(12) United States Patent
Kwon et al.

(10) Patent No.: US 12,412,965 B2
(45) Date of Patent: *Sep. 9, 2025

(54) CYLINDRICAL BATTERY, BATTERY PACK AND VEHICLE

(71) Applicant: LG Energy Solution, Ltd., Seoul (KR)

(72) Inventors: Yong-Hwan Kwon, Daejeon (KR); Dong-Wook Kim, Daejeon (KR); Ji-Young Park, Daejeon (KR); Ju-Nam Son, Daejeon (KR); Seo-Hyeon Chae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/848,306

(22) PCT Filed: Jul. 19, 2023

(86) PCT No.: PCT/KR2023/010452
§ 371 (c)(1),
(2) Date: Jan. 8, 2025

(87) PCT Pub. No.: WO2024/019552
PCT Pub. Date: Jan. 25, 2024

(65) Prior Publication Data
US 2025/0167278 A1    May 22, 2025

(30) Foreign Application Priority Data

Jul. 19, 2022   (KR) .................. 10-2022-0089226
Jul. 19, 2023   (KR) .................. 10-2023-0094183

(51) Int. Cl.
*H01M 50/538*   (2021.01)
*H01M 10/04*   (2006.01)
(Continued)

(52) U.S. Cl.
CPC ..... *H01M 50/538* (2021.01); *H01M 10/0422* (2013.01); *H01M 10/0431* (2013.01);
(Continued)

(58) Field of Classification Search
CPC ......... H01M 10/0431; H01M 2220/20; H01M 10/0422
See application file for complete search history.

(56) References Cited

U.S. PATENT DOCUMENTS 3,298,871 A * 1/1967 Lecouffe ................. H01M 6/10
429/94
5,508,122 A * 4/1996 Narukawa ............... H01M 6/10
429/94
(Continued)

FOREIGN PATENT DOCUMENTS

CN        205319258 U    6/2016
JP        2006164773 A   6/2006
(Continued)

OTHER PUBLICATIONS

International Search Report for Application No. PCT/KR2023/010452 mailed Nov. 20, 2023, pp. 1-3.
(Continued)

*Primary Examiner* — Michael L Dignan
(74) *Attorney, Agent, or Firm* — Lerner David LLP

(57) ABSTRACT

A cylindrical battery includes an electrode assembly and a cylindrical battery housing. The electrode assembly includes a core and an outer circumference. The cylindrical battery includes a first fan-shaped region and a second fan-shaped region. The first fan-shaped region is surrounded by a first straight line and a second straight line passing from a center of the core through a core side end of the first and second electrodes, respectively, and the outer circumference is defined as a stress vulnerable region. The second fan-shaped
(Continued)

region is surrounded by a third straight line and a fourth straight line passing from the center of the core through an outer circumference side end of the first and second electrodes, respectively, and the outer circumference is defined as a stress amplification region. A battery pack and vehicle including the same are also provided.

33 Claims, 62 Drawing Sheets

(51) Int. Cl.
 *H01M 50/184* (2021.01)
 *H01M 50/213* (2021.01)
 *H01M 50/249* (2021.01)
(52) U.S. Cl.
 CPC ....... *H01M 50/184* (2021.01); *H01M 50/213* (2021.01); *H01M 50/249* (2021.01); *H01M 2220/20* (2013.01)

(56) References Cited

U.S. PATENT DOCUMENTS

| | | | |
|---|---|---|---|
| 6,391,488 B1 * | 5/2002 | Shimizu | H01M 6/10 429/231.95 |
| 6,677,082 B2 | 1/2004 | Thackeray et al. | |
| 6,680,143 B2 | 1/2004 | Thackeray et al. | |
| 2005/0031950 A1 * | 2/2005 | Maeda | H01M 10/345 429/218.2 |
| 2007/0196730 A1 | 8/2007 | Kozuki | |
| 2016/0218368 A1 * | 7/2016 | Yamada | H02J 7/007194 |
| 2016/0351966 A1 | 12/2016 | Batson et al. | |
| 2017/0271640 A1 | 9/2017 | Sakamoto | |
| 2021/0344033 A1 * | 11/2021 | Park | H01M 50/152 |
| 2021/0376391 A1 * | 12/2021 | Okuda | H01M 10/0431 |
| 2022/0123373 A1 * | 4/2022 | Takahashi | B64D 27/34 |

FOREIGN PATENT DOCUMENTS

| | | |
|---|---|---|
| JP | 2008047462 A | 2/2008 |
| JP | 5082256 B2 | 11/2012 |
| KR | 20190125250 A | 11/2019 |
| KR | 20200041625 A | 4/2020 |
| KR | 102262668 B1 | 6/2021 |
| WO | 2020084986 A1 | 4/2020 |

OTHER PUBLICATIONS

Written Opinion of The International Searching Authority, for Application No. PCT/KR2023/010452, dated Nov. 20, 2023, pp. 1-5.

* cited by examiner

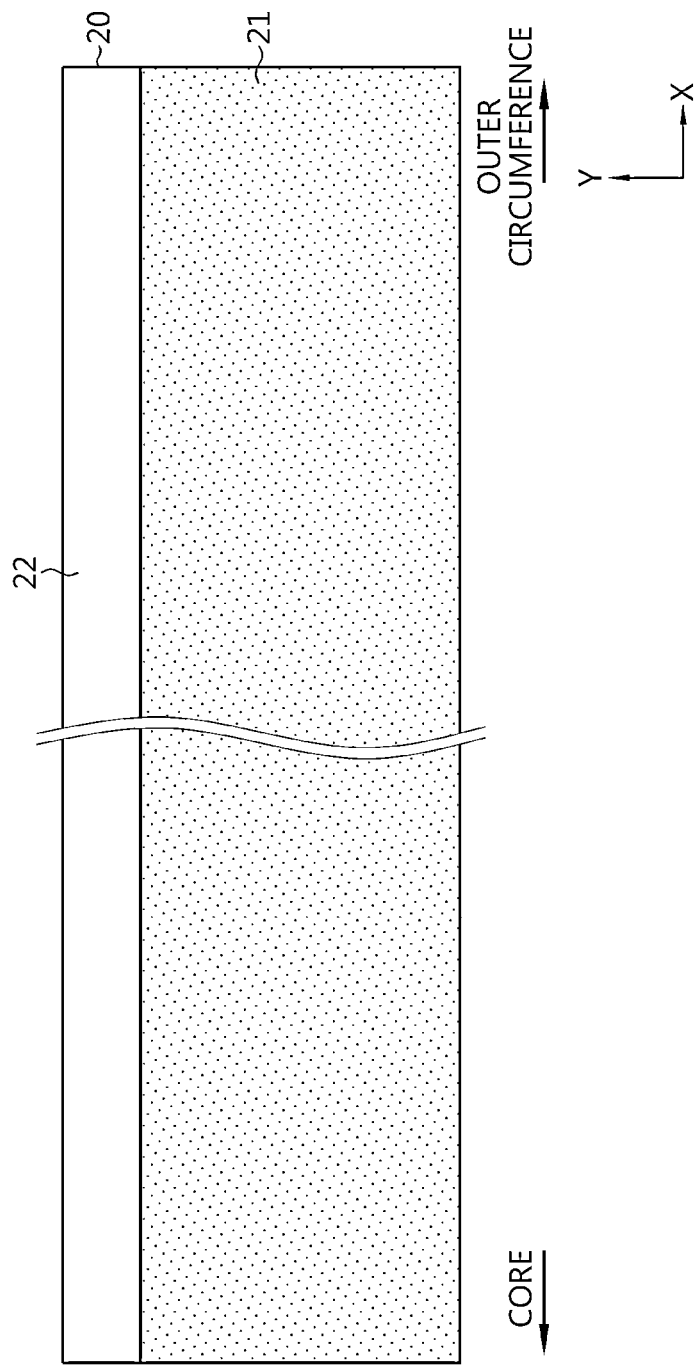

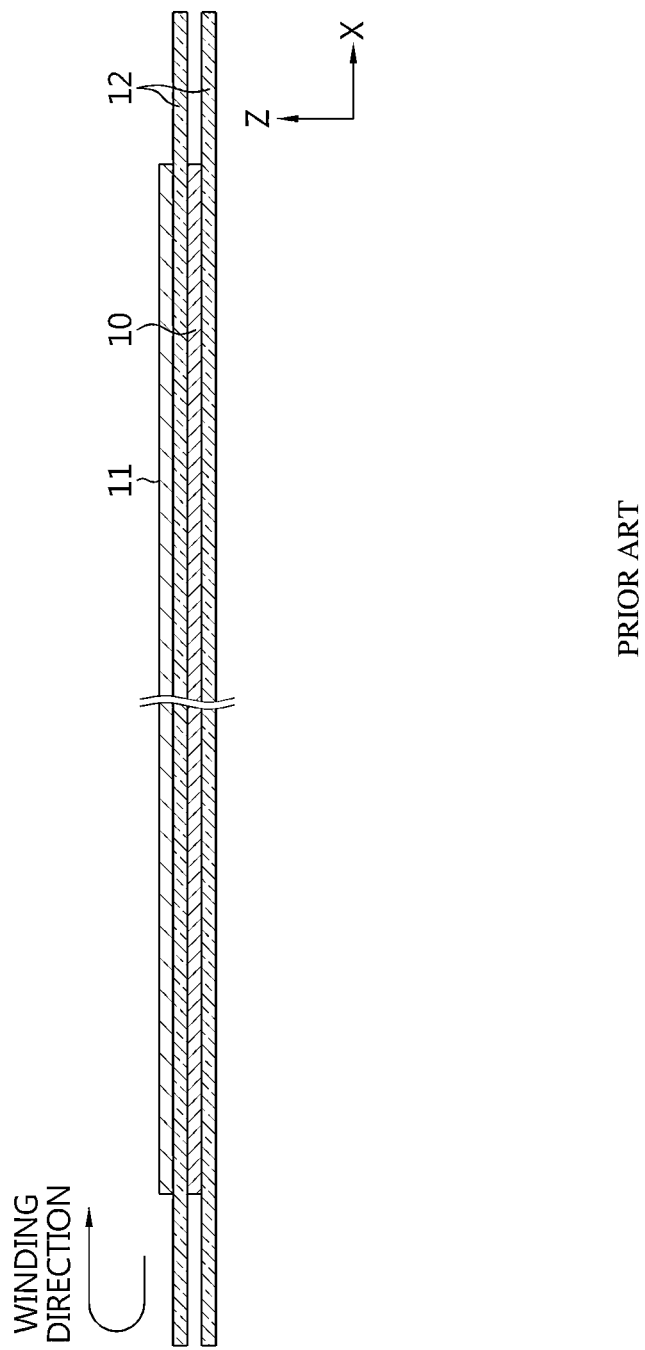

PRIOR ART

PRIOR ART

PRIOR ART

FIG. 5a
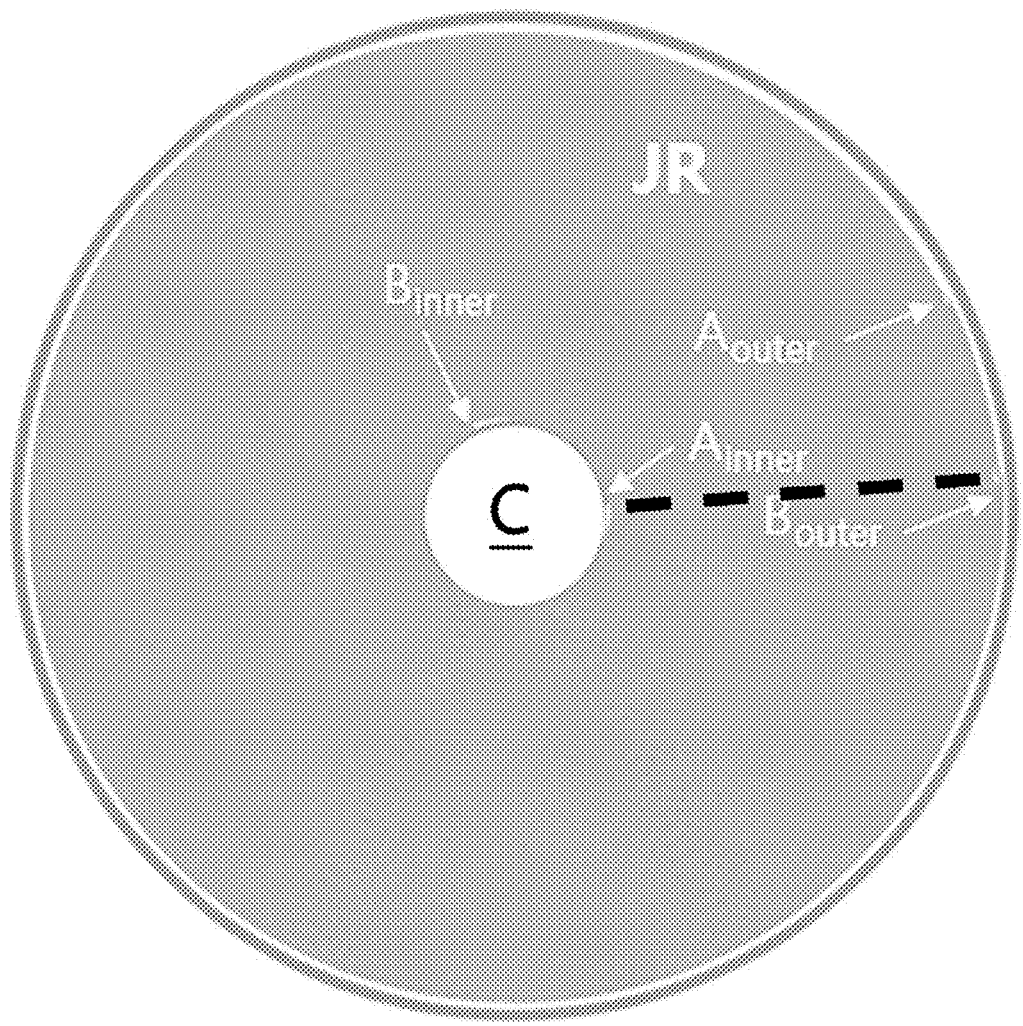
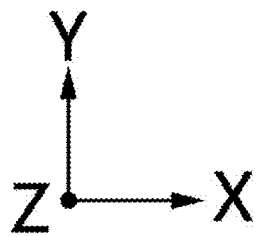

FIG. 5b
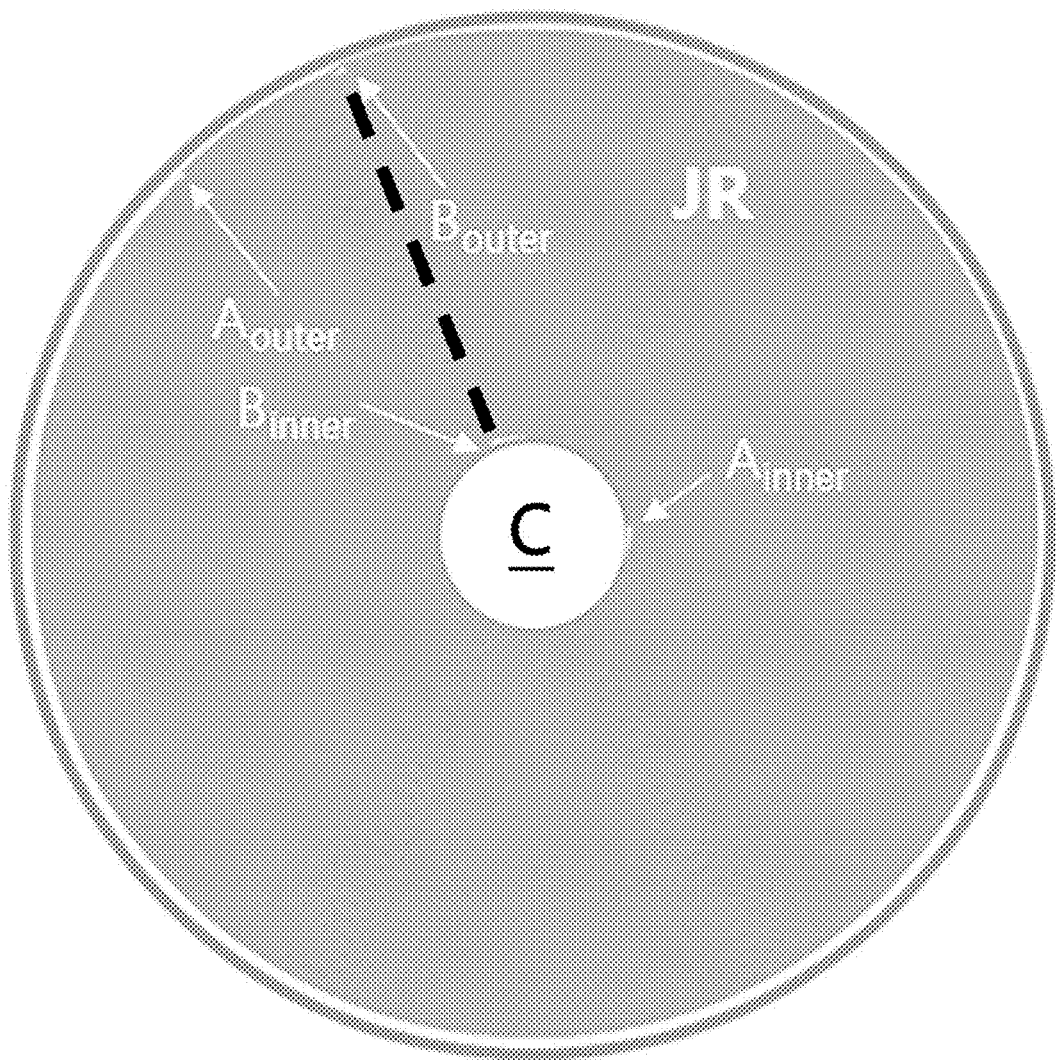
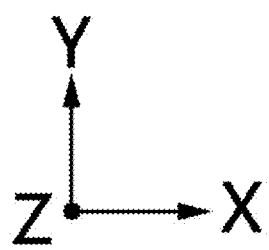

FIG. 5c
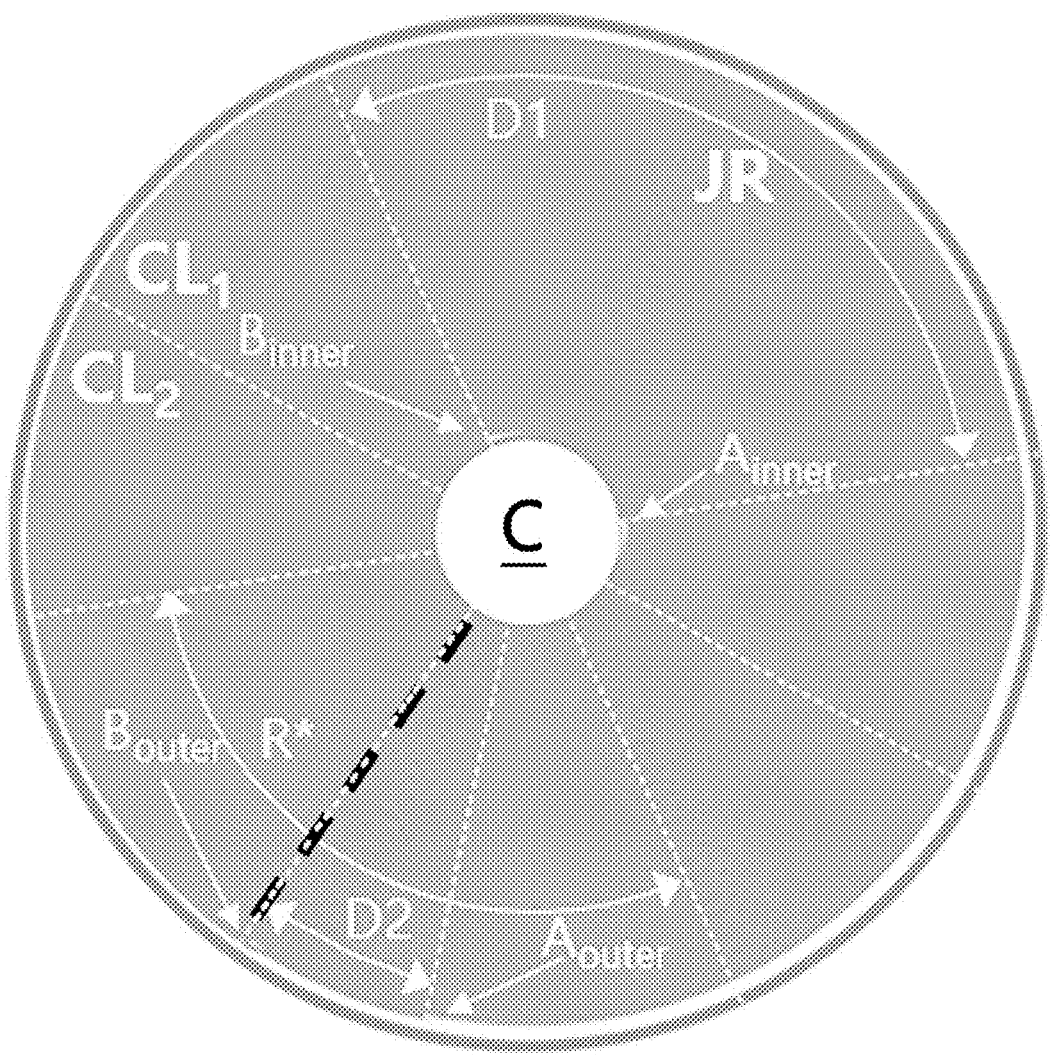
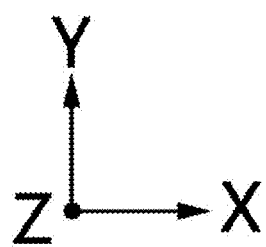

after 300 cycles

BOL

BOL

BOL

BOL

BOL

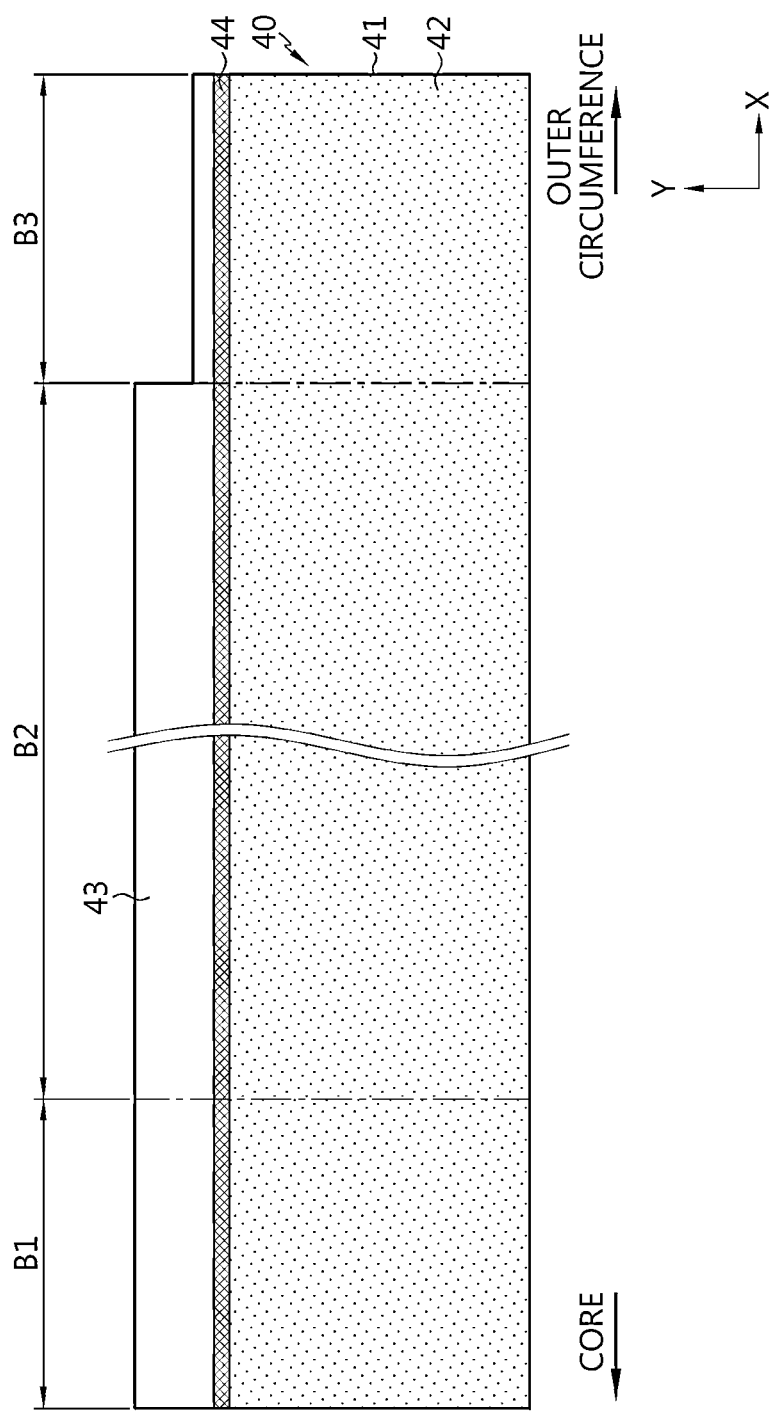

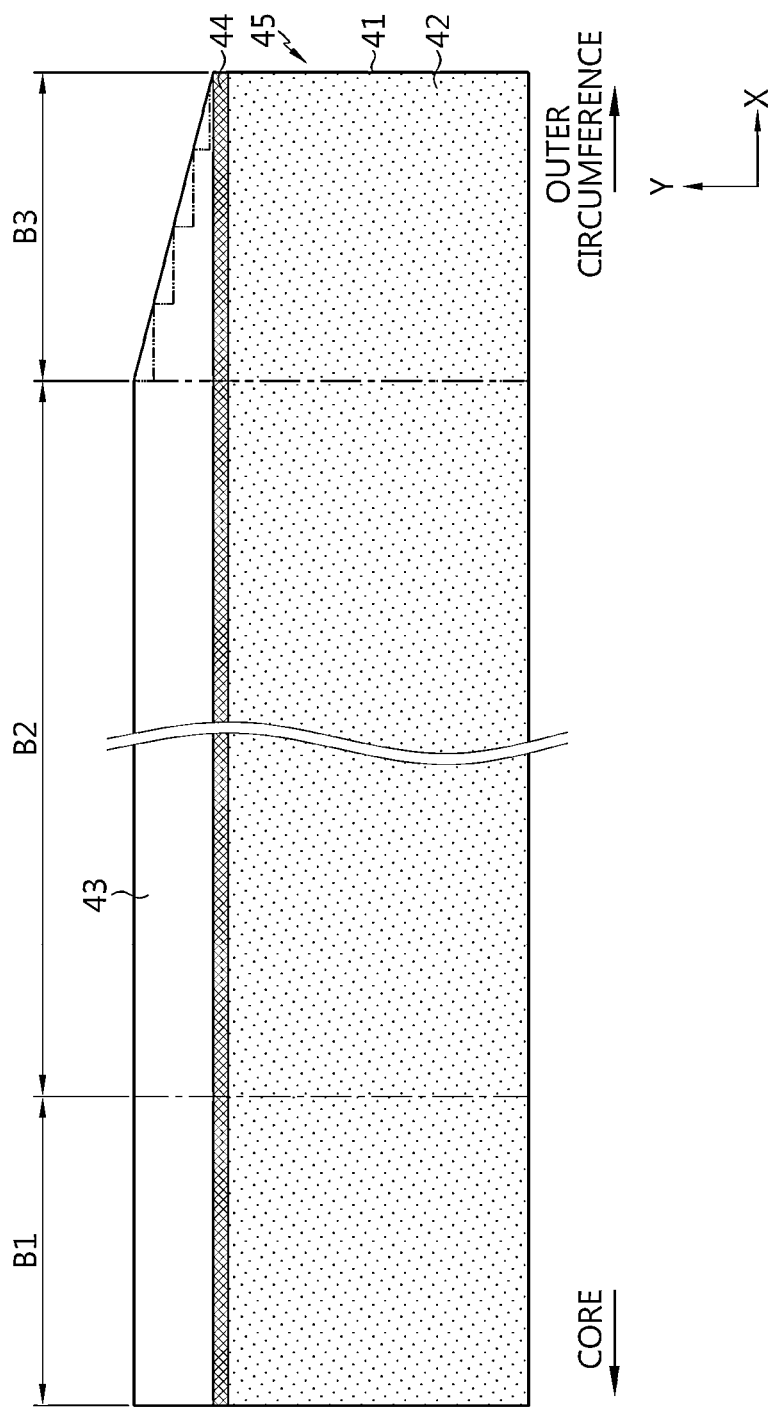

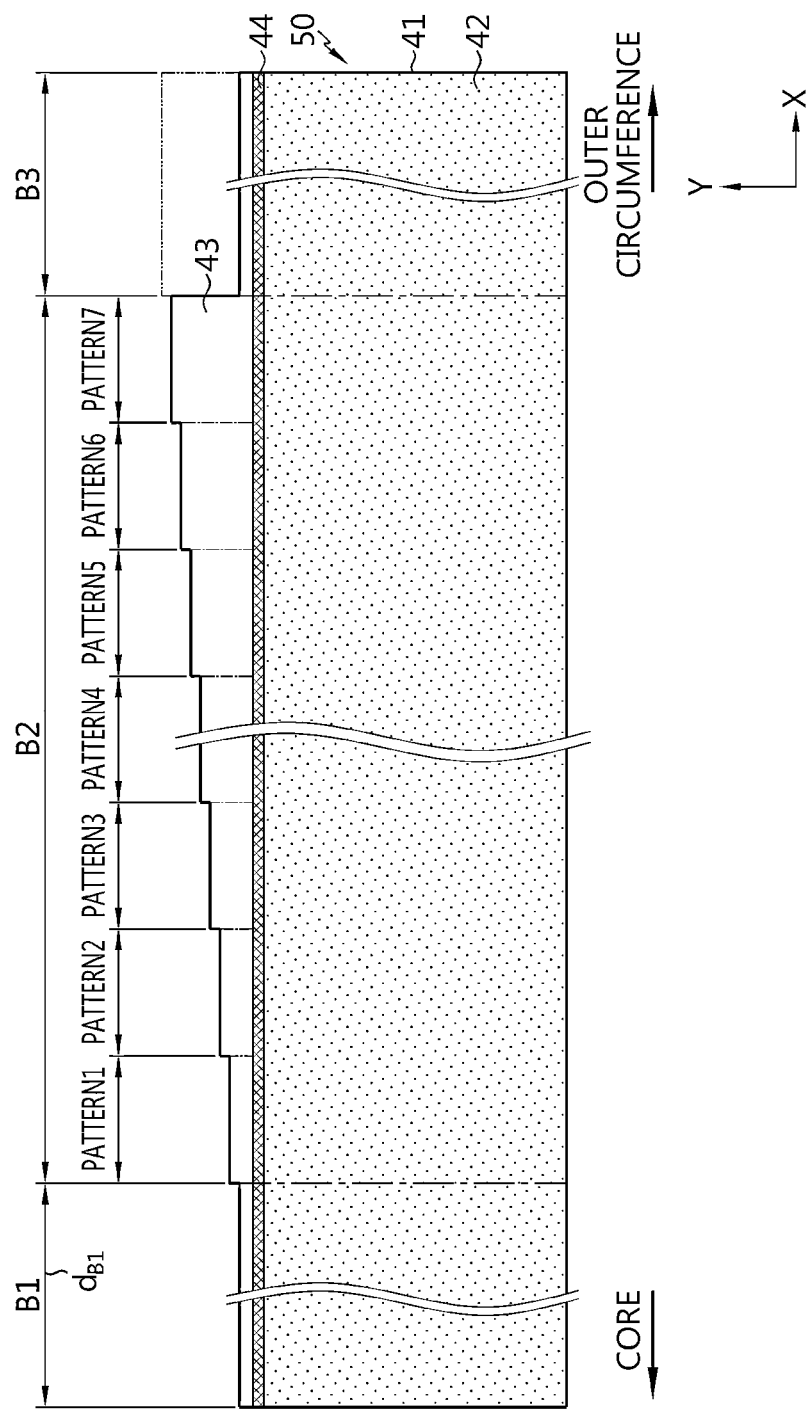

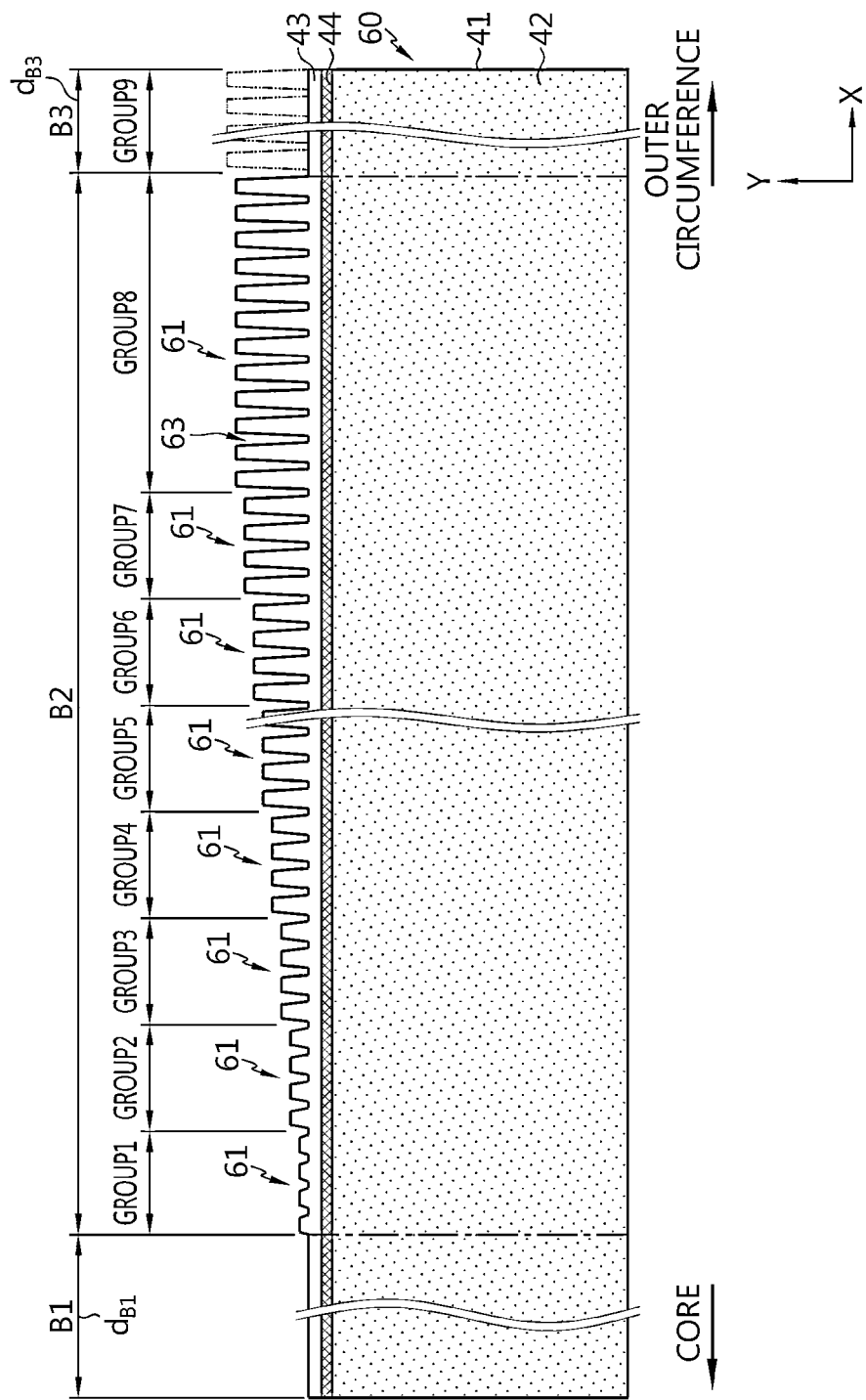

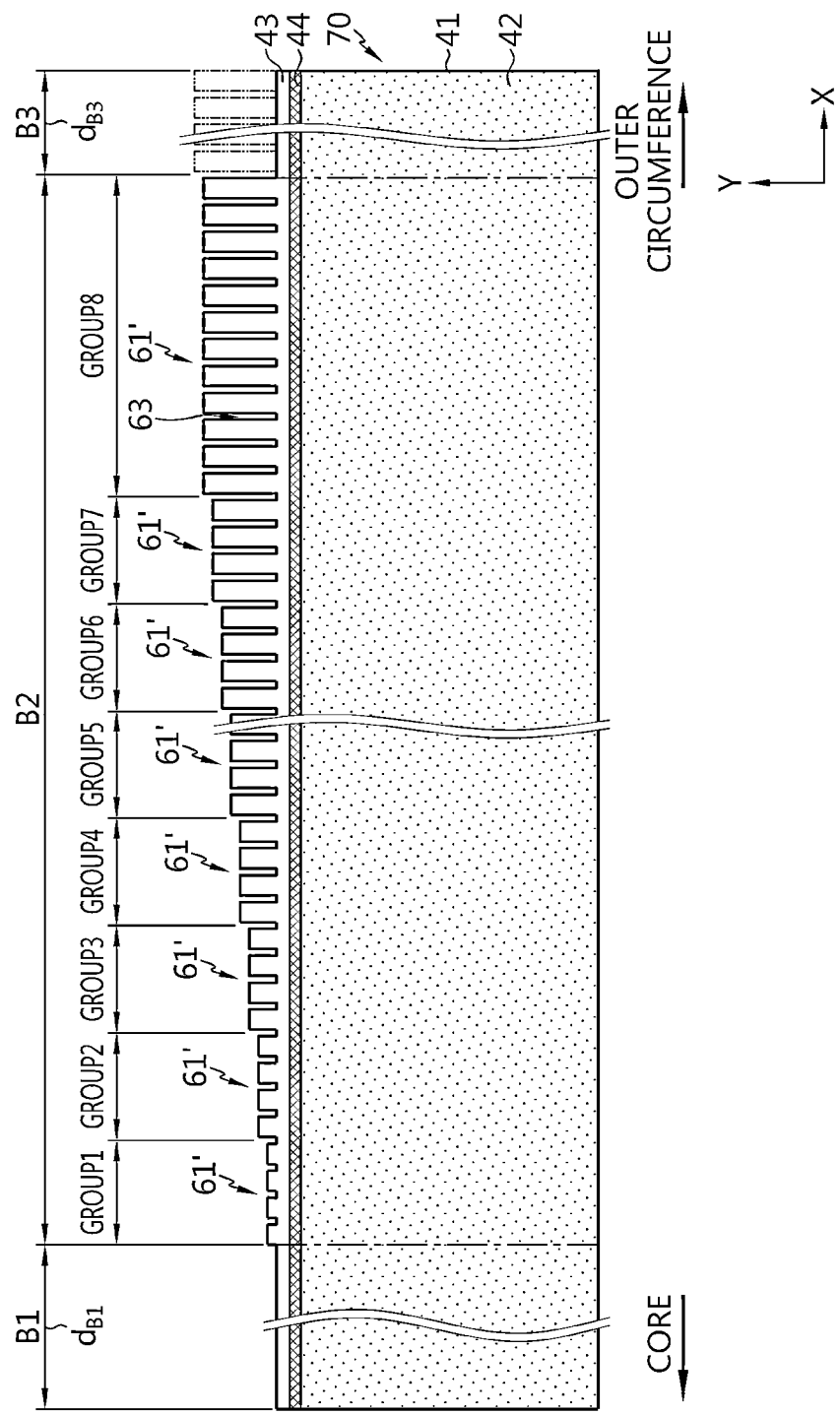

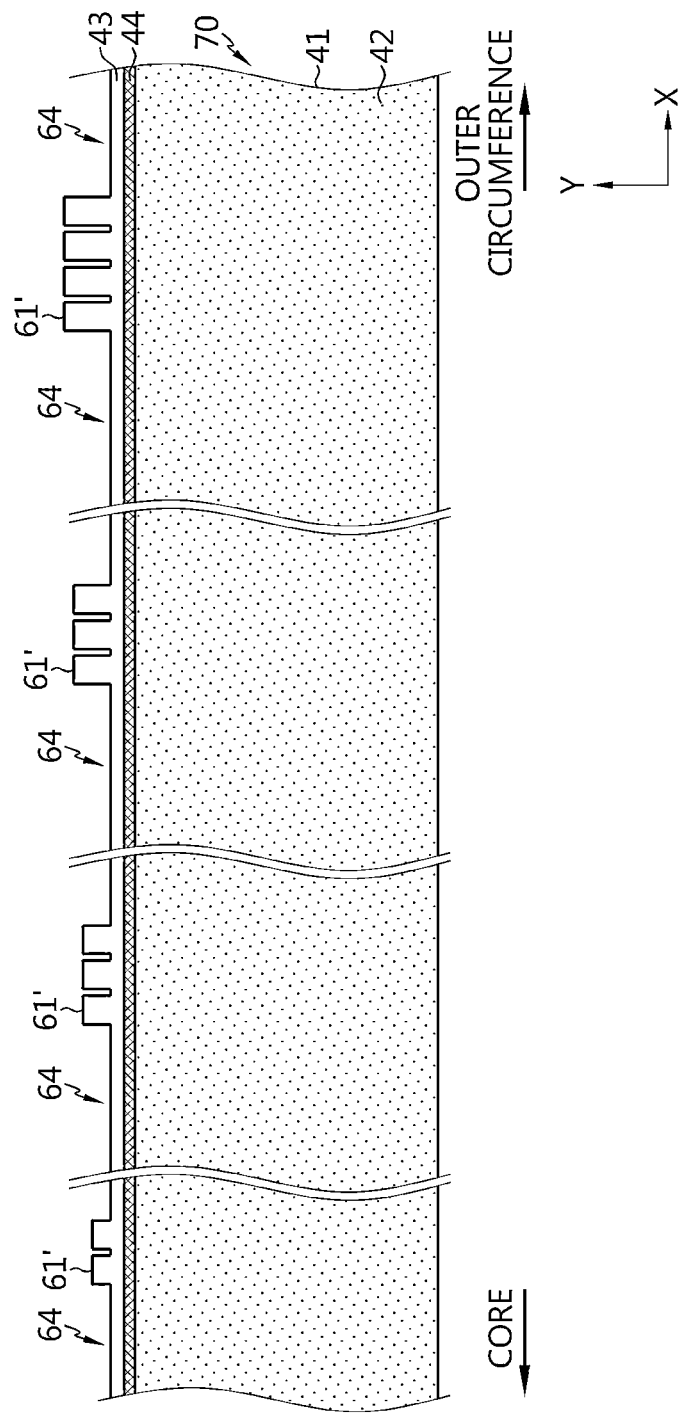

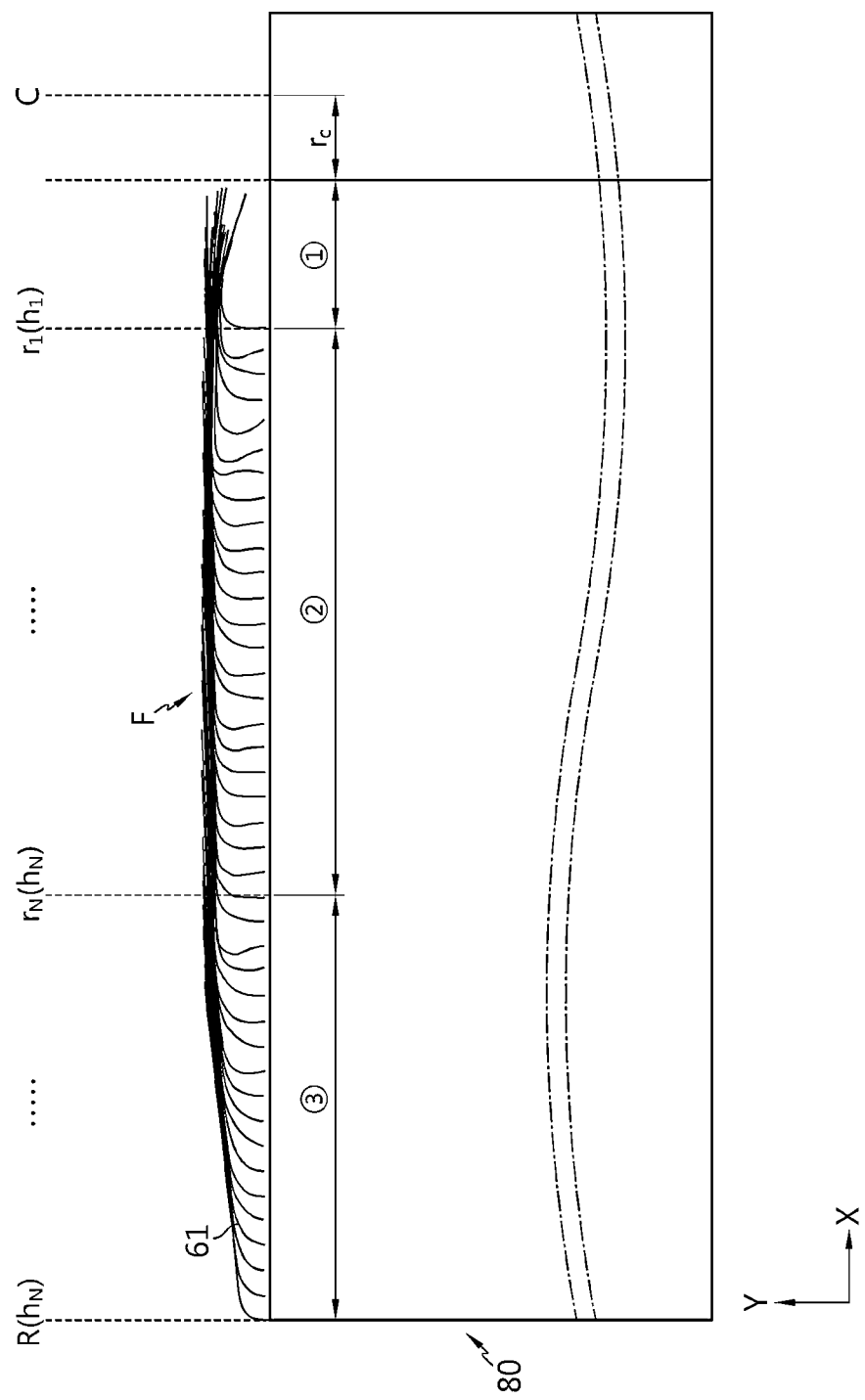

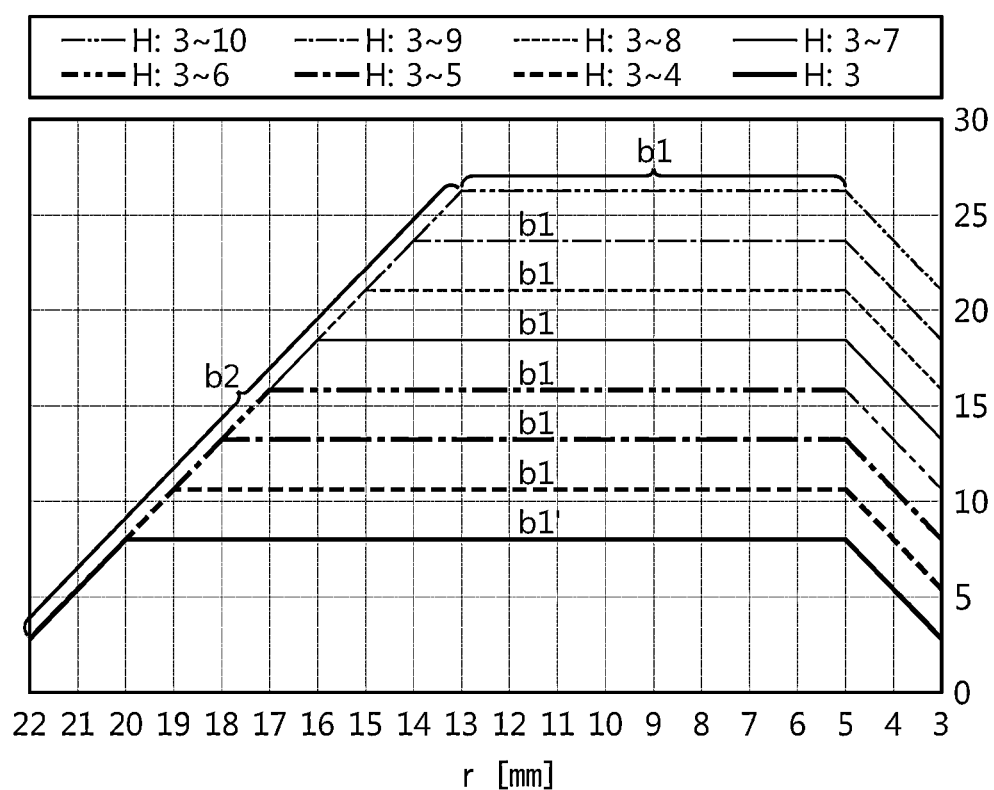

CYLINDRICAL BATTERY, BATTERY PACK AND VEHICLE

CROSS-REFERENCE TO RELATED APPLICATION(S)

The present application is a national phase entry under 35 U.S.C. § 371 of International Application No. PCT/KR2023/010452, filed on Jul. 19, 2023, which claims priority from Korean Patent Application No. 10-2022-0089226, filed on Jul. 19, 2022, and Korean Patent Application No. 10-2023-0094183, filed on Jul. 19, 2023, all of which are incorporated herein by reference.

TECHNICAL FIELD

The present disclosure relates to a cylindrical battery, a battery pack, and a vehicle, and more specifically, to a cylindrical battery capable of maintaining the symmetry and circularity of an electrode assembly core despite the increase in the charging and discharging cycle by controlling the positions of the ends of a positive electrode and a negative electrode in a winding direction, and a battery pack and a vehicle including the same.

BACKGROUND ART

Secondary batteries that are easily applicable to various product groups and have electrical characteristics such as high energy density are universally applied not only to portable devices but also to electric vehicles (EVs), hybrid electric vehicles (HEVs) or plug-in hybrid electric vehicles (PHEVs) driven by a motor.

Hereinafter, an electric vehicle will be used as a term to refer to a vehicle that includes an electrically driven motor, such as EV, HEV, and PHEV.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery has an operating voltage of about 2.5V to 4.5V. Therefore, when a higher output voltage is required, a battery pack is configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing along with an electrolyte to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, in a cylindrical battery with a form factor of 1865, 2170, or the like, the positive electrode terminal is a cap of a sealing body that seals the opening of the battery housing, and the negative electrode terminal is the battery housing.

However, according to the conventional cylindrical battery, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor 1865, a form factor 2170, or the like, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collector is welded to the uncoated portion to improve the current collecting efficiency.

FIGS. 1a to 1c are diagrams showing a process of manufacturing a tab-less cylindrical battery. FIG. 1a shows the structure of an electrode, FIG. 1b shows a process of winding the electrode, and FIG. 1c shows a process of welding a current collector to a bent surface of an uncoated portion. FIG. 1d is a cross-sectional view showing the tab-less cylindrical battery, taken along the longitudinal direction Y.

Referring to FIGS. 1a to 1d, a positive electrode 10 and a negative electrode 11 have a structure in which a sheet-shaped current collector 20 is coated with an active material 21, and include an uncoated portion 22 at one long side along the winding direction X.

An electrode assembly A is manufactured by sequentially stacking the positive electrode 10 and the negative electrode 11 together with two sheets of separators 12 as shown in FIG. 1b and then winding them in one direction X. At this time, the uncoated portions of the positive electrode 10 and the negative electrode 11 are arranged in opposite directions.

After the winding process, the uncoated portion 10a of the positive electrode 10 and the uncoated portion 11a of the negative electrode 11 are bent toward the core. After that, current collectors 30, 31 are welded and coupled to the uncoated portions 10a, 11a, respectively.

An electrode tab is not separately coupled to the positive electrode uncoated portion 10a and the negative electrode uncoated portion 11a, the current collectors 30, 31 are connected to external electrode terminals, and a current path is formed with a large cross-sectional area along the winding axis direction of the electrode assembly A (see arrow, which has an advantage of lowering the resistance of the battery. This is because resistance is inversely proportional to the cross-sectional area of the path through which the current flows.

The electrode assembly A is inserted into the battery housing 32. The current collector 31 is welded to the bottom surface of the battery housing 32. At the upper portion of the edge of the current collector 31, the outer circumferential surface of the battery housing 32 is press-fitted to form the beading portion 33. The inner surface of the beading portion 33 presses the edge of the current collector 30. As a result, the electrode assembly A is firmly fixed inside the battery housing 32.

After the electrode assembly A is fixed inside the battery housing 32, electrolyte is injected into the battery housing 32. After that, the cap assembly 34 is coupled to the open portion of the battery housing 32.

The cap assembly 34 may include a cap 34a, a connection plate 34c coupled to the lower portion of the cap 34a, and a sealing gasket 34b that seals the periphery of the cap 34a and the open portion of the battery housing 32.

The upper portion of the beading portion 33 includes a crimping portion 35. The crimping portion 35 is formed by bending the open portion of the battery housing 32 inward, and seals the open portion of the battery housing 32 by pressing the sealing gasket 34b toward the edge surface of the cap 34a.

The current collector 30 and the connection plate 34c may be electrically connected by a lead 30a. The lead 30a may be manufactured as a separate part and connected to the current collector 30, or may be manufactured integrally with the current collector 30 and extended and coupled to the connection plate 34c.

An insulator 36 is disposed on the upper portion of the current collector 30. The edge of the insulator 36 may be interposed between the beading portion 33 and the current collector 30. Accordingly, the beading portion 33 presses the electrode assembly A toward the bottom of the battery housing 32 through the insulator 36.

Meanwhile, as the charging and discharging cycle of the cylindrical battery 37 increases, swelling phenomenon occurs and internal pressure increases. The swelling phenomenon refers to a phenomenon in which the volume of the active material coated on the positive electrode 10 and the negative electrode 11 increases as charging and discharging are repeated. The degree of swelling is relatively greater on the negative electrode 11. A cavity exists in the core of the electrode assembly A manufactured through the winding process as a trace of the core member inserted therein. Therefore, when the internal pressure of the cylindrical battery 37 increases due to swelling phenomenon, stress is concentrated toward the core of the electrode assembly A. Since the battery housing is made of a highly rigid metal, most of the stress is concentrated toward the core of the electrode assembly A where an empty space exists.

When stress occurs in the electrode assembly A due to the swelling phenomenon, the stress also acts in the circumferential direction, so the positive electrode 10 and the negative electrode 11 rotate slightly while sliding with the separator interposed therebetween. Also, as the charging and discharging cycle increases, the rotation amount of the positive electrode 10 and the negative electrode 11 accumulates to create a fine gap between the positive electrode 10 and the negative electrode 11 near the core, thereby causing a local change in curvature. Therefore, even if the electrode assembly A has good symmetry and circularity immediately after winding, if swelling phenomenon occurs, the symmetry and circularity of the electrode assembly A change unlike the first time.

In addition, if the swelling phenomenon intensifies in a state where the symmetry and circularity of the electrode assembly A are changed, a partial region of the core of the electrode assembly A cannot withstand the stress but collapse. In this process, the separator near the collapse area is torn or fine cracks are generated in the electrode, which causes an internal short circuit that is noted as the main cause of ignition accidents inside the cylindrical battery.

FIGS. 2a to 2c are cross-sectional views of the electrode assembly A schematically showing the process in which the core of the electrode assembly A collapses. Each cross-sectional view shows a plane cut perpendicular to the axial direction of the electrode assembly A.

FIG. 2a shows the core structure of the electrode assembly A when the cylindrical battery 37 is in the BOL (Beginning Of Life) state. Because a step is formed at the ends of the negative electrode and the positive electrode, circularity is lowered near the ends. In addition, when straight lines L1 and L2 are drawn from the center of the core through the end of the positive electrode and the end of the negative electrode, respectively, the winding turns of the electrodes located between L1 and L2 along the circumferential direction are not constant in curvature but change.

FIG. 2b shows a state in which the volume of the electrode, especially the negative electrode, increases as the charging and discharging cycle progresses several times for the cylindrical battery 37, so that the negative and positive electrodes are rotated near the core. The change in volume of the negative electrode is greatest at the first charge during the activation process for the cylindrical battery 37. This is because the chemicals that cause the electrochemical reaction move from the positive electrode to the negative electrode and are inserted into the negative electrode.

The core of the electrode assembly A has a hollow. Therefore, rotation of the electrode occurs mainly in the core. Of course, the electrode rotates slightly in the outer circumference of the electrode assembly A, but the degree of rotation is not significant compared to the core side. This is because a hollow exists in the core of the electrode assembly A, so when rotational stress occurs, the rotational freedom of the electrode is greater at the core than at the outer circumference of the electrode assembly A.

The increase in volume of the negative electrode is relatively larger than that of the positive electrode. Also, near the core of electrode assembly A, the positive electrode is sandwiched between the winding turns of the negative electrode, so a relatively greater frictional force acts on the surface of the positive electrode than on the surface of the negative electrode. Therefore, the rotation amount of the negative electrode is greater than the rotation amount of the positive electrode. This is because the larger the volume increase, the more rotational stress occurs, and the smaller the friction force, the more sliding occurs. In FIG. 2b, the rotation of the positive and negative electrodes may be found from the fact that the core side ends of the positive and negative electrodes rotate clockwise. The direction in which the electrode end rotates in the core of the electrode assembly is opposite to the winding direction.

FIG. 2c shows the core structure when the swelling phenomenon intensifies as the charging and discharging cycle for the cylindrical battery 37 progresses hundreds of times. Due to the intensification of the swelling phenomenon, the end of the negative electrode rotates to the point where the end of the positive electrode is located. As a result, collapse occurred in the core area. When the core collapses, the structure of the winding turn, which had an arc shape convex outward, like the winding turns of the electrode located in the 3 o'clock to 6 o'clock direction, is transformed into a shape that is convex toward the core.

If the core of the electrode assembly A collapses as shown in FIG. 2c, the close contact between the positive electrode 10 and the negative electrode 11 is not maintained, a fine gap occurs at the interface between the electrodes, and the battery capacity suddenly decreases. Also, near the collapse area, the electrode and the separator collapse toward the core, causing the separator to tear or a fine crack to occur in the electrode, and thus the positive electrode 10 and the negative electrode 11 may contact each other, thereby causing an internal short circuit.

The collapse of the core of the electrode assembly A becomes more severe as the diameter of the electrode assembly A increases. This is because as the diameter of the electrode assembly A increases, the rotational force in the circumferential direction caused by the increase in electrode volume further increases. Therefore, when manufacturing large-diameter cylindrical batteries having a form factor 4680 (diameter: 46 mm, height: 80 mm), a special design is required to prevent the core of the electrode assembly from collapsing.

DISCLOSURE

Technical Problem

The present disclosure is designed to solve the problems of the related art. The rotation of positive and negative electrodes due to the swelling phenomenon of a cylindrical battery affects the symmetry and circularity of an electrode assembly. Therefore, in order to prevent the core of the electrode assembly from collapsing, it is necessary to optimally design the relative positions of the positive and negative electrodes within the electrode assembly by considering the rotation of the positive and negative electrodes.

The present disclosure is directed to deriving a structure design capable of preventing the core from collapsing by maintaining the symmetry and circularity of the core of the electrode assembly even if swelling phenomenon occurs by adjusting relative positions of a positive electrode end and a negative electrode end at the core and the outer circumference of the electrode assembly, when manufacturing a cylindrical battery.

The present disclosure is also directed to providing a cylindrical battery including an electrode assembly optimally designed to improve the collapse phenomenon of the core, and a battery pack and a vehicle including the same.

The technical objects of the present disclosure are not limited to the above, and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cylindrical battery, comprising: an electrode assembly in which a first electrode, a second electrode, and a separator interposed therebetween are wound based on a winding axis to define a core and an outer circumference; and a cylindrical battery housing configured to accommodate the electrode assembly.

On a cross-section of the electrode assembly perpendicular to the winding axis direction, a first fan-shaped region surrounded by a first straight line and a second straight line passing from a center of the core through a core side end of the first electrode and a core side end of the second electrode, respectively, and the outer circumference may be defined as a stress vulnerable region, and a second fan-shaped region surrounded by a third straight line and a fourth straight line passing from the center of the core through an outer circumference side end of the first electrode and an outer circumference side end of the second electrode, respectively, and the outer circumference may be defined as a stress amplification region.

The electrode assembly may have a winding structure in which among the stress amplification region, at least the outer circumference side end of the first electrode is spaced apart from the inside of the stress vulnerable region along a circumferential direction.

The electrode assembly may have a winding structure in which the stress amplification region is spaced apart from the stress vulnerable region along the circumferential direction on the cross-section.

A region of the outer circumference of the electrode assembly where the outer circumference side end of the first electrode is located may be in close contact with an inner surface of the battery housing.

The position of the outer circumference side end of the first electrode may be substantially fixed while the cylindrical battery is repeatedly charged and discharged.

On the cross-section, the cross-section may be classified into a first semicircular region and a second semicircular region based on a diametric line segment that passes through the center of the core and is perpendicular to a straight line dividing a circumferential angle of the stress vulnerable region into two equal angles.

The electrode assembly may have a winding structure in which the stress vulnerable region is located in the first semicircular region and the stress amplification region is located in the second semicircular region.

The electrode assembly may have a winding structure in which at least a part of the stress amplification region overlaps with a third fan-shaped region in the second semicircular region, which is point symmetrical with the stress vulnerable region based on the center of the core.

The electrode assembly may have a winding structure in which at least a part of the stress amplification region overlaps with a fifth straight line that divides a circumferential angle of the third fan-shaped region into equal angles.

When a straight line that divides a third fan-shaped region, which is point symmetrical with the stress vulnerable region based on the center of the core, into equal angles is a fifth straight line, the electrode assembly may have a winding structure in which the third straight line and the fourth straight line are located between the second straight line and the fifth straight line based on the circumferential direction on the cross-section.

When a straight line that divides a third fan-shaped region, which is point symmetrical with the stress vulnerable region based on the center of the core, into equal angles is a fifth straight line, the electrode assembly may have a winding structure in which the third straight line and the fourth straight line are located between the first straight line and the fifth straight line based on the circumferential direction on the cross-section.

When a straight line that divides a third fan-shaped region, which is point symmetrical with the stress vulnerable region based on the center of the core, into equal angles is a fifth straight line, the electrode assembly may have a winding structure in which the fourth straight line is located between the fifth straight line and the first straight line, and the third straight line is located between the fourth straight line and the second straight line based on the circumferential direction on the cross-section.

When a straight line that divides a third fan-shaped region, which is point symmetrical with the stress vulnerable region based on the center of the core, into equal angles is a fifth straight line, the electrode assembly may have a winding structure in which the fourth straight line is located between the fifth straight line and the first straight line, and the third straight line is located between the fifth straight line and the second straight line based on the circumferential direction on the cross-section.

When a straight line that divides a third fan-shaped region, which is point symmetrical with the stress vulnerable region based on the center of the core, into equal angles is a fifth straight line, the electrode assembly may have a winding structure in which the fourth straight line is located between the fifth straight line and the second straight line, and the third straight line is located between the fourth straight line and the first straight line based on the circumferential direction on the cross-section.

When a straight line that divides a third fan-shaped region, which is point symmetrical with the stress vulnerable region based on the center of the core, into equal angles is a fifth straight line, the electrode assembly may have a winding structure in which the fourth straight line is located between the fifth straight line and the second straight line, and the third straight line is located between the fifth straight line and the first straight line based on the circumferential direction on the cross-section.

The electrode assembly may have a winding structure in which a circumferential angle between the first straight line and the fourth straight line is greater than a circumferential angle between the second straight line and the third straight line, based on the circumferential direction on the cross-section.

The electrode assembly may have a winding structure in which a circumferential angle between the second straight line and the fourth straight line is greater than a circumferential angle between the first straight line and the third straight line, based on the circumferential direction on the cross-section.

The electrode assembly may have a winding structure in which a circumferential angle of the stress amplification region is smaller than a circumferential angle of the stress vulnerable region, based on the center of the core.

The winding structure of the electrode assembly as described above may be maintained during charging and discharging for 200 cycles or more, 300 cycles or more, 400 cycles or more, 500 cycles or more, 600 cycles or more, 700 cycles or more, 800 cycles or more, or 900 cycles or more.

One cycle may include full charge and full discharge. Full charge means a charge that increases the SOC of a cylindrical battery from 0% to 100%. Full discharge means a discharge that reduces the SOC of a cylindrical battery from 100% to 0%. The magnitude of the charging current and the charging temperature of full charge may be selected according to the effective operating conditions of the cylindrical battery. Likewise, the magnitude of the discharge current and the discharge temperature for full discharge may be selected from the effective operating conditions of the cylindrical battery.

The first electrode and the second electrode may be a positive electrode and a negative electrode, respectively. At least a part of negative electrode winding turns formed by only the second electrode may be provided adjacent to the core side. A winding turn in which at least a part of the negative electrode winding turns faces in a radial direction may be the winding turn of the negative electrode.

A plurality of winding turns formed by only the separator may be provided at an inner side of the negative electrode winding turn.

The first electrode and the second electrode may be a positive electrode and a negative electrode, respectively. The core side end of the second electrode may extend further in a direction opposite to the winding direction than the core side end of the first electrode to form at least a part of the innermost winding turn. The outer circumference side end of the second electrode may extend further in the winding direction than the outer circumference side end of the first electrode to form at least a part of the outermost winding turn.

The electrode assembly may have a winding structure in which a circumferential angle of the stress vulnerable region has an angle of 30 degrees or more and less than 180 degrees, and a circumferential angle of the stress amplification region has an angle of 10 degrees or more and 90 degrees or less.

The electrode assembly may have a winding structure in which the circumferential angle of the stress vulnerable region is has an angle of 87 degrees or more and the circumferential angle of the stress amplification region has an angle of 32 degrees or less.

The battery housing may include an open end and a bottom portion opposing thereto, accommodate the electrode assembly in the space between the open end and the bottom portion, and be electrically connected to one of the first electrode and the second electrode to have a first polarity The cylindrical battery may further comprise a sealing body configured to seal the open end of the battery housing; and a terminal electrically connected to the other of the first electrode and the second electrode to have a second polarity and having a surface exposed to the outside.

The first electrode may include a first uncoated portion at a long side end along a winding direction of the electrode assembly.

The second electrode may include a second uncoated portion at a long side end along the winding direction.

The first uncoated portion may extend and protrude outward from the separator through one end of the electrode assembly and be bent in a radial direction of the electrode assembly to form a first bending surface region. The first uncoated portion may include a plurality of segments separated by cut grooves. The plurality of segments may be arranged along the winding direction of the electrode assembly. The first bending surface region may be formed by bending the plurality of segments along the radial direction of the electrode assembly.

The second uncoated portion may extend and protrude outward from the separator through the other end of the electrode assembly and be bent toward the core to form a second bending surface region. The second uncoated portion may include a plurality of segments separated by cut grooves. The plurality of segments may be arranged along the winding direction of the electrode assembly. The second bending surface region may be formed by bending the plurality of segments along the radial direction of the electrode assembly.

The cylindrical battery may further include a first current collector welded to the first bending surface region; and/or a second current collector welded to the second bending surface region.

The welding region of the first current collector and/or the second current collector may have a radial structure based on the core center of the electrode assembly.

The welding structure between the first bending surface region and the first current collector and/or the welding structure between the second bending surface region and the second current collector may work synergistically with the winding structure of the electrode assembly described above to suppress the electrode from rotating while the cylindrical battery is charged and discharged.

The battery may have a ratio of diameter to height greater than 0.4.

The battery may have a form factor of 46110, 4875, 48110, 4880, 4680, or 4695.

In another aspect of the present disclosure, there is also provided a vehicle, comprising the battery pack including a plurality of cylindrical batteries as described above.

Advantageous Effects

According to an embodiment of the present disclosure, it is possible to prevent the core from collapsing by maintaining the symmetry and circularity of the electrode assembly even if swelling phenomenon occurs by adjusting relative positions of a positive electrode end and a negative electrode end at the core and the outer circumference of the electrode assembly of the cylindrical battery.

According to another embodiment of the present disclosure, it is possible to provide a cylindrical battery including an electrode assembly with a structure capable of improving the collapse phenomenon of the core.

According to still another embodiment of the present disclosure, a battery pack manufactured using the cylindrical battery with an improved structure and a vehicle including the same may be provided.

In addition to the above effects, specific effects of the present disclosure will be described below while explaining the specific details for carrying out the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1a is a plan view showing a structure of an electrode used for a conventional tab-less cylindrical battery.

FIG. 1b is a diagram showing a process of winding an electrode assembly included in the conventional tab-less cylindrical battery.

FIG. 5a is a diagram showing relative positions of a core side end ($A_{inner}$) and an outer circumference side end ($A_{outer}$) of the negative electrode and a core side end ($B_{inner}$) and an outer circumference side end ($B_{outer}$) of the positive electrode B according to an embodiment of the present disclosure.

FIG. 5b is a diagram showing relative positions of a core side end ($A_{inner}$) and an outer circumference side end ($A_{outer}$) of the negative electrode and a core side end ($B_{inner}$) and an outer circumference side end ($B_{outer}$) of the positive electrode B according to another embodiment of the present disclosure.

FIG. 5c is a diagram showing relative positions of a core side end ($A_{inner}$) and an outer circumference side end ($A_{outer}$) of the negative electrode and a core side end ($B_{inner}$) and an outer circumference side end ($B_{outer}$) of the positive electrode B according to still another embodiment of the present disclosure.

FIG. 14a is a plan view showing a structure of an electrode according to the first embodiment of the present disclosure.

FIG. 14b is a plan view showing the structure of an electrode according to the second embodiment of the present disclosure.

FIG. 14c is a plan view showing the structure of an electrode according to the third embodiment of the present disclosure.

FIG. 14d is a plan view showing the structure of an electrode according to the fourth embodiment of the present disclosure.

FIG. 15a is a plan view showing the structure of an electrode according to the fifth embodiment of the present disclosure.

FIG. 15c is a plan view showing a modified structure of the electrode according to the fifth embodiment of the present disclosure.

FIG. 17a is a schematic diagram showing a cross section of a bending surface region formed by bending the segment toward the core of the electrode assembly.

FIG. 17c is graphs showing the results of counting the stack number of segments along a radial direction in the bending surface region of a positive electrode formed at the upper portion of the electrode assemblies according to the embodiments 1-1 to 1-7 and the comparative example.

DETAILED DESCRIPTION

Figure 1C:
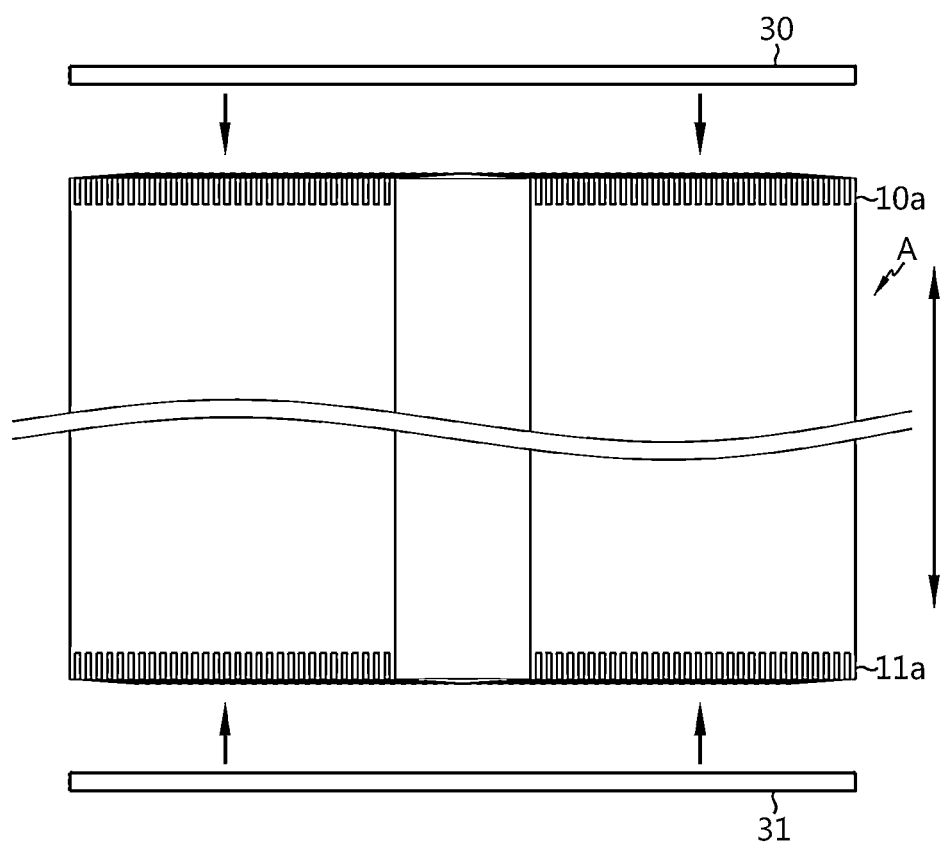
FIG. 1c is a diagram showing a process of welding a current collector to a bent surface of an uncoated portion in the electrode assembly of FIG. 1b.

The above-mentioned purpose, features and advantages are described in detail later with reference to the attached drawings, and accordingly, a person skilled in the art in the technical field to which the present disclosure belongs will be able to easily implement the technical idea of the present disclosure. When explaining the present disclosure, if it is deemed that a detailed description of the publicly known technology related to the present disclosure may unnecessarily obscure the gist of the present disclosure, the detailed explanation is omitted. Hereinafter, a preferred embodiment according to the present disclosure will be described in detail with reference to the attached drawings. In the drawings, identical reference signs are used to indicate identical or similar components.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

Hereinafter, when an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Singular expressions used in this specification include plural expressions unless the context clearly indicates otherwise. In this application, terms such as "including" or "comprising" should not be construed as necessarily including all of the various components or steps described in the specification, and it should be construed that some of the components or some of the steps may not be included, or additional components or steps may be further included.

Also, singular expressions used in this specification include plural expressions unless the context clearly indicates otherwise. In this application, terms such as "including" or "comprising" should not be construed as necessarily including all of the various components or steps described in the specification, and it should be construed that some of the components or some of the steps may not be included, or additional components or steps may be further included.

Throughout the specification, "A and/or B" refers to either A or B or both A and B unless expressly stated otherwise, and "C to D" refers to C or greater and D or smaller unless expressly stated otherwise.

For convenience of description, a direction that goes along a lengthwise direction of a winding axis of an electrode assembly wound in a roll shape is herein referred to as an axis direction Y. Additionally, a direction around the winding axis is herein referred to as a circumferential or peripheral direction X. Additionally, a direction that gets closer to or faces away from the winding axis is referred to as a radial or radiating direction Z. Among them, in particular, the direction that gets closer to the winding axis is referred to as a centripetal direction, and the direction that faces away from the winding axis is referred to as a centrifugal direction.

Hereinafter, a preferred embodiment of the present disclosure will be described with reference to the accompanying drawings.

Figure 3:
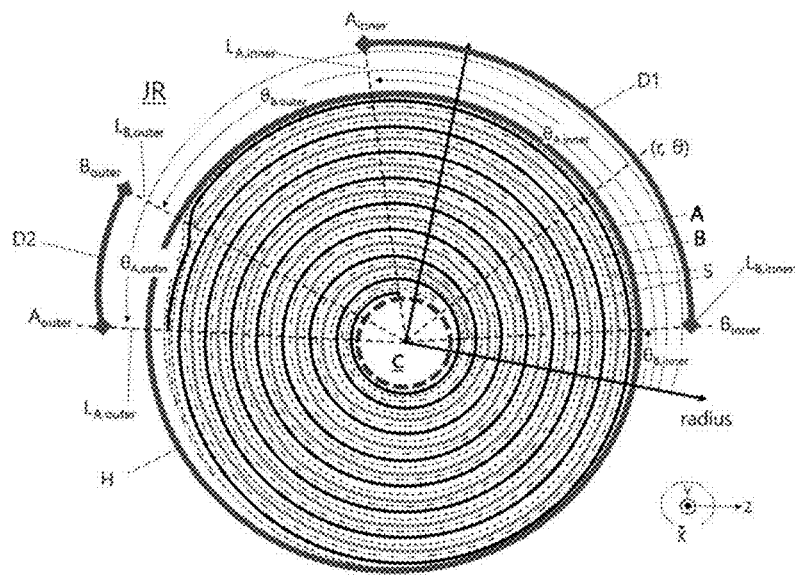
FIG. 3 is a cross-sectional view showing a cylindrical battery according to an embodiment of the present disclosure, taken perpendicular to the axial direction Y.

FIG. 3 is a cross-sectional view showing a cylindrical battery according to an embodiment of the present disclosure, taken perpendicular to the axial direction Y.

Referring to FIG. 3, the electrode assembly jelly-roll (JR) according to the embodiment has a jelly-roll structure in which a negative electrode A and a positive electrode B are wound around one axis with a separator S interposed therebetween. In an embodiment, the positive electrode B may be the first electrode, and the negative electrode A may be the second electrode, or vice versa. The winding direction X is a counterclockwise direction, but may be replaced with a clockwise direction. When the winding direction X is a clockwise, it is obvious that the rotating direction of the electrode described below may be reversed.

A hollow is formed in the core C of the electrode assembly JR. The hollow is an empty space. Alternatively, a center pin used in the process of winding the electrode assembly JR may be disposed in the hollow. There are two separators S, as indicated by dotted and dashed lines, respectively. The arrangement structure of the separators S may be modified in various ways as long as they can insulate the negative electrode A and the positive electrode B from each other.

The winding structure of the negative electrode A, the positive electrode B, and the separator S in the electrode assembly JR is schematically shown. In the actual winding structure of the electrode assembly JR, the negative electrode A, the positive electrode B, and the separator S are in close contact with each other.

The negative electrode A and/or the positive electrode B may have a structure in which an electrode tab is not separately attached thereto, as shown in FIGS. 14a to 14d and FIG. 15a. The present disclosure is effective in preventing or mitigating collapse of the core of the electrode assembly JR having a structure in which the negative electrode A and/or the positive electrode B does not include an electrode tab separately. However, the present disclosure may also be applied without limitation to embodiments in which the negative electrode A and/or the positive electrode B include a separate electrode tab.

To prevent core collapse, a structure in which the electrode design (e.g., electrode end location, core diameter, etc.) of an electrode assembly in which an electrode tab is not separately coupled to the electrode uncoated portion is disclosed.

In the electrode assembly JR, the negative electrode A has a longer length in the winding direction X than the positive electrode B.

Figure 2A:
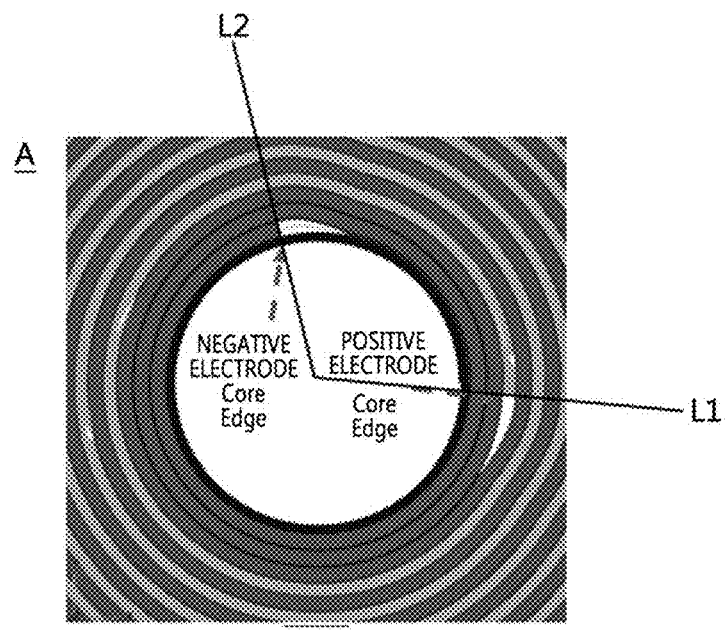
FIGS. 2a to 2c are cross-sectional views schematically showing the process in which the core of the electrode assembly collapses in the conventional cylindrical battery.
Figure 2B:
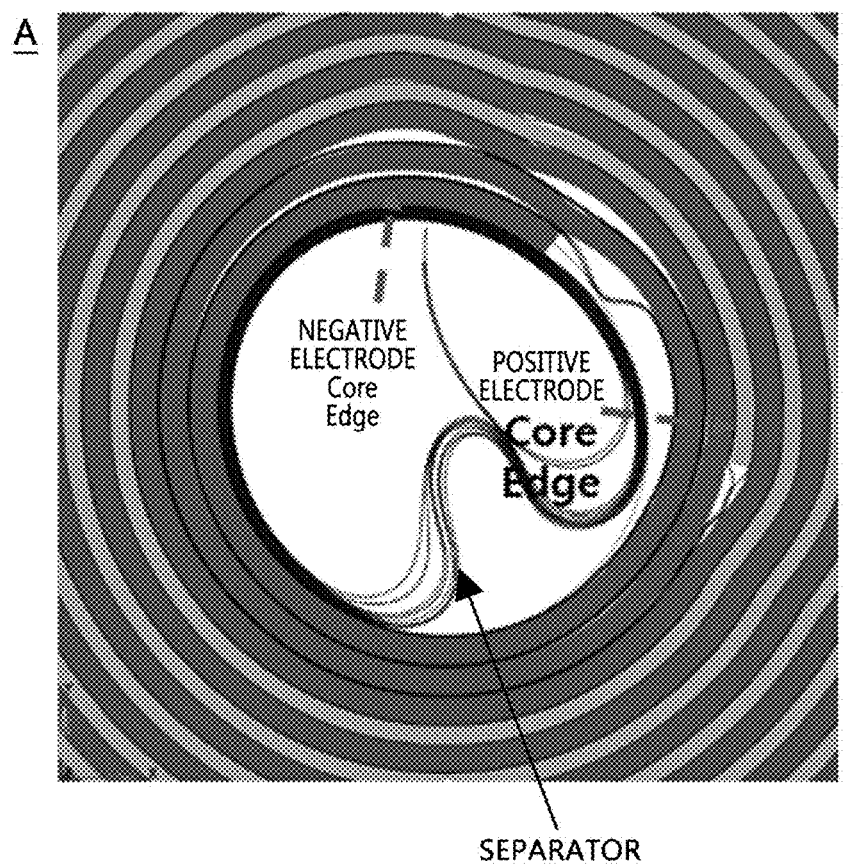

The winding turn of the negative electrode A starts before the winding turn of the positive electrode B. The winding turn of the positive electrode B begins after the winding turn of the negative electrode A increases by a predetermined number of turns. The predetermined number of turns may be less than 1 or 1 or more. In one example, the winding turn of the negative electrode A, which does not face the positive electrode B, may be 0.5 to 5 turns. The winding turns near the core C, where only the negative electrode A is wound, reinforce the structural rigidity of the core. However, the winding turn formed by only the negative electrode A does not contribute to the capacity of the cylindrical battery. Therefore, the number of winding turns for only the negative electrode A may be appropriately selected considering the reinforcement of structural rigidity and the capacity. The winding turn near the core C, where only the negative electrode A is wound, may face the winding turn of the adjacent negative electrode in the radial direction. Although not shown, a plurality of winding turns formed by only the separator S may be provided inside the winding turn formed by only the negative electrode A, as shown in FIG. 2b. The winding turn formed by only the separator S may also reinforce the structural rigidity of the core.

The present disclosure discloses a structure that optimizes the end positions of the negative electrode A and the positive electrode B in order to prevent the core from collapsing due to rotational stress resulting from the swelling phenomenon.

The ends of the negative electrode A and the positive electrode B refer to a core side end and an outer circumference side end of the winding turn structure of the negative electrode A and the positive electrode B. Preferably, the core side end and the outer circumference side end may be the ends of the active material layer in the winding direction of the electrode assembly JR. Alternatively, the core side end and the outer circumference side end may be the ends of the current collector coated with an active material layer. As another alternative, the core side end and the outer circumference side end may be the ends of the current collector not coated with an active material layer.

In the present disclosure, for convenience of explanation, an embodiment in which the end positions of the negative electrode A and the positive electrode B are optimized by applying a two-dimensional polar coordinate system on a cross-section perpendicular to the axial direction of the electrode assembly JR will be described.

When a two-dimensional polar coordinate system is applied to the cross-section structure of the electrode assembly JR, the position within the cross-section structure may be expressed as a distance (r) measured from the center of the polar coordinate system to the corresponding position and an angle measured to the corresponding position in the circumferential direction (counterclockwise) based on one coordinate (z-axis).

Even if the angle measurement direction of the position is changed to the clockwise direction, the technical idea of the present disclosure can be applied practically in the same way.

Referring to FIG. 3, the angle of the core side end ($A_{inner}$) and the angle of the outer circumference side end ($A_{outer}$) of the negative electrode A may be expressed as $\theta_{A,inner}$ and $\theta_{A,outer}$, respectively.

Similarly, the angle of the core side end ($B_{inner}$) and the angle of the outer circumference side end ($B_{outer}$) of the positive electrode B may be expressed as $\theta_{B,inner}$ and $\theta_{B,outer}$, respectively.

The core side end ($A_{inner}$) of the negative electrode A may extend further in the direction opposite to the winding direction than the core side end ($B_{inner}$) of the positive electrode B to form at least a part of the innermost winding turn. Also, the outer circumference side end ($A_{outer}$) of the negative electrode A may extend further in the winding direction than the outer circumference side end ($B_{outer}$) of the positive electrode B to form at least a part of the outermost winding turn.

According to one aspect, when the negative electrode A and the positive electrode B are wound counterclockwise, as the charging and discharging cycle is repeated, the core side end ($A_{inner}$) of the negative electrode A and the core side end ($B_{inner}$) of the positive electrode B rotate clockwise.

The rotation amount is relatively larger when the initial cycle is performed than when the subsequent usage cycle is performed.

The initial cycle refers to the first charge that increases the SOC of the cylindrical battery to a preset level by performing an activation process after the cylindrical battery including the electrode assembly JR is manufactured. The usage cycle that follows the activation process includes full discharge, which reduces the SOC of the cylindrical battery to 0%, and full charge, which increases the SOC of the cylindrical battery to 100%.

When the usage cycle is performed repeatedly, the rotation amount of the negative electrode A and the positive electrode B may increase linearly as the usage cycle increases. If the number of usage cycles increases beyond a criterion value, the rotation amount may gradually decrease and converge close to 0.

The swelling amount of the negative electrode A is relatively larger than that of the positive electrode B. In addition, since the innermost part of the electrode assembly JR contains winding turns formed by only the negative electrode A, the rotational freedom is higher than that of the positive electrode B. Also, the core side end ($B_{inner}$) of the positive electrode B is sandwiched between the winding turns of the negative electrode A, so the friction force in that area is high. Therefore, the rotation amount of the core side end ($A_{inner}$) of the negative electrode A is greater than the rotation amount of the core side end ($B_{inner}$) of the positive electrode B.

In one example, the rotation amount of the core side end ($A_{inner}$) of the negative electrode A may be several tens of degrees, and the rotation amount of the core side end ($B_{inner}$) of the positive electrode B may be less than ten degrees.

The outer circumference side end ($A_{outer}$) of the negative electrode A and the outer circumference side end ($B_{outer}$) of the positive electrode B rotate slightly counterclockwise as the initial cycle progresses. As the initial cycle progresses, a portion of the outer circumference of the electrode assembly JR, which corresponds to the outer circumference side end ($B_{outer}$) of the positive electrode B, comes into close contact with the inner surface of the can. Therefore, when the usage cycle is repeated after the initial cycle, the outer circumference side end ($A_{outer}$) of the negative electrode A and the outer circumference side end ($B_{outer}$) of the positive electrode B do not rotate to a meaningful level due to the anchoring effect. Therefore, the angle between the outer circumference side end ($A_{outer}$) of the negative electrode A and the outer circumference side end ($B_{outer}$) of the positive electrode B does not change significantly due to the anchoring effect while the usage cycle progresses after the initial cycle.

According to another aspect, on the cross-section of the electrode assembly JR, the winding turn part included in the first fan-shaped region surrounded by a first straight line ($L_{B,inner}$) passing from the center of the core C through the core side end ($B_{inner}$) of the positive electrode B, a second straight line ($L_{A,inner}$) passing from the center of the core C through the core side end ($A_{inner}$) of the negative electrode A, and the outer circumference of the electrode assembly JR has deteriorated circularity near the core C, and thus is vulnerable to stress applied to the core C when the electrode assembly JR swells.

According to still another aspect, on a cross-section of electrode assembly JR, the winding turn part included in the second fan-shaped region surrounded by a third straight line ($L_{B,outer}$) passes from the center of the core C through the outer circumference side end ($B_{outer}$) of the positive electrode B, a fourth straight line ($L_{A,outer}$) passing from the center of the core through the outer circumference side end ($A_{outer}$) of the negative electrode A, and the outer circumference of the electrode assembly JR amplifies the stress applied to the core C when the electrode assembly JR swells.

The reason is that the winding turn part where the outer circumference side end ($B_{outer}$) of the positive electrode B is located contains the most electrode and separator layers in the radial direction, so when the electrode assembly JR swells, the winding turn part where the outer circumference side end ($B_{outer}$) of the positive electrode B is located and the outer circumference side end ($A_{outer}$) of the negative electrode A adjacent thereto contact the battery housing H earlier than other outer circumference regions and are pressed the most, which increases the stress applied to the core C as much due to the principle of action and reaction.

According to the experiment, the gap between the electrode assembly JR and the battery housing H is small, so when the initial cycle proceeds, the winding turn part where the outer circumference side end ($B_{outer}$) of the positive electrode B is located already begins to contact the inner wall of the battery housing H. Also, once the winding turn part where the outer circumference side end ($B_{outer}$) of the positive electrode B is located begins to contact the battery housing H, as the swelling of the electrode assembly JR deepens, the corresponding winding turn part is getting more and more pressured toward the inner wall of the battery housing H. Therefore, when the usage cycle is repeated, the outer circumference side end ($A_{outer}$) of the negative electrode A and the outer circumference side end ($B_{outer}$) of the positive electrode B are fixed by the anchoring effect and hardly rotate. In addition, if the usage cycle continues to be repeated, the degree of compression at the outer circumference side end ($B_{outer}$) of the positive electrode B becomes more severe, so that the corresponding point amplifies the stress the most according to the action-reaction principle.

Hereinafter, for convenience of explanation, the winding turn part included in the first fan-shaped region is defined as a stress vulnerable region D1, and the winding turn part included in the second fan-shaped region is defined as a stress amplification region D2.

According to still another aspect, while the cylindrical battery is repeatedly charged and discharged after start of usage, the stress vulnerable region D1 and the stress amplification region D2 change their angles and positions.

As an example, a cylindrical battery may be repeatedly charged and discharged until it reaches an effective usage cycle. The effective usage cycle is the total number of cycles in which charging and discharging can be safely repeated from BOL (Beginning Of Life, the point of shipment) to EOL (End Of Life, life demanded by a customer).

The effective usage cycle of a cylindrical battery may be designed in advance depending on its intended use. In an embodiment, the effective usage cycle may be 200 cycles or more, 300 cycles or more, 400 cycles or more, 500 cycles or more, 600 cycles or more, 700 cycles or more, 800 cycles or more, 900 cycles or more, etc.

Preferably, the cylindrical battery is designed to perform the performance stably even if full charge and full discharge are repeated at least at room temperature during preset cycles or more, for example during the effective usage cycles or more. Full charge means charging from the lower limit to the upper limit of the operating voltage, and full discharge means discharging from the upper limit to the lower limit of the operating voltage.

When the number of usage cycles of a cylindrical battery increases beyond the effective usage cycles, the cylindrical battery may be replaced with a new battery, reused for other purposes, or recycled to retrieve the raw materials contained in the cylindrical battery.

Each cycle of the effective usage cycles includes a full charge process and a full discharge process. Full charge and full discharge may be performed at room temperature, for example 20° C. to 40° C., preferably 20° C. Full charge is a charge that increases the SOC of a cylindrical battery from 0% to 100%. The magnitude of the charging current during full charge may be ¼c to ⅓c, preferably ¼c. Full discharge is a discharge that reduces the SOC of a cylindrical battery from 100% to 0%. The magnitude of the discharge current during full discharge may be ¼c to ⅓c, preferably ⅓c. Here, the symbol c represents c-rate.

According to one aspect, the electrode assembly JR may have a winding structure in which at least the outer circumference side end ($B_{outer}$) of the positive electrode B among the stress amplification region D2 is spaced apart from the inside of the stress vulnerable region D1 along the circumferential direction on the cross-section of the electrode assembly JR. Here, the inside of the stress amplification region D2 refers to the inner area excluding its boundary.

According to another aspect, the electrode assembly JR may have a winding structure in which the stress amplification region D2 is spaced apart from the stress vulnerable region D1 along the circumferential direction on the cross-section of the electrode assembly JR.

In one aspect, the electrode assembly JR may be designed from the beginning to maintain any one winding structure defined in the present disclosure while the cylindrical battery is repeatedly charged and discharged, for example, while the cylindrical battery is charged and discharged beyond the effective usage cycle.

In other words, the relative positions of the stress vulnerable region D1 and the stress amplification region D2 may be designed from the beginning by pre-setting the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B at the winding stage of the electrode assembly JR.

In one embodiment, $|\theta_{A,inner} - \theta_{B,inner}|$, which corresponds to the circumferential angle between the core side end ($A_{inner}$) of the negative electrode A and the core side end ($B_{inner}$) of the positive electrode B, may be 30 degrees or more and less than 180 degrees.

Preferably, while the cylindrical battery is repeatedly charged and discharged, as an example, while the cylindrical battery is charged and discharged beyond the effective usage cycle, the circumferential angle $|\theta_{A,inner} - \theta_{B,inner}|$ may be maintained at an angle of 30 degrees or more and less than 180 degrees.

When designing the positions of the core side end ($A_{inner}$) of the negative electrode A and the core side end ($B_{inner}$) of the positive electrode B, the total rotation amount for the ends ($A_{inner}$, $B_{inner}$) of both electrodes may be taken into consideration. The total rotation amount may be determined in advance through a charging and discharging cycle test of the cylindrical battery. The total rotation amount may be the cumulative rotation amount when the cylindrical battery is charged and discharged beyond preset effective usage cycles.

In a specific example, the circumferential angle $|\theta_{A,inner} - \theta_{B,inner}|$ may be 40 degrees or less, 50 degrees or less, 60 degrees or less, 70 degrees or less, 80 degrees or less, 90 degrees or less, 100 degrees or less, 120 degrees or less, 130 degrees or less, 140 degrees or less, 150 degrees or less, 160 degrees or less, 170 degrees or less, or 180 degrees or less.

Preferably, the positions of the core side end ($A_{inner}$) of the negative electrode A and the core side end ($B_{inner}$) of the positive electrode B may be set in advance at the winding stage of the electrode assembly JR so that the circumferential angle $|\theta_{A,inner}-\theta_{B,inner}|$ may maintain an angle of 40 degrees or less, 50 degrees or less, 60 degrees or less, and 70 degrees or less, 80 degrees or less, 90 degrees or less, 100 degrees or less, 120 degrees or less, 130 degrees or less, 140 degrees or less, 150 degrees or less, 160 degrees or less, 170 degrees or less, or 180 degrees or less, while the cylindrical battery is repeatedly charged and discharged, as an example, while the cylindrical battery is charged and discharged beyond the effective usage cycles.

In a preferred example, the positions of the core side end ($A_{inner}$) of the negative electrode A and the core side end ($B_{inner}$) of the positive electrode B may be set in advance at the winding stage of the electrode assembly JR so that the circumferential angle $|\theta_{A,inner}-\theta_{B,inner}|$ may maintain an angle of 87 degrees or more and less than 180 degrees, while the cylindrical battery is repeatedly charged and discharged, as an example, while the cylindrical battery is charged and discharged beyond the effective usage cycles.

In another embodiment, the positions of the core side end ($A_{inner}$) of the negative electrode A and the core side end ($B_{inner}$) of the positive electrode B may be set in advance at the winding stage of the electrode assembly JR so that $|\theta_{A,inner}-\theta_{B,inner}|$, which corresponds to the circumferential angle between the core side end ($A_{inner}$) of the negative electrode A and the core side end ($B_{inner}$) of the positive electrode B, may converge to a specific angle selected in the range of 30 degrees or more and less than 180 degrees, while the cylindrical battery is repeatedly charged and discharged, as an example, while the cylindrical battery is charged and discharged beyond the effective usage cycles.

In a specific example, the positions of the core side end ($A_{inner}$) of the negative electrode A and the core side end ($B_{inner}$) of the positive electrode B may be set in advance at the winding stage of the electrode assembly JR so that the circumferential angle $|\theta_{A,inner}-\theta_{B,inner}|$ converges to the range of 30 degrees to 40 degrees, 40 degrees to 50 degrees, 50 degrees to 60 degrees, 60 degrees to 70 degrees, 70 degrees to 80 degrees, 80 degrees to 90 degrees, 90 degrees to 100 degrees, 100 degrees to 110 degrees, 110 degrees to 120 degrees, 120 degrees to 130 degrees, 130 degrees to 140 degrees, 140 degrees to 150 degrees, 150 degrees to 160 degrees, 160 degrees to 170 degrees, and 170 degrees to less than 180 degrees, while the cylindrical battery is repeatedly charged and discharged, as an example, while the cylindrical battery is charged and discharged beyond the effective usage cycles.

In a preferred example, the positions of the core side end ($A_{inner}$) of the negative electrode A and the core side end ($B_{inner}$) of the positive electrode B may be set in advance at the winding stage of the electrode assembly JR so that the circumferential angle $|\theta_{A,inner}-\theta_{B,inner}|$ may converge to the range of 110 degrees to 130 degrees, preferably to the range of 115 degrees to 125 degrees, more preferably to 120 degrees, while the cylindrical battery is repeatedly charged and discharged, as an example, while the cylindrical battery is charged and discharged beyond the effective usage cycles.

As described above, the negative electrode A is longer than the positive electrode B in the winding direction, and the positive electrode B is located inner than the negative electrode A in the winding direction. Therefore, the angle ($\theta_{A,outer}$) of the outer circumference side end ($A_{outer}$) of the negative electrode A is greater than the angle ($\theta_{B,outer}$) of the outer circumference side end ($B_{outer}$) of the positive electrode B.

In the embodiment, the circumferential angle $|\theta_{A,outer}-\theta_{B,outer}|$ corresponding to the difference between the angle ($\theta_{A,outer}$) of the outer circumference side end ($A_{outer}$) of the negative electrode A and the angle ($\theta_{B,outer}$) of the outer circumference side end ($B_{outer}$) of the positive electrode B may be 10 degrees or more and 90 degrees or less.

Preferably, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may maintain an angle of 10 degrees or more and 90 degrees or less, while the cylindrical battery is repeatedly charged and discharged, as an example, while the cylindrical battery is charged and discharged beyond the effective usage cycles.

When the electrode assembly JR swells, in order to alleviate the imbalance of stress applied to the core C, the circumferential angle $|\theta_{A,outer}-\theta_{B,outer}|$ may be designed to be smaller than the circumferential angle $|\theta_{A,inner}-\theta_{B,inner}|$.

In specific examples, the circumferential angle $|\theta_{A,outer}-\theta_{B,outer}|$ may have an angle of 80 degrees to 90 degrees, 70 degrees to 80 degrees, 60 degrees to 70 degrees, 50 degrees to 60 degrees, 40 degrees to 50 degrees, 30 degrees to 40 degrees, 20 degrees to 30 degrees, or 10 degrees to 20 degrees.

Preferably, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may maintain an angle of 80 degrees to 90 degrees, 70 degrees to 80 degrees, 60 degrees to 70 degrees, 50 degrees to 60 degrees, 40 degrees to 50 degrees, 30 degrees to 40 degrees, 20 degrees to 30 degrees, or 10 degrees to 20 degrees, while the cylindrical battery is repeatedly charged and discharged, as an example, while the cylindrical battery is charged and discharged beyond the effective usage cycles.

In a preferred example, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may maintain an angle of 10 degrees or more and 32 degrees or less, while the cylindrical battery is repeatedly charged and discharged, as an example, while the cylindrical battery is charged and discharged beyond the effective usage cycles.

In another embodiment, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may converge to a specific angle selected in the range of 10 degrees to 90 degrees, while the cylindrical battery is repeatedly charged and discharged, as an example, while the cylindrical battery is charged and discharged beyond the effective usage cycles.

In a specific example, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may converge to the range of 80 degrees to 90 degrees, 70 degrees to 80 degrees, 60 degrees to 70 degrees, 50 degrees to 60 degrees, 40 degrees to 50 degrees, 30 degrees to 40 degrees, 20 degrees to 30 degrees, or 10 degrees to 20 degrees, while the cylindrical battery is repeatedly charged and discharged, as an example, while the cylindrical battery is charged and discharged beyond the effective usage cycles.

In a more specific example, the positions of the outer circumference side end ($A_{outer}$) of the negative electrode A and the outer circumference side end ($B_{outer}$) of the positive electrode B may be set in advance at the winding stage of the electrode assembly JR so that the circumferential angle $|\theta_{A,outer}-\theta_{B,outer}|$ may maintain an angle of 10 degrees to 40 degrees or converge to a specific angle selected in the range of 10 degrees to 40 degrees, while the cylindrical battery is repeatedly charged and discharged, as an example, while the cylindrical battery is charged and discharged beyond the effective usage cycles.

Figure 4:
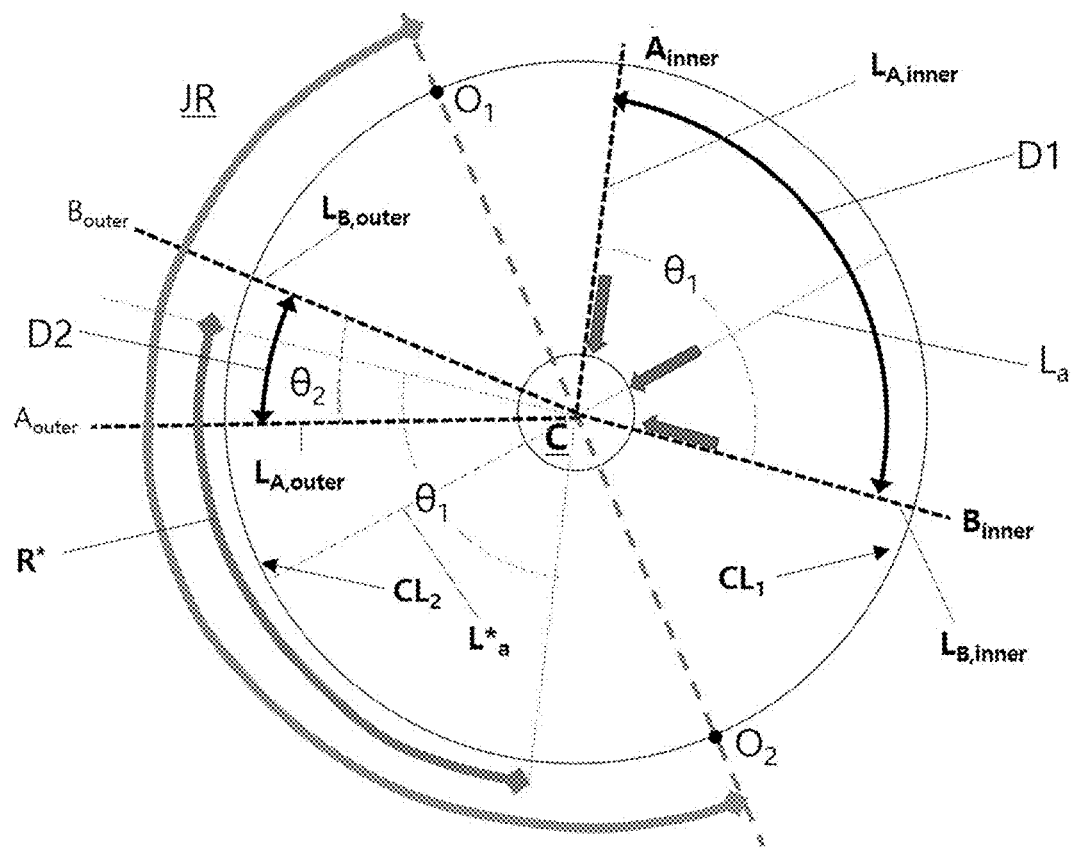
FIG. 4 is a diagram for illustrating the relative positional relationship between a stress vulnerable region D1 and a stress amplification region D2 according to an embodiment of the present disclosure.

FIG. 4 is a diagram for illustrating the relative positional relationship between a stress vulnerable region D1 and a stress amplification region D2 according to an embodiment of the present disclosure.

Referring to FIG. 4, the stress vulnerable region D1 surrounded by the first straight line ($L_{B,inner}$), the second straight line ($L_{A,inner}$), and the outer circumference of the electrode assembly JR corresponds to the first fan-shaped region and has a circumferential angle ($\theta1$). In addition, the stress amplification region D2 surrounded by the third straight line ($L_{B,outer}$), the fourth straight line ($L_{A,outer}$), and the outer circumference of the electrode assembly JR corresponds to the second fan-shaped region and has a circumferential angle ($\theta_2$).

When the line segment that divides the circumferential angle ($\theta_1$) of the stress vulnerable region D1 into two equal angles is defined as $L_a$ and the diametric line segment perpendicular to the line segment $L_a$ and passing through the center of the core C of the electrode assembly JR is defined as $O_1O_2$, the cross-section of the electrode assembly JR may be classified into a first semicircular region ($CL_1$) and a second semicircular region ($CL_2$) facing each other based on the diametric line segment $O_1O_2$.

While the cylindrical battery is repeatedly charged and discharged, as an example, while the cylindrical battery is charged and discharged beyond the effective usage cycles, the stress amplification region D2 hardly rotates, while the stress vulnerable region D1 may rotate clockwise.

While the cylindrical battery is repeatedly charged and discharged, as an example, while the cylindrical battery is charged and discharged beyond the effective usage cycles, as the stress amplification region D2, especially the outer circumference side end ($B_{outer}$) of the positive electrode B, becomes closer to the stress vulnerable region D1 in the circumferential direction, the probability of collapsing of the core C increases in the stress vulnerable region D1.

Therefore, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR, so that the stress vulnerable region D1 is located within the first semicircular region ($CL_1$) and the stress amplification region D2 is located within the second semicircular region ($CL_2$), even if the stress vulnerable region D1 rotates while the cylindrical battery is repeatedly charged and discharged, as an example, while the cylindrical battery is charged and discharged beyond the effective usage cycles.

According to this design, while the cylindrical battery is repeatedly charged and discharged, the stress applied to the core C in the stress vulnerable region D1 does not overlap with the stress applied to the core C in the stress amplification region D2, thereby to prevent the stress from increasing beyond a critical level. Here, the critical level may be the stress level that causes collapse of the core C in the stress vulnerable region D1.

Preferably, in terms of stress distribution, the location of the stress amplification region D2 may be designed so that at least a part of the stress applied to the core C in the stress vulnerable region D1 and the stress applied to the core C in the stress amplification region D2 face each other.

Specifically, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR, so that, even if the core side end ($A_{inner}$) of the negative electrode A and the core side end ($B_{inner}$) of the positive electrode B rotate, the stress amplification region D2 is located within the second semicircular region ($CL_2$) defined based on the stress vulnerable region D1, and at least a part of the stress amplification region D2 overlaps with the third fan-shaped region (R*) that is point symmetrical with the stress vulnerable region D1 based on the core C, while the cylindrical battery is repeatedly charged and discharged, as an example, while the cylindrical battery is charged and discharged beyond the effective usage cycles.

In another aspect, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR, so that, even if the core side end ($A_{inner}$) of the negative electrode A and the core side end ($B_{inner}$) of the positive electrode B rotate, the stress amplification region D2 is located within the second semicircular region ($CL_2$) defined based on the stress vulnerable region D1, and the outer circumference side end ($B_{outer}$) of the positive electrode B overlaps with the third fan-shaped region (R*), while the cylindrical battery is repeatedly charged and discharged, as an example, while the cylindrical battery is charged and discharged beyond the effective usage cycles.

In still another aspect, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR, so that, even if the core side end ($A_{inner}$) of the negative electrode A and the core side end ($B_{inner}$) of the positive electrode B rotate, the stress amplification region D2 is located within the second semicircular region ($CL_2$) defined based on the stress vulnerable region D1, and the stress amplification region D2 overlaps with the fifth straight line ($L^*_a$) that divides the circumferential angle of the third fan-shaped region (R*) into two equal angles, while the cylindrical battery is repeatedly charged and discharged, as an example, while the cylindrical battery is charged and discharged beyond the effective usage cycles.

In still another aspect, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR, so that, even if the core side end ($A_{inner}$) of the negative electrode A and the core side end ($B_{inner}$) of the positive electrode B rotate, the stress amplification region D2 is located within the second semicircular region ($CL_2$) defined based on the stress vulnerable region D1, and the outer circumference side end ($B_{outer}$) of the positive electrode B overlaps with the fifth straight line ($L''_a$) that divides the circumferential angle of the third fan-shaped region (R*) into two equal angles, while the cylindrical battery is repeatedly charged and discharged, as an example, while the cylindrical battery is charged and discharged beyond the effective usage cycles.

According to the above design, since the symmetry of the stress applied to the core C is improved as at least part of the stress applied to the core C in the stress amplification region D2 is opposed to the stress applied to the core C in the stress vulnerable region D1, it is possible to prevent the core C from collapsing or alleviate the phenomenon of collapsing of the core C, while the cylindrical battery is repeatedly charged and discharged, as an example, while the cylindrical battery is charged and discharged beyond the effective usage cycles.

Meanwhile, while the cylindrical battery is repeatedly charged and discharged, the rotation amount of the stress vulnerable region D1 is large, and in particular, the rotation amount of the core side end ($A_{inner}$) of the negative electrode A is larger than the rotation amount of the core side end ($B_{inner}$) of the positive electrode B, and the stress amplification region D2 hardly rotates. Considering this difference in rotation amounts, the collapse of the core may be prevented or alleviated by optimally designing the positional relationship among the first to fifth straight lines in the circumferential direction of the electrode assembly JR.

Specifically, as shown in FIG. 4, the electrode assembly JR may have a winding structure in which the third straight line ($L_{B,outer}$) and the fourth straight line ($L_{A,outer}$) are located between the second straight line ($L_{A,inner}$) and the fifth straight line ($L^*_a$), based on the circumferential direction on the cross-section of the electrode assembly JR.

In still another embodiment, the electrode assembly JR may have a winding structure in which the fourth straight line ($L_{A,outer}$) is located between the fifth straight line ($L'_a$) and the first straight line ($L_{B,inner}$), and the third straight line ($L_{B,outer}$) is located between the fourth straight line ($L_{A,outer}$) and the second straight line ($L_{A,inner}$), based on the circumferential direction on the cross-section of the electrode assembly JR.

In still another embodiment, the electrode assembly JR may have a winding structure in which the fourth straight line ($L_{A,outer}$) is located between the fifth straight line ($L'_a$) and the first straight line ($L_{B,inner}$), and the third straight line ($L_{B,outer}$) is located between the fifth straight line ($L^*_a$) and the second straight line ($L_{A,inner}$), based on the circumferential direction on the cross-section of the electrode assembly JR.

In still another embodiment, the electrode assembly JR may have a winding structure in which the circumferential angle between the first straight line ($L_{B,inner}$) and the fourth straight line ($L_{A,outer}$) is relatively larger than the circumferential angle between the second straight line ($L_{A,inner}$) and the third straight line ($L_{B,outer}$), based on the circumferential direction on the cross-section of the electrode assembly JR.

Meanwhile, unlike shown in FIG. 4, the position of the core side end ($A_{inner}$) of the negative electrode A and the position of the core side end ($B_{inner}$) of the positive electrode B may be switched.

In this case, the electrode assembly JR may have a winding structure in which the third straight line ($L_{B,outer}$) and the fourth straight line ($L_{A,outer}$) are located between the first straight line ($L_{B,inner}$) and the fifth straight line ($L'_a$), based on the circumferential direction on the cross-section of the electrode assembly JR.

In still another embodiment, the electrode assembly JR may have a winding structure in which the fourth straight line ($L_{A,outer}$) is located between the fifth straight line ($L^*_a$) and the second straight line ($L_{A,inner}$), and the third straight line ($L_{B,outer}$) is located between the fourth straight line ($L_{A,outer}$) and the first straight line ($L_{B,inner}$), based on the circumferential direction on the cross-section of the electrode assembly JR.

In still another embodiment, the electrode assembly JR may have a winding structure in which the fourth straight line ($L_{A,outer}$) is located between the fifth straight line ($L^*_a$) and the second straight line ($L_{A,inner}$), and the third straight line ($L_{B,outer}$) is located between the fifth straight line ($L^*_a$) and the first straight line ($L_{B,inner}$), based on the circumferential direction on the cross-section of the electrode assembly JR.

In still another embodiment, the electrode assembly JR may have a winding structure in which the circumferential angle between the second straight line ($L_{A,inner}$) and the fourth straight line ($L_{A,outer}$) is relatively larger than the circumferential angle between the first straight line ($L_{B,inner}$) and the third straight line ($L_{B,outer}$), based on the circumferential direction on the cross-section of the electrode assembly JR.

Preferably, the winding structures of the electrode assembly JR described above may be maintained while the cylindrical battery is repeatedly charged and discharged, for example, while the cylindrical battery is charged and discharged beyond the effective usage cycles. To meet this condition, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B may be set in advance at the winding stage of the electrode assembly JR.

According to still another aspect of the present disclosure, depending on the relative positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B, the speed at which a portion of the outer circumference of the electrode assembly corresponding to the outer circumference side end ($B_{outer}$) of the positive electrode B contacts the inner circumference of the battery housing may vary.

FIGS. 5a to 5c are sectional views of cylindrical batteries showing three different embodiments for the relative positions of a core side end ($A_{inner}$) and an outer circumference side end ($A_{outer}$) of the negative electrode and a core side end ($B_{inner}$) and an outer circumference side end ($B_{outer}$) of the positive electrode B.

The electrode assembly JR shown in FIGS. 5a to 5c has specifications that can be used in a cylindrical battery with a form factor of 4680 (diameter: 46 mm, height: 80 mm).

When the cylindrical battery in FIG. 5a is in the BOL state, the core side end ($A_{inner}$) of the negative electrode A and the outer circumference side end ($B_{outer}$) of the positive electrode B are located on the same line in the radial direction of the electrode assembly JR.

When the cylindrical battery in FIG. 5b is in the BOL state, the core side end ($B_{inner}$) of the positive electrode B and the outer circumference side end ($B_{outer}$) of the positive electrode B are located on the same line in the radial direction of the electrode assembly JR.

When the cylindrical battery in FIG. 5c is in the BOL state, the stress amplification region D2 is located within the second semicircular region ($CL_2$) defined based on the stress vulnerable region D1, and is located to overlap with approximately the center of the fan-shaped region (R*) that is point symmetrical with the stress vulnerable region D1.

When the cylindrical battery of FIG. 5a and the cylindrical battery of FIG. 5b are repeatedly charged and discharged, the outer circumference side end ($B_{outer}$) of the positive electrode B begins to contact the inner surface of the battery housing H at the point where the volume of the negative electrode A increases by about 2.5%.

Meanwhile, when the cylindrical battery of FIG. 5c is repeatedly charged and discharged, the outer circumference side end ($B_{outer}$) of the positive electrode B begins to contact the inner surface of the battery housing H at the point where the volume of the negative electrode A increases by about 5%.

Like the cylindrical battery in FIG. 5c, if the point at which the outer circumference side end ($B_{outer}$) of the positive electrode B contacts the inner surface of the battery housing H is delayed, this means that the circularity of the cross-section of the electrode assembly JR is relatively well maintained.

Like the cylindrical battery in FIG. 5c, if the circularity of the electrode assembly cross-section is maintained relatively well, the possibility of collapse of the core may be reduced compared to the cylindrical battery in FIGS. 5a and 5b, even if the charging and discharging cycle is increased.

Figure 6A:
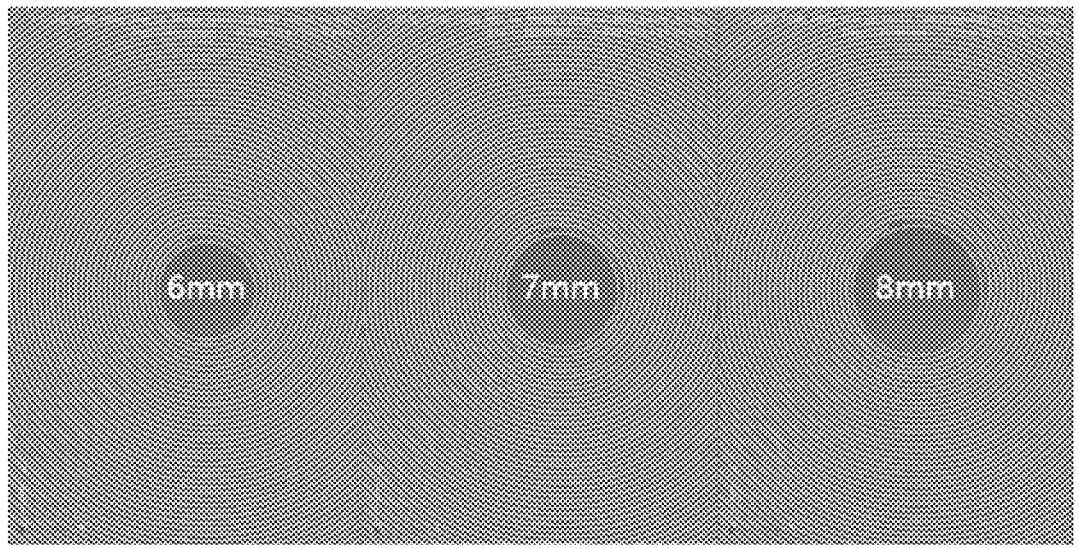
FIG. 6a is a diagram showing cross-sections of three electrode assemblies in which hollows present in the core of the electrode assembly JR have different diameters according to an embodiment of the present disclosure.
Figure 6B:
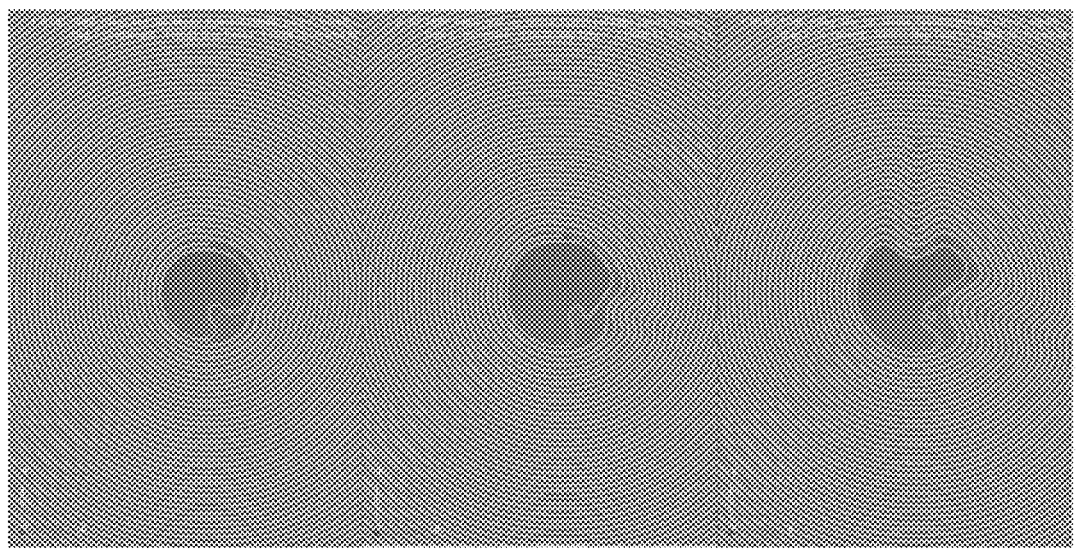
FIG. 6b is a diagram comparatively showing the degree of deformation of the winding turn near the core when cylindrical batteries including three electrode assemblies shown in FIG. 6a are repeatedly charged and discharged.

FIGS. 6a and 6b are diagrams showing the tendency of collapse of the core according to the diameter of the hollow present in the core of the electrode assembly JR.

Referring to FIGS. 6a and 6b, when the diameter of the core C is changed to 6 mm, 7 mm, and 8 mm, the possibility of collapse of the core increases as the diameter of the core C is larger. This is because the smaller the curvature radius, the greater the resistance to stress.

Preferably, the core diameter of the electrode assembly JR may be adjusted to 7 mm or less, 6.5 mm or less, and preferably 6 mm or less. The core diameter of the electrode assembly JR may be adjusted to 3 mm or more, taking into account the size of the core member used in the winding process and the welding process using the hollow of the core.

Hereinafter, the effect of the relative arrangement of the stress vulnerable region D1 and the stress amplification region D2 in the circumferential direction of the electrode assembly on the circularity of the electrode assembly core will be explained through a cycle test.

In the electrode assemblies manufactured as samples, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B are adjusted with various conditions along the circumferential direction. The positioning design applied to each sample will be explained in detail using the CT cross-sectional photograph of the sample cylindrical battery.

First, the preparation method of the electrode assembly, the preparation method of the cylindrical battery, the initial activation conditions, and the charging and discharging conditions in the usage cycle after initial activation, which are commonly applied to the samples, are explained.

<Preparation of a Sample Electrode Assembly>

First, a positive electrode and a negative electrode were manufactured. The positive electrode has a structure in which a positive electrode active material is coated on both sides of an aluminum foil along the longitudinal direction (winding direction). The negative electrode has a structure in which a negative electrode active material is coated on both sides of a copper foil along the longitudinal direction (winding direction). The positive and negative electrodes include an uncoated portion along the long side end that is not coated with active material. The length, width, and thickness of the aluminum foil are 4015 mm, 65 mm, and 15 μm, respectively. The length, width, and thickness of the copper foil are 4103 mm, 70 mm, and 10 μm, respectively. The coating width and coating length of the positive electrode active material are 65 mm and 4015 mm, respectively. The coating width and coating length of the negative electrode active material are 70 mm and 4103 mm, respectively. As the positive electrode active material, aluminum-doped lithium nickel manganese cobalt oxide was used. As the negative electrode active material, a mixed negative electrode material containing natural graphite and artificial graphite mixed at a weight ratio of 50:50 was used. The thickness of the positive electrode was designed to be 161 μm, including the thickness of the active material coating layer and the aluminum foil, and the thickness of the negative electrode was designed to be 189 μm, including the thickness of the active material coating layer and the copper foil. As the separator, a film with an inorganic particle coating layer formed on both sides of a porous polyethylene substrate was used, and the length, width, and thickness of the separator were 4235 mm, 72 mm, and 13 μm, respectively. Two separators were prepared. One separator was interposed between the positive electrode and the negative electrode, and the other separator was used as a winding film. The sample electrode assembly was manufactured using a known jelly-roll winding process. In the sample electrode assembly, the winding turn of the positive electrode and negative electrode is approximately 50 turns. The core, diameter, and height of the sample electrode assembly are 6 mm, 44.86 mm, and 73.3 mm, respectively.

<Preparation of a Sample Cylindrical Battery>

The sample cylindrical battery was manufactured to have a cross-section structure shown in FIG. 32, explained later. The outer diameter, thickness, and inner diameter of the battery housing are 46 mm, 0.45 mm, and 45.1 mm, respectively. A non-aqueous electrolyte in which 1.25 mol of lithium salt $LiPF_6$ was added to a solvent with EC/EMC/DMC mixed at a volume ratio of 20/5/75 was injected into the sample cylindrical battery. The sample cylindrical battery has a capacity of 12.5 Ah and an operating voltage of 2.5V to 4.2V. The upper limit voltage is the full charge voltage and corresponds to SOC (State Of Charge) 100%. The lower limit voltage is the full discharge voltage and corresponds to SOC 0%.

<Setting of Cycle Initial State>

After electrolyte injection, an activation process was performed to activate the sample cylindrical battery. After activation, the SOC of the sample cylindrical battery is 30%. The state of the cylindrical battery that is fully discharged after active charging is considered as the BOL (Beginning Of Life) state. During active charging of the cylindrical battery, the magnitude of the charging current and the temperature were set to ¼c and 20° C., respectively. Here, c is a symbol representing the c-rate of current, and the same applies hereinafter. During full discharge of the sample cylindrical battery, the magnitude of the discharge current and the temperature were set to (⅓c) and 20° C., respectively.

<CT Cross-Sectional Photograph, Measurement of an Electrode End Rotation Angle and Circularity of the Core of the Electrode Assembly in a BOL State>

Figure 2C:
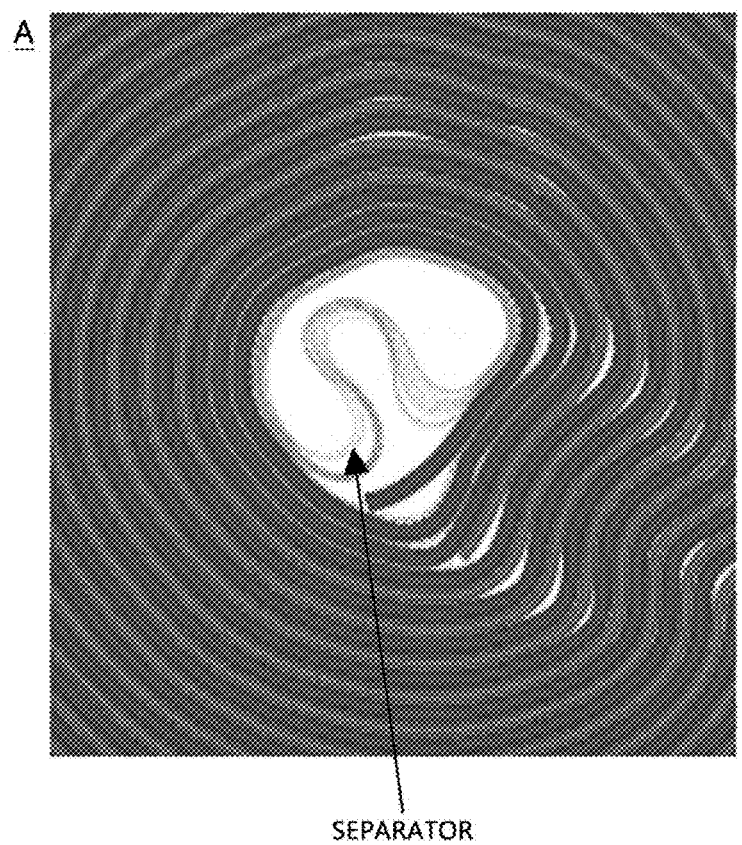

A CT cross-sectional photograph was obtained by performing CT tomography on the sample cylindrical battery in the BOL state using Vtomex m300 equipment of General Electric. Then, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B were identified on the CT cross-sectional photograph. In addition, the angle of the stress vulnerable region D1 and the stress amplification region D2 along the circumferential direction based on the core center of the electrode assembly and the rotation amount of the negative electrode end and the positive electrode end on the core and the outer circumference of the electrode assembly were measured. In addition, when the distance from the core center to the electrode winding turn located at the innermost side on the CT cross-sectional photograph was measured at equal intervals 24 times along the circumferential direction, the ratio (%) of the minimum value to the maximum value of the distance was calculated as the circularity value of the electrode assembly core. The circularity of the electrode assembly core is a measure for evaluating symmetry. When the circularity decreases, the shape of the core cannot maintain its original shape and has a distorted shape. Also, if the circularity is lowered beyond a threshold level, the core may not maintain its shape but collapse as shown in FIG. 2c.

<Conditions of Charging and Discharging Cycle>

The sample cylindrical battery in the BOL state was mounted to a cycler and the cycle test was repeated continuously 300 times or more. 300 or more cycles may be an example of the effective usage cycles. Cycle tests performed per day were limited to three. One cycle includes a full charge process and a full discharge process. There was a one-hour rest period between the full charge process and the full discharge process. The cycle test temperature was set at 20° C. During full charge, the magnitude of the charging current was set to ¼c and charging was performed for 4 hours, and during full discharge, the magnitude of the discharge current was set to ⅓c and discharging was performed for 3 hours. During full charge, the voltage of the sample cylindrical battery increases from 2.5V to 4.2V, and during full discharge, the voltage of the sample cylindrical battery decreases from 4.2V to 2.5V.

<CT Cross-Sectional Photograph, Measurement of an Electrode End Rotation Angle and Circularity of the Core of the Electrode Assembly after Cycle Tests are Performed>

A CT cross-sectional photograph was obtained by performing CT tomography using the above-described equipment on a sample cylindrical battery that had undergone a predetermined number of cycle tests. Then, the positions of the core side end ($A_{inner}$) of the negative electrode A, the core side end ($B_{inner}$) of the positive electrode B, the outer circumference side end ($A_{outer}$) of the negative electrode A and the outer circumference side end ($B_{outer}$) of the positive electrode B were identified on the CT cross-sectional photograph. In addition, the angle of the stress vulnerable region D1 and the stress amplification region D2 based on the core center of the electrode assembly and the rotation amount of the negative electrode end and the positive electrode end on the core and outer circumference of the electrode assembly were measured. In addition, when the distance from the core center to the electrode winding turn located at the innermost side on the CT cross-sectional photograph was measured at equal intervals 24 times along the circumferential direction, the ratio (%) of the minimum value to the maximum value of the distance was calculated as the circularity of the electrode assembly core.

<Cycle Test for the #1 Sample Cylindrical Battery>

Figure 7A:
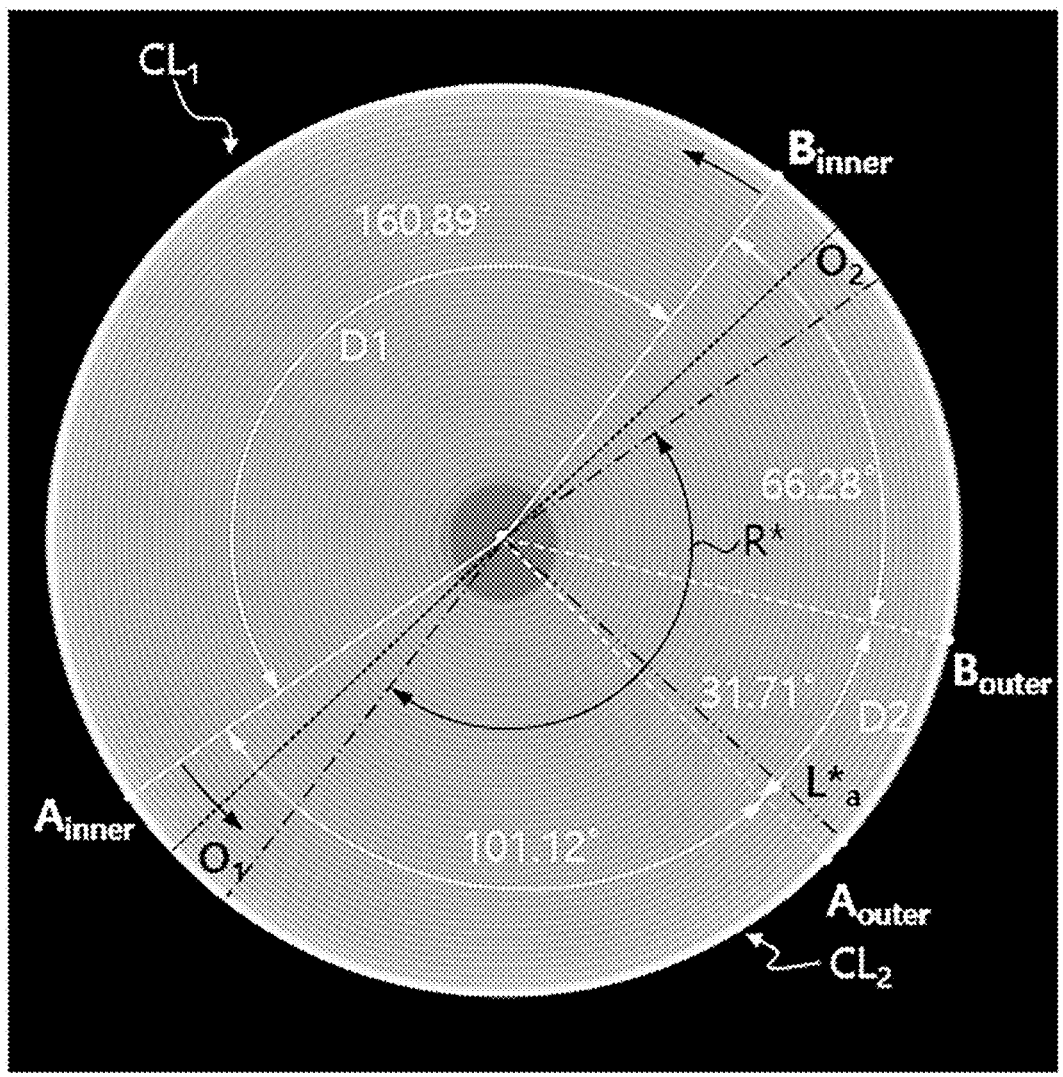
FIG. 7a is a CT cross-sectional photograph taken when the #1 sample battery is in the BOL (Beginning Of Life) state.
Figure 7B:
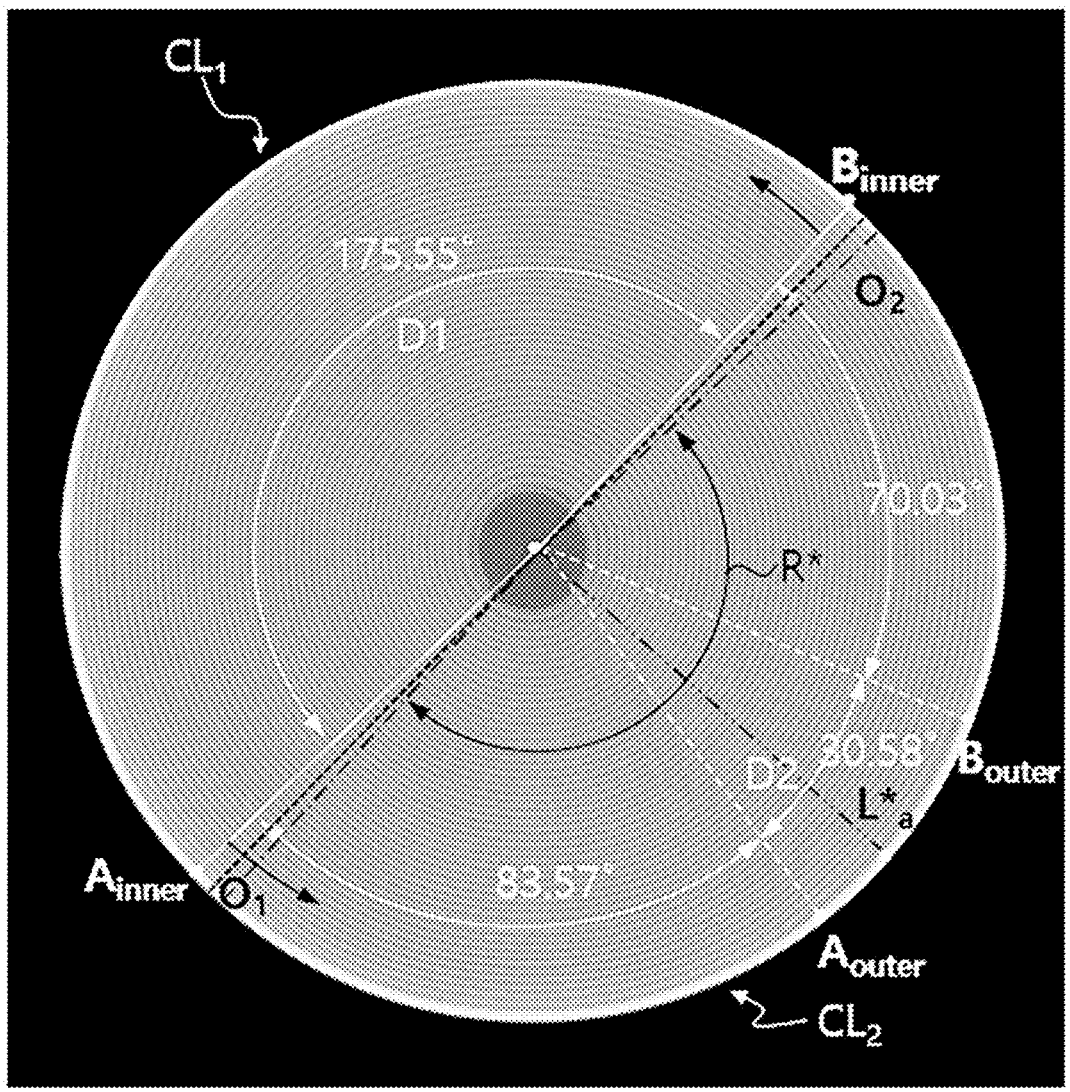
FIG. 7b is a CT cross-sectional photograph taken after 200 cycle tests are performed on the #1 sample battery.
Figure 7C:
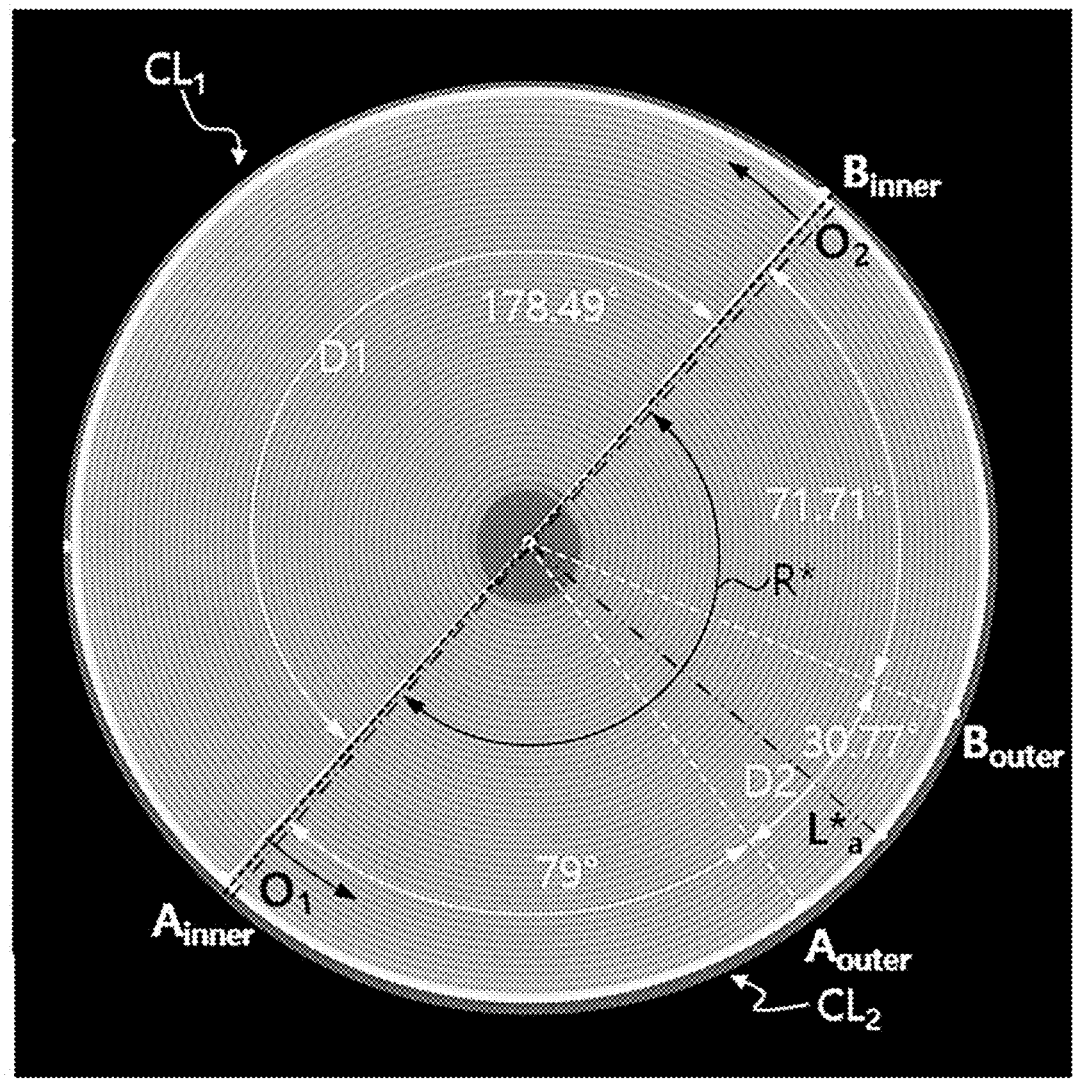
FIG. 7c is a CT cross-sectional photograph taken after 300 cycle tests are performed on the #1 sample battery.

FIG. 7a is a CT cross-sectional photograph taken when a cylindrical battery prepared as a #1 sample (hereinafter, #1 sample battery) is in the BOL (Beginning Of Life) state. FIG. 7b is a CT cross-sectional photograph taken after 200 cycle tests are performed on the #1 sample battery. FIG. 7c is a CT cross-sectional photograph taken after 300 cycle tests are performed on the #1 sample battery.

Referring to FIGS. 7a to 7c, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode. The winding direction of the positive electrode and the negative electrode depends on the standing direction of the cylindrical battery when a CT cross-sectional photograph is taken. If the standing direction of the cylindrical battery is reversed, the winding direction of the electrode shown on the CT cross-sectional photograph may appear reversed.

When the #1 sample battery was in the BOL state, the angle for the stress vulnerable region D1 between the negative electrode core side end ($A_{inner}$) and the positive electrode core side end ($B_{inner}$) was measured to be 160.89 degrees, and the angle for the stress amplification region D2 between the negative electrode outer circumference side end ($A_{outer}$) and the positive electrode outer circumference side end ($B_{outer}$) was measured to be 31.71 degrees. Also, the circularity of the electrode assembly core was calculated to be 89.9%.

For the #1 sample battery, when 200 cycle tests were performed, the angle for the stress vulnerable region D1 between the negative electrode core side end ($A_{inner}$) and the positive electrode core side end ($B_{inner}$) was measured to be 175.55 degrees, and the angle for the stress amplification region D2 between the negative electrode outer circumference side end ($A_{outer}$) and the positive electrode outer circumference side end ($B_{outer}$) was measured to be 30.58 degrees.

The negative electrode core side end ($A_{inner}$) and the positive electrode core side end ($B_{inner}$) were rotated counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 14.66 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased by 1.13 degrees compared to the BOL state. Because the manual error of the operator is involved when measuring the angle, the decrease in the angle of the stress amplification region D2 is not meaningful.

Meanwhile, when the CT cross-sectional photograph is classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles, the positions of the stress vulnerable region D1 and the stress amplification region D2 are maintained continuously within the first semicircular region ($CL_1$) and the second semicircular region ($CL_2$), respectively, while 200 cycles of charging and discharging were performed.

In addition, the stress amplification region D2 maintains its position within the second semicircular region ($CL_2$) defined based on the stress vulnerable region D1 during 200 cycles of charging and discharging, and is continuously maintained in an overlapping state with the dividing-in-two line segment ($L^*_a$) of the fan-shaped region (R*) that is point symmetrical with the stress vulnerable region D1 based on the center of the core.

After 200 cycles of charging and discharging, the circularity of the electrode assembly core was calculated to be 89.7%, which was decreased by 0.2% compared to the circularity of 89.9% in the BOL state, and there was substantially no change.

For the #1 sample battery, when 300 cycle tests were performed, the angle for the stress vulnerable region D1 between the negative electrode core side end ($A_{inner}$) and the positive electrode core side end ($B_{inner}$) was measured to be 178.49 degrees, and the angle for the stress amplification region D2 between the negative electrode outer circumference side end ($A_{outer}$) and the positive electrode outer circumference side end ($B_{outer}$) was measured to be 30.77 degrees.

The negative electrode core side end ($A_{inner}$) and the positive electrode core side end ($B_{inner}$) were further rotated counterclockwise compared to the state after 200 cycles. Since the rotation amount of the negative electrode core side end ($A_{inner}$) is relatively larger than the rotation amount of the positive electrode core side end ($B_{inner}$), the angle of the stress vulnerable region D1 was increased by 2.94 degrees compared to the state after 200 cycles.

There is no substantial change in the negative electrode outer circumference side end ($A_{outer}$) and the positive electrode outer circumference side end ($B_{outer}$) compared to the state after 200 cycles. This is because when the number of cycles increases to a certain extent, the outer circumferential surface of the electrode assembly where the positive electrode outer circumference side end ($B_{outer}$) is located strongly comes into close contact with the inner surface of the battery housing, thereby creating an anchoring effect that fixes its position. Therefore, the angle of the stress amplification region D2 shows substantially no change compared to the state after 200 cycles.

The stress vulnerable region D1 and the stress amplification region D2 maintain their positions within the first semicircular region ($CL_1$) and the second semicircular region ($CL_2$), respectively, even during 300 cycles of charging and discharging. In addition, the stress amplification region D2 maintains its position within the second semicircular region ($CL_2$) defined based on the stress vulnerable region D1 during 300 cycles of charging and discharging, and is continuously maintained in an overlapping state with the dividing-in-two line segment ($L^*_a$) of the fan-shaped region (R*) that is point symmetrical with the stress vulnerable region D1 based on the center of the core.

After 300 cycles of charging and discharging, the circularity of the electrode assembly core was calculated to be 89.7%, and there was no change compared to the circularity of 89.7% after 200 cycles.

There is substantially no change between the calculated circularities in the BOL state, after 200 cycles and after 300 cycles. Also, the relative positional relationship between the above-described first to fifth straight lines remained identical while the cycle test was repeated. The arrangement design of the stress vulnerable region D1 and the stress amplification region D2 applied to the #1 sample battery maintains the circularity of the electrode assembly core and distributes the stress well, which is effective in preventing or mitigating the core from collapsing in the effective usage cycles of 200 cycles or more, or 300 cycles or more.

<Cycle Test for the #2 Sample Cylindrical Battery>

Figure 8A:
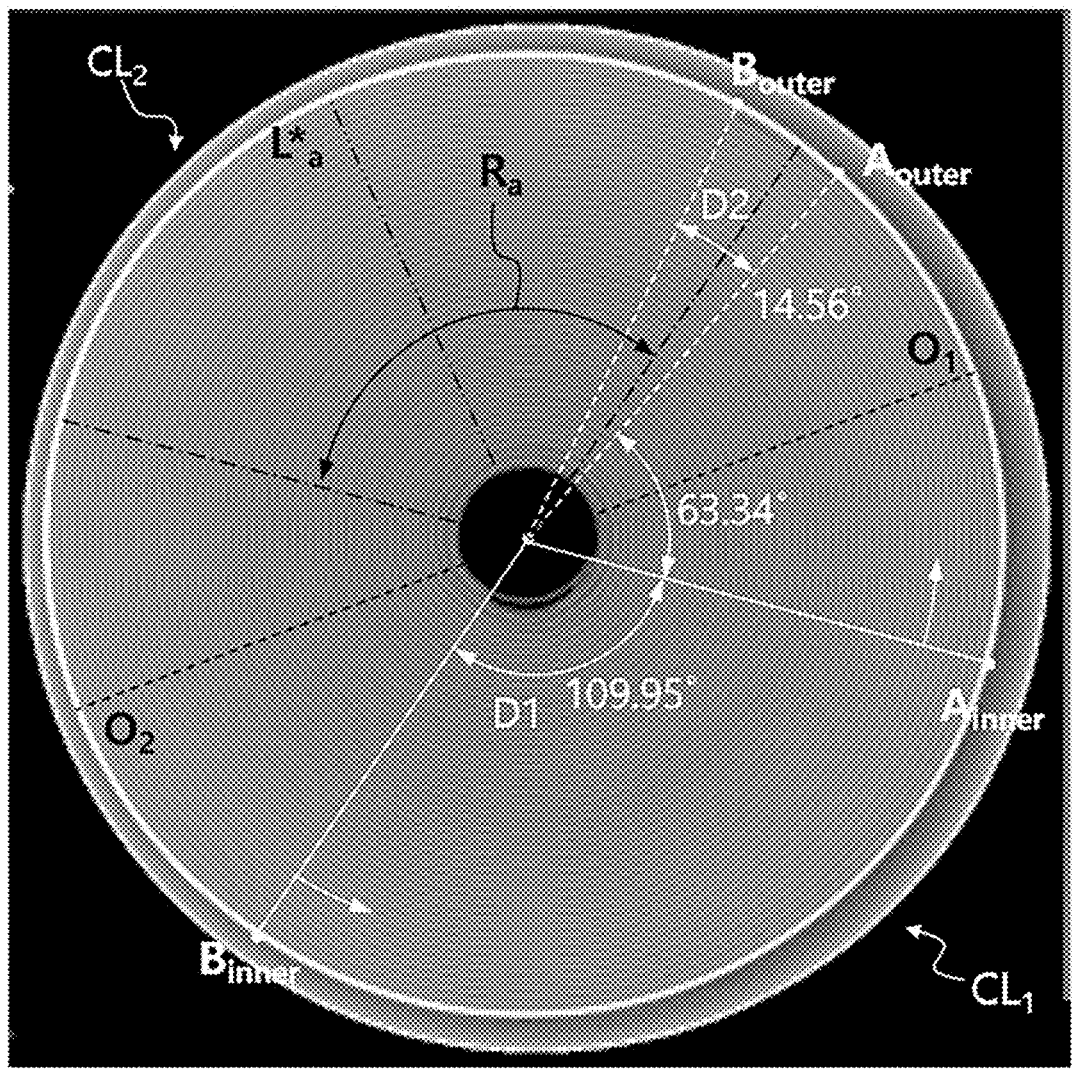
FIG. 8a is a CT cross-sectional photograph taken when the #2 sample battery is in the BOL state.
Figure 8B:
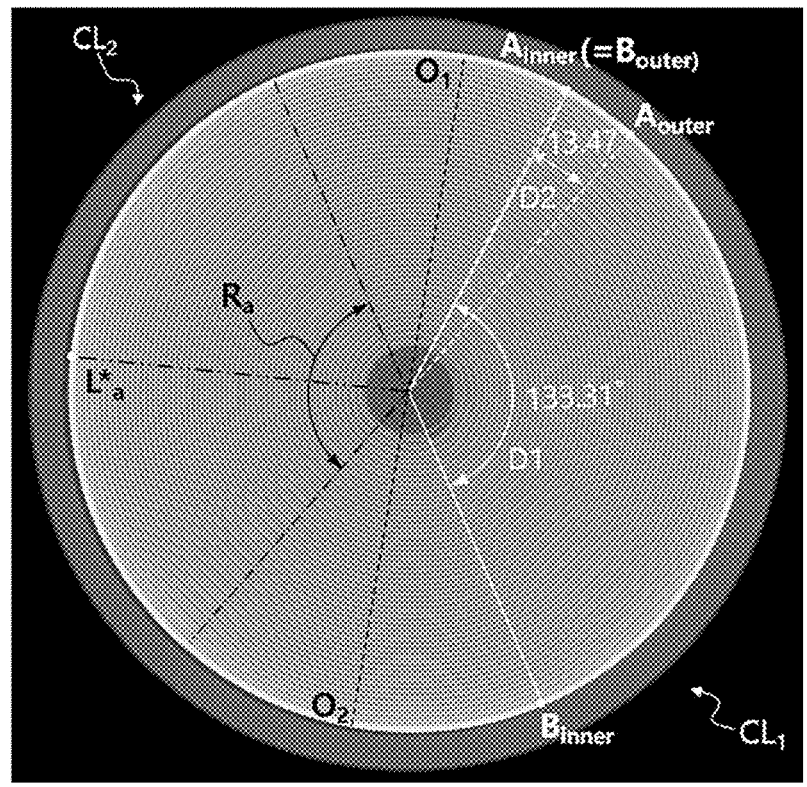
FIG. 8b is a CT cross-sectional photograph taken after 900 cycle tests are performed on the #2 sample battery.

FIG. 8a is a CT cross-sectional photograph taken when a cylindrical battery prepared as a #2 sample (hereinafter, #2 sample battery) is in the BOL state. FIG. 8b is a CT cross-sectional photograph taken after 900 cycle tests, which is considerably larger than in the first embodiment, are performed on the #2 sample battery.

Referring to FIGS. 8a to 8c, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode.

When the #2 sample battery was in the BOL state, the angle for the stress vulnerable region D1 between the negative electrode core side end ($A_{inner}$) and the positive electrode core side end ($B_{inner}$) was measured to be 109.95 degrees, and the angle for the stress amplification region D2 between the negative electrode outer circumference side end ($A_{outer}$) and the positive electrode outer circumference side end ($B_{outer}$) was measured to be 14.56 degrees. Also, the circularity of the electrode assembly core was calculated to be 93.04%.

For the #2 sample battery, when 900 cycle tests were performed continuously, the angle for the stress vulnerable region D1 between the negative electrode core side end ($A_{inner}$) and the positive electrode core side end ($B_{inner}$) was measured to be 133.31 degrees, and the angle for the stress amplification region D2 between the negative electrode outer circumference side end ($A_{outer}$) and the positive electrode outer circumference side end ($B_{outer}$) was measured to be 13.47 degrees.

The negative electrode core side end ($A_{inner}$) and the positive electrode core side end ($B_{inner}$) were rotated significantly counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 23.36 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased slightly compared to the BOL state. Because the manual error of the operator is involved when measuring the angle, the decrease in the angle of the stress amplification region D2 is not meaningful.

Meanwhile, the CT cross-sectional photograph may be classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles.

The position of the stress vulnerable region D1 was maintained continuously within the first semicircular region ($CL_1$), while 900 cycles of charging and discharging were performed.

The stress amplification region D2 is located in the second semicircular region ($CL_2$) at the beginning of the cycle test, but moves to the first semicircular region ($CL_1$) while going to the middle of the cycle test as the stress vulnerable region D1 rotates counterclockwise. In addition, stress amplification region D2 began to overlap with the stress vulnerable region D1 in the latter half of the cycle test, and after 900 cycles, the position of the positive electrode outer circumference side end ($B_{outer}$) of the stress amplification region D2 becomes substantially the same as the position of the negative electrode core side end ($A_{inner}$). As the number of cycles increases, the negative electrode core side end ($A_{inner}$) rotates counterclockwise, so the circumferential angle between the negative electrode core side end ($A_{inner}$) and the positive electrode outer circumference side end ($B_{outer}$) gradually decreases. Therefore, before 900 cycles, the positive electrode outer circumference side end ($B_{outer}$) is spaced counterclockwise from the stress vulnerable region D1 along the circumferential direction, and if the cycle test is repeated beyond 900 cycles, the positive electrode outer circumference side end ($B_{outer}$) would be located within the stress vulnerable region D1, so the stress amplification region D2 is expected to entirely overlap with the stress vulnerable region D1.

After 900 cycles of charging and discharging, the circularity of the electrode assembly core was calculated to be 92.10%, which was decreased by 0.94% compared to the circularity of 93.04% in the BOL state. This decrease in circularity is not a meaningful decrease considering that the number of cycles is 900.

The experimental results for the #2 sample battery support that the relative positions of the stress vulnerable region D1 and the stress amplification region D2 in the circumferential direction are effective in maintaining the circularity of the electrode assembly core when intentionally designed according to an embodiment of the present disclosure.

In other words, if the position of the electrode end is designed from the beginning in consideration of the rotation amount of the electrode end according to the increase of cycles so that the circumferential location of the stress amplification region D2, especially the positive electrode outer circumference side end ($B_{outer}$), does not overlap with the inner area of the stress vulnerable region D1 while 900 cycles are performed, the circularity of the electrode assembly core may be maintained without significant change even if the charging and discharging cycle is repeated 900 times or more. As a result, the collapse of the electrode assembly core may be prevented or alleviated.

Figure 9:
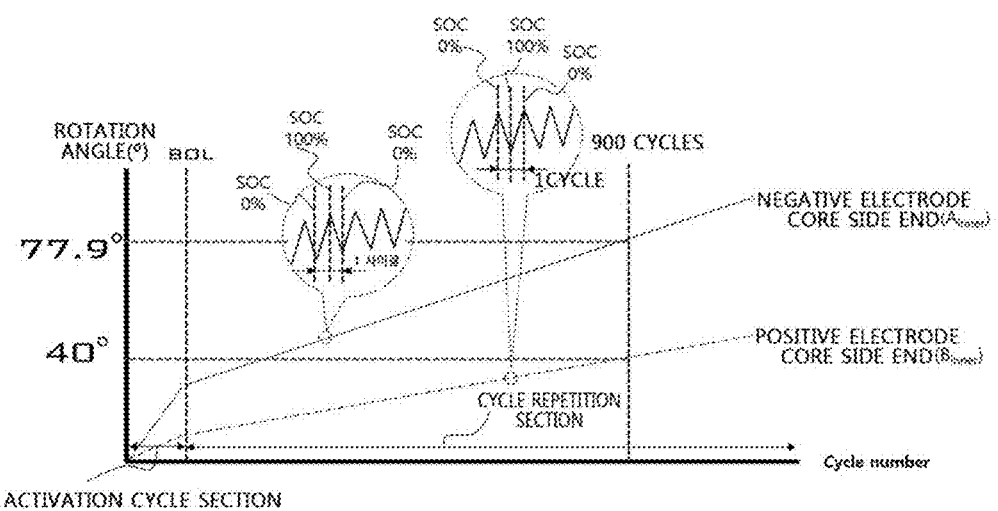
FIG. 9 is a graph showing the results of measuring the rotation amount of the negative electrode core side end ($A_{inner}$) and the positive electrode core side end ($B_{inner}$) while repeating the cycle test for the #2 sample battery immediately after manufacturing.

FIG. 9 is a graph showing the results of measuring the rotation amount of the negative electrode core side end ($A_{inner}$) and the positive electrode core side end ($B_{inner}$) while repeating the cycle test for the #2 sample battery immediately after manufacturing.

Referring to FIG. 9, the rotation amount of the negative electrode core side end ($A_{inner}$) and the positive electrode core side end ($B_{inner}$) in the #2 sample battery shows a pattern of gradually increasing as the number of cycles increases. The rotation amount of the negative electrode core side end ($A_{inner}$) and the positive electrode core side end ($B_{inner}$) is greatest in the activation cycle section. The rotation amount of the negative electrode core side end ($A_{inner}$) and the positive electrode core side end ($B_{inner}$) shows a linear increase pattern in the cycle repetition section after the activation cycle. In the #2 sample battery, after 900 cycles, the rotation amounts of the negative electrode core side end ($A_{inner}$) and the positive electrode core side end ($B_{inner}$) were measured to be 77.9 degrees and 40 degrees, respectively. Meanwhile, referring to the partially enlarged view of the local area of the graph, when one cycle test is performed, the rotation amount of the negative electrode core side end ($A_{inner}$) gradually increases while showing a pattern of increasing during the full charge process and then decreasing again during the full discharge process. Conversely, the rotation amount of the positive electrode core side end ($B_{inner}$) gradually increases while showing a pattern of decreasing during the full charge process and then increasing during the full discharge process.

The test results of the #2 sample battery support that the change in circularity will not be significant even if 900 or more cycle tests are performed on the #1 sample battery. When the #2 sample battery is in the BOL state, the stress vulnerable region D1 and the stress amplification region D2 are spaced by about 63.34 degrees in the circumferential direction, but in the #1 sample battery, the stress vulnerable region D1 and the stress amplification region D2 are spaced in the circumferential direction by 71.71 degrees, which is larger than 63.34 degrees, even after 300 cycles. Therefore, even if charging and discharging tests are additionally performed to the #1 sample battery from 300 cycles to 900 cycles, the positive electrode outer circumference side end ($B_{outer}$) will not overlap with the inner area of the stress vulnerable region D1 due to the linear increase in electrode rotation. Therefore, similar to the test results of the #2 sample battery, it is obvious to those skilled in the art that at least the circularity of the electrode assembly core in the #1 sample battery will not be reduced to the extent of causing the core to collapse.

<Cycle Test for the #3 Sample Cylindrical Battery>

Figure 10A:
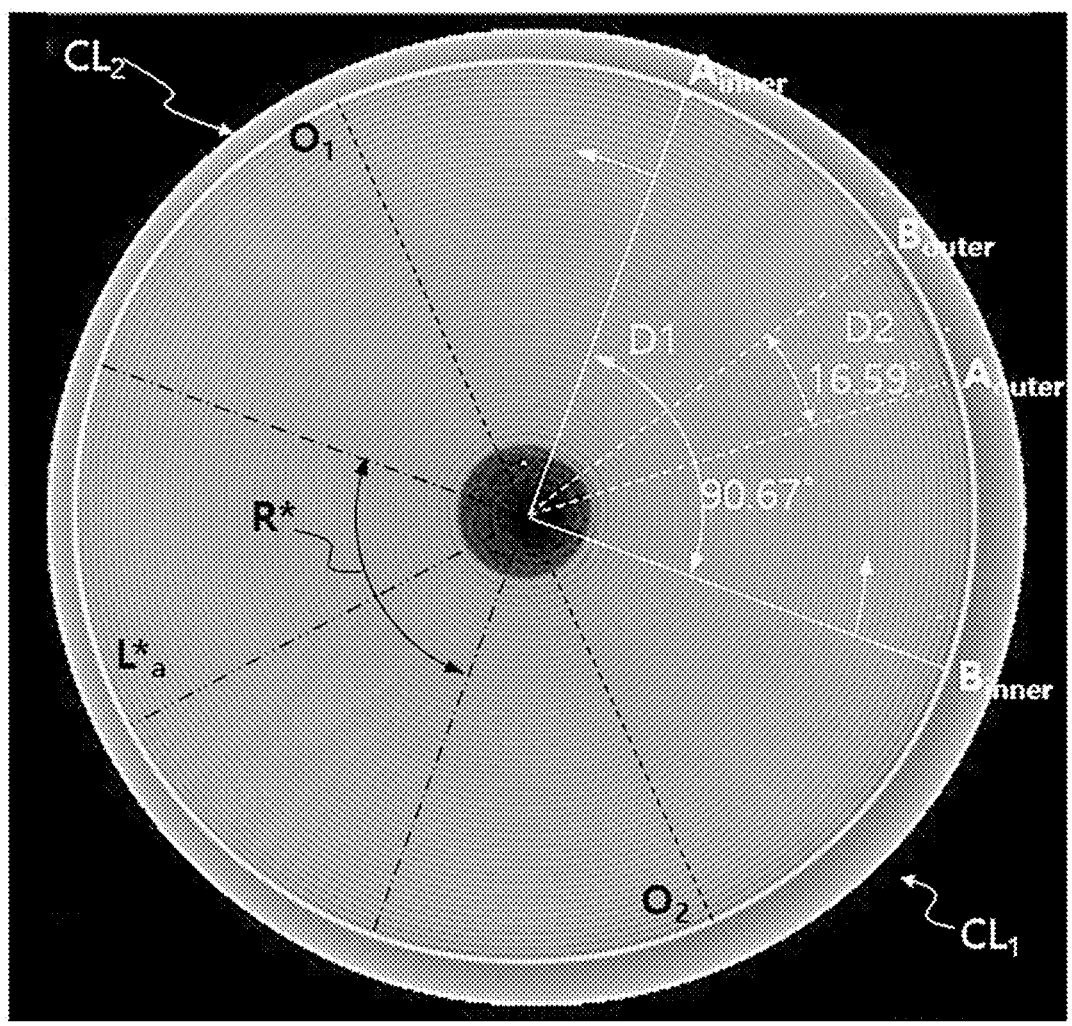
FIG. 10a is a CT cross-sectional photograph taken when the #3 sample battery is in the BOL state.
Figure 10B:
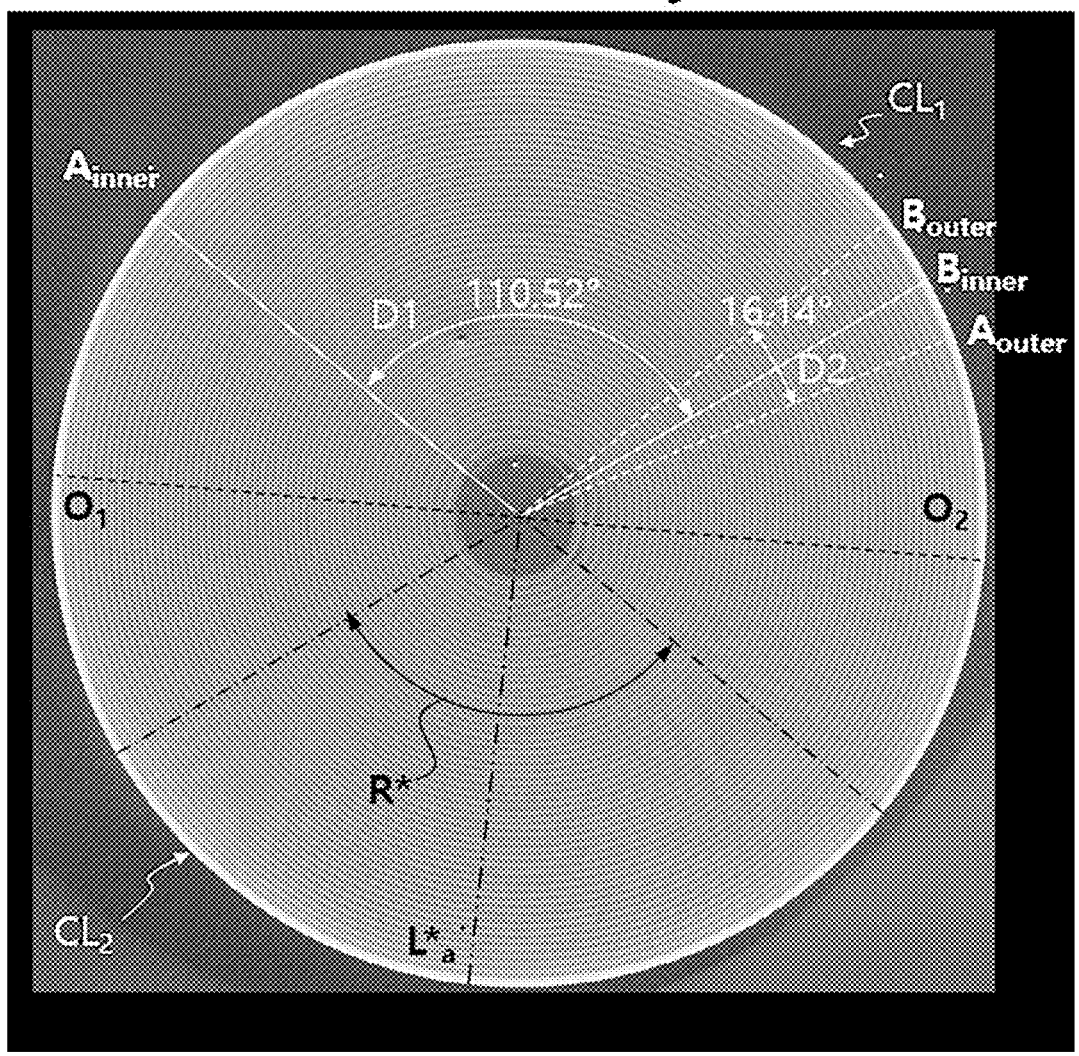
FIG. 10b is a CT cross-sectional photograph taken after 900 cycle tests are performed on the #3 sample battery.

FIG. 10a is a CT cross-sectional photograph taken when a cylindrical battery prepared as a #3 sample (hereinafter, #3 sample battery) is in the BOL state. FIG. 10b is a CT cross-sectional photograph taken after 900 cycle tests are performed on the #3 sample battery.

Referring to FIGS. 10a and 10b, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode.

When the #3 sample battery was in the BOL state, the angle for the stress vulnerable region D1 between the negative electrode core side end ($A_{inner}$) and the positive electrode core side end ($B_{inner}$) was measured to be 90.67 degrees, and the angle for the stress amplification region D2 between the negative electrode outer circumference side end ($A_{outer}$) and the positive electrode outer circumference side end ($B_{outer}$) was measured to be 16.59 degrees. Also, the circularity of the electrode assembly core was calculated to be 93.23%.

For the #3 sample battery, when 900 cycle tests were performed continuously, the angle for the stress vulnerable region D1 between the negative electrode core side end ($A_{inner}$) and the positive electrode core side end ($B_{inner}$) was measured to be 110.52 degrees, and the angle for the stress amplification region D2 between the negative electrode outer circumference side end ($A_{outer}$) and the positive electrode outer circumference side end ($B_{outer}$) was measured to be 16.14 degrees.

The negative electrode core side end ($A_{inner}$) and the positive electrode core side end ($B_{inner}$) were rotated significantly counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 19.85 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased slightly compared to the BOL state. Because the manual error of the operator is involved when measuring the angle, the decrease in the angle of the stress amplification region D2 is not meaningful.

Meanwhile, the CT cross-sectional photograph may be classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles.

The position of the stress vulnerable region D1 was maintained continuously within the first semicircular region ($CL_1$), while 900 cycles of charging and discharging were performed.

The stress amplification region D2 overlaps with the stress vulnerable region D1 from the BOL state, and even after 900 cycles, a part of the stress amplification region D2, especially the circumferential location of the positive electrode outer circumference side end ($B_{outer}$), overlaps with the stress vulnerable region D1. The arrangement design of the stress vulnerable region D1 and the stress amplification region D2 applied to the #3 sample battery does not conform to the embodiment of the present disclosure.

After 900 cycles of charging and discharging, the circularity of the electrode assembly core was calculated to be 89.65%, which was decreased by about 3.58% compared to the circularity of 93.23% in the BOL state. This decrease in circularity is a meaningful decrease when compared to the #1 sample battery and the #2 sample battery. Therefore, the electrode winding turns in the 3 o'clock to 6 o'clock direction on the CT cross-sectional photograph obtained after 900 cycles are deformed to the extent that their curvature can be recognized with the naked eye. Therefore, if the #3 sample battery is additionally charged and discharged beyond 900 times, there is a high possibility of collapse of the core.

The experimental results for the #3 sample battery support that unless the positions of the stress vulnerable region D1 and the stress amplification region D2 in the circumferential direction are intentionally designed according to the embodiments of the present disclosure, the circularity of the electrode assembly core cannot be maintained.

In other words, if the position of the electrode is not designed from the beginning in consideration of the linear increase of rotation amount of the positive and negative electrode core side ends so that the circumferential location of the stress amplification region D2, especially the positive electrode outer circumference side end ($B_{outer}$), is not included within the stress vulnerable region D1 while 900 cycles are performed, the circularity of the electrode assembly core cannot be maintained when the charging and discharging cycle is repeated 900 times or more. As a result, the collapse of the electrode assembly core cannot be prevented or alleviated while the cylindrical battery is charged and discharged beyond the effective usage cycles.

<Cycle Test for the #4 Sample Cylindrical Battery>

Figure 11A:
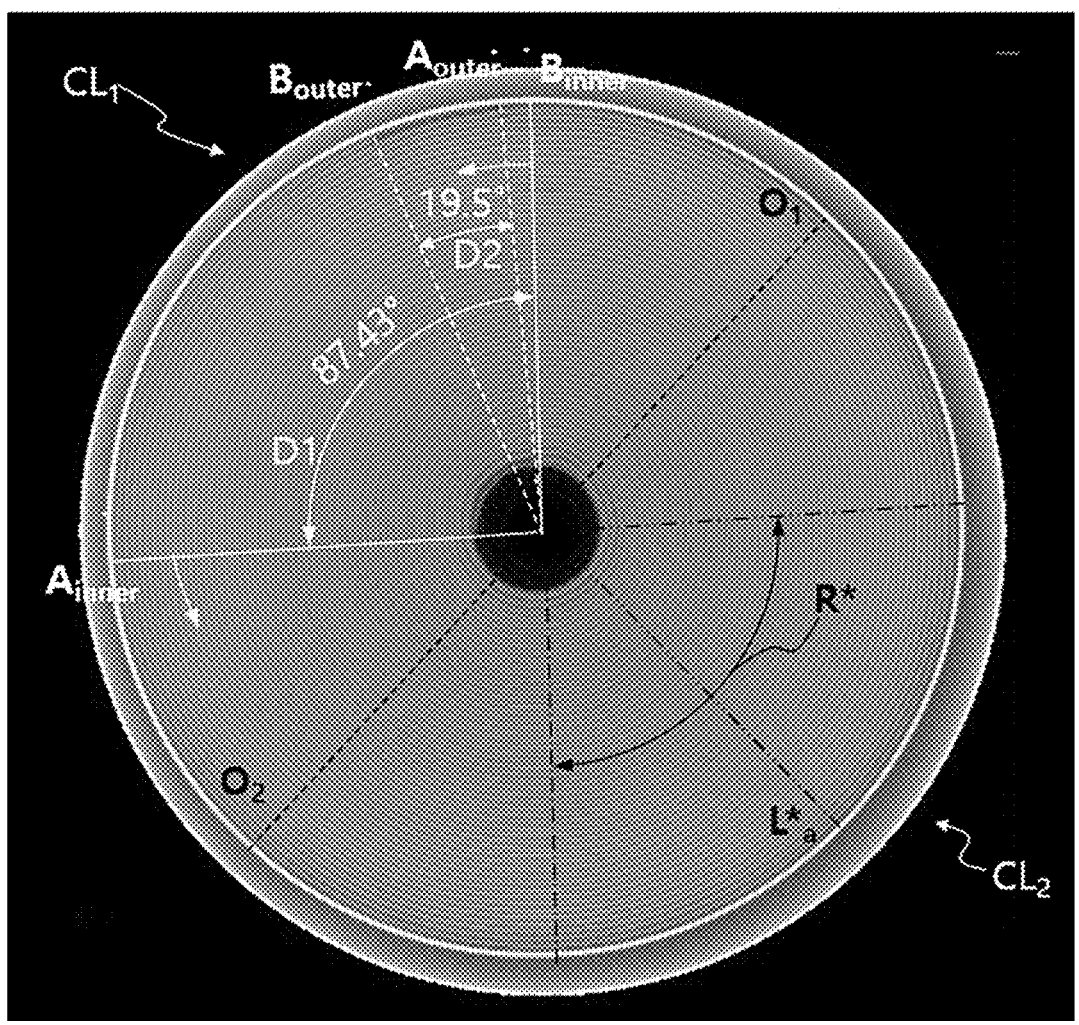
FIG. 11a is a CT cross-sectional photograph taken when the #4 sample battery is in the BOL state.
Figure 11B:
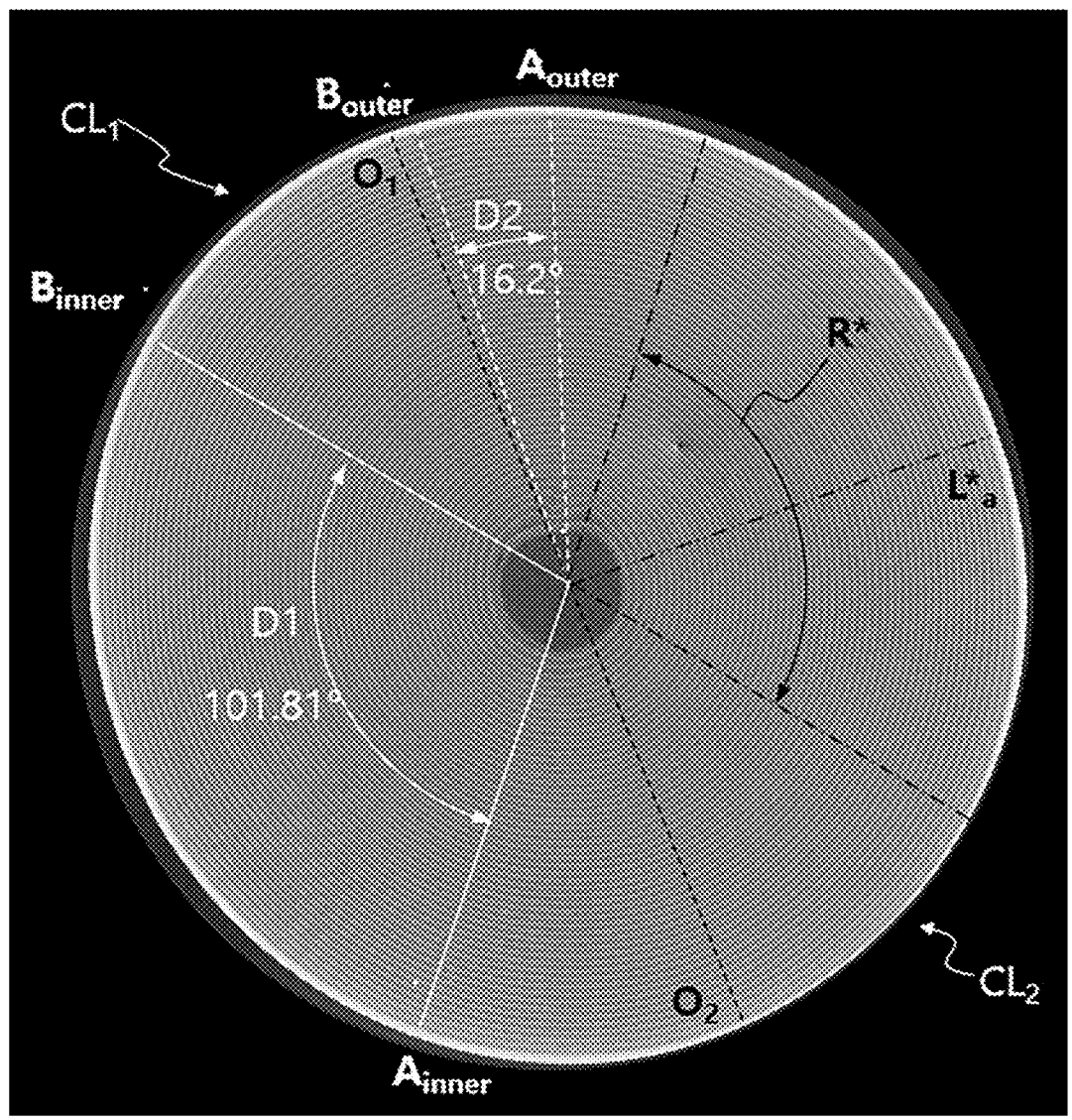
FIG. 11b is a CT cross-sectional photograph taken after 700 cycle tests are performed on the #4 sample battery.

FIG. 11a is a CT cross-sectional photograph taken when a cylindrical battery prepared as a #4 sample (hereinafter, #4 sample battery) is in the BOL state. FIG. 11b is a CT cross-sectional photograph taken after 700 cycle tests are performed on the #4 sample battery.

Referring to FIGS. 11a and 11b, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode.

When the #4 sample battery was in the BOL state, the angle for the stress vulnerable region D1 between the negative electrode core side end ($A_{inner}$) and the positive electrode core side end ($B_{inner}$) was measured to be 87.43 degrees, and the angle for the stress amplification region D2 between the negative electrode outer circumference side end ($A_{outer}$) and the positive electrode outer circumference side end ($B_{outer}$) was measured to be 19.5 degrees. Also, the circularity of the electrode assembly core was calculated to be 95.24%.

For the #4 sample battery, when 700 cycle tests were performed continuously, the angle for the stress vulnerable region D1 between the negative electrode core side end ($A_{inner}$) and the positive electrode core side end ($B_{inner}$) was measured to be 101.81 degrees, and the angle for the stress amplification region D2 between the negative electrode outer circumference side end ($A_{outer}$) and the positive electrode outer circumference side end ($B_{outer}$) was measured to be 16.2 degrees.

The negative electrode core side end ($A_{inner}$) and the positive electrode core side end ($B_{inner}$) were rotated significantly counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 14.38 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased by 3.3 degrees compared to the BOL state.

Meanwhile, the CT cross-sectional photograph may be classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles.

The position of the stress vulnerable region D1 was maintained continuously within the first semicircular region ($CL_1$), while 700 cycles of charging and discharging were performed.

The stress amplification region D2 overlaps with the stress vulnerable region D1 from the BOL state, but after 700 cycles, the stress amplification region D2 does not overlap with the stress vulnerable region D1 and is located in the second semicircular region ($CL_2$). The stress amplification region D2 initially maintains an overlapped state with the stress vulnerable region D1 in the circumferential direction during the 700 cycle tests. The stress amplification region D2 is spaced apart from the stress vulnerable region D1 in the circumferential direction from the middle of the cycle test and enters the second semicircular region ($CL_2$) in the latter half. The arrangement of the stress vulnerable region D1 and the stress amplification region D2 applied to the #4 sample battery does not conform to the embodiment of the present disclosure. This is because stress is concentrated in the core of the electrode assembly since the stress vulnerable region D1 and the stress amplification region D2 overlap while a significant number of cycles are performed from the BOL state.

After 700 cycles of charging and discharging, the circularity of the electrode assembly core was calculated to be 87.86%, which was decreased by about 7.38% compared to the circularity of 95.24% in the BOL state. This decrease in circularity is a meaningful decrease when compared to the #1 sample battery and the #2 sample battery. Therefore, the electrode winding turns in the 9 o'clock to 1 o'clock direction on the CT cross-sectional photograph obtained after 700 cycles are deformed to the extent that their curvature can be recognized with the naked eye. Therefore, if the #4 sample battery is additionally charged and discharged beyond 700 times, there is a high possibility of collapse of the core.

The cycle test results for the #4 sample battery support that unless the positions of the stress vulnerable region D1 and the stress amplification region D2 in the circumferential direction are intentionally designed according to the embodiments of the present disclosure, the circularity of the electrode assembly core cannot be maintained.

In other words, if the position of the electrode within the electrode assembly is not designed from the beginning in consideration of the linear increase of rotation amount of the positive and negative electrode core side ends so that the circumferential location of the stress amplification region D2, especially the positive electrode outer circumference side end ($B_{outer}$), is not included within the stress vulnerable region D1 while 700 cycles are performed, the circularity of the electrode assembly core cannot be maintained when the charging and discharging cycle is repeated 700 times or more. As a result, the collapse of the electrode assembly core cannot be prevented or alleviated while the cylindrical battery is charged and discharged beyond the effective usage cycles.

<Cycle Test for the #5 Sample Cylindrical Battery>

Figure 12A:
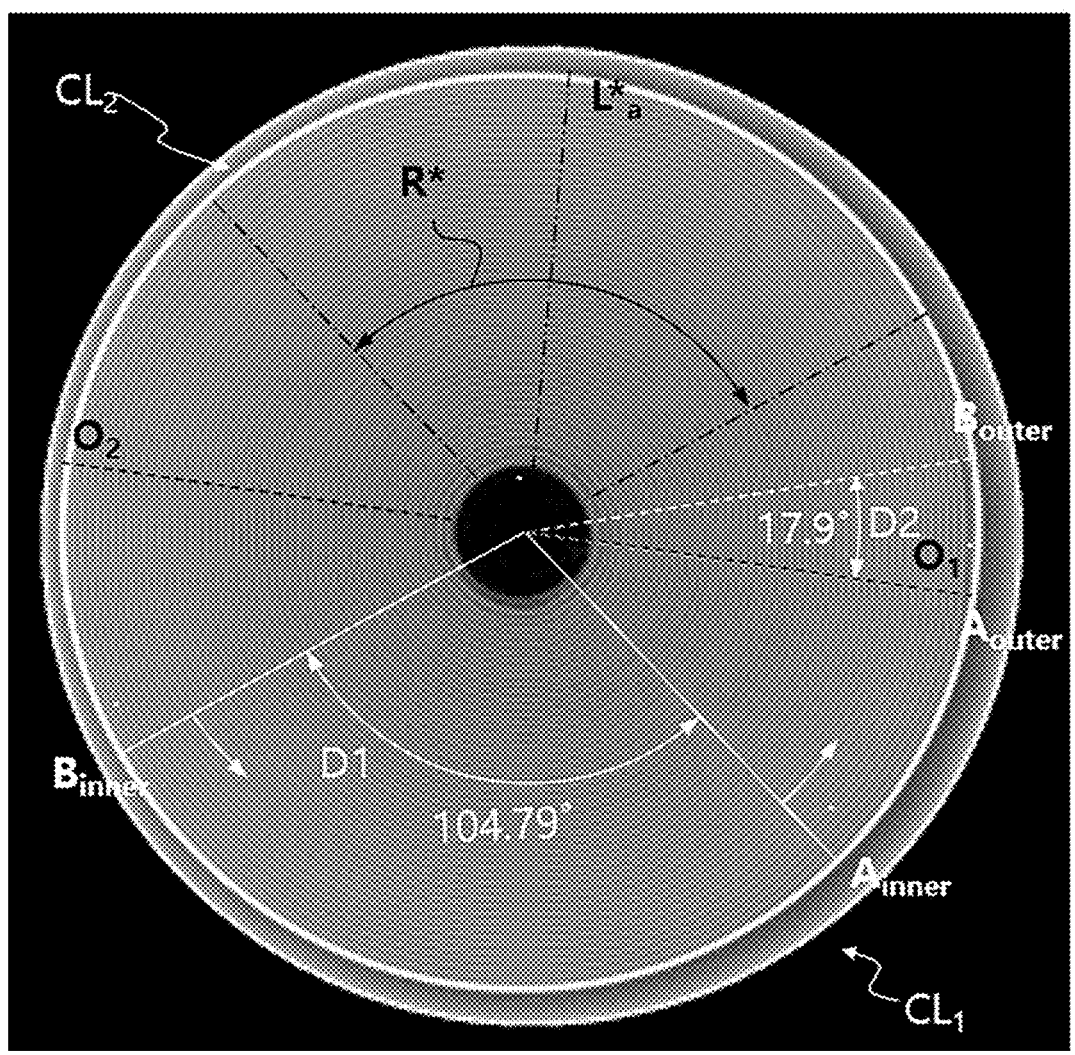
FIG. 12a is a CT cross-sectional photograph taken when the #5 sample battery is in the BOL state.
Figure 12B:
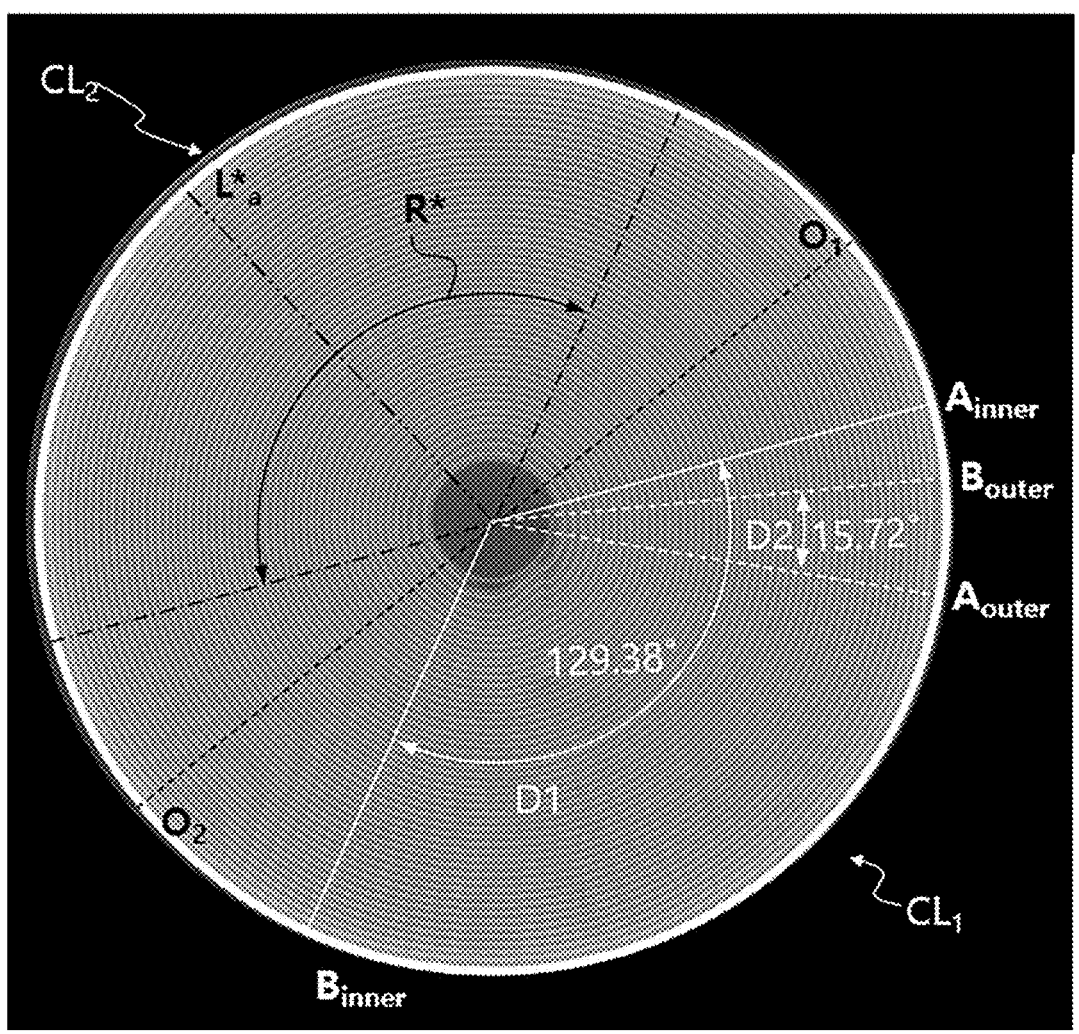
FIG. 12b is a CT cross-sectional photograph taken after 420 cycle tests are performed on the #5 sample battery.

FIG. 12a is a CT cross-sectional photograph taken when a cylindrical battery prepared as a #5 sample (hereinafter, #5 sample battery) is in the BOL state. FIG. 12b is a CT cross-sectional photograph taken after 420 cycle tests are performed on the #5 sample battery.

Referring to FIGS. 12a and 12b, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode.

When the #5 sample battery was in the BOL state, the angle for the stress vulnerable region D1 between the negative electrode core side end ($A_{inner}$) and the positive electrode core side end ($B_{inner}$) was measured to be 104.79 degrees, and the angle for the stress amplification region D2 between the negative electrode outer circumference side end ($A_{outer}$) and the positive electrode outer circumference side end ($B_{outer}$) was measured to be 17.9 degrees. Also, the circularity of the electrode assembly core was calculated to be 92.65%.

For the #5 sample battery, when 420 cycle tests were performed continuously, the angle for the stress vulnerable region D1 between the negative electrode core side end ($A_{inner}$) and the positive electrode core side end ($B_{inner}$) was measured to be 129.38 degrees, and the angle for the stress amplification region D2 between the negative electrode outer circumference side end ($A_{outer}$) and the positive electrode outer circumference side end ($B_{outer}$) was measured to be 15.72 degrees.

The negative electrode core side end ($A_{inner}$) and the positive electrode core side end ($B_{inner}$) were rotated significantly counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 24.59 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased by 2.18 degrees compared to the BOL state.

Meanwhile, the CT cross-sectional photograph may be classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles.

The position of the stress vulnerable region D1 was maintained continuously within the first semicircular region ($CL_1$), while 420 cycles of charging and discharging were performed.

The stress amplification region D2 begins overlapping with the stress vulnerable region D1 from the middle of the cycle test, and entirely overlaps with the stress vulnerable region D1 after 420 cycles. The arrangement of the stress vulnerable region D1 and the stress amplification region D2 applied to the #5 sample battery does not conform to the embodiment of the present disclosure. This is because stress is concentrated in the core of the electrode assembly as the stress vulnerable region D1 and the stress amplification region D2 overlap from the middle of the cycle test to the later part of the cycle test.

After 420 cycles of charging and discharging, the circularity of the electrode assembly core was calculated to be 90.63%, which was decreased by about 2.02% compared to the circularity of 92.65% in the BOL state. This decrease in circularity is a meaningful decrease when compared to the #1 sample battery and the #2 sample battery. Therefore, the electrode winding turns in the 3 o'clock to 7 o'clock direction on the CT cross-sectional photograph obtained after 420 cycles are deformed to the extent that their curvature can be recognized with the naked eye. Therefore, if the #5 sample battery is additionally charged and discharged beyond 420 times, there is a high possibility of collapse of the core.

The cycle test results for the #5 sample battery support that unless the positions of the stress vulnerable region D1 and the stress amplification region D2 in the circumferential direction are intentionally designed according to the embodiments of the present disclosure, the circularity of the electrode assembly core cannot be maintained.

In other words, if the position of the electrode within the electrode assembly is not designed from the beginning in consideration of the linear increase of rotation amount of the positive and negative electrode core side ends so that the circumferential location of the stress amplification region D2, especially the positive electrode outer circumference side end ($B_{outer}$), is not included within the stress vulnerable region D1 while 420 cycles are performed, the circularity of the electrode assembly core cannot be maintained when the charging and discharging cycle is repeated 420 times or more. As a result, the collapse of the electrode assembly core cannot be prevented or alleviated while the cylindrical battery is charged and discharged beyond the effective usage cycles.

<Cycle Test for the #6 Sample Cylindrical Battery>

Figure 13A:
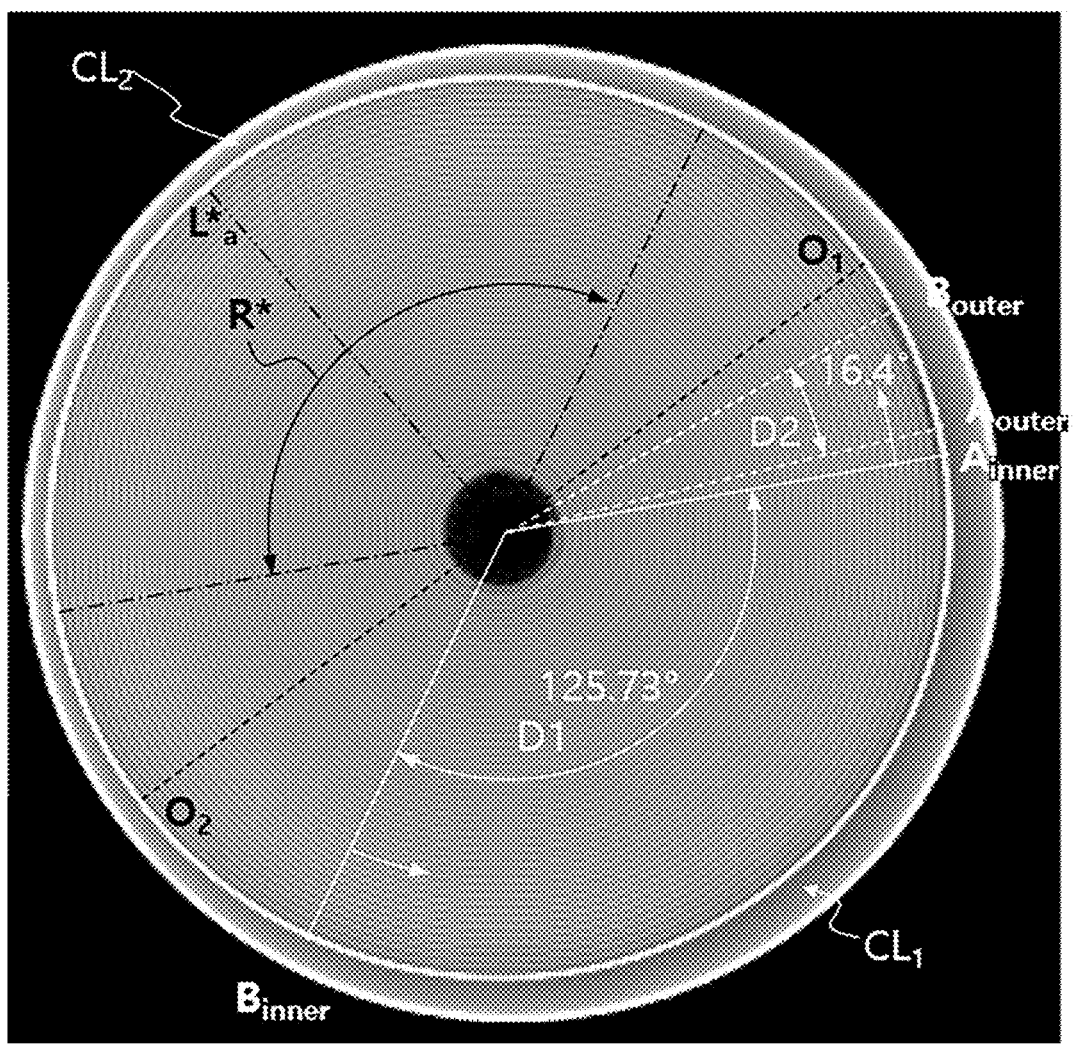
FIG. 13a is a CT cross-sectional photograph taken when the #6 sample battery is in the BOL state.
Figure 13B:
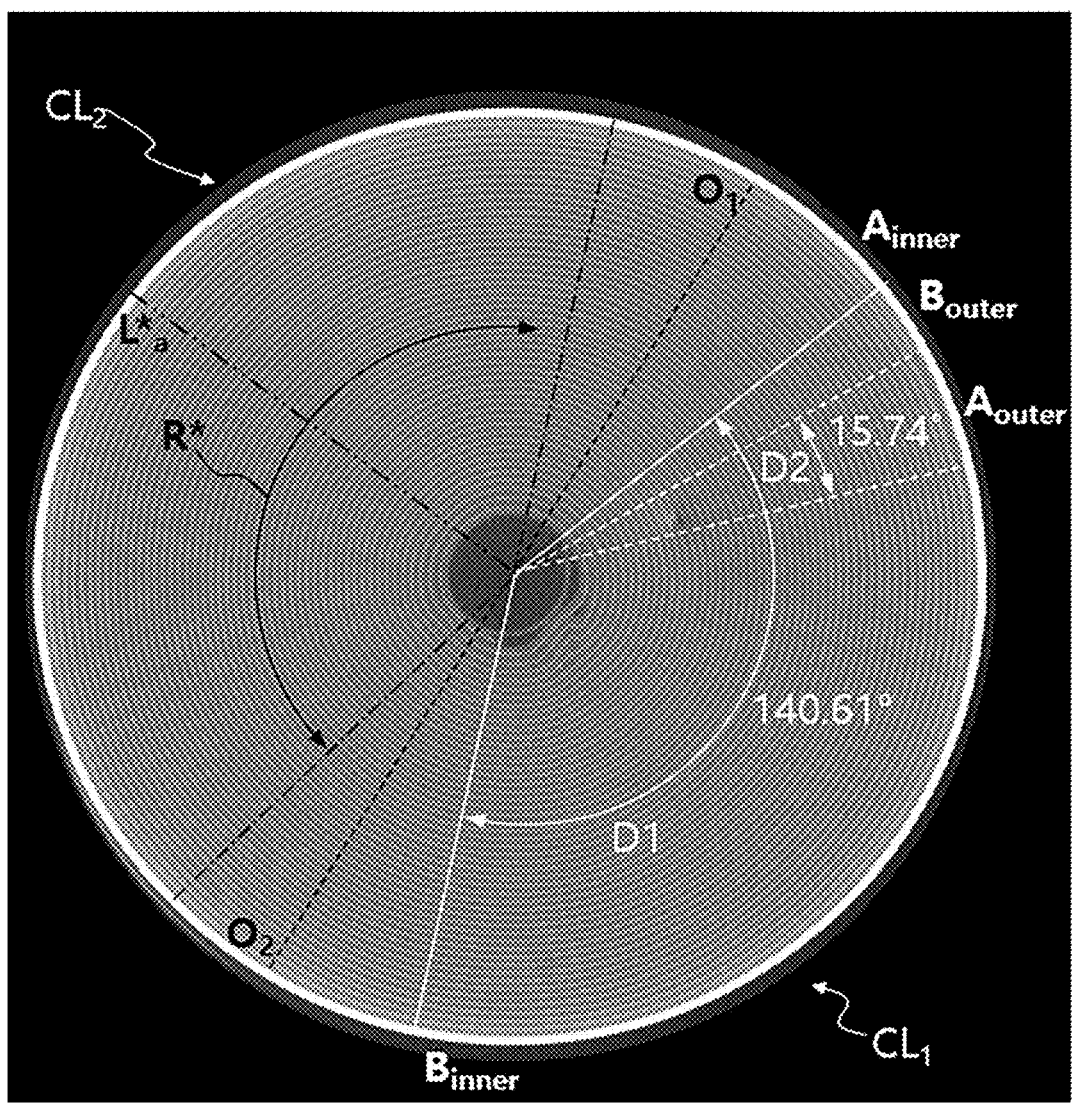
FIG. 13b is a CT cross-sectional photograph taken after 420 cycle tests are performed on the #6 sample battery.

FIG. 13a is a CT cross-sectional photograph taken when a cylindrical battery prepared as a #6 sample (hereinafter, #6 sample battery) is in the BOL state. FIG. 13b is a CT cross-sectional photograph taken after 420 cycle tests are performed on the #6 sample battery.

Referring to FIGS. 13a and 13b, on the CT cross-sectional photograph, the positive electrode and the negative electrode are wound clockwise, and the negative electrode is wound before the positive electrode. Therefore, based on the core center of the electrode assembly, the negative electrode is placed more centripetally than the positive electrode.

When the #6 sample battery was in the BOL state, the angle for the stress vulnerable region D1 between the negative electrode core side end ($A_{inner}$) and the positive electrode core side end ($B_{inner}$) was measured to be 125.73 degrees, and the angle for the stress amplification region D2 between the negative electrode outer circumference side end ($A_{outer}$) and the positive electrode outer circumference side end ($B_{outer}$) was measured to be 16.4 degrees. Also, the circularity of the electrode assembly core was calculated to be 93.34%.

For the #6 sample battery, when 420 cycle tests were performed continuously, the angle for the stress vulnerable region D1 between the negative electrode core side end ($A_{inner}$) and the positive electrode core side end ($B_{inner}$) was measured to be 140.61 degrees, and the angle for the stress amplification region D2 between the negative electrode outer circumference side end ($A_{outer}$) and the positive electrode outer circumference side end ($B_{outer}$) was measured to be 15.74 degrees.

The negative electrode core side end ($A_{inner}$) and the positive electrode core side end ($B_{inner}$) were rotated significantly counterclockwise compared to the BOL state. The rotation amount of the negative electrode core side end ($A_{inner}$) was relatively larger than the rotation amount of the positive electrode core side end ($B_{inner}$), and as a result, the angle of the stress vulnerable region D1 was increased by 14.88 degrees compared to the BOL state.

The negative electrode outer circumference side end ($A_{outer}$) and the positive electrode outer circumference side end ($B_{outer}$) hardly rotate compared to the BOL state. In measurements, the angle of the stress amplification region D2 was decreased by 0.66 degrees compared to the BOL state. Because the manual error of the operator is involved when measuring the angle, the decrease in the angle of the stress amplification region D2 is not meaningful.

Meanwhile, the CT cross-sectional photograph may be classified into the first semicircular region ($CL_1$) and the second semicircular region ($CL_2$) based on the diametric line segment ($O_1O_2$) that passes through the center of the electrode assembly core and is perpendicular to the straight line that divides the circumferential angle of the stress vulnerable region D1 into two equal angles.

The position of the stress vulnerable region D1 was maintained continuously within the first semicircular region ($CL_1$), while 420 cycles of charging and discharging were performed.

The stress amplification region D2 begins overlapping with the stress vulnerable region D1 from the middle of the cycle test, and entirely overlaps with the stress vulnerable region D1 after 420 cycles. The arrangement of the stress vulnerable region D1 and the stress amplification region D2 applied to the #6 sample battery does not conform to the embodiment of the present disclosure. This is because stress is concentrated in the core of the electrode assembly as the stress vulnerable region D1 and the stress amplification region D2 overlap from the middle of the cycle test to the later part of the cycle test.

After 420 cycles of charging and discharging, the circularity of the electrode assembly core was calculated to be 87.15%, which was decreased by about 6.19% compared to the circularity of 93.34% in the BOL state. This decrease in circularity is a meaningful decrease when compared to the #1 sample battery and the #2 sample battery. Therefore, the electrode winding turns in the 3 o'clock to 7 o'clock direction on the CT cross-sectional photograph obtained after 420 cycles are deformed to the extent that their curvature can be recognized with the naked eye. Therefore, if the #6 sample battery is additionally charged and discharged beyond 420 times, there is a high possibility of collapse of the core.

The cycle test results for the #6 sample battery support that unless the positions of the stress vulnerable region D1 and the stress amplification region D2 in the circumferential direction are intentionally designed according to the embodiments of the present disclosure, the circularity of the electrode assembly core cannot be maintained.

In other words, if the position of the electrode within the electrode assembly is not designed from the beginning in consideration of the linear increase of rotation amount of the positive and negative electrode core side ends so that the circumferential location of the stress amplification region D2, especially the positive electrode outer circumference side end ($B_{outer}$), is not included within the stress vulnerable region D1 while 420 cycles are performed, the circularity of the electrode assembly core cannot be maintained when the charging and discharging cycle is repeated 420 times or more. As a result, the collapse of the electrode assembly core cannot be prevented or alleviated while the cylindrical battery is charged and discharged beyond the effective usage cycles.

As can be seen from the charging and discharging cycle test above, when the electrode assembly has a structure wound in the jelly-roll form, if the end positions of the negative electrode and the positive electrode in the core and the outer circumference are designed intentionally from the beginning to conform to the embodiment of the present disclosure, the circularity of the electrode assembly core can be maintained without significant change even if the cylindrical battery is charged and discharged for 200 cycles or more, 300 cycles or more, 400 cycles or more, 700 cycles or more, or up to 900 cycles.

In a cylindrical battery including an electrode assembly wound in the jelly-roll form, the angle at which the positive electrode end and the negative electrode end are rotated along the circumferential direction varies depending on various factors such as the positive electrode active material, the negative electrode active material, the diameter of the electrode assembly, the thickness of the positive electrode and the negative electrode, the number of winding turns of the positive electrode and the negative electrode, etc. Therefore, according to the present disclosure, the cylindrical battery may be designed and manufactured as follows.

First, the specifications (diameter and height) of the cylindrical battery, specifications for all materials involved in the electrochemical reaction, and the effective usage cycle are determined. The effective usage cycle may be appropriately determined considering the intended use of the cylindrical battery. The effective usage cycle may be arbitrarily selected as 200 cycles or more, 300 cycles or more, 400 cycles or more, 500 cycles or more, 600 cycles or more, 700 cycles or more, 800 cycles or more, or 900 cycles or more. Next, a sample cylindrical battery is manufactured using a process known in the art, and the sample cylindrical battery is activated to enter the BOL state.

Subsequently, while conducting a charging and discharging cycle test exceeding the effective usage cycle for the sample cylindrical battery, the rotation amount of the electrode according to the increase in cycle number is measured, as shown in FIG. 9. The rotation amount of the electrode may be determined by obtaining CT cross-sectional photographs of the cylindrical battery at regular cycle intervals during the cycle test and then analyzing the CT cross-sectional photographs.

Once the electrode rotation amount according to the increase in cycle number is determined, the initial angles of the stress vulnerable region and the stress amplification region are determined as the first winding design condition. The initial separation angle between the two regions in the circumferential direction may be determined such that the stress amplification region, especially the positive electrode outer circumference side end ($B_{outer}$) thereof, does not overlap the inner area of the stress vulnerable region while the cylindrical battery is repeatedly charged and discharged until the effective usage cycle may be determined as the second winding design condition.

Then, the electrode assembly may be wound according to the determined winding design conditions, and a cylindrical battery may be manufactured using the wound electrode assembly. The cylindrical battery manufactured in this way may maintain the circularity of the electrode assembly core without significant change even if it is repeatedly charged and discharged up to the effective usage cycle.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from Ni, Co, Mn, Ca, Mg, Al, Ti, Si, Fe, Mo, V, Zr, Zn, Cu, Al, Mo, Sc, Zr, Ru, and Cr; $0 \le x$, $1 \le x+y \le 2$, $-0.1 \le z \le 2$; and the stoichiometric coefficients x, y, z and M are selected so that the compound maintains electrical neutrality).

In another example, the positive electrode active material may be an alkali metal compound $xLiM^1O_2\text{-}(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \le x \le 1$).

In still another example, the positive electrode active material may be lithium metal phosphate expressed by a general formula $Li_aM^1{}_xFe_{1-x}M^2{}_yP_{1-y}M^3{}_zO_{4-z}$ ($M^1$ includes at least one element selected from the Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0 < a \le 2$, $0 \le x \le 1$, $0 \le y < 1$, $0 \le z < 1$; the stoichiometric coefficient a, x, y, z, $M^1$, $M^2$, and $M^3$ are selected so that the compound maintains electrical neutrality), or $Li_3M_2(PO_4)_3$ [M includes at least one element selected from Ti, Si, Mn, Fe, Co, V, Cr, Mo, Ni, Al, Mg and Al].

Preferably, the positive electrode active material may include primary particles and/or secondary particles in which the primary particles are aggregated.

In one example, the negative electrode active material may employ carbon material, lithium metal or lithium metal compound, silicon-based compound, tin or tin compound, or the like. Metal oxides such as $TiO_2$ and $SnO_2$ with a potential of less than 2V may also be used as the negative electrode active material. As the carbon material, low-crystalline carbon, high-crystalline carbon or the like may be used.

The negative electrode active material may include a silicon-based active material, the silicon-based active material may include one or more selected from the group consisting of Si particles, silicon oxide (e.g., SiOx ($0<x<2$)), SiC, and Si alloy. In one example, the silicon-based active material (e.g., SiO) may be added by amount of 0.5% to 15%, 1% to 10%, 2% to 6%, or 2% to 5% by weight of the total negative electrode active material. When the amount of silicon-based active material (e.g., SiO) is controlled within the numerical range, the addition of SiO may increase the capacity of the negative electrode while suppressing the volume expansion of the negative electrode, which affects the collapse of the core of the electrode assembly, to a manageable level.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

At least one surface of the separator may include a coating layer of inorganic particles. It is also possible that the separator itself is made of a coating layer of inorganic particles. The particles constituting the coating layer may have a structure coupled with a binder so that interstitial volumes exist among adjacent particles.

The inorganic particles may be made of an inorganic material having a dielectric constant of 5 or more. The inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$, $PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

The electrolyte may be a salt having a structure like $A^+B^-$. Here, $A^+$ includes an alkali metal cation such as $Li^+$, $Na^+$, or $K^+$, or a combination thereof, and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5 PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

Hereinafter, the structure of the electrode and the electrode assembly used for manufacturing the cylindrical battery according to an embodiment of the present disclosure will be described. Subsequently, the structure of the cylindrical battery according to an embodiment of the present disclosure will also be described in detail.

The design of the electrode, the electrode assembly, and the cylindrical battery described in the embodiments, along with the design of the position of the electrode end described above, is effective in preventing or mitigating collapse of the electrode assembly core. In particular, the welding structure of the current collector utilizing the bending surface region formed by bending the uncoated portion of the positive electrode and/or the negative electrode may firmly fix the position of the positive electrode and/or the negative electrode, thereby reducing the degree of rotational freedom of the electrode near the core of the electrode assembly.

FIG. 14a is a plan view showing a structure of an electrode 40 according to the first embodiment of the present disclosure.

Referring to FIG. 14a, the electrode 40 of the first embodiment includes a current collector 41 made of metal foil and an active material layer 42. The metal foil may be a conductive metal such as aluminum or copper, and is appropriately selected according to the polarity of the electrode 40. The active material layer 42 is formed on at least one surface of the current collector 41. The active material layer 42 is formed along the winding direction X. The electrode 40 includes an uncoated portion 43 at the long side end in the winding direction X. The uncoated portion 43 is a partial area of the current collector 41 not coated with the active material. The area of the current collector 41 where the active material layer 42 is formed may be called an active material portion.

In the electrode 40, the width of the active material portion in the short side direction of the current collector 41 may be 50 mm to 120 mm, and the length of the active material portion in the long side direction of the current collector 41 may be 3 m to 5 m. Therefore, the ratio of the short side to the long side of the active material portion may be 1.0% to 4.0%.

Preferably, in the electrode 40, the width of the active material portion in the short side direction of the current collector 41 may be 60 mm to 70 mm, and the length of the active material portion in the long side direction of the current collector 41 may be 3 m to 5 m. Therefore, the ratio of the short side to the long side of the active material portion may be 1.2% to 2.3%.

The ratio of the short side to the long side of the active material portion is significantly smaller than 6% to 11% that is the ratio of the short side to the long side of the active material portion of an electrode used in a cylindrical battery with a form factor of 1865 or 2170.

Preferably, the current collector 41 may have an elongation of 1.5% to 3.0%, and a tensile strength of 25 kgf/mm$^2$ to 35 kgf/mm$^2$. The elongation and tensile strength may be measured according to the measurement method of IPC-TM-650. The electrode 40 is manufactured by forming an active material layer 42 on the current collector 41 and then compressing the same. When compressed, the region of the uncoated portion 43 and the region of the active material layer 42 have different elongations. Therefore, a swell is formed on the electrode 40 after the compression, and as the electrode 40 is longer, the swell is more severe.

Optimization of the elongation and tensile strength of the current collector 41 reduces the camber length after compression to less than 20 mm when the length of the electrode 40 is about 4 m. The camber length is a maximum deflection amount of the electrode 40 in the winding direction X when the swollen electrode 20 is spread out. The maximum deflection amount may be measured at the end of the outer circumference. Since the electrode 40, in which the elongation and tensile strength of the current collector 41 are optimized, has a small camber length, meandering defects (e.g., wrinkles) do not occur during the notching operation of the uncoated portion 43 or the winding process of the electrode 40.

The current collector 41 is more likely to break as the elongation is smaller. When the elongation of the current collector 41 is less than 1.5%, the rolling process efficiency of the current collector 41 is reduced, and so a disconnection may occur in the current collector 41 when the electrode 40 coated with the active material layer 42 is pressed on the current collector 41. Meanwhile, when the elongation of the current collector 41 exceeds 3.0%, the camber length greatly increases as the elongation of the active material portion of the electrode 40 increases. If the tensile strength of the current collector 41 is less than 25 kgf/mm$^2$ or greater than 35 kgf/mm$^2$, the electrode process efficiency of the electrode 40 is deteriorated.

The camber phenomenon is particularly problematic for positive electrode current collectors made of aluminum foil. According to the present disclosure, the camber phenomenon may be suppressed by using an aluminum foil with elongation of 1.5% to 3.0% and tensile strength of 25 kgf/mm$^2$ to 35 kgf/mm$^2$ as a current collector. It is desirable to form an active material layer on the current collector and use it as a positive electrode.

Preferably, an insulating coating layer 44 may be formed at a boundary between the active material layer 42 and the uncoated portion 43. The insulating coating layer 44 is formed such that at least a part thereof overlaps with the boundary between the active material layer 42 and the uncoated portion 43. The insulating coating layer 44 prevents a short circuit between two electrodes having different polarities and facing each other with a separator interposed therebetween. The insulating coating layer 44 may cover a boundary between the active material layer 42 and the uncoated portion 43 with a width of 0.3 mm to 5 mm. The width of the insulating coating layer 44 may vary along the winding direction of the electrode 40. The insulating coating layer 44 may include a polymer resin and an inorganic filler such as $Al_2O_3$. Since the portion of the current collector 41 covered by the insulating coating layer 44 is not an area coated with an active material layer, it may be regarded as an uncoated portion.

The uncoated portion 43 includes a core side uncoated portion B1 adjacent to the core of the electrode assembly, an outer circumference side uncoated portion B3 adjacent to the outer circumference of the electrode assembly, and an intermediate uncoated portion B2 interposed between the core side uncoated portion B1 and the outer circumference side uncoated portion B3.

The core side uncoated portion B1, the outer circumference side uncoated portion B3, and the intermediate uncoated portion B3 may be defined as an uncoated portion in an area adjacent to the core, an uncoated portion in an area adjacent to the outer circumference, and an uncoated portion of the remaining area other than the above areas, respectively, when the electrode 40 is wound into a jelly-roll type electrode assembly.

Hereinafter, the core side uncoated portion B1, the outer circumference side uncoated portion B3, and the intermediate uncoated portion B2 are referred to as a first portion, a second portion, and a third portion, respectively.

In one example, the first portion B1 may be an uncoated portion of an electrode region including the innermost winding turn, and the second portion B3 may be an uncoated portion of an electrode region including the outermost winding turn. The winding turn may be counted based on the core-side end of the electrode assembly.

In another example, the boundary of B1/B2 may be appropriately defined as a point at which the height (or, change pattern) of the uncoated portion substantially changes while going from the core of the electrode assembly toward the outer circumference, or a point of a predetermined % based on the radius of the electrode assembly (e.g., 5% point, 10% point, 15% point, or the like of the radius)

The boundary of B2/B3 may be defined as a point at which the height (or, change pattern) of the uncoated portion substantially changes as going from the outer circumference of the electrode assembly toward the core, or a point of a predetermined % based on the radius of the electrode assembly (e.g., 85% point, 90% point, 95% point, or the like of the radius). When the boundary of B1/B2 and the boundary of B2/B3 are specified, the third portion B2 may be automatically specified.

If only the boundary of B1/B2 is specified, the boundary of B2/B3 may be appropriately selected at a point near the outer circumference of the electrode assembly. In one example, the second portion may be defined as an uncoated portion of an area of the electrode constituting the outermost winding turn. Conversely, when only the boundary of B2/B3 is specified, the boundary of B1/B2 may be appropriately selected at a point near the core of the electrode assembly. In one example, the first portion may be defined as an uncoated portion of an area of the electrode constituting the innermost winding turn.

It is not excluded that another structure is interposed between the first portion B1 and the third portion B2. Also, it is not excluded that another structure is interposed between the third portion B2 and the second portion B3.

In the first embodiment, the height of the uncoated portion 43 is not constant and there is a relative difference in the winding direction X. That is, the height (length in the Y-axis direction) of the second portion B3 is 0 or more, but is relatively smaller than those of the first portion B1 and the third portion B2. Here, the height of each portion may be an average height or a maximum height, which is applied below in the same way. In the winding direction, the third portion B2 is longer than the first portion B1 and the second portion B3.

FIG. 14b is a plan view showing the structure of an electrode 45 according to the second embodiment of the present disclosure.

Referring to FIG. 14b, the electrode 45 of the second embodiment substantially the same as the first embodiment, except that the height of the second portion B3 gradually decreases toward the outer circumference.

In one modification, the second portion B3 may be deformed into a step shape in which the height decreases stepwise (see dotted line).

FIG. 14c is a plan view showing the structure of an electrode 50 according to the third embodiment of the present disclosure.

Referring to FIG. 14c, in the electrode 50 of the third embodiment, the heights of the first portion B1 and the second portion B3 are 0 or more, but are relatively smaller than the third portion B2. Also, the heights of the first portion B1 and the second portion B3 may be the same or different.

Preferably, the height of the third portion B2 may have a step shape gradually increasing from the core toward the outer circumference.

Patterns 1 to 7 classify the third portion B2 based on the location where the height of the uncoated portion 43 changes. Preferably, the number of patterns and the height (length in the Y-axis direction) and width (length in the X-axis direction) of each pattern may be adjusted to distribute the stress as much as possible during bending of the uncoated portion 43. The stress distribution is to prevent the uncoated portion 43 from being torn when the uncoated portion 43 is bent toward the core of the electrode assembly.

The width ($d_{B1}$) of the first portion B1 is designed by applying the condition that the core of the electrode assembly is not covered when the patterns of the third portion B2 are bent toward the core. The core means a cavity existing at the winding center of the electrode assembly.

In one example, the width ($d_{B1}$) of the first portion B1 may increase in proportion to the bending length of Pattern 1. The bending length corresponds to the height of the pattern based on the bending point of the pattern.

Preferably, the width ($d_{B1}$) of the first portion B1 may be set such that the radial direction width of the winding turns formed by the first portion B1 is equal to or greater than the bending length of Pattern 1. In a modification, the width ($d_{B1}$) of the first portion B1 may be set such that the value obtained by subtracting the radial width of the winding turns formed by the first portion B1 from the bending length of Pattern 1 is less than 0 or 10% or less of the radius of the core.

In a specific example, when the electrode 60 is used to manufacture an electrode assembly of a cylindrical battery having a form factor of 4680, the width ($d_{B1}$) of the first portion B1 may be set as 180 mm to 350 mm depending on the diameter of the core of the electrode assembly and the bending length of Pattern 1.

In one embodiment, the width of each pattern may be designed to constitute one or more winding turns of the electrode assembly.

In one modification, the height of the third portion B2 may have a step shape in which the height increases and then decreases from the core toward the outer circumference.

In another modification, the second portion B3 may deformed to have the same structure as the second embodiment.

In still another modification, the pattern structure applied to the third portion B2 may be extended to the second portion B3 (see dotted line).

FIG. 14d is a plan view showing the structure of an electrode 60 according to the fourth embodiment of the present disclosure.

Referring to FIG. 14d, in the electrode 60 of the fourth embodiment, the first portion B1 and the second portion B3 have heights of 0 or more in the winding axis Y direction, but are relatively smaller than the third portion B2. In addition, the heights of the first portion B1 and the second portion B3 in the winding axis Y direction may be the same or different.

Preferably, at least a partial region of the third portion B2 may include a plurality of segments 61. The heights of the plurality of segments 61 may increase stepwise from the core toward the outer circumference. The plurality of segments 61 have a geometric shape in which the width decreases from the bottom to the top. Preferably, the geometric figure is a trapezoid. As will be described later, the shape of the geometric figure may be modified in various ways.

The segment 61 may be formed by laser notching. The segment 61 may be formed by a known metal foil cutting process such as ultrasonic cutting or punching.

In the fourth embodiment, in order to prevent the active material layer 42 and/or the insulating coating layer 44 from being damaged during bending of the uncoated portion 43, it is preferable to provide a predetermined gap between the bottom (a portion indicated by G in FIG. 14*e*) of the cut groove between the segments 61 and the active material layer 42. This is because stress is concentrated near the bottom of the cut groove 63 when the uncoated portion 43 is bent. The gap may be varied along the winding direction of the electrode 60. The gap is 0.2 mm to 4 mm, preferably 1.5 mm to 2.5 mm. If the gap is adjusted within the corresponding numerical range, it is possible to prevent the active material layer 42 and/or the insulating coating layer 44 from being damaged near the bottom of the cut groove 63 by the stress generated during bending of the uncoated portion 43. The gap may prevent the active material layer 42 and/or the insulating coating layer 44 from being damaged due to tolerance during notching or cutting of the segment 61. In one direction parallel to the winding direction, the gap may be substantially the same or may vary. In the latter case, the gaps of the plurality of segments may be varied individually, in a group unit, or in two or more group units, along one direction parallel to the winding direction. The lower end of the cut groove 63 and the insulating coating layer 44 may be spaced apart by 0.5 mm to 2.0 mm. In one direction parallel to the winding direction, the separation distance between the lower end of the cut groove 63 and the insulating coating layer 44 may be substantially the same or variable. In the latter case, the separation distances of the plurality of segments may be varied individually, in a group unit, or in two or more group units, along one direction parallel to the winding direction. When the electrode 60 is wound, the end of the insulating coating layer 44 in the winding axis Y direction may be located in the range of −2 mm to 2 mm along the winding axis direction based on the end of the separator. The insulating coating layer 44 may prevent a short circuit between two electrodes having different polarities and facing each other with a separator interposed therebetween, and may support a bending point when the segment 61 is bent. In order to improve the short circuit prevention effect between the two electrodes, the insulating coating layer 44 may be exposed to the outside of the separator. In addition, in order to further maximize the effect of preventing a short circuit between the two electrodes, the width of the insulating coating layer 44 may be increased so that the end of the insulating coating layer 44 in the winding axis Y direction is located above the lower end of the cut groove 63. In one embodiment, the end of the insulating coating layer 44 in the winding axis direction may be located within a range of −2 mm to +2 mm based on the lower end of the cut groove 63. The thickness of the insulating coating layer 44 may be smaller than the thickness of the active material layer 42. In this case, a gap may exist between the surface of the insulating coating layer 44 and the separator.

In one aspect, the plurality of segments 61 may form a plurality of segment groups going from the core to the outer circumference. At least one of the width, height, and separation pitch of segments belonging to the same segment group may be substantially the same. Preferably, the width, height, and separation pitch of the segments belonging to the same segment group may be substantially the same.

Preferably, the width, height, and separation pitch of the segments belonging to the same segment group may be substantially the same.

In another aspect, the separation pitches of the plurality of segments may gradually or stepwise increase from the core toward the outer circumference in a group unit or in two or more group units, or vice versa.

In still another aspect, the separation pitches of the plurality of segments may gradually or stepwise increase and then gradually or stepwise decrease from the core toward the outer circumference is in a group unit or in two or more group units, or vice versa.

In still another aspect, in the plurality of segments, the gap between the lower end of the cut groove 63 and the insulating coating layer 44 or the active material layer 42 may gradually or gradually increase from the core toward the outer circumference, or vice versa.

In still another aspect, in the plurality of segments, the gap between the lower end of the cut groove 63 and the insulating coating layer 44 or the active material layer 42 may gradually or stepwise increase or gradually or stepwise decrease from the core toward the outer circumference, or vice versa.

Figure 14E:
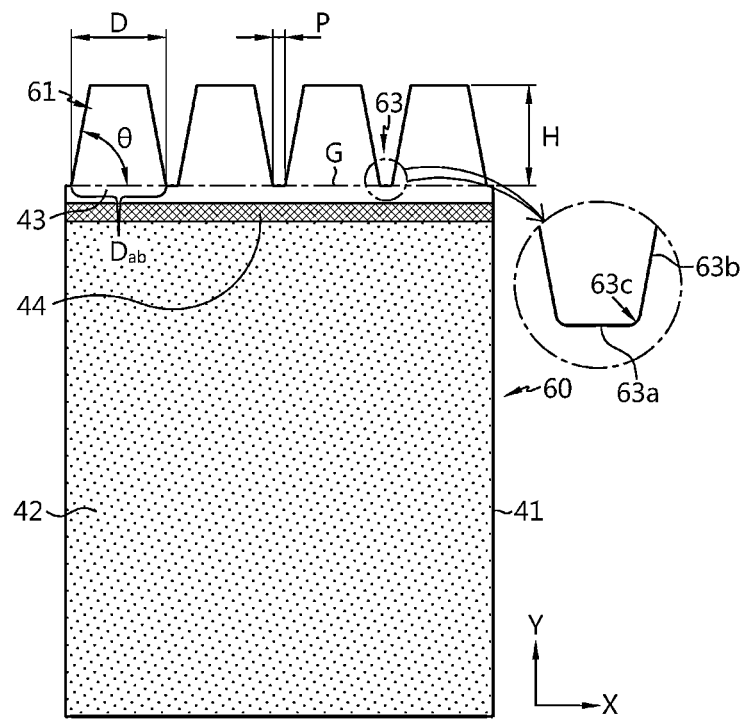
FIG. 14e is a diagram showing the definitions of width, height and separation pitch of a segment according to an embodiment of the present disclosure.

FIG. 14*e* is a diagram showing the definitions of width D, height H and separation pitch P of a trapezoidal segment 61 according to an embodiment of the present disclosure.

Referring to FIG. 14*e*, the width (D), height (H), and separation pitch (P) of the segment 61 are designed to prevent the uncoated portion 43 near the bending point from being torn during bending of the uncoated portion 43 and to prevent abnormal deformation of the uncoated portion 43 while sufficiently increasing the number of overlapping layers of the uncoated portion 43 to secure sufficient welding strength.

The segment 61 is bent at the line G passing through the bottom of the cut groove 63 or at the top thereof. The cut groove 63 enables smooth and easy bending of the segment 61 in the radial direction of the electrode assembly.

The width (D) of the segment 61 is defined as the length between two points where two straight lines extending from both sides 63*b* of the segment 61 meet a straight line extending from the bottom 63*a* of the cut groove 63. The height (H) of the segment 61 is defined as the shortest distance between the uppermost edge of the segment 61 and a straight line extending from the bottom 63*a* of the cut groove 63. The separation pitch (P) of the segment 61 is defined as the length between two points where a straight line extending from the bottom 63*a* of the cut groove 63 meets straight lines extending from both sides 63*b* connected to the bottom 63*a*. When the side 63*b* and/or the bottom 63*a* is curved, the straight line may be replaced with a tangent extending from the side 63*b* and/or the bottom 63*a* at an intersection point where the side 63*b* and the bottom 63*a* meet.

Preferably, the width (D) of the segment 61 is 1 mm or more. If D is less than 1 mm, when the segment 61 is bent toward the core, an area or an empty space (gap) where the segments 61 do not overlap enough to sufficiently secure sufficient welding strength may occur.

Preferably, the width (D) of the segments 61 may be adjusted adaptively depending on the radius of the winding turn where the segments 61 are located so that segments 61 overlap well in the radial direction when the segments 61 are bent toward the core of the electrode assembly.

Figure 14F:
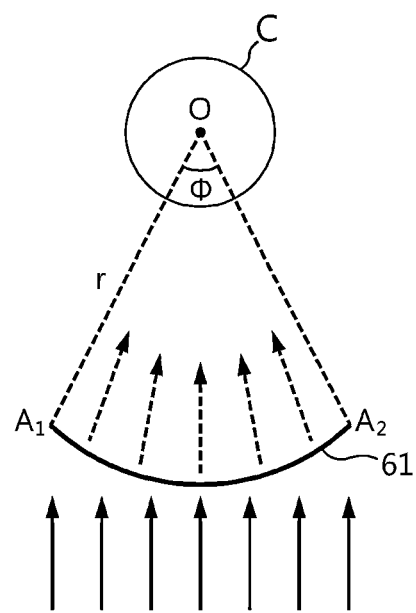
FIG. 14f is a diagram showing an arc formed by a lower end of the segment, where the width of the segment is defined, with respect to the center of the core of the electrode assembly, when the electrode is wound according to an embodiment of the present disclosure.

FIG. 14f is a diagram showing an arc ($A_1A_2$) formed by a lower end (line Dab in FIG. 14e) of the segment 61, where the width D of the segment 61 is defined, with respect to the center O of the core of the electrode assembly, when the electrode 60 is wound according to an embodiment of the present disclosure.

Referring to FIG. 14f, the arc ($A_1A_2$) has a length corresponding to the width (D) of the segment 61 and has a circumferential angle (Φ) based on the center of the core of the electrode assembly. The circumferential angle (Φ) may be defined as the angle between two line segments connecting both ends of the arc ($A_1A_2$) and the center O of the core on a plane perpendicular to the winding axis passing through the arc ($A_1A_2$).

When the length of the arc ($A_1A_2$) of the segment 61 is the same, the circumferential angle (Φ) decreases as the radius (r) of the winding turn where the segment 61 is located increases. Conversely, when the circumferential angle (Φ) of the segment 61 is the same, the length of the arc ($A_1A_2$) increases proportionally as the radius (r) of the winding turn where the segment 61 is located increases.

The circumferential angle (Φ) affects the bending quality of the segment 61. In the drawing, a solid arrow indicates a direction of force applied to bend the segment 61, and a dotted arrow indicates a direction in which the segment 61 is bent. The bending direction is a direction toward the center O of the core.

The circumferential angle (Φ) of the segment 61 may be 45 degrees or less, preferably 30 degrees or less, depending on the radius (r) of the winding turn where the segment 61 is located in order to improve bending uniformity and prevent cracking.

In one aspect, the circumferential angle (Φ) of the segment 61 may gradually or stepwise increase or decrease along the radial direction of the electrode assembly within the above numerical range. In another aspect, the circumferential angle (Φ) of the segment 61 may gradually or stepwise increase or gradually or stepwise decrease along the radial direction of the electrode assembly within the above numerical range, or vice versa. In another aspect, the circumferential angle (Φ) of the segment 61 may be substantially the same along the radial direction of the electrode assembly within the above numerical range.

According to experiments, when the circumferential angle (Φ) of the segment 61 exceeds 45 degrees, the bending shape of the segment 61 is not uniform. The difference between the force applied to the middle part of the segment 61 and the force applied to the side part increases, so the compression of the segment 61 is not uniform in the circumferential direction. In addition, if the pressing force is increased for uniformity of bending, cracks may occur in the uncoated portion 43 near the cut groove 63.

In one embodiment, the circumferential angles (Φ) of the segments 61 included in the electrode 60 are substantially the same, and the widths of the segments 61 may proportionally increase as the radius (r) of the winding turn in which the segment 61 is located increases. The term 'substantially the same' means completely identical or with a variance of less than 5%.

For example, when the radius of the electrode assembly is 22 mm, the radius of the core is 4 mm, the segments 61 are disposed starting from the winding turn located at the point where the radius is 7 mm, if the circumferential angles (Φ) of the segments 61 are uniform as 28.6 degrees, the widths (D) of the segments 61 may proportionally increase according to the radius (r) of the winding turn where the segments 61 are located, as shown in Table 1 below. That is, the widths of the segments 61 may increase at substantially the same rate by 0.5 mm whenever the radius (r) of the winding turn increases by 1 mm.

TABLE 1

| winding turn radius (mm) | 7.0 | 8.0 | 9.0 | 10.0 | 11.0 | 12.0 | 13.0 | 14.0 | 15.0 | 16.0 | 17.0 | 18.0 | 19.0 | 20.0 | 21.0 | 22.0 |
|---|---|---|---|---|---|---|---|---|---|---|---|---|---|---|---|---|
| segment width (D, mm) | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
| circumferential angle (degree) | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 |

Preferably, the width D(r) of the segment 61 located in a winding turn having a radius of r based on the core center O of the electrode assembly may be determined within a range satisfying Formula 1 below.

$$1 \leq D(r) \leq (2*\pi*r/360°)*45° \qquad \langle\text{Formula 1}\rangle$$

Preferably, the widths D(r) of the plurality of segments 61 in the winding direction may gradually or stepwise increase as the radius r of the winding turn where the segment 61 is located increases based on the core center of the electrode assembly, or vice versa.

In another aspect, the widths D(r) of the plurality of segments 61 in the winding direction may gradually or stepwise increase in the range of 1 mm to 11 mm as the radius r of the winding turn where the segment 61 is located increases based on the core center of the electrode assembly, or vice versa.

In still another aspect, the widths D(r) of the plurality of segments 61 in the winding direction may gradually or stepwise increase and then gradually or stepwise decrease as the radius r of the winding turn where the segment 61 is located increases based on the core center of the electrode assembly, or vice versa.

In still another aspect, the widths D(r) of the plurality of segments 61 in the winding direction may gradually or stepwise increase and then gradually or stepwise decrease in the range of 1 mm to 11 mm as the radius r of the winding turn where the segment 61 is located increases based on the core center of the electrode assembly, or vice versa.

In still another aspect, the rate at which the widths D(r) of the segments 61 change as the radius r of the winding turn where the segment 61 is located increases may be the same or different.

In still another aspect, the rate at which the widths D(r) of the segments 61 change in the range of 1 mm to 11 mm as the radius r of the winding turn where the segment 61 is located increases may be the same or different.

Referring to FIG. 14e again, the height (H) of the segment 61 may be 2 mm or more. If D2 is less than 2 mm, when the segment 61 is bent toward the core, an area or an empty space (gap) where the segments 61 do not overlap enough to sufficiently secure sufficient welding strength may occur.

The height (H) of the segment 61 may be determined by applying the condition that the segment 61 does not block the core when being bent toward the core. Preferably, the height (H) of segment 61 may be adjusted so that 90% or more of the diameter of the core may be opened to the outside.

Preferably, the heights (H) of the segments 61 may increase from the core toward the outer circumference depending on the radius of the winding turn and the radius of the core where the segments 61 are located.

In one embodiment, when the heights (H) of the segments 61 increase stepwise over N steps from $h_1$ to $h_N$ as the radius of the winding turn increases, assuming that the $k^{th}$ height of the segment 61 (k is a natural number from 1 to N) is $h_k$, the starting radius of the winding turn including the segment 61 having the height $h_k$ is $r_k$ and the radius of the core is $r_c$, the heights $h_1$ to $h_N$ of the segments 61 may be determined to satisfy Formula 2 below.

$$2 \text{ mm} \leq h_k \leq r_k - \alpha * r_c \text{(preferably, } \alpha \text{ is 0.90 to 1)} \quad \langle \text{Formula 2} \rangle$$

If the heights ($h_k$) of the segments 61 meet Formula 2, even if the segments 61 are bent toward the core, 90% or more of the diameter of the core may be open to the outside.

In one example, the radius of the entire winding turns of the electrode 60 is 22 mm, the heights of the segments 61 start from 3 mm, and the heights of segments 61 are increased sequentially to 3 mm, 4 mm, 5 mm and 6 mm whenever the radius of the winding turn including the segment 61 increases by 1 mm, and the heights may be maintained substantially identically at 6 mm in the remaining winding turns. That is, among the radii of the entire winding turns, the radial width of the height variable region of the segment 61 is 3 mm, and the remaining radial region corresponds to the height uniform region.

In this case, when a is 1 and the equal sign condition is applied in the right inequality, the starting radius $r_1$, $r_2$, $r_3$, $r_4$ of the winding turns including the segments 61 having heights of 3 mm, 4 mm, 5 mm, and 6 mm depending on the radius ($r_c$) of the core of the electrode assembly may be as shown in Table 2 below.

TABLE 2

| | | Segment height ((mm) | | | |
|---|---|---|---|---|---|
| Item | | 3 ($h_1$) | 4 ($h_2$) | 5 ($h_3$) | 6 ($h_4$) |
| Core | 2 | 5 ($r_1$) | 6 ($r_2$) | 7 ($r_3$) | 8 ($r_4$) |
| radius | 2.5 | 5.5 ($r_1$) | 6.5 ($r_2$) | 7.5 ($r_3$) | 8.5 ($r_4$) |
| ($r_c$) | 3 | 6 ($r_1$) | 7 ($r_2$) | 8 ($r_3$) | 9 ($r_4$) |
| (mm) | 3.5 | 6.5 ($r_1$) | 7.5 ($r_2$) | 8.5 ($r_3$) | 9.5 ($r_4$) |
| | 4 | 7 ($r_1$) | 8 ($r_2$) | 9 ($r_3$) | 10 ($r_4$) |

When the segments 61 are arranged at the radius locations shown in Table 2, the core is not blocked by the segments 61 even if the segments 61 are bent toward the core. Meanwhile, $r_1$, $r_2$, $r_3$, $r_4$ shown in Table 1 may be shifted toward the core according to the value of $\alpha$. In one example, when a is 0.90, $r_1$, $r_2$, $r_3$, $r_4$ may be shifted toward the core by 10% of the core radius. In this case, when the segment 61 is bent toward the core, 10% of the core radius is blocked by the segment 61. Radii $r_1$, $r_2$, $r_3$, $r_4$ shown in Table 1 are limit values of the location where the segment 61 starts. Therefore, the location of the segment 61 may be shifted toward the outer circumference by a predetermined distance rather than the radius shown in Table 2.

Figure 14G:
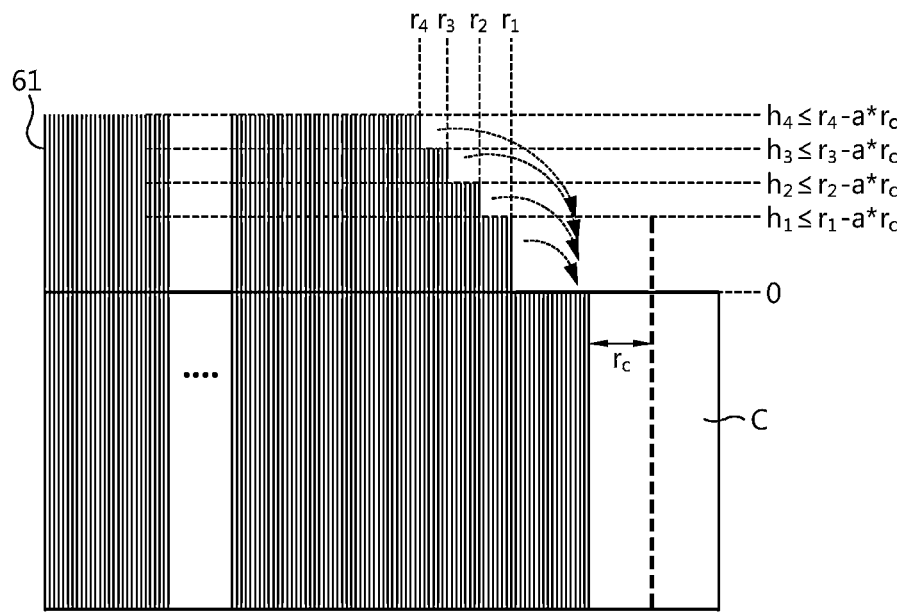
FIG. 14g is a diagram schematically showing the relationship between heights $h_1$, $h_2$, $h_3$, $h_4$ of segments, core radius $r_c$, and radii $r_1$, $r_2$, $r_3$, $r_4$ of winding turns where segments begin to appear, according to an embodiment of the present disclosure.

FIG. 14g is a diagram schematically showing the relationship of the heights $h_1$, $h_2$, $h_3$, $h_4$ of the segments 61, the core radius ($r_c$), and the radii $r_1$, $r_2$, $r_3$, $r_4$ of the winding turns where the segments 61 begins to appear.

Referring to Table 2 and FIG. 14g together, for example, when the radius ($r_c$) of the core C is 3 m, the starting radii $r_1$, $r_2$, $r_3$ and $r_4$ of the winding turns including the segments 61 having heights of 3 mm ($h_1$), 4 mm ($h_2$), 5 mm ($h_3$) and 6 mm ($h_4$) may be 6 mm, 7 mm, 8 mm, and 9 mm, respectively, and the heights of the segments 61 may be maintained at 6 mm from the radius 9 mm to the last winding turn. Also, the segment 61 may not be included in the winding turn having a radius smaller than 6 mm ($r_1$). In this example, since the segment 61 having a height of 3 mm ($h_1$) closest to the core C is located from the winding turn having a radius of 6 mm, even if the segments 61 are bent toward the core C, the segments 61 cover only the radial region of 3 mm to 6 mm and substantially does not block the core C. According to the a value of Formula 2, the location of the segment 61 may be shifted toward the core C within 10% of the core radius ($r_c$).

In another embodiment, the height of the segment 61 may increase at the same or different rate as the starting radius r of the winding turn where the segment 61 is located increases based on the core center of the electrode assembly.

Preferably, the height (H) of the segment 61 satisfies Formula 2, and at the same time the maximum height of the segment 61 may be limited.

Figure 14H:
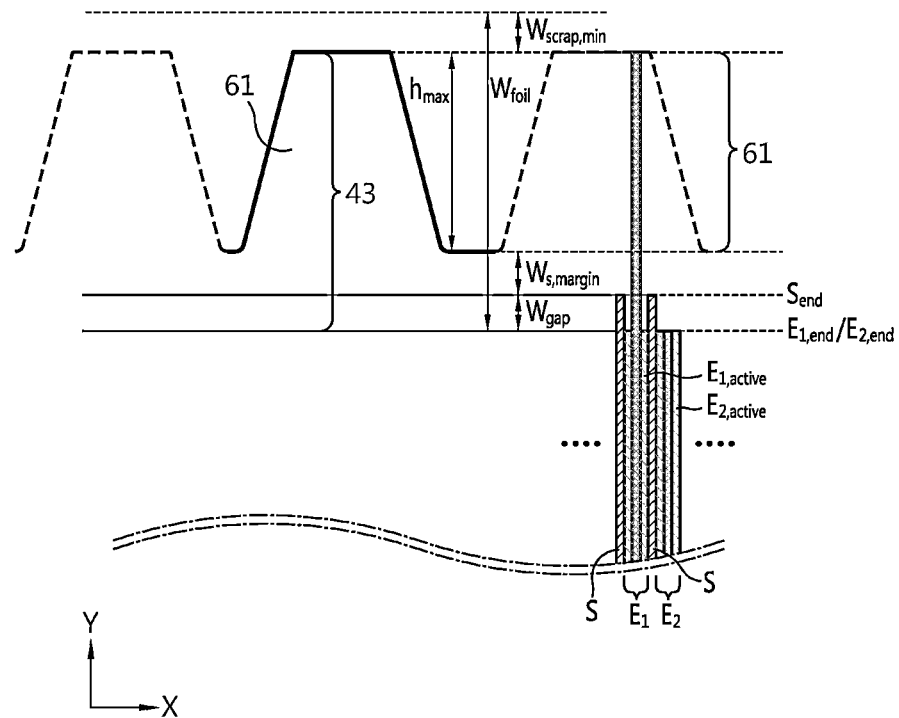
FIG. 14h is a conceptual diagram for determining a maximum value ($h_{max}$) for the height (H) of the segment in a segment height variable region.

FIG. 14h is a conceptual diagram for determining a maximum value ($h_{max}$) for the height (H) of the segment 61 in a segment height variable region of the segment 61.

Referring to FIG. 14h, in the winding structure of the electrode assembly, the electrode ($E_1$) including the segment 61 faces the electrode ($E_2$) of opposite polarity with the separator S interposed therebetween in the radial direction. Both surfaces of the electrode ($E_1$) are coated with an active material layer ($E_{1,active}$), and both surfaces of the electrode ($E_2$) are also coated with an active material layer ($E_{2,active}$). For electrical insulation, the end (Send) of the separator S may further extend outward from the end ($E_{2,end}$) of the electrode ($E_2$) to a length corresponding to the insulation gap ($W_{gap}$). Also, the end of the electrode ($E_1$) does not further extend outward beyond the end of the electrode ($E_2$) for electrical insulation. Therefore, a region corresponding to the insulation gap ($W_{gap}$) should be secured at the lower end of the uncoated portion 43. Also, when the electrodes ($E_1$, $E_2$) and the separator S are wound, the end (Send) of the separator S causes meandering. Therefore, in order for the segment 61 to be exposed to the outside of the separator S, the region ($W_{margin,min}$) corresponding to a minimum meandering margin of the separator S must be allocated to the uncoated portion 43. In addition, in order to cut the segment 61, a minimum cutting scrap margin ($W_{scrap,min}$) should be allocated to the end of the current collector foil. Therefore, the maximum height ($h_{max}$) of the segment 61 in the height variable region of the segment 61 may be determined by Formula 3 below. In Formula 3, $W_{foil}$ corresponds to the width of the current collector foil before the current collector foil is cut.

$$h_{max} = W_{foil} - W_{scrap,min} - W_{margin,min} - W_{gap} \qquad \langle \text{Formula 3} \rangle$$

Preferably, the insulation gap $W_{gap}$ may be 0.2 mm to 6 mm when the first electrode is a positive electrode. In addition, the insulation gap $W_{gap}$ may be 0.1 mm to 2 mm when the first electrode is a negative electrode.

Preferably, the minimum cutting scrap margin $W_{scrap,min}$ may be 1.5 mm to 8 mm. The minimum cutting scrap margin ($W_{scrap,min}$) may not be allocated depending on the process of forming the segment 61. For example, the cut groove 63 may be formed such that the upper edge of the segment 61 and the upper edge of the current collector foil coincide with each other. In this case, in Formula 3, $W_{scrap,min}$ may be 0.

Preferably, the minimum meander margin $W_{margin,min}$ of the separator may be 0 mm to 1 mm.

In one example, the minimum cutting scrap margin ($W_{scrap,min}$) may be 1.5 mm, and the minimum meandering margin ($W_{margin,min}$) of the separator S may be 0.5 mm. Under these conditions, when the width ($W_{foil}$) of the current collector foil before forming the segment 61 is 8 mm to 12 mm and the insulation gap ($W_{gap}$) is 0.6 mm, 0.8 mm, and 1.0 mm, the maximum height ($h_{max}$) of the segment 61 may be calculated using Formula 3 as in Table 3 below.

TABLE 3

| | | Gap of Separator ↔ Negative electrode (mm) | | |
|---|---|---|---|---|
| Segment Height | | 0.6 | 0.8 | 1 |
| Width of current collector Foil (mm) | 8 | 5.4 | 5.2 | 5 |
| | 9 | 6.4 | 6.2 | 6 |
| | 10 | 7.4 | 7.2 | 7 |
| | 11 | 8.4 | 8.2 | 8 |
| | 12 | 9.4 | 9.2 | 9 |

Considering Table 3, the maximum height ($h_{max}$) of the segment 61 in the height variable region of the segment 61 may be set to 10 mm. Therefore, in the height variable region of the segment 61, the height of the segment 61 satisfies Formula 2 and may increase stepwise or gradually along the radial direction of the electrode assembly in the range of 2 mm to 10 mm.

Referring to FIG. 14e again, the separation pitch (P) of the segment 61 may be adjusted in the range of 0.05 mm to 1 mm. If the separation pitch (P) is less than 0.05 mm, cracks may occur in the uncoated portion 43 near the lower end of the cut groove 63 due to stress when the electrode 60 travels in the winding process or the like. Meanwhile, if the separation pitch (P) exceeds 1 mm, an area or an empty space (gap) where the segments 61 do not overlap each other enough to sufficiently secure the welding strength when the segment 61 is bent may occur.

Meanwhile, when the current collector 41 of the electrode 60 is made of aluminum, it is more preferable to set the separation pitch (P) as 0.5 mm or more. When the separation pitch (P) is 0.5 mm or more, even if the electrode 60 travels at a speed of 100 mm/see or more under a tension of 300 gf or more in the winding process or the like, cracks may be prevented from occurring at the bottom of the cut groove 63.

According to the experimental results, when the current collector 41 of the electrode 60 is an aluminum foil with a thickness of 15 μm and the separation pitch (P) is 0.5 mm or more, no cracks are generated at the bottom of the cut groove 63 when the electrode 60 travels under the above travel conditions.

As shown in FIG. 14e, a cut groove 63 is interposed between two segments 61 adjacent in the winding direction X. The cut groove 63 corresponds to a space created by removing the uncoated portion 43. Preferably, edges at both ends of the lower portion of the cut groove 63 has a round shape. That is, the cut groove 63 includes a substantially flat bottom portion 63a and a round portion 63c. The round portion 63c connects the bottom portion 63a and the side 63b of the segment 61. In a modified example, the bottom portion 63a of the cut groove 63 may be replaced with an arc shape. In this case, the sides 63b of the segments 61 may be smoothly connected by the arc shape of the bottom portion 63a.

The curvature radius of the round portion 63c may be greater than 0 and less than or equal to 0.5 mm, preferably greater than 0 and less than or equal to 0.1 mm, more preferably 0.01 mm to 0.05 mm. When the curvature radius of the round portion 63c meets the above numerical range, it is possible to prevent cracks from occurring in the lower portion of the cut groove 63 while the electrode 60 is traveling in the winding process or the like.

The lower internal angles (θ) of the plurality of segments 61 may increase from the core toward the outer circumference. In one example, the lower internal angles (θ) of the plurality of segments 61 may gradually or stepwise increase from the core toward the outer circumference. The lower internal angle (θ) is an angle between a straight line extending from the bottom 63a of the cut groove 63 and a straight line extending from the side portion 53b of the segment 61. When the segment 61 is symmetrical in the left and right direction, the lower internal angles (θ) of the left and right sides are substantially the same.

If the radius of the electrode assembly increases, the radius of curvature increases. If the lower internal angle (θ) of the segment 61 increases as the radius of the electrode assembly increases, the stress generated in the radial direction and the circumferential direction when the segment 61 is bent may be relieved. In addition, if the lower internal angle (θ) increases, when the segment 61 is bent, the area overlapping with the segment 61 at the inner side and the number of overlapping layers also increase, so that welding strength may be uniformly secured in the radial direction and the circumferential direction and the bending surface region may be formed flat.

Preferably, the lower internal angle (θ) may be determined by the radius of the winding turn where the segment 61 is located and the width (D) of the segment 61.

Figure 14I:
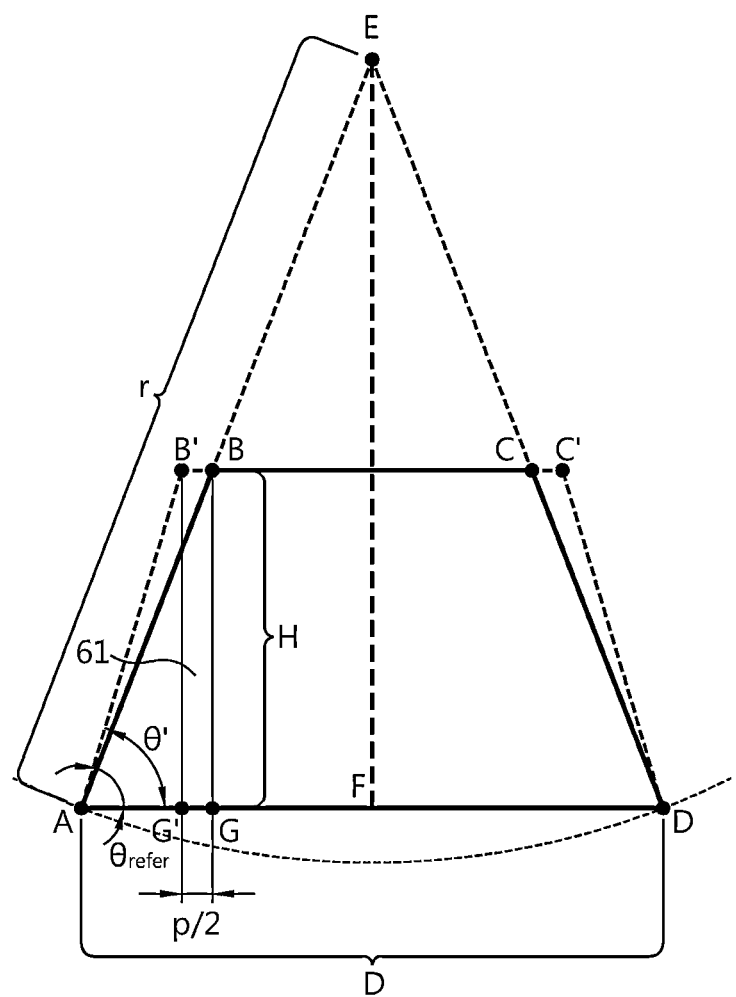
FIG. 14i is a schematic diagram for explaining the formula that determines a lower angle (θ) of the segment.

FIG. 14i is a schematic diagram for explaining the formula that determines a lower internal angle (θ) of the segment 61.

Referring to FIG. 14i, the sides of the segment 61 ideally coincide with the line segment AE and the line segment DE connecting the core center (E) to both end points A and D of the line segment AD corresponding to the width (D) of the segment 61.

When the side of the segment 61 extends in the most ideal direction, assuming that the line segment EF is approximately equal to the line segment AE and the line segment DE, the lower internal angle ($\theta_{refer}$) of the segment 61 may be determined approximately from the width (D) of the segment 61 and the radius (r) of the winding turn where the segment 61 is located using Formula 4 below.

$$\theta_{refer} = \cos^{-1}\left(\frac{0.5 * D}{r}\right) \qquad \langle \text{Formula 4} \rangle$$

The angle of Formula 4 is an ideal criterion angle for the lower internal angle ($\theta_{refer}$) of the segment 61. Meanwhile, a separation pitch (P) exists between adjacent segments 61 located in the same winding turn. The length of the separation pitch (P) is expressed as p. Since the separation pitch (P) exists between adjacent segments 61, a tolerance of 50% of the separation pitch (p) may be endowed for the lower internal angle (θ). That is, the width of the upper side BC of the segment 61 may be increased by a maximum of p/2 to the upper side B'C'. The lower internal angle (θ') with the tolerance reflected may be expressed as in Formula 5 below. The lower internal angle ($\theta_{refer}$) is the ideal criterion angle <BAG, and the lower internal angle (θ') is the angle <B'AG' that reflects the tolerance according to the separation pitch (p). In Formula 5, H is the height of the segment 61, and p corresponds to the separation pitch.

$$\theta' = \tan^{-1}\left(\frac{2*H*\tan\theta_{refer}}{2*H - p*\tan\theta_{refer}}\right) \qquad \text{(Formula 5)}$$

Preferably, the lower internal angle (θ) of the segment 61 located at each winding turn of the electrode assembly may satisfy Formula 6 below. Then, when the segments 61 are bent toward the core center of the electrode assembly, the segments 61 adjacent in the circumferential direction do not interfere with each other and may be smoothly bent.

$$\cos^{-1}\left(\frac{0.5*D}{r}\right) \leq \theta \leq \tan^{-1}\left(\frac{2*H*\tan\theta_{refer}}{2*H - p*\tan\theta_{refer}}\right) \qquad \text{(Formula 6)}$$

In one example, when the electrode 60 forms a winding structure with a diameter of 22 mm and a core radius of 4 mm, the lower internal angle of the segment 61 may gradually or stepwise increase in the range of 60 degree to 85 degree in the height variable region.

In another example, the lower internal angles (θ) of the plurality of segments 61 may gradually or stepwise increase while going from the core toward the outer circumference in a group unit or in two or more group units.

Meanwhile, the left lower internal angle and the right lower internal angle of the segment 61 may not be the same. Nonetheless, the lower internal angle (θ) of any one side may be designed to satisfy Formula 6 described above.

Referring to FIG. 14*d* again, the width ($d_{B1}$) of the first portion B1 is designed so that the core of the electrode assembly is open to the outside by 90% or more based on its diameter when the segment 61 of the third portion B2 is bent toward the core. The width ($d_{B1}$) of the first portion B1 may increase in proportion to the bending length of the segment 61 of Group 1. The bending length corresponds to a length from the bending point to the upper end side of the segment 61. Preferably, when the electrode 60 is used to manufacture an electrode assembly of a cylindrical battery having a form factor of 4680, the width ($d_{B1}$) of the first portion B1 may be set to 180 mm to 350 mm depending on the diameter of the core of the electrode assembly and the height of the segment 61 included in Group 1.

The bending point of the segment 61 may be set at a line passing through the lower end of the cut groove 63 or a point spaced upward from the line by a predetermined distance. When the segment 61 is bent toward the core at a point spaced from the lower end of the cut groove 63 by a certain distance, the segments are overlapped better in the radial direction. When the segments 61 are bent, a segment at an outer side presses a segment at an inner side based on the center of the core. At this time, if the bending point is spaced apart from the lower end of the cut groove 63 by a predetermined distance, the segment at the inner side is pressed in the winding axis direction by the segment at the outer side, and the segments are overlapped better. The separation distance of the bending point may be preferably 1 mm or less. Since the minimum height of the segment is 2 mm, the ratio of the separation distance of the bending point to the minimum height may be 50% or less.

In one embodiment, the width of each segment group may be designed to constitute the same winding turn of the electrode assembly. Here, the winding turn may be counted based on the end of the first portion B1 when the electrode 60 is in a wound state.

In another modification, the width of each segment group may be designed to constitute at least one winding turn of the electrode assembly.

In still another modification, the width and/or height and/or separation pitch of the segments 61 belonging to the same segment group may be increased or decreased gradually and/or stepwise and/or irregularly within the group or between the adjacent groups.

Groups 1 to 8 are only examples of segment groups included in the third portion B2. The number of groups, the number of segments 61 included in each group, and the width of the group may be preferably adjusted so that the segments 61 are overlapped into multiple layers so as to disperse stress as much as possible during the bending process of the uncoated portion 43 and sufficiently secure the welding strength with the current collector.

In another modification, the height of the second portion B3 may decrease gradually or stepwise, similar to the first embodiment and the second embodiment.

In still another modification, the segment structure of the third portion B2 may extend to the second portion B3 (see dotted line). In this case, the second portion B3 may also include a plurality of segments, like the third portion B2. Preferably, the segment structure of the second portion B3 may be substantially the same as that of the outermost segment group of the third portion B2. In this case, the segments included in the second portion B3 and the third portion B2 may have substantially the same width, height, and separation pitch. In a modified example, the segments of the second portion B3 may have a width and/or height and/or separation pitch greater than that of the third portion B2.

In the third portion B2, the region (Groups 1 to 7) in which the heights of the segments 61 increase stepwise based on the winding direction of the electrode 60 may be defined as a segment height variable region, and the last segment group (group 8) may be defined as a height uniform region where the heights of the segments are maintained uniformly.

That is, in the third portion B2, when the heights of the segments 61 increase stepwise from $h_1$ to $h_N$, the region in which the segments 61 with the heights of $h_1$ to $h_{N-1}$ (N is a height index, a natural number greater than or equal to two corresponds to the height variable region, and the region in which the segments 61 with the height of $h_N$ are placed corresponds to the height uniform region. The ratio of the height variable region and the height uniform region to the length of the electrode 60 in the winding direction will be described later with reference to specific embodiments.

When the electrode 60 is used to manufacture an electrode assembly of a cylindrical battery having a form factor of 4680, the width ($d_{B1}$) of the first portion B1 may be 180 mm to 350 mm. The width of Group 1 may be 35% to 40% of the width of the first portion B1. The width of Group 2 may be 130% to 150% of the width of Group 1. The width of Group 3 may be 120% to 135% of the width of Group 2. The width of group 4 may be 85% to 90% of the width of group 3. The width of Group 5 may be 120% to 130% of the width of Group 4. The width of Group 6 may be 100% to 120% of the width of Group 5. The width of Group 7 may be 90% to 120% of the width of Group 6. The width of Group 8 may be 115% to 130% of the width of Group 7. The width ($d_{B3}$) of the second portion B3 may be 180 mm to 350 mm, similar to the width of the first portion B1.

The widths of Groups 1 to 8 do not show a constant increase or decrease pattern because the segment width gradually increases from Group 1 to Group 8, but the number of segments included in the group is limited to an integer number and the thickness of the electrode has a slight deviation in the winding direction. Accordingly, the number of segments may be reduced in a specific segment group. Therefore, the widths of the groups may show an irregular change pattern as in the above example from the core to the outer circumference.

That is, assuming that the width in the winding direction for each of the three segment groups consecutively adjacent to each other in the circumferential direction of the electrode assembly is W1, W2, and W3, respectively, it is possible for the electrode assembly to include a combination of segment groups in which W3/W2 is smaller than W2/W1.

In the specific example, Groups 4 to 6 corresponds to the above case. The width ratio of Group 5 to Group 4 is 120% to 130%, and the width ratio of Group 6 to Group 5 is 100% to 120%, which is smaller than 120% to 130%.

Figure 14J:
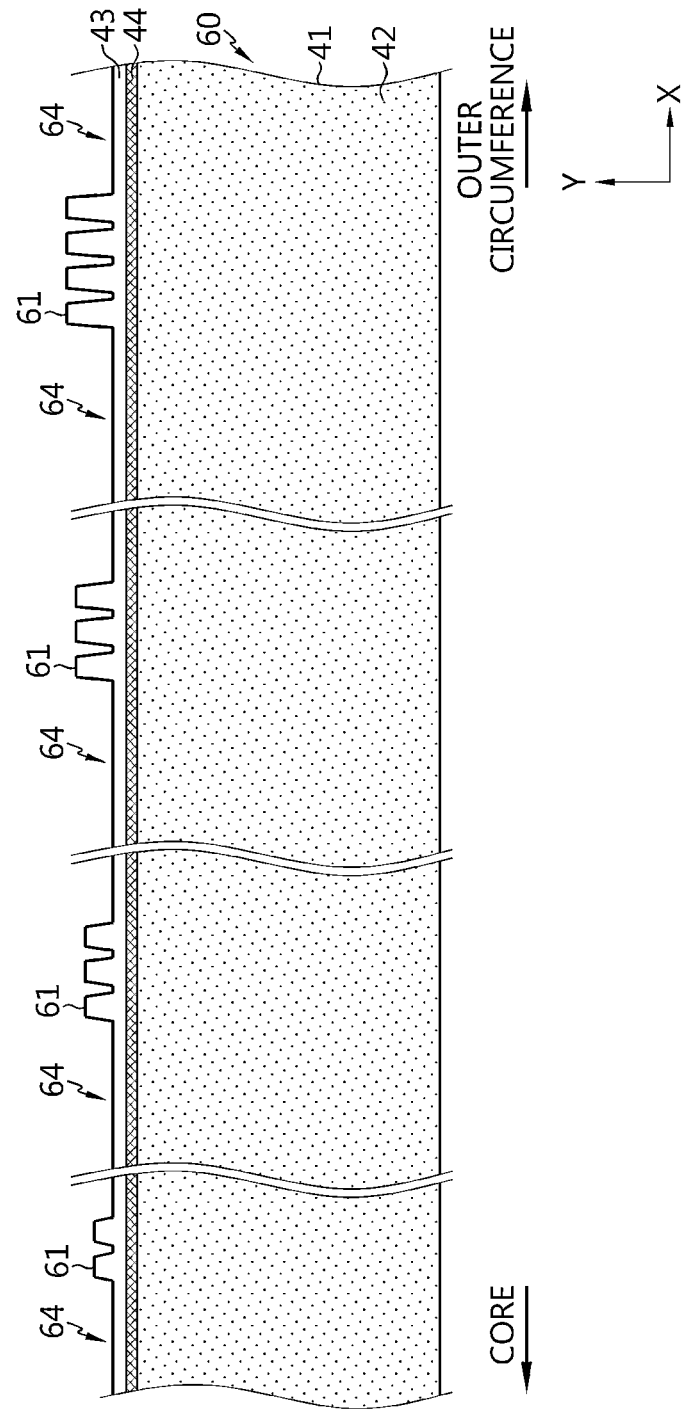
FIG. 14j is a plan view showing a modified structure of the electrode according to the fourth embodiment of the present disclosure.

According to still another modification, when the uncoated portion 43 of the electrode 60 has a segment structure, the electrode 60 may include a segment skip region 64 in which some of the plurality of segments are regularly or irregularly omitted, as shown in FIG. 14j.

Preferably, the segment skip region 64 may be plural. In one example, the width of the segment skip region 64 may be constant going from the core to the outer circumference. In another example, the width of the segment skip region 64 may increase or decrease regularly or irregularly from the core to the outer circumference. Preferably, the height of the uncoated portion existing in the segment skip region 64 may correspond to the height of the first portion B1 and/or the second portion B3.

The number of segments 61 existing between the segment skip region 64 may be at least one. As shown in FIG. 14j, the electrode 60 may include an uncoated portion in which the number of segments 61 existing between the segment skip regions 64 increases going from the core toward the outer circumference.

Figure 14K:
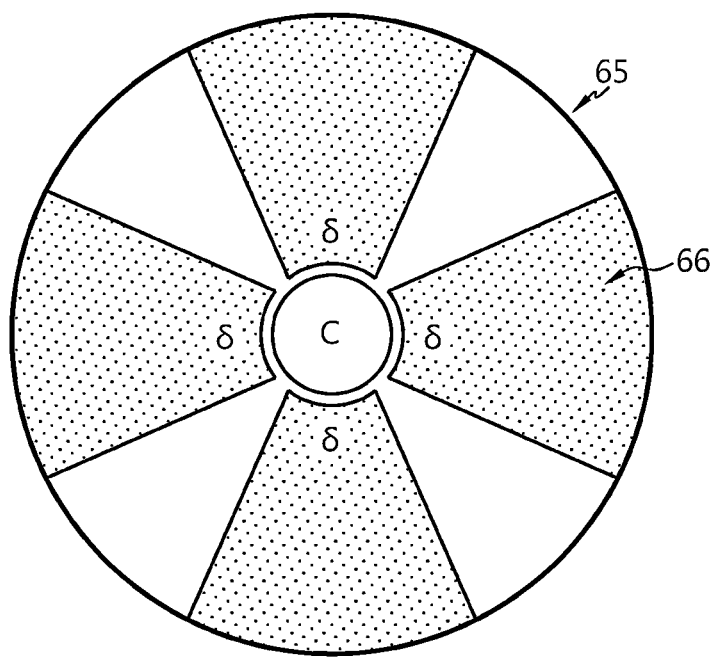
FIG. 14k is a top plan view showing an independent area in which a plurality of segments can be located when the electrode according to a modification of the present disclosure is wound into an electrode assembly.

Preferably, the width of the segment skip region 64 may be set such that when the electrode 60 is wound, as shown in FIG. 14k, the segments located at each winding turn can be located within a preset independent area 66 based on the core center C of the electrode assembly 65.

In other words, the plurality of segments 61 may be located within a plurality of independent areas 66 based on the core center C when looking at the electrode assembly 65 in the winding axis direction. The number of independent areas 66 may be changed to 2, 3, 4, 5, etc.

Preferably, the independent area 66 may be fan-shaped. In this case, the angle between the independent areas 66 may be substantially the same. Also, the circumferential angle (δ) of the independent area 66 may be 20 degrees or more, optionally 25 degrees or more, optionally 30 degrees or more, optionally 35 degrees or more, or optionally 40 degrees or more.

In a modification, the independent area 66 may have a geometric shape such as a square, rectangle, quadrilateral, trapezoidal, etc.

In the present disclosure, the shape of the segment 61 may be variously modified.

FIG. 15a is a plan view showing the structure of an electrode 70 according to the fifth embodiment of the present disclosure.

Referring to FIG. 15a, the electrode 70 of the fifth embodiment, is substantially the same as the former embodiment, except that the shape of the segment 61' is different. Therefore, the configuration of the fourth embodiment can be equally applied to the fifth embodiment, unless otherwise described.

The segment 61' has a geometric figure with substantially equal upper and lower widths. Preferably, the segment 61' may have a rectangular shape.

Figure 15B:
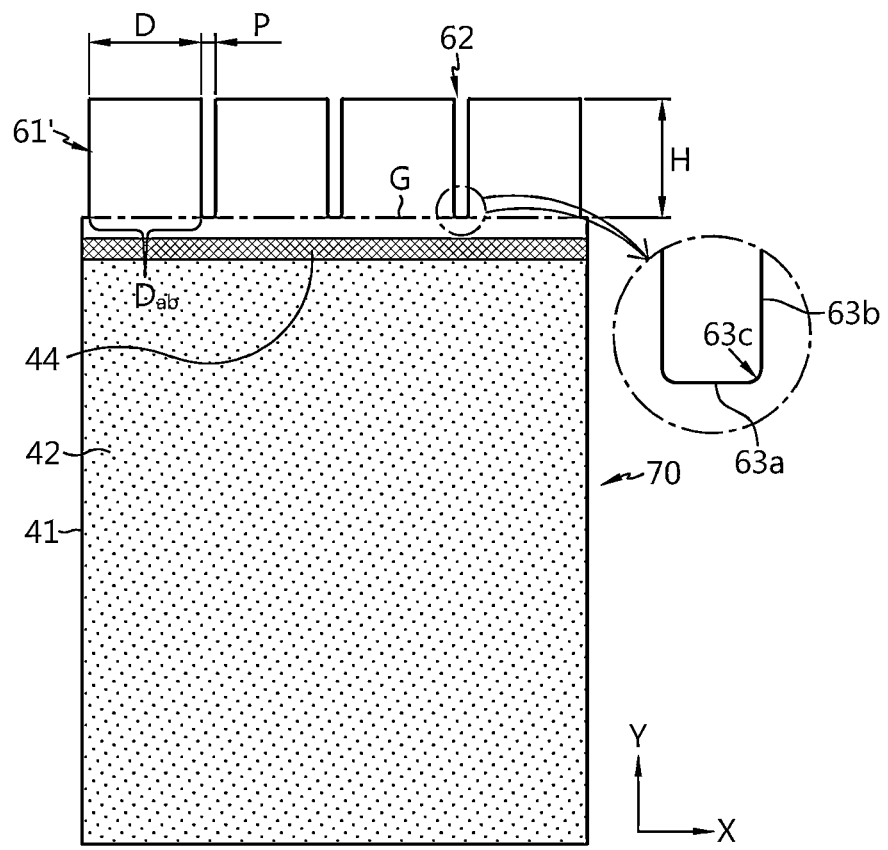
FIG. 15b is a diagram showing definitions of width, height, and separation pitch of a segment according to another embodiment of the present disclosure.

FIG. 15b is a diagram showing definitions of width, height, and separation pitch of the rectangular segment 61'.

Referring to FIG. 15b, the width (D), height (H), and separation pitch (P) of the segment 61' may be set to prevent the uncoated portion 43 from being torn during bending of the uncoated portion 43 and to prevent abnormal deformation of the uncoated portion 43 while sufficiently increasing the number of overlapping layers of the uncoated portion 43 in order to improve welding strength with the current collector. The abnormal deformation means that the uncoated portion below the bending point does not maintain a straight state and is deformed irregularly while falling down.

The width (D) of the segment 61' is defined as a length between two points where two straight lines extending from both sides of the segment 61' meet a straight line extending from the bottom 63a of the cut groove 63. The height (H) of the segment 61' is defined as a shortest distance between the uppermost edge of the segment 61' and the straight line extending from the bottom 63a of the cut groove 63. The separation pitch (P) of the segment 61' is defined as a length between two points where the straight line extending from the bottom 63a of the cut groove 63 meet straight lines extending from two sides 63b connected to the bottom 63a. When the side 63b and/or the bottom 63a is curved, the straight line may be replaced with a tangent extending from the side 63b and/or the bottom 63a at an intersection where the side 63b and the bottom 63a meet.

Preferably, the conditions for the width (D), height (H), and separation pitch (P) of the segment 61' are substantially the same as those of the fourth embodiment described above, and thus will not be described again. However, since the segment 61' has a rectangular shape, the lower internal angle of the segment 61' may be constant as 90 degrees.

Similar to the electrode 60 of the fourth embodiment, the electrode 70 according to the fifth embodiment may also include a segment skip region 64 in which some of the plurality of segments are regularly or irregularly omitted, as shown in FIG. 15c.

Also, when the electrode 70 including the segment skip region 64 is wound into an electrode assembly, the segments may be located within the plurality of independent areas 66 as shown in FIG. 14k.

As in the fourth embodiment and the fifth embodiment, when the third portion B2 and the second portion B3 include a plurality of segments 61, 61', the shape of each segment 61, 61' may be modified in various ways.

Preferably, the segment may be deformed into various shapes while satisfying at least one of the following conditions:

Condition 1: the width of the lower portion is greater than the width of the upper portion.

Condition 2: the width of the lower portion is the same as the width of the upper portion.

Condition 3: the width is kept uniform from the upper portion to the lower portion.

Condition 4: the width decreases from the upper portion to the lower portion.

Condition 5: the width decreases and then increases from the lower portion to the upper portion.

Condition 6: the width increases and then decreases from the lower portion to the upper portion.

Condition 7: the width increases from the lower portion to the upper portion and then is kept uniform.

Condition 8: the width decreases from the lower portion to the upper portion and then is kept uniform.

Condition 9: the interior angle of one side and the interior angle of the other side of the lower portion are equal.

Here, the interior angle may be defined as an angle formed by the side portion of the segment based on the width direction of the lower portion of the segment. If the side portion is a curve, the interior angle is defined as the angle between the tangent drawn at the lowest end of the curve and the width direction of the lower portion of the segment.

Condition 10: the interior angle of one side of the lower portion and the interior angle of the other side are different.

Condition 11: the interior angle of one side of the lower portion and the interior angle of the other side of the lower portion have an acute angle, a right angle, or an obtuse angle, respectively.

Condition 12: symmetrical in the left and right direction based on the winding axis direction.

Condition 13: asymmetrical in the left and right direction based on the winding axis direction.

Condition 14: the side portion is straight.

Condition 15: the side portion is curved.

Condition 16: the side portion is convex outward.

Condition 17: the side portion is convex inward.

Condition 18: the corner of the upper portion and/or the lower portion has a structure where straight lines meet.

Condition 19: the corner of the upper portion and/or the lower portion has a structure where a straight line and a curve meet.

Condition 20: the corner of the upper portion and/or the lower portion has a structure where curves meet.

Condition 21: the corner of the upper portion and/or the lower portion has a round structure.

Figure 16:
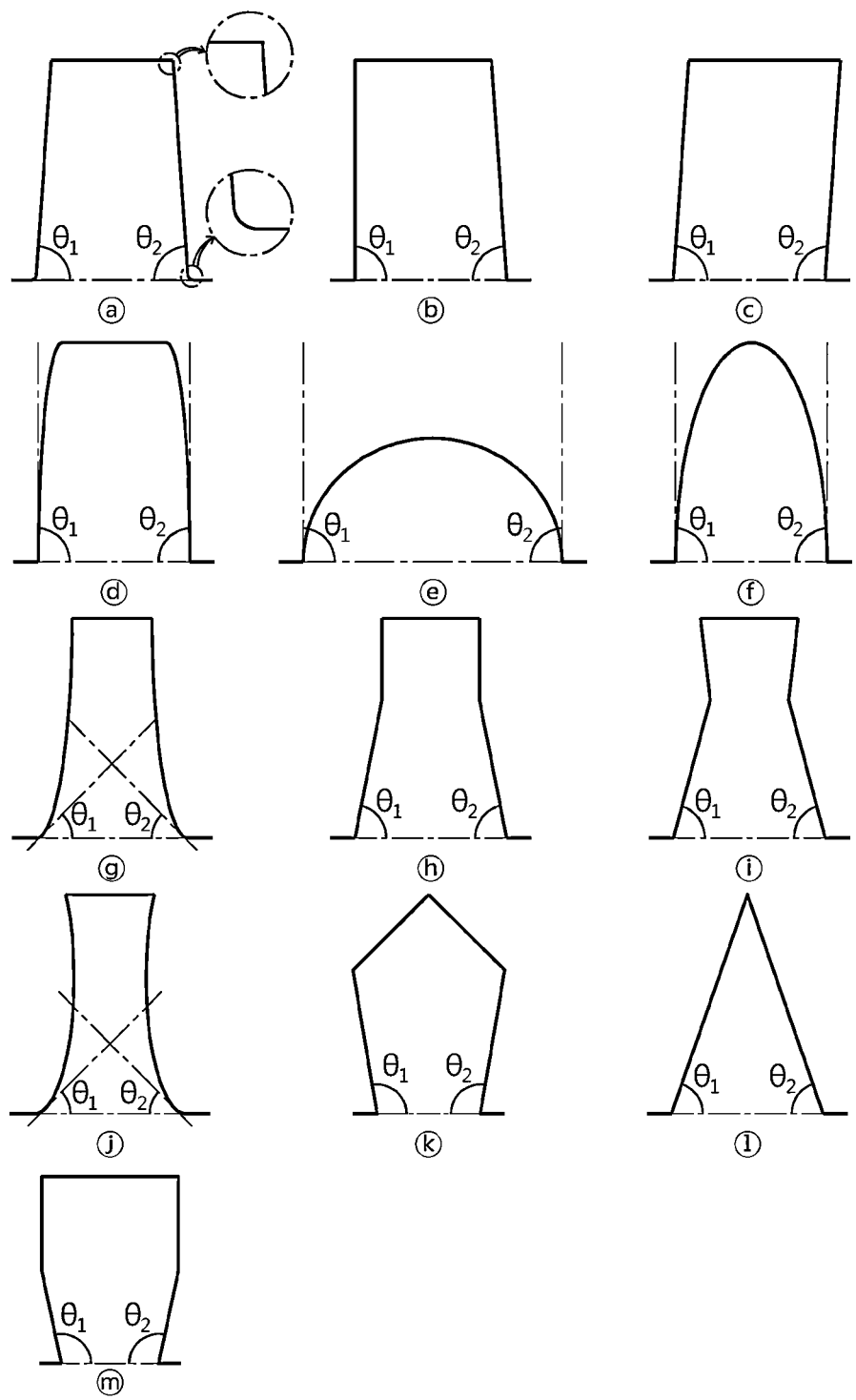
FIG. 16 is a diagram showing a segment structure according to various modifications of the present disclosure.

FIG. 16 is a diagram exemplarily showing the shapes of segments according to various modifications of the present disclosure.

As shown in the drawing, the segment may have various geometric shapes in which a dotted line connecting the bottom portions of both cut grooves is as a base. The geometric shape has a structure in which at least one straight line, at least one curved line, or a combination thereof are connected. In one example, the segment may have a polygonal shape, a round shape, or various combinations thereof. Specifically, the segment may have a left-right symmetrical trapezoidal shape (ⓐ); a left-right asymmetric trapezoidal shape (ⓑ); a parallelogram shape (ⓒ); a triangular shape (ⓘ); a pentagonal shape (ⓚ); an arc shape (ⓔ); or an elliptical shape (ⓕ).

Since the shape of the segment is not limited to those shown in FIG. 16, it may be transformed into other polygonal shapes, other round shapes, or combinations thereof to satisfy at least one of the conditions 1 to 21 described above.

In the polygonal shapes ⓐ, ⓑ, ⓒ, ⓚ and ⓘ of the segment, the corners of the upper portion and/or the lower portion may have a shape where straight lines meet or a round shape (see the enlarged view of the corners of the upper portion and/or the lower portion of the shape ⓐ).

In the polygonal shapes ⓐ, ⓑ, Ⓒ, ⓚ, and ⓘ of the segment and the curved shapes ⓔ and ⓕ of the segment, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be an acute angle, a right angle, or an obtuse angle, respectively. The interior angle is an angle at which the base and the side of a geometric figure meet. When the side is curved, the straight line may be replaced by a tangent line extending from the point where the base meets the side.

The shape of the side portion of the segment having a polygonal shape may be modified in various ways.

In one example, the side portion of the segment shape ⓐ may be transformed into an outwardly convex curve, such as the shape ⓓ, or may be transformed into an inwardly curved segment, such as the shape ⓖ or ⓙ.

In another example, the side portion of the segment shape ⓐ may be transformed into a bent straight line curved indented into the segment, such as the shape ⓗ or ⓘ. Although not shown, the side portion of the segment shape ⓐ may be transformed into a straight line convexly bent to the outside.

In the segment shapes ⓓ, ⓖ, ⓙ, ⓗ, and ⓘ in which the side portion is modified in various ways, the interior angle ($\theta_1$) at one side and the interior angle ($\theta_2$) at the other side of the lower portion may be the same or different, and the interior angle ($\theta_1$) at one side and the interior angle ($\theta_2$) at the other side of the lower portion may be any one of an acute angle, a right angle, and an obtuse angle, respectively.

The width of the segment may have various change pattern from the bottom to the top.

In one example, the width of the segment may be kept uniform from the bottom to the top (shape ⓒ). In another example, the width of the segment may gradually decrease from the bottom to the top (shapes ⓐ, ⓑ, ⓓ, ⓔ, ⓕ, and ⓖ). In still another example, the width of the segment may gradually decrease and then increase from the bottom to the top (shapes ⓘ and ⓙ). In still another example, the width of the segment may gradually increase and then decrease from the bottom to the top (shape ⓚ). In still another example, the width of segment may gradually decrease from the bottom to the top and then be kept uniform (shape ⓗ). Although not shown, the width of the segment may gradually increase from the bottom to the top and then be kept uniform.

Meanwhile, among the shapes of the segment illustrated in FIG. 16, the polygonal shape with a flat top may be rotated by 180 degrees. In one example, when the segment shape ⓐ, ⓑ, ⓓ or ⓖ rotates by 180 degrees, the width of the segment may gradually increase from the bottom to the top. In another example, when the segment shape ⓗ is rotated by 180 degrees, the width of the segment may be kept uniform from the bottom to the top and then gradually increase.

In the embodiments (modifications) described above, according to another aspect of the present disclosure, it is possible to differently change the shape of the segment 61, 61' according to the area of the third portion B2. In one example, for a region in which stress is concentrated, a round shape (e.g., semicircle, ellipse, etc.) that is advantageous for stress distribution may be applied, and for a region in which stress is relatively low, a polygonal shape (e.g., square, trapezoid, parallelogram, etc.) having a wide area as much as possible may be applied.

In another aspect, the plurality of segments may have different shapes individually, in a group unit, or in two or more group units along one direction parallel to the winding direction of the electrode assembly.

In the embodiments (modifications), the segment structure of the third portion B2 may also be applied to the first portion B1. However, when the segment structure is applied to the first portion B1, a reverse forming phenomenon in which the end of the first portion B1 is curved toward the outer circumference when the segment 61, 61' of the third portion B2 is bent according to the radius of curvature of the core may occur. Therefore, even if there is no segment structure in the first portion B1, or even if the segment structure is applied, it is desirable to adjust the width and/or height and/or separation pitch of the segment 61, 61' as small as possible to a level where reverse forming does not occur in consideration of the radius of curvature of the core.

According to still another aspect of the present disclosure, after the electrode 60, 70 is wound into the electrode assembly, the segments exposed on the upper portion and the lower portion of the electrode assembly may be overlapped into several layers along the radial direction of the electrode assembly to form the bending surface regions.

Figure 17B:
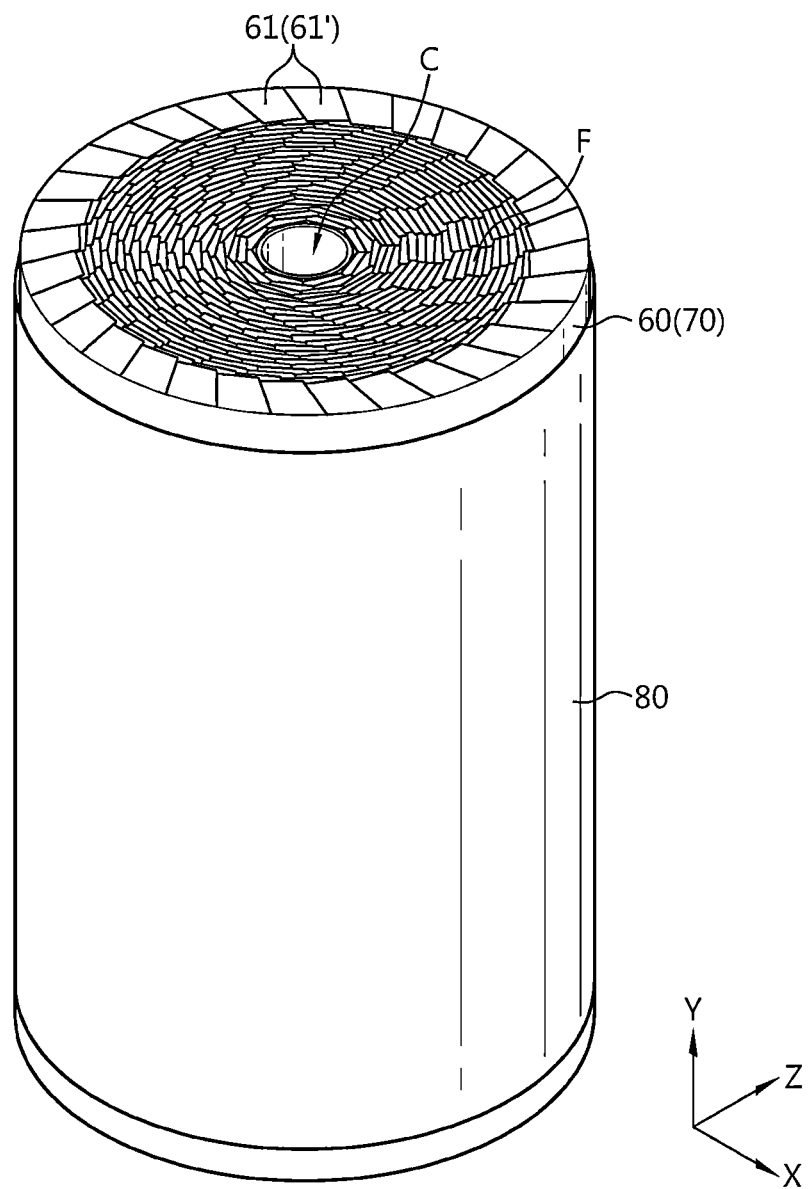
FIG. 17b is a top perspective view schematically showing an electrode assembly in which the bending surface region is formed.

FIG. 17a is a schematic diagram showing a cross section of the bending surface region F formed by bending the segments 61 toward the core C of the electrode assembly 80. In FIG. 17a, the cross section of the bending surface region F is shown only at the left side based on the winding axis of the electrode assembly 80. The bending surface region F may be formed at both the upper portion and the lower portion of the electrode assembly 80. FIG. 17b is a top perspective view schematically showing the electrode assembly 80 in which the bending surface region F is formed.

Referring to FIGS. 17a and 17b, the bending surface region F has a structure in which the segments 61 are overlapped into a plurality of layers in the winding axis direction. The overlapping direction is the winding axis direction Y. The region ① is a segment skip region (first portion B1) with no segment, and the regions ② and ③ are regions where winding turns containing the segments 61 are located. The region ② is a height variable region in which the heights of the segments 61 vary, and the region ③ is a height uniform region in which the heights of the segments are maintained uniformly until the outer circumference of the electrode assembly. As will be described later, the lengths of the region ② and the region ③ in the radial direction may be variable. Meanwhile, the uncoated portion (second portion B3) included in at least one winding turn including an outermost winding turn may not include a segment structure. In this case, the second portion B3 may be excluded in the region ③.

In the region ②, the heights of the segments 61 may be changed stepwise from the minimum height $h_1$ (=$h_{min}$) to the maximum height hp (=$h_{max}$) in the radius $r_1$ to $r_N$ region of the electrode assembly 80. The height variable regions where the heights of the segments 61 vary are $r_1$ to $r_N$. From the radius $r_N$ to the radius R of the electrode assembly 80, the heights of the segments 61 are maintained uniformly at $h_N$. Uniform heights means that the deviation of heights is within 5%.

At any radius location in the region ② and the region ③, the stack number of the segments 61 varies depending on the radius location. In addition, the stack number of the segments 61 may vary depending on the width of the region ②, the minimum height ($h_1$) and maximum height ($h_N$) of the segments in the height variable region of the segments 61, and the height change amount (Δh) of the segments 61. The stack number of the segments 61 is the number of segments that meet an imaginary line when the imaginary line is drawn in the winding axis direction from an arbitrary radius location of the electrode assembly 80.

Preferably, the stack number of the segments 61 at each location of the bending surface region F may be optimized according to the required welding strength of the current collector by adjusting the height, width and separation pitch of the segments 61 according to the radius of the winding turn containing the segment 61.

First, in the height variable region ② of the segments 61, when the minimum height ($h_1$) of the segments is the same, it will be described through specific embodiments how the stack number of the segments 61 varies along the radial direction of the bending surface region F according to the change in the maximum height (hp) of the segments 61.

The electrode assemblies of the embodiments 1-1 to 1-7 are prepared. The electrode assemblies of the embodiments have a radius of 22 mm and a core diameter of 4 mm. The positive electrode and the negative electrode included in the electrode assembly have the electrode structure shown in FIG. 14d. That is, the segment has a trapezoidal shape. The second portion B3 of the positive electrode and the negative electrode does not contain a segment. The length of the second portion B3 is 3% to 4% of the total length of the electrode. The positive electrode, the negative electrode, and the separator are wound by the method described in FIG. 2. The winding turns are between 48 turns and 56 turns, but the winding turns of the embodiments are 51 turns. The thickness of the positive electrode, the negative electrode and the separator are 149 μm, 193 μm and 13 um, respectively. The thickness of the positive electrode and the negative electrode is the thickness including the thickness of the active material layer. The thicknesses of the positive electrode current collector and the negative electrode current collector are 15 μm and 10 um, respectively. The lengths of the positive and negative electrodes in the winding direction are 3948 mm and 4045 mm, respectively.

In each embodiment, the minimum height of the segments 61 is set to 3 mm so that the height variable region (②) of the segments 61 starts with a radius of 5 mm. In addition, in each embodiment, the heights of the segments 61 are increased by 1 mm per 1 mm increase in radius, and the maximum height of the segments 61 is changed variously from 4 mm to 10 mm.

Specifically, in the embodiment 1-1, the height variable region (②) of the segments 61 is 5 mm to 6 mm, and the heights of the segments 61 are variable from the radius 3 mm to 4 mm. In the embodiment 1-2, the height variable region (②) of the segments 61 is 5 mm to 7 mm, and the heights of the segments 61 are variable from 3 mm to 5 mm. In the embodiment 1-3, the height variable region (②) of the segments 61 is 5 mm to 8 mm, and the heights of the segments 61 are variable from 3 mm to 6 mm. In the embodiment 1-4, the height variable region (②) of the segments 61 is 5 mm to 9 mm, and the heights of the segments 61 are variable from 3 mm to 7 mm. In the embodiment 1-5, the height variable region (②) of the segments 61 is 5 mm to 10 mm, and the heights of the segments 61 are variable from 3 mm to 8 mm. In the embodiment 1-6, the height variable region (②) of the segments 61 is 5 mm to 11 mm, and the heights of the segments 61 are variable from 3 mm to 9 mm. In the embodiment 1-7, the height variable region (②) of the segments 61 is 5 mm to 12 mm, and the heights of the segments 61 are variable from 3 mm to 10 mm. In the embodiment 1-1 to 1-7, the heights of the segments 61 are uniform from the radius corresponding to the upper limit of the height variable region (②) to the outer circumference. In one example, in the embodiment 1-7, the heights of the segments 61 are uniform at 10 mm from radius 12 mm to 22 mm. Meanwhile, in the electrode assembly of the comparative example, the heights of the segments 61 are maintained at a single height of 3 mm from the radius of 5 mm to the radius of 22 mm.

FIG. 17c is graphs showing the results of counting the stack number of segments along the radial direction in the bending surface region F of the positive electrode formed at the upper portion of the electrode assemblies according to the embodiments 1-1 to 1-7 and the comparative example. The bending surface region of the negative electrode also shows substantially the same results. The horizontal axis of the graph is the radius based on the center of the core, and the vertical axis of the graph is the stack number of segments counted at each radius point, which is also applied in the same way to FIGS. 17d and 17e, explained later.

Referring to FIG. 17c, the stack number uniform region b1 of the segments is commonly shown in the embodiments 1-1 to 1-7 and the comparative example 1. The stack number uniform region b1 is a radial region of a flattened area in each graph. The length of the stack number uniform region b1 increases as the maximum height of the segments decreases, and the stack number uniform region b1' of the comparative example is longest. Meanwhile, the stack number of segments increases as the maximum height ($h_N$) of the segments increases. That is, when the maximum height ($h_N$) of the segments increases so that the width of the height variable region (②) of the segments increases, the stack number of segments increases while the width of the stack number uniform region b1 decreases. At the outer side of the stack number uniform region b1, the stack number decrease region b2 appears, in which the stack number of segments decreases as the radius increases. The stack number decrease region b2 is a radial region in which the stack number of segments decreases as the radius of the electrode assembly increases. The stack number uniform region b1 and the stack number decrease region b2 are adjacent in the radial direction and complementary to each other. That is, when the length of one region increases, the length of the other region decreases. In addition, in the stack number decrease region b2, the stack number decreases in proportion to the distance away from the stack number uniform region b1.

From the point of view of the stack number of the segments, in the embodiments 1-1 to 1-7, the stack number of the segments is 10 or more in the uniform region b1. An area where the stack number of segments is 10 or more may be set as a desirable welding target area. The welding target area is a region to which at least a part of the current collector can be welded.

In the embodiments 1-1 to 1-7, the stack number uniform region b1 starts from the radius point where the height variable region (②) of the segments starts. That is, the height variable region (②) starts with the radius of 5 mm and extends toward the outer circumference.

In the embodiments 1-1 to 1-7 and the comparative example 1, for the positive electrode, Table 4 below shows the results of calculating a ratio of the length of the segment skip region (c, ① in FIG. 17a) to the radius (b-a) of the electrode assembly excluding the core, a ratio (e/f) of the length of the stack number uniform region b1 to the length (f) from the radius point (5 mm) where the stack number uniform region starts to the outermost point (22 mm) of the electrode assembly, a ratio (d/f) of the length of the height variable region (d) of the segment to the length (f) from the radius point (5 mm) where the stack number uniform region starts to the outermost point (22 mm) of the electrode assembly, a ratio (h) of the length of the electrode area corresponding to the segment skip region (first portion B1) to the entire length of the electrode, a ratio (i) of the length of the electrode area corresponding to the height variable region to the entire length of the electrode, and a ratio (j) of the length of the electrode area corresponding to the height uniform region to the entire length of the electrode, and the like.

Except that the negative electrode shows a difference of 0.1% to 1.2% for the parameter h, the other parameters are substantially the same as the positive electrode. The sum of the proportions h, i and j is slightly different from 100%. The reason is that there is a region with no segment in the second portion B3 corresponding to the outer circumference uncoated portion of the electrode. For example, in the embodiment 1-1, a segment does not exist in the second portion B3 corresponding to approximately 4% of the entire length of the electrode. In Table 4, a to f are parameters based on the length in the radial direction, and h, i, and j are parameters based on the length in the longitudinal direction of the electrode before the electrode is wound into an electrode assembly. Also, the parameters corresponding to the ratio (%) are values rounded at one decimal place. These points are substantially the same in Tables 5 and 6, explained later.

TABLE 4

| Ref. | a. core radius (mm) | b. radius of winding structure (mm) | c. segment skip region (mm) | d. height variable region (mm) | e. stack number uniform region (mm) | f. segment region (mm) | g. stack number | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 1-1 | 2 | 22 | 3 | 1 | 14 | 17 | 11 | 15% | 6% | 82% | 6% | 3% | 87% |
| Embodiment 1-2 | 2 | 22 | 3 | 2 | 13 | 17 | 13 | 15% | 12% | 76% | 6% | 7% | 83% |
| Embodiment 1-3 | 2 | 22 | 3 | 3 | 12 | 17 | 16 | 15% | 18% | 71% | 6% | 11% | 80% |

TABLE 4-continued

| Ref. | a. core radius (mm) | b. radius of winding structure (mm) | c. segment skip region (mm) | d. height variable region (mm) | e. stack number uniform region (mm) | f. segment region (mm) | g. stack number | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| Embodiment 1-4 | 2 | 22 | 3 | 4 | 11 | 17 | 18 | 15% | 24% | 65% | 6% | 15% | 75% |
| Embodiment 1-5 | 2 | 22 | 3 | 5 | 10 | 17 | 21 | 15% | 29% | 59% | 6% | 21% | 69% |
| Embodiment 1-6 | 2 | 22 | 3 | 6 | 9 | 17 | 24 | 15% | 35% | 53% | 6% | 25% | 65% |
| Embodiment 1-7 | 2 | 22 | 3 | 7 | 8 | 17 | 26 | 15% | 41% | 47% | 6% | 32% | 59% |
| comparative example1 | 2 | 22 | 3 | 0 | 15 | 17 | 8 | 15% | 0% | 88% | 6% | — | — |

Seeing the embodiments 1-1 to 1-7 of Table 4, the stack number of segments is 11 to 27, and the ratio (d/f) of the height variable region (d) to the radial region f containing segments is 6% to 41%. In addition, the ratio (e/f) of the stack number uniform region (e) to the radial region f containing segments is 47% to 82%. In addition, the ratio (c/(b-a)) of the segment skip region (c, ① in FIG. 17a) to the radius (b-a) of the electrode assembly excluding the core is 15%. In addition, the ratio of the length of the electrode area corresponding to the segment skip region (first portion B1) to the entire length of the electrode is 6%, the ratio of the length of the electrode area corresponding to the height variable region to the entire length of the electrode to is 3% to 32%, and the ratio of the length of the electrode area corresponding to the height uniform region to the entire length of the electrode is 59% to 87%.

The stack number (g) of the stack number uniform region is 10 or more in all of the embodiments 1-1 to 1-7. The stack number uniform region (e) decreases as the height variable region (d) of the segments increases, but the stack number (g) of the segments increases in the stack number uniform region (e). Preferably, the stack number uniform region (e) in which the stack number (g) of segments is 10 or more may be set as a welding target area.

In the cylindrical batteries with form factors of 1865 and 2170, the radius of the electrode assembly is approximately 9 mm to 10 mm. Therefore, for a conventional cylindrical battery, as in the embodiments 1-1 to 1-7, the length of the segment region (f) in the radial direction cannot be secured at the level of 17 mm, and the length of the stack number uniform region (e) cannot be secured at the level of 8 mm to 14 mm. This is because, in a conventional cylindrical battery, when the radius of the core is designed to be 2 mm, which is the same as in the embodiments 1-1 to 1-7, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) used in the embodiments 1-1 to 1-7. Therefore, the numerical ranges for the parameters h, i, and j cannot be easily derived from design specifications of the conventional cylindrical battery.

Next, when the maximum height ($h_N$) of the segments is the same in the height variable region (② in FIG. 17a) of the segments, it will be explained through specific embodiments how the stack number of the segments varies along the radial direction of the bending surface region F according to the change in the minimum height ($h_1$) of the segments.

The electrode assemblies of the embodiments 2-1 to 2-5 have a radius of 22 mm and a diameter of core C of 4 mm. In the height variable region (② in FIG. 17a) of the segments 61, the minimum height ($h_1$) is the same as 4 mm, and the maximum height ($h_N$) varies from 6 mm to 10 mm in increments of 1 mm. Therefore, in the electrode assemblies of the embodiments 2-1 to 2-5, the height variable region (② in FIG. 17a) of the segments has a width of 2 mm, 3 mm, 4 mm, 5 mm, and 6 mm, respectively, and the segment skip region (① in FIG. 17a) is a radial region with a radius of 2 mm to 6 mm.

The electrode assemblies of the embodiments 3-1 to 3-4 have a radius of 22 mm and a diameter of the core C of 4 mm. In the height variable region (② in FIG. 17a) of the segments 61, the minimum height ($h_1$) is the same as 5 mm, and the maximum height ($h_N$) varies from 7 mm to 10 mm in increments of 1 mm. Therefore, in the electrode assemblies of the embodiments 3-1 to 3-4, the height variable region (② in FIG. 17a) of the segments has a width of 2 mm, 3 mm, 4 mm, and 5 mm, respectively, and the segment skip region (① in FIG. 17a) is a radial region with a radius of 2 mm to 7 mm.

The electrode assemblies of the embodiments 4-1 to 4-3 have a radius of 22 mm and a diameter of the core C of 4 mm. In the height variable region (② in FIG. 17a) of the segments 61, the minimum height ($h_1$) is the same as 6 mm, and the maximum height ($h_N$) varies from 8 mm to 10 mm in increments of 1 mm. Therefore, in the electrode assemblies of the embodiments 4-1 to 4-3, the width of the height variable region (② in FIG. 17a) of the segments is 2 mm, 3 mm, and 4 mm, respectively, and the segment skip region (① in FIG. 17a) is a radial region with a radius of 2 mm to 8 mm.

The electrode assemblies of the embodiments 5-1 to 5-2 have a radius of 22 mm and a diameter of core C of 4 mm. In the height variable region (② in FIG. 17a) of the segments 61, the minimum height ($h_1$) is the same as 7 mm, and the maximum height ($h_N$) varies from 9 mm to 10 mm in 1 mm increments. Therefore, in the electrode assemblies of the embodiments 5-1 to 5-2, the width of the height variable region (② in FIG. 17a) of the segments is 2 mm and 3 mm, respectively, and the segment skip region (① in FIG. 17a) is a radial region with a radius of 2 mm to 9 mm.

Figure 17D:
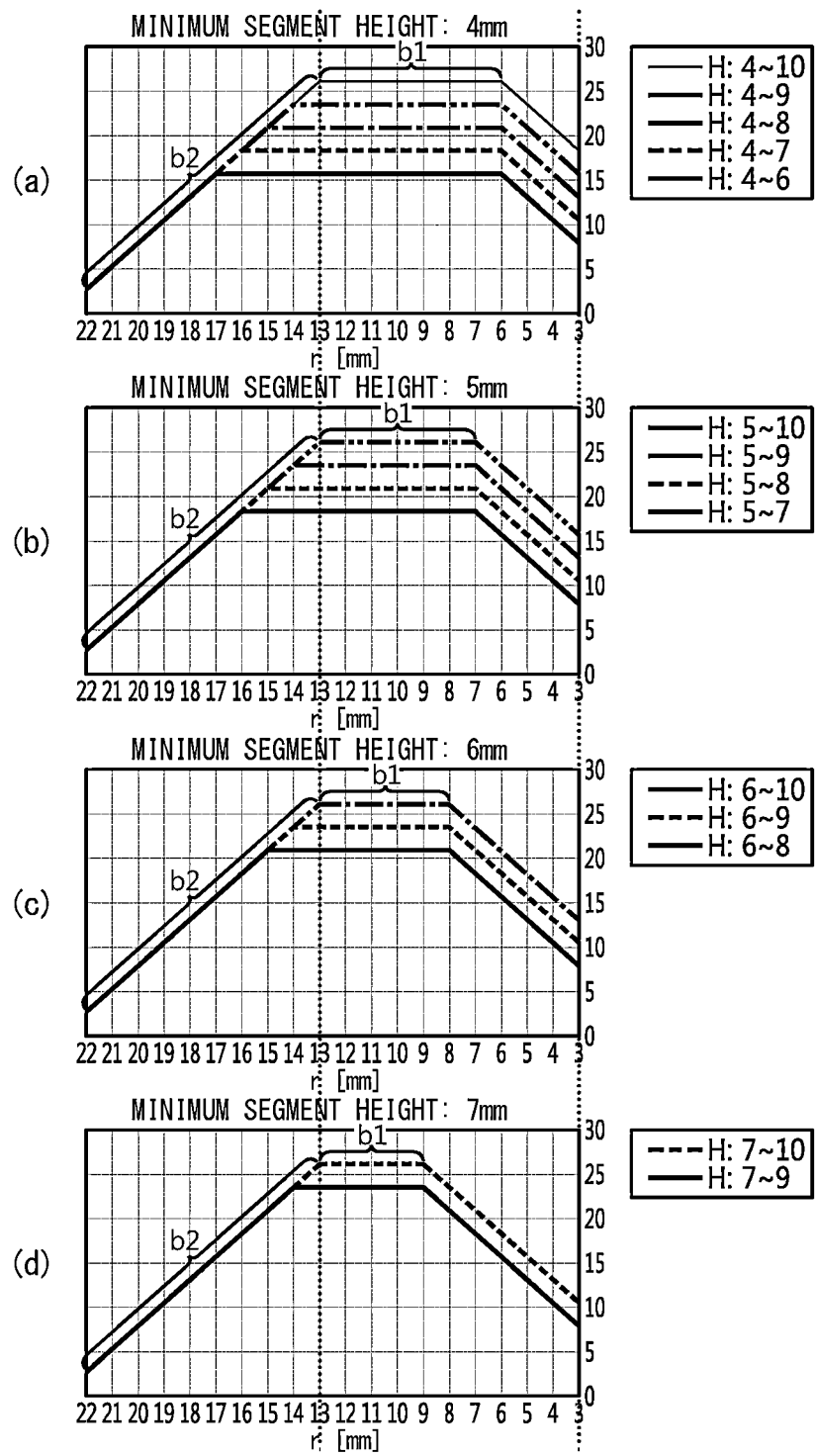
FIG. 17d is graphs showing the results of counting the stack number of segments along the radial direction in the bending surface region of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2.

FIG. 17d is graphs showing the results of counting the stack number of segments along the radial direction in the bending surface region F of the positive electrode formed at the upper portion of the electrode assemblies according to the embodiments 2-1 to 2-5, the embodiments 3-1 to 3-4, the embodiments 4-1 to 4-3, and the embodiments 5-1 to 5-2. The bending surface region of the negative electrode also shows substantially the same results.

In FIG. 17*d*, the graph (a) is shows the result of counting the stack number of segments along the radial direction in the bending surface region F for the embodiment 2-1 to 2-5, the graph (b) is for the embodiment 3-1 to 3-4, the graph (c) is for the embodiment 4-1 to 4-3, and the graph (d) is for the embodiments 5-1 to 5-2.

Referring to FIG. 17*d*, the stack number uniform region b1 of the segments appears in common in all embodiments. The stack number uniform region b1 is a radial region of the flat area in the graph. The length of the stack number uniform region b1 increases as the maximum height ($h_N$) of the segments decreases when the minimum height ($h_1$) of the segments is the same. Also, the length of the stack number uniform region b1 increases as the minimum height ($h_1$) of the segments decreases when the maximum height (hp) of the segments is the same. Meanwhile, in the stack number uniform region b1, the stack number of segments increases as the maximum height ($h_N$) of the segments increases. Even in the embodiments, the stack number decrease region b2 appears near the stack number uniform region b1.

In all of the embodiments, the stack number of segments in the stack number uniform region b1 is 10 or more. Preferably, an area where the stack number of segments is 10 or more may be set as a desirable welding target area.

In the embodiments, the stack number uniform region b1 starts from the radius point where the height variable region (② in FIG. 17*a*) of the segments starts. In the embodiments 2-1 to 2-5, the height variable region (② in FIG. 17*a*) of the segments starts from 6 mm and extends toward the outer circumference. In the embodiments 3-1 to 3-4, the height variable region (② in FIG. 17*a*) of the segments starts from 7 mm and extends toward the outer circumference. In the embodiments 4-3 to 4-3, the height variable region (② in FIG. 17*a*) of the segments starts from 8 mm and extends toward the outer circumference. In the embodiments 5-1 to 5-2, the height variable region (② in FIG. 17*a*) of the segments starts from 9 mm and extends toward the outer circumference.

Table 5 below shows the results of calculating various parameters for the embodiments 2-1 to 2-5, the embodiments 3-1 to 3-4, the embodiments 4-1 to 4-3, and the embodiments 5-1 to 5-2, including a ratio (e/f) of the length of the stack number uniform region to the length from the radius point (6 mm, 7 mm, 8 mm, 9 mm) where the stack number uniform region starts to the outermost point (22 mm) of the electrode assembly, a ratio (d/f) of the length of the height variable region (②) of the segments to the length from the radius point (6 mm, 7 mm, 8 mm, 9 mm) where the stack number uniform region starts to the outermost point (22 mm) of the electrode assembly, and the like.

TABLE 5

| Ref. | a. core radius (mm) | b. radius of winding structure (mm) | c. segment skip region (mm) | d. height variable region (mm) | e. stack number uniform region (mm) | f. segment region (mm) | g. stack number | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 2-1 | 2 | 22 | 4 | 2 | 7 | 16 | 16 | 20% | 13% | 44% | 10% | 6% | 81% |
| embodiment 2-2 | 2 | 22 | 4 | 3 | 8 | 16 | 18 | 20% | 19% | 50% | 10% | 11% | 77% |
| embodiment 2-3 | 2 | 22 | 4 | 4 | 9 | 16 | 21 | 20% | 25% | 56% | 10% | 16% | 72% |
| embodiment 2-4 | 2 | 22 | 4 | 5 | 10 | 16 | 24 | 20% | 31% | 63% | 10% | 20% | 68% |
| Embodiment 2-5 | 2 | 22 | 4 | 6 | 11 | 16 | 26 | 20% | 38% | 69% | 10% | 25% | 65% |
| embodiment 3-1 | 2 | 22 | 5 | 2 | 6 | 15 | 18 | 25% | 13% | 40% | 13% | 7% | 77% |
| embodiment 3-2 | 2 | 22 | 5 | 3 | 7 | 15 | 21 | 25% | 20% | 47% | 13% | 12% | 72% |
| embodiment 3-3 | 2 | 22 | 5 | 4 | 8 | 15 | 24 | 25% | 27% | 53% | 13% | 16% | 68% |
| embodiment 3-4 | 2 | 22 | 5 | 5 | 9 | 15 | 26 | 25% | 33% | 60% | 13% | 22% | 62% |
| embodiment 4-1 | 2 | 22 | 6 | 2 | 5 | 14 | 21 | 30% | 14% | 36% | 16% | 9% | 72% |
| embodiment 4-2 | 2 | 22 | 6 | 3 | 6 | 14 | 24 | 30% | 21% | 43% | 16% | 13% | 68% |
| embodiment 4-3 | 2 | 22 | 6 | 4 | 7 | 14 | 26 | 30% | 29% | 50% | 16% | 19% | 62% |
| embodiment 5-1 | 2 | 22 | 7 | 2 | 4 | 13 | 24 | 35% | 15% | 31% | 20% | 9% | 68% |
| embodiment 5-2 | 2 | 22 | 7 | 3 | 5 | 13 | 26 | 35% | 23% | 38% | 20% | 15% | 62% |

Referring to the embodiments 2-5, 3-4, 4-3, and 5-2 of Table 5 together with FIGS. 17*a* and 17*d*, the maximum height ($h_N$) of the segments in the height variable region (②) of the segments is the same as 10 mm, but the minimum height ($h_1$) of the segments increases to 4 mm, 5 mm, 6 mm, and 7 mm by 1 mm, and the length of the height variable region (②) decreases to 6 mm, 5 mm, 4 mm, and 3 mm by 1 mm. In the four embodiments, the ratio (e/f) of the stack number uniform region is largest in the embodiments 2-5 as 69% and is smallest in the embodiment 5-2 as 38%, and the stack numbers of the stack number uniform regions are all the same.

From the results shown in Table 5, when the maximum height (hp) of the segments is the same, it may be understood that as the width of the height variable region (②) of the segment increases since the minimum height ($h_1$) of the segments decreases, the width of the stack number uniform region also increases proportionally. The reason is that as the minimum length ($h_1$) of the segments is smaller, the radius point at which the segment starts is closer to the core, and thus the area where the segments are stacked expands toward the core.

Seeing Table 5, it may be found that the stack number of the segments is 16 to 26, the ratio (d/f) of the height variable region (②) of the segments is 13% to 38%, and the ratio (e/f) of the stack number uniform region is 31% to 69%. In addition, the ratio (c/(b-a)) of the segment skip region (①) to the radius (b-a) of the electrode assembly excluding the core is 20% to 35%. In addition, the ratio of the length of the electrode area corresponding to the segment skip region (①) to the entire length of the electrode is 10% to 20%, the ratio of the length of the electrode area corresponding to the height variable region (②) to the entire length of the electrode is 6% to 25%, and the ratio of the length of the electrode area corresponding to the height uniform region (③) to the entire length of the electrode is 62% to 81%.

In the cylindrical batteries with form factors of 1865 and 2170, the electrode assembly has a radius of approximately 9 mm to 10 mm. Therefore, different from the embodiments, it is not possible to secure the length of the segment region (f) in the radial direction at the level of 13 mm to 16 mm, and it is not possible to secure the length of the stack number uniform region (e) where the stack number of the segments is 10 or more at the level of 5 mm to 11 mm while securing the length of the segment skip region (c, ①) at the level of about 4 mm to 7 mm. This is because, in the conventional cylindrical battery, when the radius of the core is designed to be 2 mm, which is the same as the embodiments, the radial region in which segments can be disposed is substantially only 7 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Next, when the minimum height ($h_1$) and the maximum height (h) of the segments are the same in the height variable region (②) of the segments, it will be explained through specific embodiments how the stack number of the segments according to the diameter of the core C of the electrode assembly changes along the radial direction of the bending surface region F.

The electrode assemblies of the embodiments 6-1 to 6-6 have a radius of 22 mm, and the radius of the core C is 4 mm. In the height variable region (②) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 6-1 to 6-6, the width of the height variable region (②) of the segments is 2 mm, 3 mm, 4 mm, 5 mm, 6 mm, and 7 mm, respectively, and the segment skip region (①) is a radial region with a radius of 4 mm to 7 mm.

The electrode assemblies of the embodiments 7-1 to 7-6 have a radius of 22 mm, and the radius of the core C is 2 mm. In the height variable region (②) of the segments 61, the minimum height ($h_1$) of the segments is the same as 3 mm, and the maximum height ($h_N$) of the segments varies from 5 mm to 10 mm in increments of 1 mm. Therefore, in the electrode assemblies of the embodiments 7-1 to 7-6, the height variable region (②) of the segments has a width of 2 mm, 3 mm, 4 mm, 5 mm, 6 mm, and 7 mm, respectively, and the segment skip region (①) is all the same as a radial region with a radius of 2 mm to 5 mm.

Figure 17E:
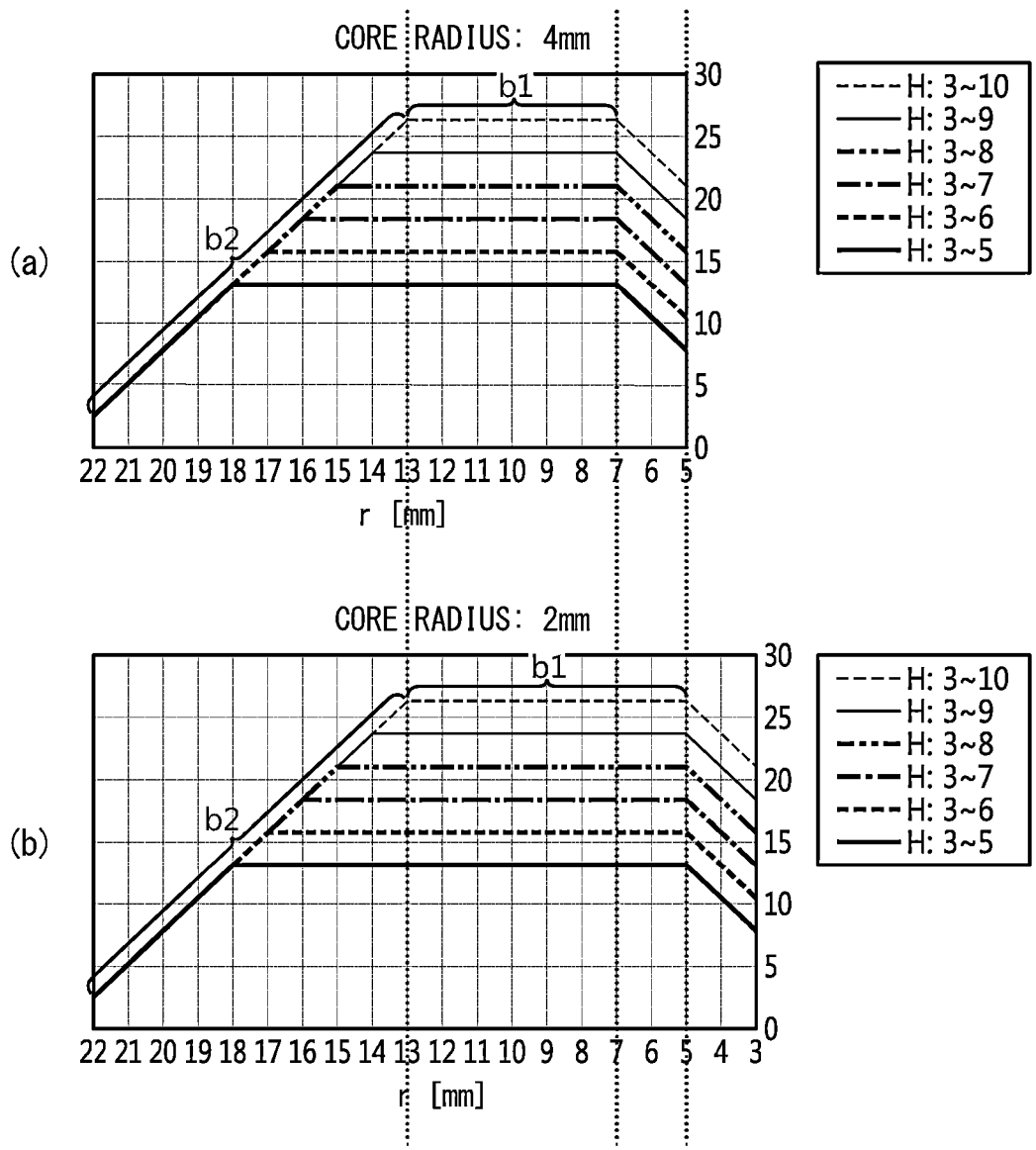
FIG. 17e is graphs showing the results of counting the stack number of segments measured along the radial direction in the bending surface region of the positive electrode formed at the upper portion of the electrode assembly according to the embodiments 6-1 to 6-6 and the embodiments 7-1 to 7-6.

FIG. 17e is graphs showing the results of counting the stack number of segments measured along the radial direction in the bending surface region F of the positive electrode formed at the upper portion of the electrode assembly according to the embodiments 6-1 to 6-6 and the embodiments 7-1 to 7-6. Substantially the same results appear in the bending surface region of the negative electrode.

In FIG. 17e, the graph (a) shows the result of counting the stack number of segments measured along the radial direction in the bending surface region F for the embodiments 6-1 to 6-6, and the graph (b) is for the embodiments 7-1 to 7-6.

Referring to FIG. 17e, the stack number uniform region b1 of the segments appears in common in all embodiments. The stack number uniform region b1 is a radial region of the flat area in the graph. The length of the stack number uniform region b1 in the radial direction increases as the maximum height ($h_N$) of the segments decreases when the minimum height ($h_1$) of the segments is the same. Meanwhile, in the stack number uniform region b1, the stack number of segments increases as the maximum height ($h_N$) of the segments increases. In the embodiments, the stack number decrease region b2 is identified near the stack number uniform region b1.

In all of the embodiments, the stack number of the segments is 10 or more in the stack number uniform region b1. Preferably, an area where the stack number of segments is 10 or more may be set as a desirable welding target area.

In the embodiments, the stack number uniform region b1 starts from the radius point where the height variable region (②) of the segments starts. In the embodiments 6-1 to 6-6, the radius where the height variable region (②) of the segment starts is 7 mm, and in the embodiments 7-1 to 7-6, the radius where the height variable region (②) of the segments starts is 5 mm.

Table 6 below shows the results of calculating various parameters for the embodiments 6-1 to 6-6 and the embodiments 7-1 to 7-6, including a ratio (e/f) of the length of the stack number uniform region to the length from the radius point (7 mm, 5 mm) where the stack number uniform region starts to the outermost point (22 mm) of the electrode assembly, a ratio (d/f) of the length of the height variable region (②) of the segments to the length from the radius point (7 mm, 5 mm) where the stack number uniform region starts to the outermost point (22 mm) of the electrode assembly, and the like.

TABLE 6

| Ref. | a. core radius (mm) | b. radius of winding structure (mm) | c. segment skip region (mm) | d. height variable region (mm) | e. stack number uniform region (mm) | f. segment region (mm) | g. uniform region stack number | c/(b−a) (%) | d/f (%) | e/f (%) | h. ratio of segment skip region | i. ratio of height variable region | j. ratio of height uniform region |
|---|---|---|---|---|---|---|---|---|---|---|---|---|---|
| embodiment 6-1 | 4 | 22 | 3 | 2 | 11 | 15 | 13 | 17% | 13% | 73% | 6% | 7% | 83% |
| embodiment 6-2 | 4 | 22 | 3 | 3 | 10 | 15 | 16 | 17% | 20% | 67% | 6% | 11% | 80% |
| embodiment 6-3 | 4 | 22 | 3 | 4 | 9 | 15 | 18 | 17% | 27% | 60% | 6% | 15% | 75% |
| embodiment 6-4 | 4 | 22 | 3 | 5 | 8 | 15 | 21 | 17% | 33% | 53% | 6% | 21% | 69% |
| embodiment 6-5 | 4 | 22 | 3 | 6 | 7 | 15 | 24 | 17% | 40% | 47% | 6% | 25% | 65% |
| embodiment 6-6 | 4 | 22 | 3 | 7 | 6 | 15 | 26 | 17% | 47% | 40% | 6% | 32% | 59% |
| embodiment 7-1 | 2 | 22 | 3 | 2 | 13 | 17 | 13 | 15% | 12% | 76% | 6% | 7% | 83% |
| embodiment 7-2 | 2 | 22 | 3 | 3 | 12 | 17 | 16 | 15% | 18% | 71% | 6% | 11% | 80% |
| embodiment 7-3 | 2 | 22 | 3 | 4 | 11 | 17 | 18 | 15% | 24% | 65% | 6% | 15% | 75% |
| embodiment 7-4 | 2 | 22 | 3 | 5 | 10 | 17 | 21 | 15% | 29% | 59% | 6% | 21% | 69% |
| embodiment 7-5 | 2 | 22 | 3 | 6 | 9 | 17 | 24 | 15% | 35% | 53% | 6% | 25% | 65% |
| embodiment 7-6 | 2 | 22 | 3 | 7 | 8 | 17 | 26 | 15% | 41% | 47% | 6% | 32% | 59% |

Seeing FIG. 17a and the embodiments 6-6 and 7-6 of Table 6, the minimum height ($h_1$) and the maximum height ($h_N$) of the segments in the height variable region (②) of the segments are the same as 3 mm and 10 mm, respectively. However, in the embodiment 6-6, the radius of the core is larger by 2 mm than that in the embodiment 7-6. Therefore, in the embodiment 6-6, the stack number uniform region (e) and the segment region (f) are smaller by 2 mm than those in the embodiment 7-6, and the stack number of segments is the same in the stack number uniform region. This result comes from the difference in the radius of the core. From the results shown in Table 6, when the width of the height variable region (②) of the segments is the same, it may be understood that, as the radius (a) of the core is smaller, the ratio (d/f) of the height variable region (②) decreases, but the ratio (e/f) of the stack number uniform region increases.

Seeing Table 6, it may be found that the stack number of segments is 13 to 26, the ratio (d/f) of the height variable region (②) of the segments is 12% to 47%, and the ratio (e/f) of the length of the stack number uniform region is 40% to 76%. In addition, the ratio (c/(b-a)) of the segment skip region (①) to the radius (b-a) of the electrode assembly excluding the core is 15% to 17%. In addition, the ratio of the length of the electrode area corresponding to the segment skip region (①) to the entire length of the electrode is 6%, the ratio of the length of the electrode area corresponding to the height variable region (②) to the entire length of the electrode is 7% to 32%, and the ratio of the length of the electrode area corresponding to the height uniform region (③) to the entire length of the electrode is 59% to 83%.

For cylindrical batteries with form factors of 1865 and 2170, the radius of the electrode assembly is approximately 9 mm to 10 mm. Therefore, different from the embodiments, the length of the segment region (f) in the radial direction is not secured at the level of 15 mm to 17 mm, and at the same time the length of the stack number uniform region (e) where the stack number of segments is 10 or more cannot be secured at the level of 6 mm to 13 mm, while securing the length of the segment skip region (①) at the level of about 3 mm. This is because, in the conventional cylindrical battery, when the radius of the core is designed to be 2 mm to 4 mm, which is the same as the embodiments, the radial region in which segments can be disposed is substantially only 5 mm to 8 mm. In addition, in the conventional cylindrical battery, the length of the electrode in the winding direction is about 600 mm to 980 mm. This short length of the electrode is only about 15% to 24% of the length of the electrode (positive electrode 3948 mm, negative electrode 4045 mm) in the embodiments. Therefore, the numerical ranges for the parameters h, i, and j cannot be easily derived from design specifications of the conventional cylindrical batteries.

Comprehensively considering the data in Tables 4 to 6, the stack number of segments may be 11 to 26 in the stack number uniform region of the segments. In addition, the ratio (d/f) of the height variable region (②) of the segments may be 6% to 47%. Also, the ratio (e/f) of the stack number uniform region may be 31% to 82%. In addition, the ratio (c/(b-a)) of the length of the segment skip region (①) to the radius of the electrode assembly excluding the core may be 15% to 35%. In addition, the ratio of the length of the electrode area corresponding to the segment skip region (①) to the entire length (length in the winding direction) of the electrode may be 6% to 20%. In addition, the ratio of the length of the electrode area corresponding to the height variable region (②) of the segments to the entire length of the electrode may be 3% to 32%. In addition, the ratio of the length of the electrode area corresponding to the height uniform region (③) of the segments to the entire length of the electrode may be 59% to 87%.

Meanwhile, the parameters described in Tables 4 to 6 are be varied according to design factors including the radius (a) of the core; the radius of the electrode assembly B; the minimum height ($h_1$) and the maximum height (hp) in the height variable region (②) of the segments; the height change amount (Δh) of the segments per 1 mm increment of the radius; the thickness of the positive electrode, the negative electrode and the separator, and the like.

Therefore, in the stack number uniform region of the segments, the segment stack number may be 10 to 35. The ratio (d/f) of the height variable region (②) of the segments may be 1% to 50%. Also, the ratio (e/f) of the stack number uniform region may be 30% to 85%. In addition, the ratio (c/(b-a)) of the length of the segment skip region (①) to the radius of the electrode assembly excluding the core may be 10% to 40%. In addition, the ratio of the length of the electrode area corresponding to the segment skip region (①) to the entire length (length in the winding direction) of the electrode may be 1% to 30%. In addition, the ratio of the length of the electrode area corresponding to the height variable region (②) of the segments to the entire length of the electrode may be 1% to 40%. In addition, the ratio of the length of the electrode area corresponding to the height uniform region (③) of the segments to the entire length of the electrode may be 50% to 90%. In the embodiments, the height index N of the maximum height ($h_N$) of the segments included in the height variable region (②) and the height uniform region (③) is 2 to 8. For example, seeing Table 4, the height index N for the embodiments 1-1 and 1-7 is 2 and 8, respectively. However, the height index N may vary depending on the height change amount (Δh) of the segment in the radial direction of the electrode assembly. When the radial length of the height variable region (②) is fixed, if the height change amount (Δh) of the segment decreases, the height index N increases accordingly, or vice versa. Preferably, the height index N may be further expanded to 2 to 20, optionally to 2 to 30.

In the bending surface region F formed at the upper portion and the lower portion of the electrode assembly, the stack number uniform region may be used as the welding target area of the current collector.

Preferably, the welding region of the current collector overlaps the stack number uniform region by at least 50% in the radial direction of the electrode assembly, and a higher overlapping ratio is more preferred.

Preferably, the rest of the area of the welding region of the current collector that does not overlap with the stack number uniform region may overlap with the stack number decrease region adjacent to the stack number uniform region in the radial direction.

More preferably, the rest of the area of the welding region of the current collector that does not overlap with the stack number uniform region may overlap with the area of the stack number decrease region in which the segment stack number is 10 or more.

If the current collector is welded to the area where the segment stack number is 10 or more, it is desirable in terms of the welding strength and prevention of damage to the separator or the active material layer during welding. In particular, it is useful when welding the current collector using a high-power laser with high transmission characteristics.

If the stack number uniform region where 10 or more of the segments are stacked and the current collector are welded with a laser, even if the output of the laser is increased to improve welding quality, the stack number uniform region absorbs most of the laser energy to form a welding bead, so it is possible to prevent the separator and the active material layer below the bending surface region F from being damaged by the laser.

In addition, since the segment stack number is 10 or more in the area where the laser is irradiated, welding beads are formed with sufficient volume and thickness. Therefore, sufficient welding strength may be secured and the resistance of the welding interface may be reduced to a level suitable for rapid charging.

When welding the current collector, the output of the laser may be determined by the desired welding strength between the bending surface region F and the current collector. The welding strength increases in proportion to the stack number of segments. This is because the volume of the welding beads formed by the laser increases as the stack number increases. The welding beads are formed as the material of the current collector and the material of the segment are melted together. Therefore, when the volume of the welding bead is large, the current collector and the bending surface region are coupled stronger and the contact resistance of the welding interface is lowered.

Preferably, the welding strength may be 2 $kgf/cm^2$ or more, more preferably 4 $kgf/cm^2$ or more. The maximum welding strength may vary depending on the output of the laser welding equipment. Also, the welding strength may be preferably set to 8 $kgf/cm^2$ or less, more preferably 6 $kgf/cm^2$ or less. However, the present disclosure is not limited thereto.

When the welding strength satisfies the above numerical range, even if severe vibration is applied to the electrode assembly along the winding axis direction and/or the radial direction, the properties of the welding interface do not deteriorate, and the resistance of the welding interface may be reduced since the volume of the welding beads is sufficient.

The power of the laser to meet the welding strength condition differs depending on the laser equipment, and may be appropriately adjusted in the range of 250 W to 320 W or in the range of 40% to 100% of the laser maximum output provided by the equipment.

The welding strength may be defined as a tensile force ($kgf/cm^2$) per unit area of the current collector when the current collector starts to separate from the bending surface region F. Specifically, after the current collector is completely welded, a tensile force may be applied to the current collector while gradually increasing the magnitude of the tensile force. When the tensile force exceeds a threshold value, the segment starts to separate from the welding interface. At this time, the value obtained by dividing the tensile force applied to the current collector by the area of the current collector corresponds to the welding strength.

In the bending surface region F, the segments are stacked in a plurality of layers, and according to the above embodiments, the stack number of segments may increase to 10 at minimum to 35 at maximum.

The thickness of the positive electrode current collector (foil) constituting the uncoated portion 43 is 10 μm to 25 μm, and the thickness of the negative electrode current collector (foil) constituting the uncoated portion 43 may be 5 μm to 20 μm. Therefore, the bending surface region F of the positive electrode may include an area where the total stack thickness of the segments is 100 μm to 875 μm. In addition, the bending surface region F of the negative electrode may include an area where the total layered thickness of the segments is 50 μm to 700 μm.

Figure 17F:
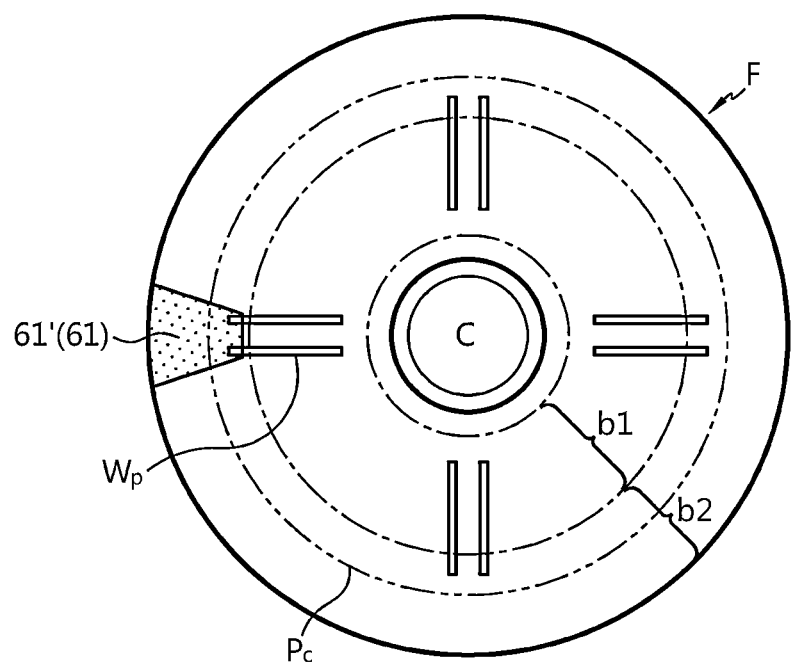
FIG. 17f is a top plan view of the electrode assembly showing a stack number uniform region b1 and a stack number decrease region b2 in the bending surface region of the segment according to an embodiment of the present disclosure.

FIG. 17f is a top plan view of the electrode assembly showing the stack number uniform region b1 and the stack number decrease region b2 in the bending surface region F of the segments 61, 61' according to an embodiment of the present disclosure.

Referring to FIG. 17f, the area between two circles indicated by the thick solid line corresponds to the bending surface region F of the segments, and the area between two circles indicated by the dashed-dotted line corresponds to the stack number uniform region b1 in which the stack number of the segments is 10 or more, and the outer area of the stack number uniform region b1 corresponds to the stack number decrease region b2.

In one example, when the current collector ($P_c$) is welded to the bending surface region F, a welding pattern ($W_p$) is generated on the surface of the current collector ($P_c$). The welding pattern ($W_p$) may have an array of line patterns or dot patterns. The welding pattern ($W_p$) corresponds to the welding region and may overlap by 50% or more with the stack number uniform region b1 of the segments along the radial direction. Therefore, a part of the welding pattern ($W_p$) may be included in the stack number uniform region b1, and the rest of the welding pattern ($W_p$) may be included in the stack number decrease region b2 outside the stack number uniform region b1. Of course, the entire welding pattern ($W_p$) may overlap with the stack number uniform region b1 in order to maximize the welding strength and lower the resistance of the welding region.

The area of the bending surface region F may be defined as the sum of the area of the stack number uniform region b1 and the area of the stack number decrease region b2 of the segment. Since the ratio (e/f) of the stack number uniform region b1 is 30% to 85%, preferably 31% to 82%, the ratio of the area of the stack number uniform region b1 to the area of the bending surface region F may be 9% ($30^2/100^2$) to 72% ($85^2/100^2$), preferably 10% ($31^2/100^2$) to 67% ($82^2/100^2$).

Preferably, the edge of the portion where the current collector ($P_c$) contacts the bending surface region F may cover the end of the segment 61, 61' bent toward the core C in the last winding turn of the height uniform region (③). In this case, since the welding pattern ($W_p$) is formed in a state where the segments 61, 61' are pressed by the current collector ($P_c$), the current collector ($P_c$) and the bending surface region F are strongly coupled. As a result, since the segments 61, 61' stacked in the winding axis direction come into close contact with each other, the resistance at the welding interface may be lowered and lifting of the segments 61, 61' may be prevented.

Meanwhile, the bending direction of the segments may be opposite to that described above. That is, the segments may be bent from the core toward the outer circumference. In this case, the pattern in which the heights of the segments change along the winding direction (X-axis direction) may be opposite to that of the embodiments (modifications) described above. For example, the heights of the segments may gradually decrease from the core toward the outer circumference. Also, the structure applied to the first portion B1 and the structure applied to the second portion B3 may be switched with each other. Preferably, the height change pattern may be designed such that the heights of the segments are gradually decreased from the core toward the outer circumference, but when the segment closest to the outer circumference of the electrode assembly is bent toward the outer circumference, the end of the segment does not protrude out of the outer circumference of the electrode assembly.

The electrode structure of the above embodiments (modifications) may be applied to at least one of the first electrode and the second electrode having different polarities included in the jelly-roll type electrode assembly or another type electrode assembly known in the art. In addition, when the electrode structure of the above embodiments (modifications) is applied to any one of the first electrode and the second electrode, the conventional electrode structure may be applied to the other one. In addition, the electrode structures applied to the first electrode and the second electrode may not be identical but be different from each other.

Figure 1D:
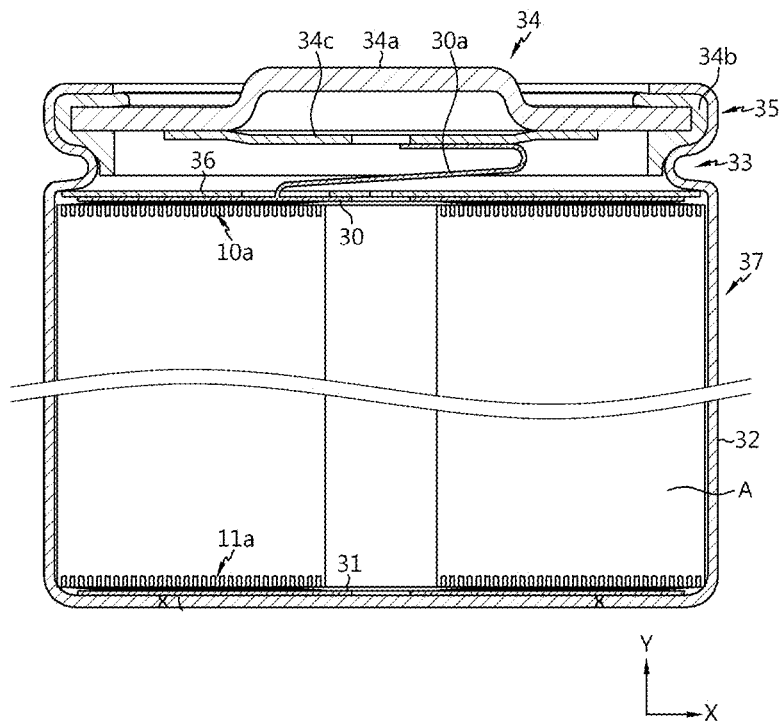
FIG. 1d is a cross-sectional view showing the conventional tab-less cylindrical battery, taken along the axial direction Y.

For example, when the first electrode and the second electrode are a positive electrode and a negative electrode, respectively, any one of the above embodiments (modifications) may be applied to the first electrode and the conventional electrode structure (see FIG. 1) may be applied to the second electrode.

As another example, when the first electrode and the second electrode are a positive electrode and a negative electrode, respectively, any one of the above embodiments (modifications) may be selectively applied to the first electrode and any one of the above embodiments (modifications) may be selectively applied to the second electrode.

Hereinafter, the structure of the electrode assembly according to an embodiment of the present disclosure will be described in detail.

Figure 18:
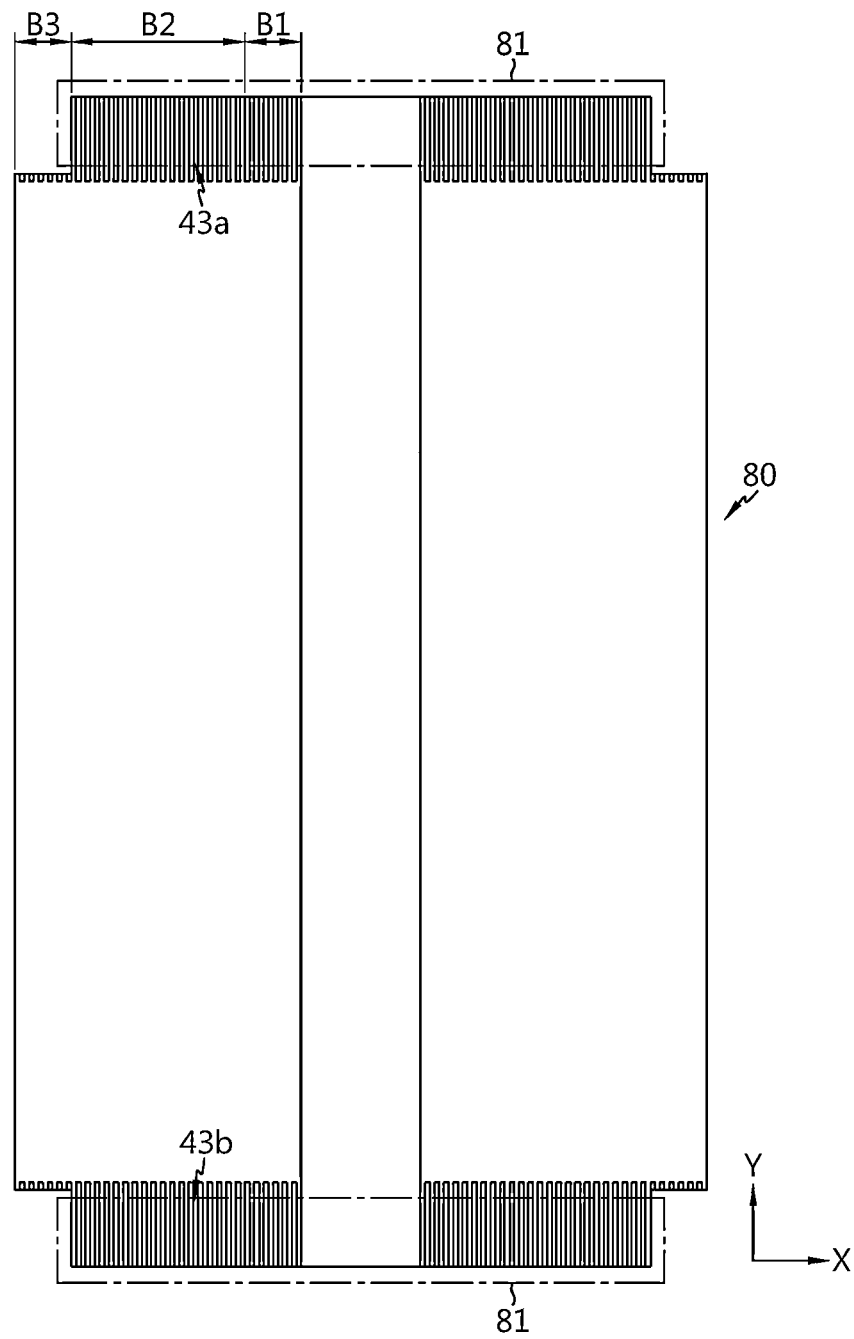
FIG. 18 is a cross-sectional view of a jelly-roll type electrode assembly in which the electrode of the first embodiment is applied to a first electrode (positive electrode) and a second electrode (negative electrode), taken along the Y-axis direction (winding axis direction).

FIG. 18 is a cross-sectional view of a jelly-roll type electrode assembly 80 in which the electrode 40 according to the first embodiment is applied to a first electrode (positive electrode) and a second electrode (negative electrode), taken along the Y-axis direction (winding axis direction).

The electrode assembly 80 may be manufactured by the winding method described with reference to FIG. 2. For convenience of description, the protruding structure of the first uncoated portion 43a and the second uncoated portion 43b extending to the outside of the separator is shown in detail, and the winding structure of the first electrode, the second electrode, and the separator is not depicted. The first uncoated portion 43a upwardly protruding extends from the first electrode, and the second uncoated portion 43b downwardly protruding extends from the second electrode.

A pattern in which the heights of the first and second uncoated portions 43a, 43b change is schematically shown. That is, the height of the uncoated portion may change irregularly depending on the position where the section is cut. For example, if the side of the trapezoid segment 61, 61' or the cut groove 63 is cut, the height of the uncoated portion in the cross section is lower than the height (H) of the segment 61, 61'. Accordingly, it should be understood that the height of the uncoated portion shown in the cross-sectional drawings of the electrode assembly corresponds to the average of the heights (H in FIGS. 14b and 15b) of the uncoated portions included in each winding turn.

Referring to FIG. 18, the first uncoated portion 43a includes a first portion B1 adjacent to the core of the electrode assembly 80, a second portion B3 adjacent to the outer circumferential surface of the electrode assembly 80, and a third portion B2 interposed between the first portion B1 and the second portion B3.

The height (length in the Y-axis direction) of the second portion B3 is relatively smaller than the height of the third portion B2. Therefore, while the beading portion of the battery housing is being pressed near the second portion B3, it is possible to prevent a phenomenon in which an internal short circuit occurs as the beading portion and the second portion B3 contact each other.

The second uncoated portion 43b has the same structure as the first uncoated portion 43a. In one modification, the second uncoated portion 43b may have a conventional electrode structure or the electrode structure in other embodiments (modifications).

The ends 81 of the first uncoated portion 43a and the second uncoated portion 43b may be bent in the radial direction of the electrode assembly 80, for example from the outer circumference toward the core. At this time, the second portion B3 may not be substantially bent.

Figure 19:
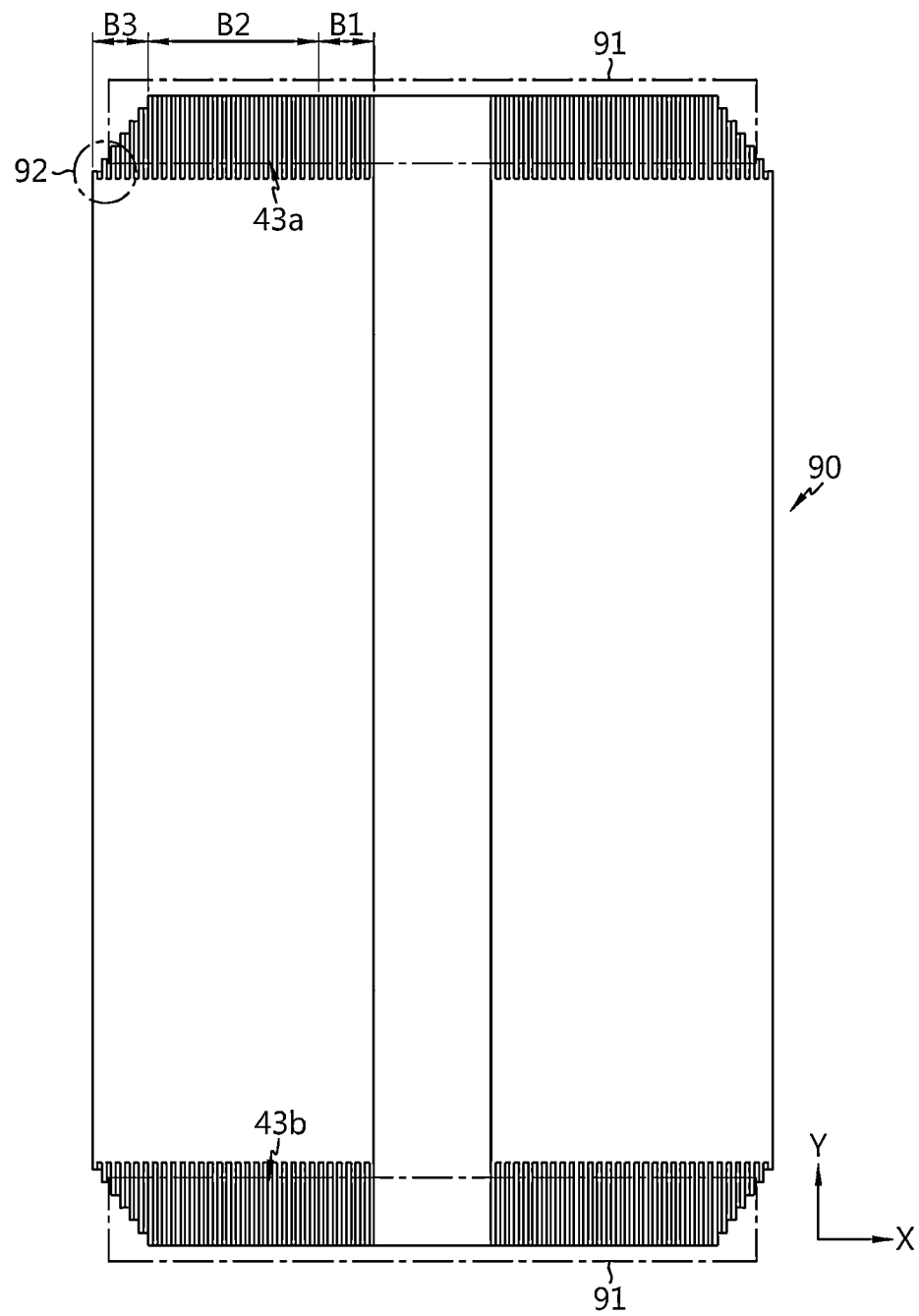
FIG. 19 is a cross-sectional view of a jelly-roll type electrode assembly in which an electrode of the second embodiment is applied to the first electrode (positive electrode) and the second electrode (negative electrode), taken along the Y-axis direction (winding axis direction).

FIG. 19 is a cross-sectional view of a jelly-roll type electrode assembly 90 in which the electrode 45 of the second embodiment is applied to the first electrode (positive electrode) and the second electrode (negative electrode), taken along the Y-axis direction (winding axis direction).

Referring to FIG. 19, the first uncoated portion 43a of the first electrode includes a first portion B1 adjacent to the core of the electrode assembly 90, a second portion B3 adjacent to the outer circumferential surface of the electrode assembly 90, and a third portion B2 interposed between the first portion B1 and the second portion B3.

The height of the second portion B3 is relatively smaller than that of the third portion B2 and gradually or stepwise decreases from the core toward the outer circumference. Therefore, while the beading portion of the battery housing is being pressed near the second portion B3, it is possible to prevent a phenomenon in which an internal short circuit occurs as the beading portion and the second portion B3 contact each other.

The second uncoated portion 43b has the same structure as the first uncoated portion 43a. In one modification, the second uncoated portion 43b may have a conventional electrode structure or an electrode structure of other embodiments (modifications).

The ends 91 of the first uncoated portion 43a and the second uncoated portion 43b may be bent in the radial direction of the electrode assembly 90, for example from the outer circumference toward the core. At this time, the outermost side 92 of the second portion B3 may not be substantially bent.

Figure 20:
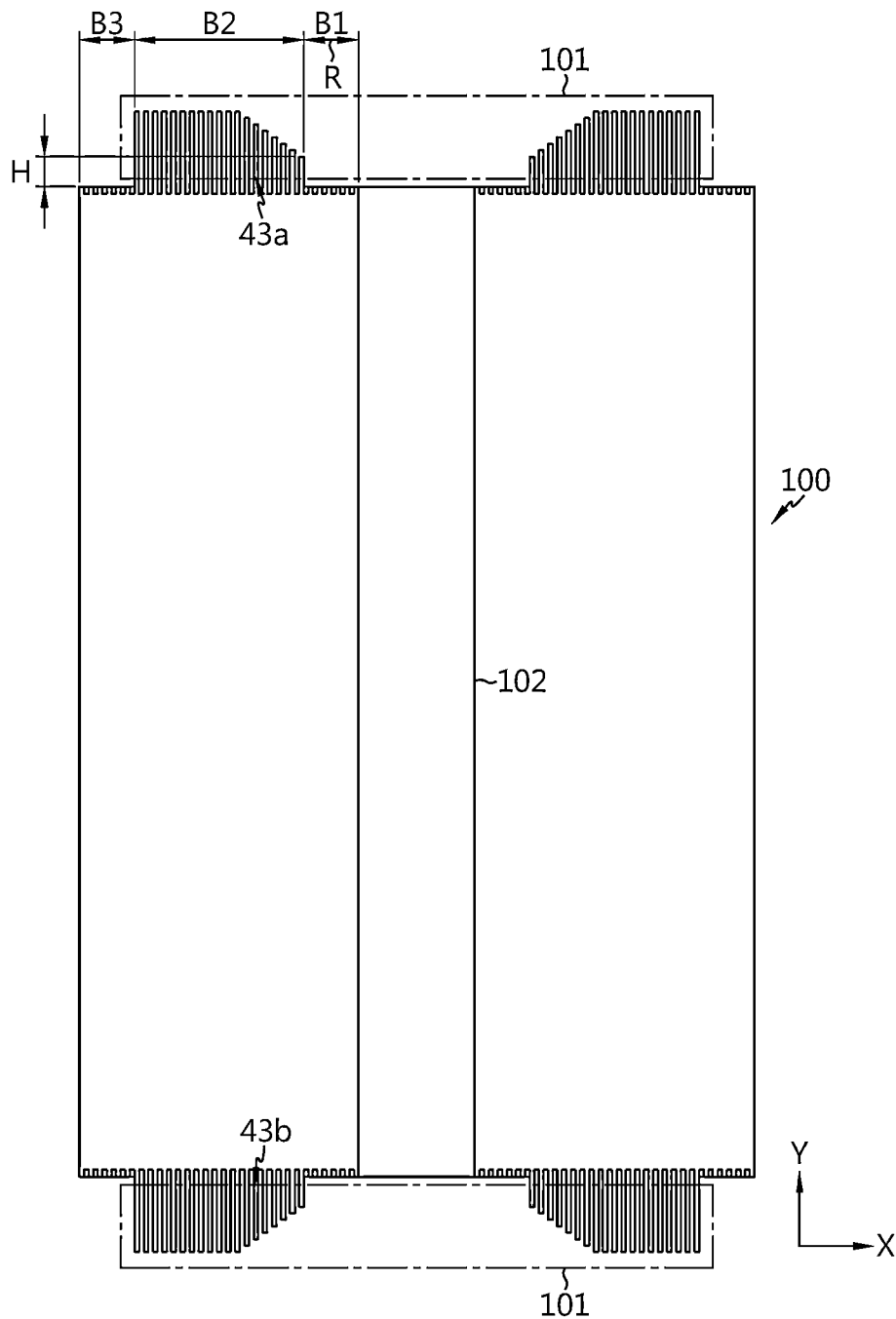
FIG. 20 is a cross-sectional view of a jelly-roll type electrode assembly in which any one of the electrodes of the third to fifth embodiments (modifications thereof) is applied to the first electrode (positive electrode) and the second electrode (negative electrode), taken along the Y-axis direction (winding axis direction).

FIG. 20 is a cross-sectional view of a jelly-roll type electrode assembly 100 in which any one of the electrodes 50, 60, 70 of the third to fifth embodiments (modifications thereof) is applied to the first electrode (positive electrode) and the second electrode (negative electrode), taken along the Y-axis direction (winding axis direction).

Referring to FIG. 20, the uncoated portion 43a of the first electrode includes a first portion B1 adjacent to the core of the electrode assembly 100, a second portion B3 adjacent to the surface of the outer circumference of the electrode assembly 100, and a third portion B2 interposed between the first portion B1 and the second portion B3.

The height of the first portion B1 is relatively smaller than that of the third portion B2. Also, in the third portion B2, the bending length of the uncoated portion 43a located at the innermost side is equal to or smaller than the radial length (R) of the first portion B1. The bending length (H) corresponds to a distance from the point where the uncoated portion 43a is bent to a top end of the uncoated portion 43a. In a modification, the bending length H may be less than the sum of the radial length (R) of the first portion B1 and 10% of the radius of the core 102.

Therefore, even if the third portion B2 is bent, more than 90% of the diameter of the core 102 of the electrode assembly 100 is open to the outside. The core 102 is a cavity at the center of the electrode assembly 100. If the core 102 is not blocked, there is no difficulty in the electrolyte injection process and the electrolyte injection efficiency is improved. In addition, by inserting a welding jig through the core 102, a welding process between the current collector at the negative electrode (or, the positive electrode) and the battery housing (or, the terminal) may be easily performed.

The height of the second portion B3 is relatively smaller than the height of the third portion B2. Therefore, while the beading portion of the battery housing is being pressed near the second portion B3, it is possible to prevent a phenomenon in which an internal short circuit occurs as the beading portion and the second portion B3 contact each other.

In one modification, the height of the second portion B3 may decrease gradually or stepwise, unlike that shown in FIG. 20. Also, in FIG. 20, the height of the third portion B2 is the same in a part near the outer circumference, but the height of the third portion B2 may increase gradually or stepwise from the boundary between the first portion B1 and the third portion B2 toward the boundary between the third portion B2 and the second portion B3. When the third portion B2 is divided into a plurality of segments, a region in which the height of the uncoated portion 43a changes corresponds to the segment height variable region (②) in FIG. 17a).

The second uncoated portion 43b has the same structure as the first uncoated portion 43a. In one modification, the second uncoated portion 43b may have a conventional electrode structure or an electrode structure of other embodiments (modifications).

The ends 101 of the first uncoated portion 43a and the second uncoated portion 43b may be bent in the radial direction of the electrode assembly 100, for example from the outer circumference toward the core. At this time, the first portion B1 and the second portion B3 are not substantially bent.

When the third portion B2 includes a plurality of segments, the bending stress may be alleviated to prevent the uncoated portions 43a near the bending point from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Figure 21:
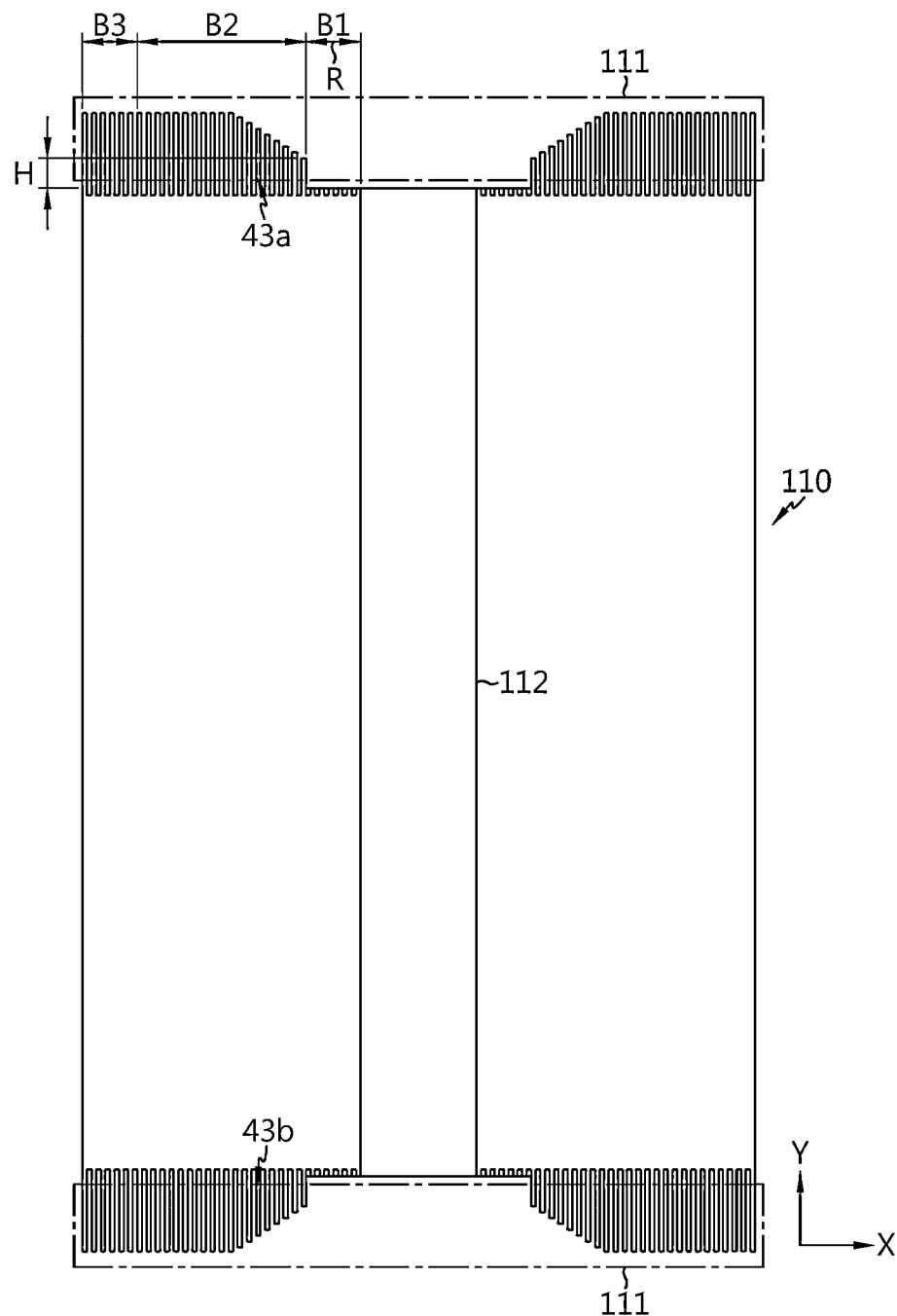
FIG. 21 is a cross-sectional view of an electrode assembly according to still another embodiment of the present disclosure, taken along the Y-axis direction (winding axis direction).

FIG. 21 is a cross-sectional view of an electrode assembly 110 according to still another embodiment of the present disclosure, taken along the Y-axis direction (winding axis direction).

Referring to FIG. 21, the electrode assembly 110 has substantially the same configuration as the electrode assembly 100 of FIG. 20, except that the height of the second portion B3 is substantially equal to the height of the outermost side of the third portion B2.

The second portion B3 may include a plurality of segments. The configuration of the plurality of segments is substantially the same as that of the fourth and fifth embodiments (modifications) of the electrode.

In the electrode assembly 110, the height of the first portion B1 is relatively smaller than the height of the third portion B2. Also, in the third portion B2, the bending length (H) of the uncoated portion located at the innermost side is equal to or smaller than the radial length (R) of the first portion B1. Preferably, the first portion B1 may be a segment skip region (①) in FIG. 17a) with no segment. In a modification, the bending length H may be less than the sum of the radial length (R) of the first portion B1 and 10% of the radius of the core 112.

Therefore, even if the third portion B2 is bent, 90% or more of the diameter of the core 112 of the electrode assembly 110 is open to the outside. If the core 112 is not blocked, there is no difficulty in the electrolyte injection process and the electrolyte injection efficiency is improved. In addition, the welding process between the current collector at the negative electrode (or, the positive electrode)

and the battery housing (or, the terminal) may be easily performed by inserting a welding jig through the core 112.

In one modification, the structure in which the height of the third portion B2 gradually or stepwise increases from the core toward the outer circumference may be extended to the second portion B3. In this case, the height of the uncoated portion 43a may gradually or stepwise increase from the boundary between the first portion B1 and the third portion B2 toward the surface of the outermost side of the electrode assembly 110.

The second uncoated portion 43b has the same structure as the first uncoated portion 43a. In one modification, the second uncoated portion 43b may have a conventional electrode structure or an electrode structure of other embodiments (modifications).

The ends 111 of the first uncoated portion 43a and the second uncoated portion 43b may be bent in the radial direction of the electrode assembly 110, for example from the outer circumference toward the core. At this time, the first portion B1 is not substantially bent.

When the third portion B2 and the second portion B3 include a plurality of segments, the bending stress is relieved, so it is possible to prevent tearing or abnormal deformation of the uncoated portions 43a, 43b near the bending point. In addition, when the width and/or height and/or separation pitch of the segment is adjusted according to the numerical ranges of the above embodiment, the segments are bent toward the core and overlapped in several layers enough to secure sufficient welding strength, and an empty hole (gap) is not formed in the bending surface region.

Figure 22:
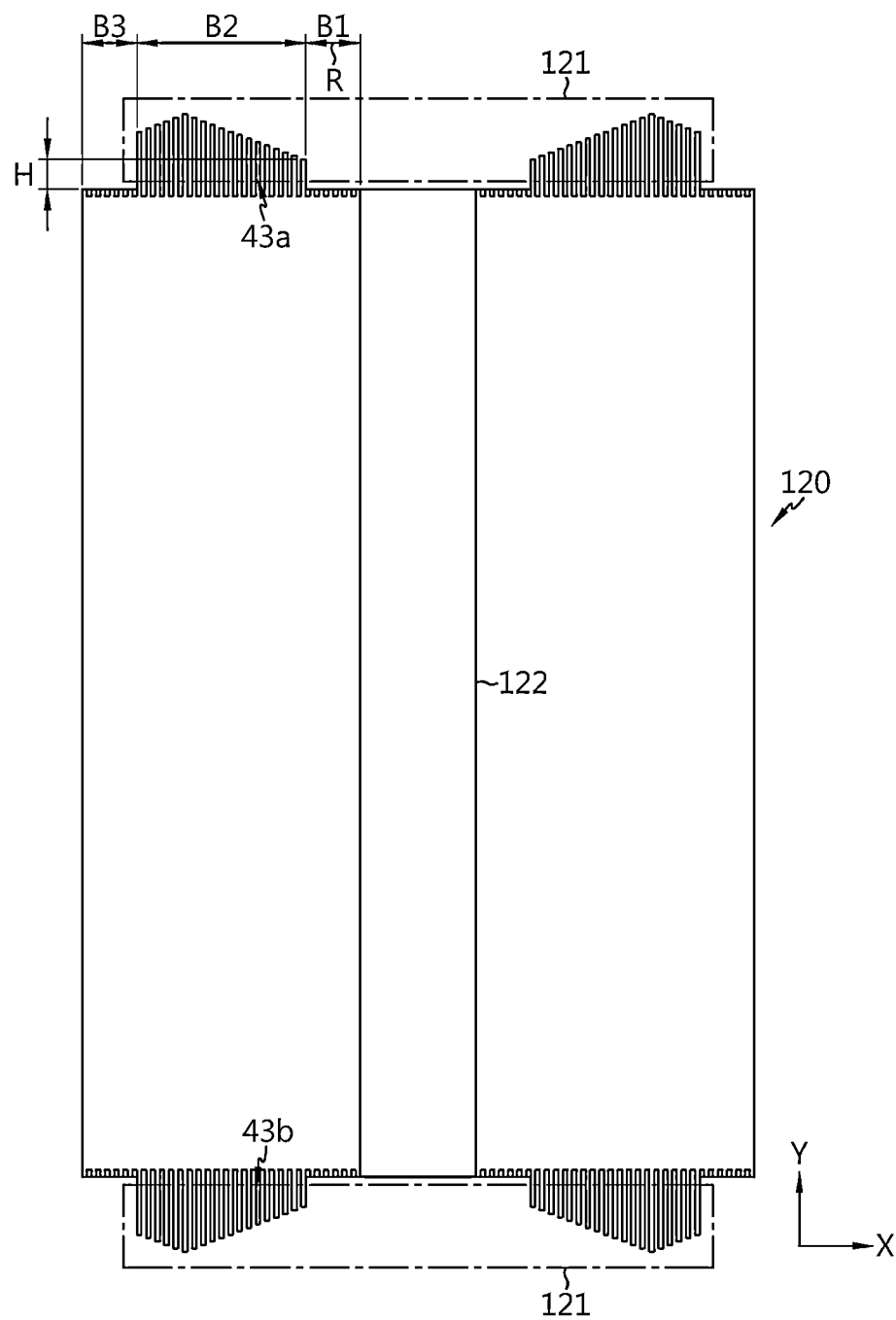
FIG. 22 is a cross-sectional view of an electrode assembly according to still another embodiment of the present disclosure, taken along the Y-axis direction (winding axis direction).

FIG. 22 is a cross-sectional view showing the electrode assembly 120 according to still another embodiment of the present disclosure, taken along the Y-axis direction (winding axis direction).

Referring to FIG. 22, the electrode assembly 120 is substantially identical to the electrode assembly 100 of FIG. 20, except that the heights of the third portion B2 have a pattern of increasing gradually or stepwise and then decreasing. The radial region in which the heights of the third portion B2 change may be regarded as the height variable region (②) in FIG. 17a) of the segments. Even in this case, the height variable region of the segments may be designed so that the stack number uniform region in which the stack number of the segments is 10 or more appears in the desirable numerical range described above in the bending surface region F formed by bending the third portion B2.

The change in height of the third portion B2 may be implemented by adjusting the height of the step pattern (see FIG. 14c) or the segment (see FIG. 14d or 15a) included in the third portion B2.

In the electrode assembly 120, the height of the first portion B1 is relatively smaller than the height of the third portion B2. In addition, in the third portion B2, the bending length H of the uncoated portion located at the innermost side is equal to or smaller than the radial length R of the first portion B1. The region corresponding to the first portion B1 corresponds to the segment skip region (①) in FIG. 17a) with no segment. In one modification, the bending length H may be less than the sum of the radial length R of the first portion B1 and 10% of the radius of the core 122.

Therefore, even if the third portion B2 is bent toward the core, 90% or more of the diameter of the core 122 of the electrode assembly 120 is open to the outside. If the core 122 is not blocked, there is no difficulty in the electrolyte injection process, and the electrolyte injection efficiency is improved. In addition, by inserting a welding jig through the core 122, the welding process may be easily performed between the current collector of the negative electrode (or, positive electrode) and the battery housing (or, rivet terminal).

Also, the height of the second portion B3 is relatively smaller than the heights of the third portion B2, and preferably, the segment may not be formed in the second portion B3. Therefore, it is possible to prevent the phenomenon that the beading portion and the second portion B3 come into contact with each other to cause an internal short circuit while the beading portion of the battery housing is being pressed near the second portion B3. In one modification, the height of the second portion B3 may decrease gradually or stepwise toward the outer circumference.

The second uncoated portion 43b has the same structure as the first uncoated portion 43a. In one modification, the second uncoated portion 43b may have a conventional electrode structure or an electrode structure of other embodiments (modifications).

The ends 121 of the first uncoated portion 43a and the second uncoated portion 43b may be bent from the outer circumference of the electrode assembly 120 toward the core. At this time, the first portion B1 and the second portion B3 are substantially not bent.

When the third portion B2 includes a plurality of segments, the bending stress is alleviated to prevent the uncoated portions 43a, 43b from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Figure 23:
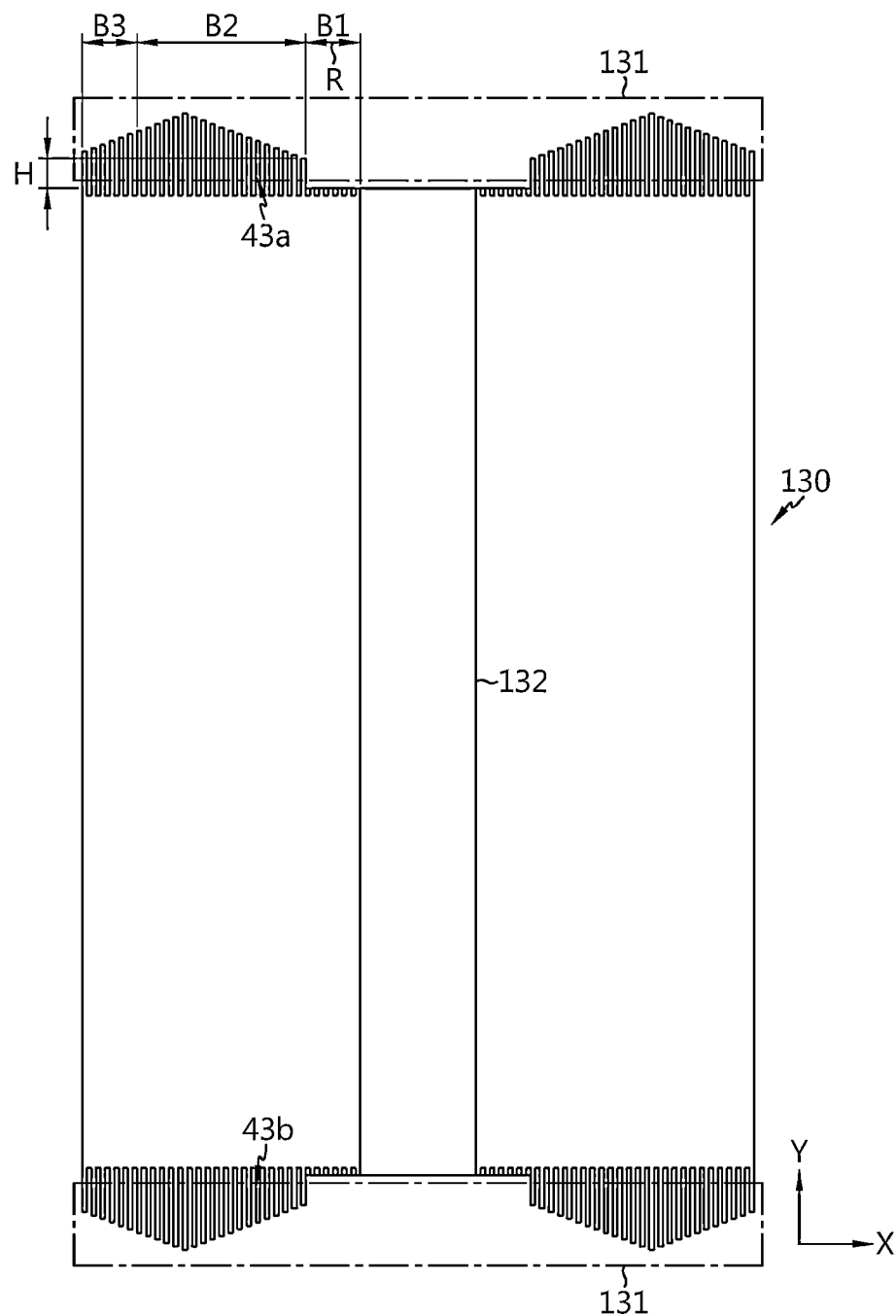
FIG. 23 is a cross-sectional view of an electrode assembly according to still another embodiment of the present disclosure, taken along the Y-axis direction (winding axis direction).

FIG. 23 is a cross-sectional view showing the electrode assembly 130 according to still another embodiment of the present disclosure, taken along the Y-axis direction (winding axis direction).

Referring to FIG. 23, the electrode assembly 130 is substantially identical to the electrode assembly 120 of FIG. 22, except that the height of the second portion B3 has a pattern of decreasing gradually or stepwise from the boundary point of the second portion B3 and the third portion B2 toward the outermost surface of the electrode assembly 130.

The change in height of the second portion B3 may be implemented by extending the step pattern (see FIG. 14c) included in the third portion B2 to the second portion B3 and at the same time gradually or stepwise decreasing the height of the pattern toward the outer circumference. Also, in another modification, the change in height of the second portion B3 may be implemented by extending the segment structure of the third portion B2 to the second portion B3 and at the same time gradually or stepwise decreasing the height of the segment toward the outer circumference.

In the electrode assembly 120, the height of the first portion B1 is relatively smaller than the height of the third portion B2. In addition, in the third portion B2, the bending length H of the uncoated portion located at the innermost side is equal to or smaller than the radial length R of the first portion B1. The first portion B1 corresponds to the segment skip region (①) in FIG. 17a) with no segment. In one modification, the bending length H may be less than the sum of the radial length R of the first portion B1 and 10% of the radius of the core 132.

Therefore, even if the third portion B2 is bent toward the core, 90% or more of the diameter of the core 132 of the electrode assembly 130 is open to the outside. If the core 132 is not blocked, there is no difficulty in the electrolyte injection process, and the electrolyte injection efficiency is improved. In addition, by inserting a welding jig through the core 132, the welding process may be easily performed between the current collector of the negative electrode (or, positive electrode) and the battery housing (or, terminal).

The second uncoated portion 43b has the same structure as the first uncoated portion 43a. In one modification, the second uncoated portion 43b may have a conventional electrode structure or the electrode structure of other embodiments (modifications).

The ends 131 of the first uncoated portion 43a and the second uncoated portion 43b may be bent from the outer circumference of the electrode assembly 130 toward the core. At this time, the first portion B1 is substantially not bent.

When the third portion B2 and the second portion B3 include a plurality of segments, the bending stress is alleviated to prevent the uncoated portions 43a, 43b near the bending point from being torn or abnormally deformed. In addition, when the width and/or height and/or separation pitch of the segments is adjusted according to the numerical range of the above embodiment, the segments are bent toward the core and overlapped in several layers enough to secure sufficient welding strength, and an empty hole (gap) is not formed in the bending surface region.

Meanwhile, in the above embodiments (modifications), the ends of the first uncoated portion 43a and the second uncoated portion 43b may be bent from the core toward the outer circumference. In this case, it is preferable that the second portion B3 is designed as the segment skip region (①) in FIG. 17a) with no segment and not bent toward the outer circumference. In addition, the radial width of the second portion B3 may be equal to or greater than the bending length of the outermost uncoated portion (or, segment) of the third portion B2. In this case, when the outermost uncoated portion (or, segment) of the third portion B2 is bent toward the outer circumference, the end of the bent portion does not protrude toward the inner surface of the battery housing beyond the outer circumference of the electrode assembly. In addition, the structural change pattern of the segments may be opposite to the above embodiments (modifications). For example, the heights of the segments may increase stepwise or gradually from the outer circumference toward the core. That is, by sequentially arranging the segment skip region (①) in FIG. 17a), the height variable region (② in FIG. 17a), and the height uniform region (③ in FIG. 17a) from the outer circumference of the electrode assembly toward the core, in the bending surface region, the stack number uniform region in which the stack number of segments is 10 or more may appear in a desirable numerical range.

Various electrode assembly structures according to an embodiment of the present disclosure may be applied to a cylindrical battery.

Preferably, the cylindrical battery may be, for example, a cylindrical battery whose form factor ratio (defined as a value obtained by dividing the diameter of the cylindrical battery by height, namely a ratio of diameter (Φ) to height (H)) is greater than about 0.4. Here, the form factor means a value indicating the diameter and height of a cylindrical battery.

Preferably, the cylindrical battery may have a diameter of 40 mm to 50 mm and a height of 60 mm to 130 mm. The form factor of the cylindrical battery according to an embodiment of the present disclosure may be, for example, 46110, 4875, 48110, 4880, 4680, 4695. In the numerical value representing the form factor, first two numbers indicate the diameter of the battery, and the remaining numbers indicate the height of the battery. The winding turn of the electrode assembly may be 50 turns to 60 turns.

When an electrode assembly having a tab-less structure is applied to a cylindrical battery having a form factor ratio of more than 0.4, the stress applied in the radial direction when the uncoated portion is bent is large, so that the uncoated portion may be easily torn. In addition, when welding the current collector to the bending surface region of the uncoated portion, it is necessary to sufficiently increase the number of stacked layers of the uncoated portion in the bending surface region in order to sufficiently secure the welding strength and lower the resistance. This requirement may be achieved by the electrode and the electrode assembly according to the embodiments (modifications) of the present disclosure.

A battery according to an embodiment of the present disclosure may be an approximately cylindrical battery, whose diameter is approximately 46 mm, height is approximately 110 mm, and form factor ratio is 0.418.

A battery according to another embodiment may be an approximately cylindrical battery, whose diameter is about 48 mm, height is about 75 mm, and form factor ratio is 0.640.

A battery according to still another embodiment may be an approximately cylindrical battery, whose diameter is approximately 48 mm, height is approximately 110 mm, and form factor ratio is 0.436.

A battery according to still another embodiment may be an approximately cylindrical battery, whose diameter is approximately 48 mm, height is approximately 80 mm, and form factor ratio is 0.600.

A battery according to still another embodiment may be an approximately cylindrical battery, whose diameter is approximately 46 mm, height is approximately 80 mm, and form factor ratio is 0.575.

A battery according to still another embodiment may be an approximately cylindrical battery, whose diameter is approximately 46 mm, height is approximately 95 mm, and form factor ratio is 0.484.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

Hereinafter, the cylindrical battery according to an embodiment of the present disclosure will be described in detail.

Figure 24:
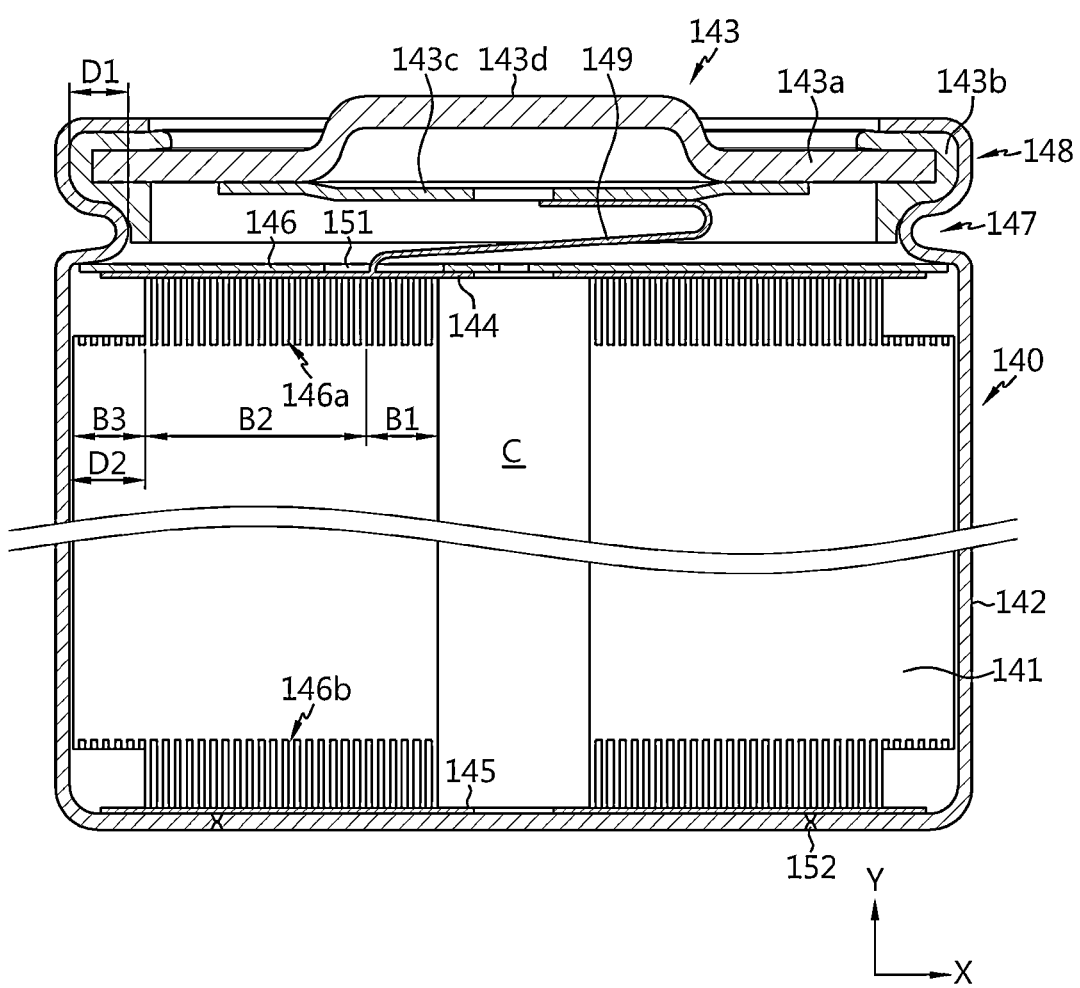
FIG. 24 is a sectional view showing a cylindrical battery according to an embodiment of the present disclosure, taken along the Y-axis direction.

FIG. 24 is a cross-sectional view showing a cylindrical battery 140 according to an embodiment of the present disclosure, taken along the Y-axis direction.

Referring to FIG. 24, the cylindrical battery 140 according to an embodiment of the present disclosure includes an electrode assembly 141 having a first electrode, a separator and a second electrode, a battery housing 142 for accommodating the electrode assembly 141, and a sealing body 143 for sealing an open end of the battery housing 142.

The battery housing 142 is a cylindrical container with an opening at the top. The battery housing 142 is made of a conductive metal material such as aluminum, steel or stainless steel. A nickel coating layer may be formed on the surface of the battery housing 142. The battery housing 142 accommodates the electrode assembly 141 in the inner space through the top opening and also accommodates the electrolyte.

The electrolyte may be a salt having a structure like $A^+B^-$. Here, $A^+$ includes an alkali metal cation such as Li+, Na+, or K+, or a combination thereof, and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 141 may have a jelly-roll shape, but the present disclosure is not limited thereto. The electrode assembly 141 may be manufactured by winding a laminate formed by sequentially laminating a lower separator, a first electrode, an upper separator, and a second electrode at least once, based on the winding axis C, as shown in FIG. 2.

The first electrode and the second electrode have different polarities. That is, if one has positive polarity, the other has negative polarity. At least one of the first electrode and the second electrode may have an electrode structure according to the above embodiments (modifications). In addition, the other of the first electrode and the second electrode may have a conventional electrode structure or an electrode structure according to embodiments (modifications). The electrode pair included in the electrode assembly 141 is not limited to one electrode pair, two or more electrode pairs may be included.

The first uncoated portion 146a of the first electrode and the second uncoated portion 146b of the second electrode protrude at the upper portion and the lower portion of the electrode assembly 141, respectively. The first electrode has the electrode structure of the first embodiment (modification). Therefore, in the first uncoated portion 146a, the height of the second portion B3 is smaller than the height of the uncoated portion of the other region. The second portion B3 is spaced apart from the inner circumference of the battery housing 142, particularly the beading portion 147, by a predetermined distance. Therefore, the second portion B3 of the first electrode does not come into contact with the battery housing 142 electrically connected to the second electrode, thereby preventing an internal short circuit of the battery 140.

The second uncoated portion 146b of the second electrode may have the same structure as the first uncoated portion 146a. In another modification, the second uncoated portion 146b may selectively have the uncoated portion structures of the electrodes according to the embodiments (modifications).

The sealing body 143 may include a cap 143a having a plate shape, a first gasket 143b for providing airtightness between the cap 143a and the battery housing 142 and having insulation, and a connection plate 143c electrically and mechanically coupled to the cap 143a.

The cap 143a is a component made of a conductive metal material, and covers the top opening of the battery housing 142. The cap 143a is electrically connected to the uncoated portion 146a of the first electrode, and is electrically insulated from the battery housing 142 by means of the first gasket 143b. Accordingly, the cap 143a may function as the first electrode (for example, positive electrode) of the cylindrical battery 140.

The cap 143a is placed on the beading portion 147 formed on the battery housing 142, and is fixed by a crimping portion 148. Between the cap 143a and the crimping portion 148, the first gasket 143b may be interposed to secure the airtightness of the battery housing 142 and the electrical insulation between the battery housing 142 and the cap 143a. The cap 143a may have a protrusion 143d protruding upward from the center thereof.

The battery housing 142 is electrically connected to the second uncoated portion 146b of the second electrode. Therefore, the battery housing 142 has the same polarity as the second electrode. If the second electrode has negative polarity, the battery housing 142 also has negative polarity.

The battery housing 142 includes the beading portion 147 and the crimping portion 148 at the top thereof. The beading portion 147 is formed by press-fitting the periphery of the outer circumferential surface of the battery housing 142. The beading portion 147 prevents the electrode assembly 141 accommodated inside the battery housing 142 from escaping through the top opening of the battery housing 142, and may function as a support portion on which the sealing body 143 is placed.

The inner circumference of the beading portion 147 may be spaced apart from the second portion B3 of the first electrode by a predetermined interval. More specifically, the lower end of the inner circumference of the beading portion 147 is separated from the second portion B3 of the first electrode by a predetermined interval. In addition, since the second portion B3 has a low height, the second portion B3 is not substantially affected even when the battery housing 142 is press-fitted at the outside to form the beading portion 147. Therefore, the second portion B3 is not pressed by other components such as the beading portion 147, and thus partial shape deformation of the electrode assembly 141 is prevented, thereby preventing a short circuit inside the cylindrical battery 140.

Preferably, when the press-fit depth of the beading portion 147 is defined as D1 and the radial length from the inner circumference of the battery housing 142 to the boundary point between the second portion B3 and the third portion B2 is defined as D2, the relational expression D1≤D2 may be satisfied. In this case, when press-fitting the battery housing 142 to form the beading portion 147, it is possible to substantially prevent the second portion B3 from being damaged.

The crimping portion 148 is formed on the beading portion 147. The crimping portion 148 has an extended and bent shape to cover the outer circumference of the cap 143a disposed on the beading portion 147 and a part of the upper surface of the cap 143a.

The cylindrical battery 140 may further include a first current collector 144 and/or a second current collector 145 and/or an insulator 146.

The first current collector 144 is coupled to the upper portion of the electrode assembly 141. The first current collector 144 is made of a conductive metal material such as aluminum, copper, steel, nickel and so on, and is electrically connected to the first uncoated portion 146a of the first electrode. The electric connection may be made by welding. A lead 149 may be connected to the first current collector 144. The lead 149 may extend upward above the electrode assembly 141 and be coupled to the connection plate 143c or directly coupled to the lower surface of the cap 143a. The lead 149 may be connected to other components by welding.

Preferably, the first current collector 144 may be integrally formed with the lead 149. In this case, the lead 149 may have an elongated plate shape extending outward from near the center of the first current collector 144.

The first current collector 144 may have a plurality of irregularities (not shown) formed radially on the lower surface thereof. When the radial irregularities are provided, the irregularities may be press-fitted into the first uncoated portion 146a of the first electrode by pressing the first current collector 144.

The first current collector 144 is coupled to an end of the first uncoated portion 146a. The first uncoated portion 146a and the first current collector 144 may be coupled by, for example, laser welding. Laser welding may be performed by partially melting a base material of the current collector 144. In one modification, the first current collector 144 and the first uncoated portion 146a may be welded with a solder interposed therebetween. In this case, the solder may have a lower melting point compared to the first current collector 144 and the first uncoated portion 146a. The laser welding may be replaced with resistance welding, ultrasonic welding, spot welding, or the like.

The second current collector 145 may be coupled to the lower surface of the electrode assembly 141. One side of the second current collector 145 may be coupled by welding to the second uncoated portion 146b, and the other side may be coupled to the inner bottom surface of the battery housing 142 by welding. The coupling structure between the second current collector 145 and the second uncoated portion 146b may be substantially the same as the coupling structure between the first current collector 144 and the first uncoated portion 146a.

The welding of the first current collector 144 and/or the second current collector 145 may prevent the electrodes from rotating when the electrode assembly 141 swells. In other words, the welding of the first current collector 144 and/or the second current collector 145 may enhance the effect of the winding structure of the electrode assembly to prevent or alleviate the collapse of the core. This effect appears identically in embodiments described later.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

The insulator 146 may cover the first current collector 144. The insulator 146 may cover the first current collector 144 at the upper surface of the first current collector 144, thereby preventing direct contact between the first current collector 144 and the inner circumference of the battery housing 142.

The insulator 146 has a lead hole 151 so that the lead 149 extending upward from the first current collector 144 may be withdrawn therethrough. The lead 149 is drawn upward through the lead hole 151 and coupled to the lower surface of the connection plate 143c or the lower surface of the cap 143a.

A peripheral region of the edge of the insulator 146 may be interposed between the first current collector 144 and the beading portion 147 to fix the coupled body of the electrode assembly 141 and the first current collector 144. Accordingly, the movement of the coupled body of the electrode assembly 141 and the first current collector 144 may be restricted in the winding axis direction Y of the battery 140, thereby improving the assembly stability of the battery 140.

The insulator 146 may be made of an insulating polymer resin. In one example, the insulator 146 may be made of polyethylene, polypropylene, polyimide, or polybutylene terephthalate.

The battery housing 142 may further include a venting portion 152 formed at a lower surface thereof. The venting portion 152 corresponds to a region having a smaller thickness compared to the peripheral region of the lower surface of the battery housing 142. The venting portion 152 is structurally weak compared to the surrounding area. Accordingly, when an abnormality occurs in the cylindrical battery 140 and the internal pressure increases to a predetermined level or more, the venting portion 152 may be ruptured so that the gas generated inside the battery housing 142 is discharged to the outside. The internal pressure at which the venting portion 152 is ruptured may be approximately 15 $kgf/cm^2$ to 35 $kgf/cm^2$.

The venting portion 152 may be formed continuously or discontinuously while drawing a circle at the lower surface of the battery housing 142. In one modification, the venting portion 152 may be formed in a straight pattern or other patterns.

Figure 25:
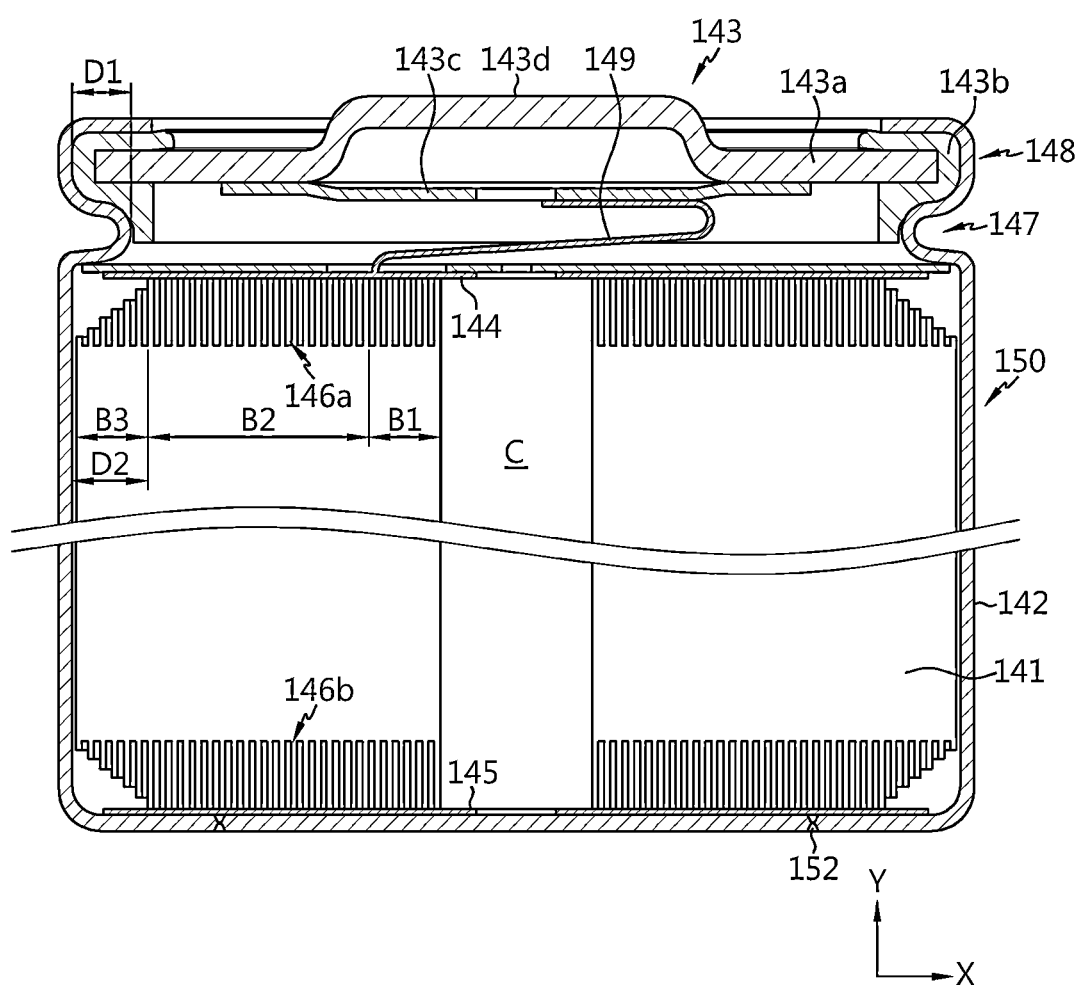
FIG. 25 is a sectional view showing a cylindrical battery according to another embodiment of the present disclosure, taken along the Y-axis direction.

FIG. 25 is a cross-sectional view showing a cylindrical battery 150 according to an embodiment of the present disclosure, taken along the Y-axis direction.

Referring to FIG. 25, the cylindrical battery 150 has substantially the same configuration as the cylindrical battery 140 of FIG. 24, except that the electrode structure of the second embodiment (modification) is adopted in the first uncoated portion 146a of the first electrode.

Referring to FIG. 25, the first uncoated portion 146a of the first electrode may have a shape in which the height of the second portion B3 gradually or stepwise decreases toward the inner circumference of the battery housing 142. Preferably, an imaginary line connecting the top of the second portion B3 may have the same or similar shape as the inner circumference of the beading portion 147.

The second portion B3 forms an inclined surface. Therefore, when the battery housing 142 is press-fitted to form the beading portion 147, the second portion B3 may be prevented from being compressed and damaged by the beading portion 147. In addition, it is possible to suppress a phenomenon in which the second portion B3 contacts the battery housing 142 having a different polarity and causes an internal short circuit.

The other configuration of the cylindrical battery 150 is substantially the same as the embodiment (modification) described above.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

Figure 26:
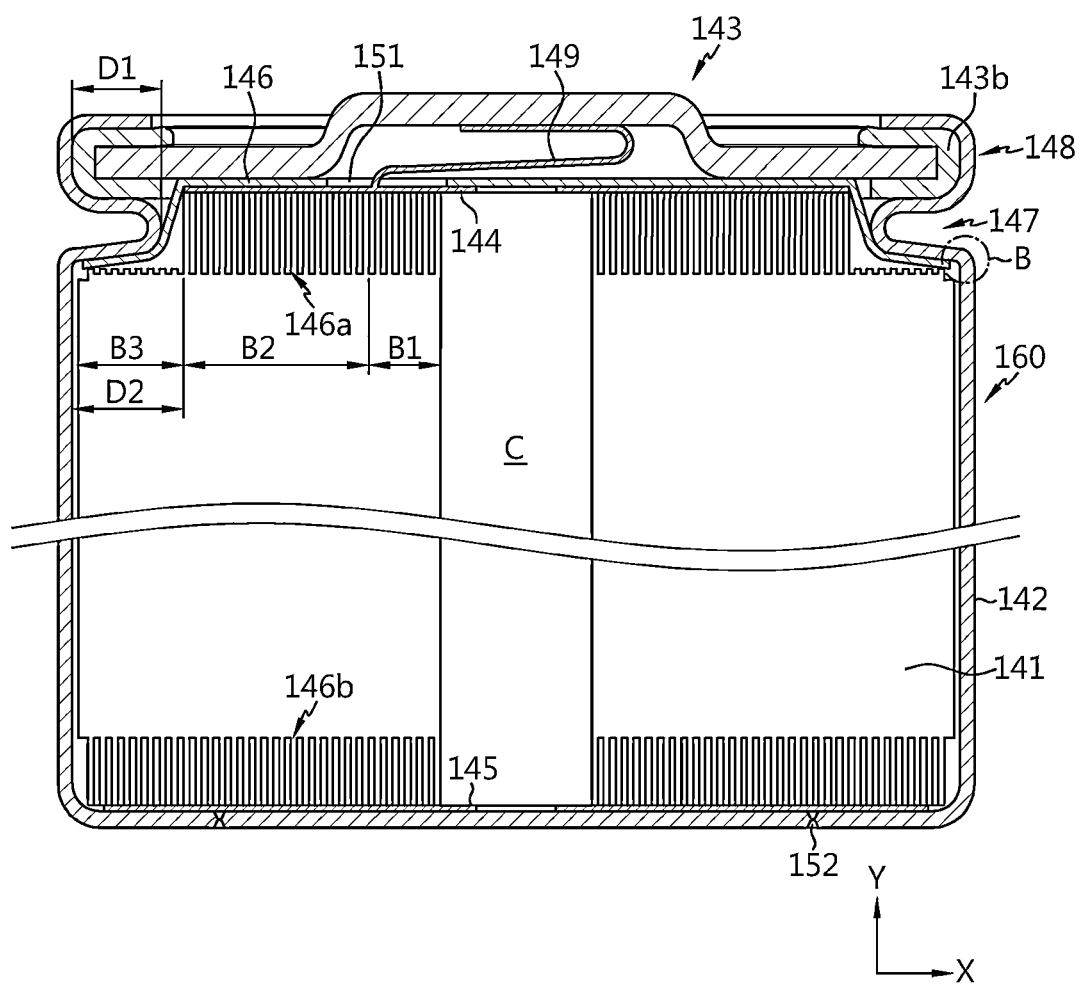
FIG. 26 is a cross-sectional view showing a cylindrical battery according to still another embodiment of the present disclosure, taken along the Y-axis direction.

FIG. 26 is a cross-sectional view showing a cylindrical battery 160 according to still another embodiment of the present disclosure, taken along the Y-axis direction.

Referring to FIG. 26, the cylindrical battery 160 is substantially the same as the cylindrical batteries 140, 150, described above, except that the lead 149 connected to the first current collector 144 is connected directly to the cap 143a of the sealing body 143 through the lead hole 151 of the insulator 146, and the insulator 146 and the first current collector 144 have a structure in close contact with the lower surface of the cap 143a.

In the cylindrical battery 160, the diameter of the first current collector 144 and the diameter of the outermost side of the third portion B2 are smaller than the minimum inner diameter of the battery housing 142. Also, the diameter of the first current collector 144 may be equal to or larger than the diameter of the outermost side of the third portion B2.

Specifically, the minimum inner diameter of the battery housing 142 may correspond to the inner diameter of the battery housing 142 at a position where the beading portion 147 is formed. At this time, the outermost diameters of the first current collector 144 and the third portion B2 are smaller than the inner diameter of the battery housing 142 at the position where the beading portion 147 is formed. Also, the diameter of the first current collector 144 may be equal to or larger than the outermost diameter of the third portion B2. The peripheral region of the edge of the insulator 146 may be interposed between the second portion B3 and the beading portion 147 in a state of being bent downward to fix the coupled body of the electrode assembly 141 and the first current collector 144.

Preferably, the insulator 146 includes a portion covering the second portion B3 and a portion covering the first current collector 144, and a portion connecting the two portions may have a curved shape corresponding to the curved shape of the beading portion 147. The insulator 146 may insulate the inner circumference of the second portion B3 and the beading portion 147 and at the same time insulate the first current collector 144 and the inner circumference of the beading portion 147.

The first current collector 144 may be located higher than the lower end of the beading portion 147 and may be coupled to the first portion B1 and the third portion B2. At this time, the press-fit depth D1 of the beading portion 147 is less than or equal to the distance D2 from the inner circumference of the battery housing 142 to the boundary between the second portion B3 and the third portion B2. Accordingly, the first portion B1 and the third portion B2 as well as the first current collector 144 coupled thereto may be located higher than the lower end of the beading portion 147. The lower end of the beading portion 147 means a bending point B between the portion of the battery housing 142 where the electrode assembly 141 is accommodated and the beading portion 147.

Since the first portion B1 and the third portion B2 occupy the inner space of the beading portion 147 in the radial direction, the empty space between the electrode assembly 141 and the cap 143a may be minimized. In addition, the connection plate 143c located in the empty space between the electrode assembly 141 and the cap 143a is omitted. Therefore, the lead 149 of the first current collector 144 may be directly coupled to the lower surface of the cap 143a. According to the above structure, the empty space in the battery is reduced, and the energy density may be maximized as much as the reduced empty space.

In the cylindrical battery 160, the first current collector 144 and the second current collector 145 may be welded to the ends of the first and second uncoated portions 146a, 146b, respectively, in the same manner as in the above embodiment.

The uncoated portions 146a, 146b are not limited to the illustrated structure. Accordingly, the uncoated portions 146a, 146b may selectively have a conventional uncoated portion structure as well as the electrode uncoated portion structure according to the embodiments (modifications).

Figure 27:
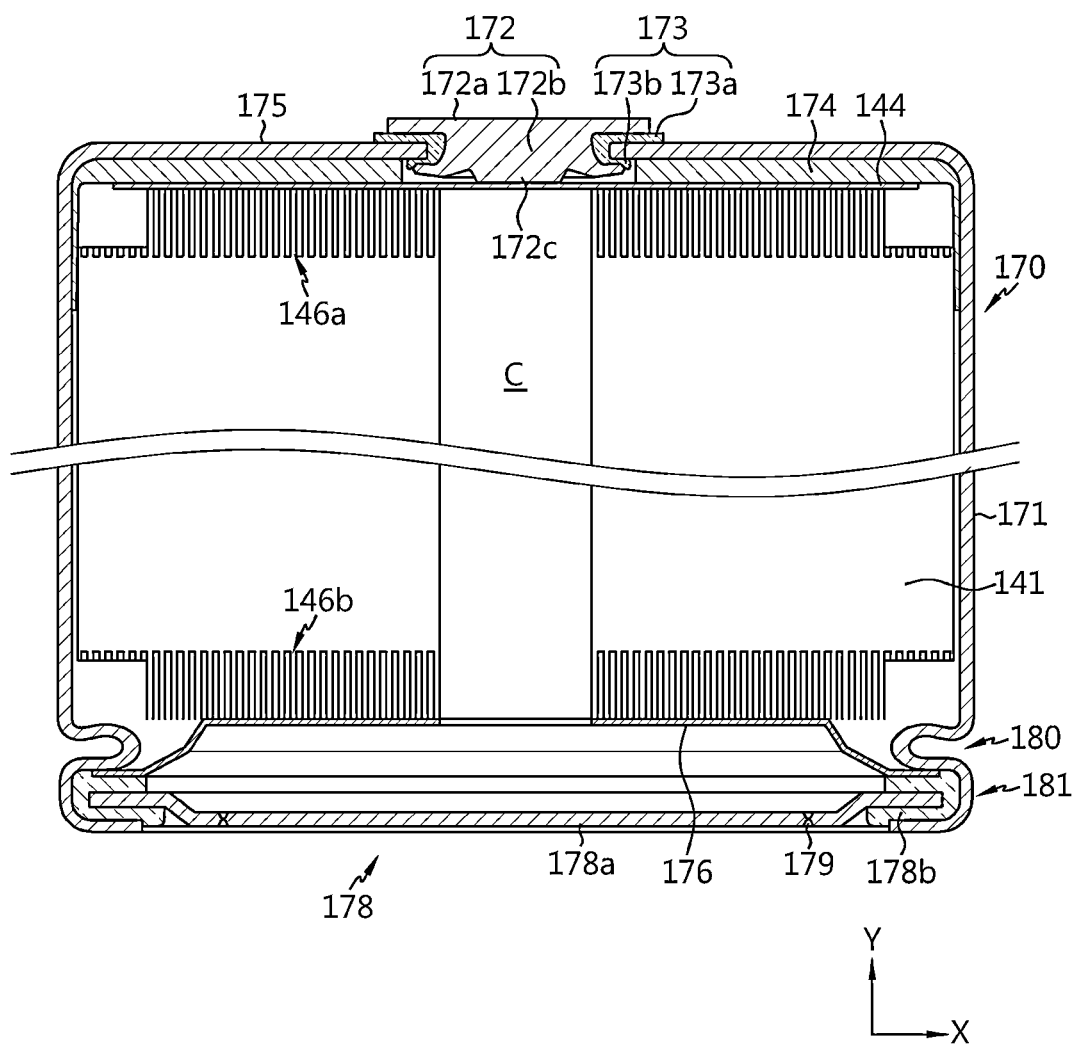
FIG. 27 is a cross-sectional view showing a cylindrical battery according to still another embodiment of the present disclosure, taken along the Y-axis direction.

FIG. 27 is a cross-sectional view showing a cylindrical battery 170 according to an embodiment of the present disclosure, taken along the Y-axis direction.

Referring to FIG. 27, the structure of the electrode assembly of the cylindrical battery 170 is substantially the same as that of the cylindrical battery 140 of in FIG. 17, and the other structure except for the electrode assembly is changed.

Specifically, the cylindrical battery 170 includes a battery housing 171 through which a terminal 172 is installed. The terminal 172 is installed through a perforation hole formed in the closed surface (the upper surface in the drawing) of the battery housing 171. The terminal 172 is riveted to the perforation hole of the battery housing 171 in a state where a second gasket 173 made of an insulating material is interposed therebetween. The terminal 172 is exposed to the outside in a direction opposite to the direction of gravity.

The terminal 172 includes a terminal exposing portion 172a and a terminal insert portion 172b. The terminal exposing portion 172a is exposed to the outside of the closed surface of the battery housing 171. The terminal exposing portion 172a may be located approximately at a central portion of the closed surface of the battery housing 171. The maximum diameter of the terminal exposing portion 172a may be larger than the maximum diameter of the perforation hole formed in the battery housing 171. The terminal insert portion 172b may be electrically connected to the uncoated portion 146a of the first electrode through approximately the central portion of the closed surface of the battery housing 171. The lower edge of the terminal insert portion 172b may be riveted onto the inner surface of the battery housing 171. That is, the lower edge of the terminal insert portion 172b may have a shape curved toward the inner surface of the battery housing 171. A flat portion 172c is included at the inner side of the lower edge of the terminal insert portion 172b. The maximum diameter of the lower portion of the riveted terminal insert portion 172b may be larger than the maximum diameter of the perforation hole of the battery housing 171.

The flat portion 172c of the terminal insert portion 172b may be welded to the center portion of the first current collector 144 connected to the first uncoated portion 146a of the first electrode. The welding may be replaced with other welding methods such as ultrasonic welding.

An insulator 174 made of an insulating material may be interposed between the first current collector 144 and the inner surface of the battery housing 171. The insulator 174 covers the upper portion of the first current collector 144 and the top edge of the electrode assembly 141. Accordingly, it is possible to prevent the second portion B3 of the electrode assembly 141 from contacting the inner surface of the battery housing 171 having a different polarity to cause a short circuit.

The thickness of the insulator 174 corresponds to or is slightly greater than the distance between the upper surface of the first current collector 144 and the inner surface of the closed portion of the battery housing 171. Accordingly, the insulator 174 may contact the upper surface of the first current collector 144 and the inner surface of the closed portion of the battery housing 171.

The terminal insert portion 172b of the terminal 172 may be welded to the first current collector 144 through the perforation hole of the insulator 174. A diameter of the perforation hole formed in the insulator 174 may be larger than a diameter of the riveting portion at the lower end of the terminal insert portion 172b. Preferably, the perforation hole may expose the lower portion of the terminal insert portion 172b and the second gasket 173.

The second gasket 173 is interposed between the battery housing 171 and the terminal 172 to prevent the battery housing 171 and the terminal 172 having opposite polarities from electrically contacting each other. Accordingly, the upper surface of the battery housing 171 having an approximately flat shape may function as the second electrode (for example, negative electrode) of the cylindrical battery 170.

The second gasket 173 includes a gasket exposing portion 173a and a gasket insert portion 173b. The gasket exposing portion 173a is interposed between the terminal exposing portion 172a of the terminal 172 and the battery housing 171. The gasket insert portion 173b is interposed between the terminal insert portion 172b of the terminal 172 and the battery housing 171. The gasket insert portion 173b may be deformed together when the terminal insert portion 172b is riveted, so as to be in close contact with the inner surface of the battery housing 171. The second gasket 173 may be made of, for example, a polymer resin having insulation property.

The gasket exposing portion 173a of the second gasket 173 may have an extended shape to cover the outer circumference of the terminal exposing portion 172a of the terminal 172. When the second gasket 173 covers the outer circumference of the terminal 172, it is possible to prevent a short circuit from occurring while an electrical connection part such as a bus bar is coupled to the upper surface of the battery housing 171 and/or the terminal 172. Although not shown in the drawings, the gasket exposing portion 173a may have an extended shape to cover not only the outer circumference surface of the terminal exposing portion 172a but also a part of the upper surface thereof.

When the second gasket 173 is made of a polymer resin, the second gasket 173 may be coupled to the battery housing 171 and the terminal 172 by thermal fusion. In this case, airtightness at the coupling interface between the second gasket 173 and the terminal 172 and at the coupling interface between the second gasket 173 and the battery housing 171 may be enhanced. Meanwhile, when the gasket exposing portion 173a of the second gasket 173 has a shape extending to the upper surface of the terminal exposing portion 172a, the terminal 172 may be integrally coupled with the second gasket 173 by insert injection molding.

In the upper surface of the battery housing 171, a remaining area or part 175 other than the area occupied by the terminal 172 and the second gasket 173 corresponds to the second electrode terminal having a polarity opposite to that of the terminal 172.

The second current collector 176 is coupled to the lower portion of the electrode assembly 141. The second current collector 176 is made of a conductive metal material such as aluminum, steel, copper or nickel, and is electrically connected to the second uncoated portion 146b of the second electrode.

Preferably, the second current collector 176 is electrically connected to the battery housing 171. To this end, at least a portion of the edge of the second current collector 176 may be interposed and fixed between the inner surface of the battery housing 171 and a first gasket 178b. In one example, at least a portion of the edge of the second current collector 176 may be fixed to the beading portion 180 by welding in a state of being supported on the lower surface of the beading portion 180 formed at the bottom of the battery housing 171. In one modification, at least a portion of the edge of the second current collector 176 may be directly welded to the inner wall surface of the battery housing 171.

The second current collector 176 may include a plurality of irregularities (not shown) radially formed on a surface facing the second uncoated portion 146b. When the irregularities are formed, the irregularities may be press-fitted into the second uncoated portion 146b by pressing the second current collector 176.

Preferably, the second current collector 176 and the second uncoated portion 146b may be coupled by welding, for example laser welding. In addition, the welded portion of the second current collector 176 and the second uncoated portion 146b may be spaced apart by a predetermined interval toward the core C based on the inner circumference of the beading portion 180.

A sealing body 178 for sealing the lower open end of the battery housing 171 includes a cap 178a having a plate shape and a first gasket 178b. The first gasket 178b electrically separates the cap 178a and the battery housing 171. A crimping portion 181 fixes the edge of the cap 178a and the first gasket 178b together. The cap 178a has a venting portion 179. The configuration of the venting portion 179 is substantially the same as the above embodiment (modification). The lower surface of the cap 178a may be located above the lower end of the crimping portion 181. In this case, a space is formed under the cap 178a to smoothly perform venting. In particular, it is useful when the cylindrical battery 170 is installed so that the crimping portion 181 faces the direction of gravity.

Preferably, the cap 178a is made of a conductive metal material. However, since the first gasket 178b is interposed between the cap 178a and the battery housing 171, the cap 178a does not have electrical polarity. The sealing body 178 seals the open end of the lower portion of the battery housing 171 and mainly functions to discharge gas when the internal pressure of the battery 170 increases over a critical value. A threshold value of the pressure is 15 kgf/cm$^2$ to 35 kgf/cm$^2$.

Preferably, the terminal 172 electrically connected to the first uncoated portion 146a of the first electrode is used as the first electrode terminal. In addition, in the upper surface of the battery housing 171 electrically connected to the second uncoated portion 146b of the second electrode through the second current collector 176, a part 175 except for the terminal 172 is used as the second electrode terminal having a different polarity from the first electrode terminal. If two electrode terminals are located at the upper portion of the cylindrical battery 170 as above, it is possible to arrange electrical connection components such as bus bars at only one side of the cylindrical battery 170. This may bring about simplification of the battery pack structure and improvement of energy density. In addition, since the part 175 used as the second electrode terminal has an approximately flat shape, a sufficient connection area may be secured for connecting electrical connection components such as bus bars. Accordingly, the cylindrical battery 170 may reduce the resistance at the connection portion of the electrical connection components to a desirable level.

Meanwhile, the structure of the electrode assembly 141 and the structure of the uncoated portion are not limited to those shown, and may be replaced with structures of the above embodiments (modifications).

Figure 28:
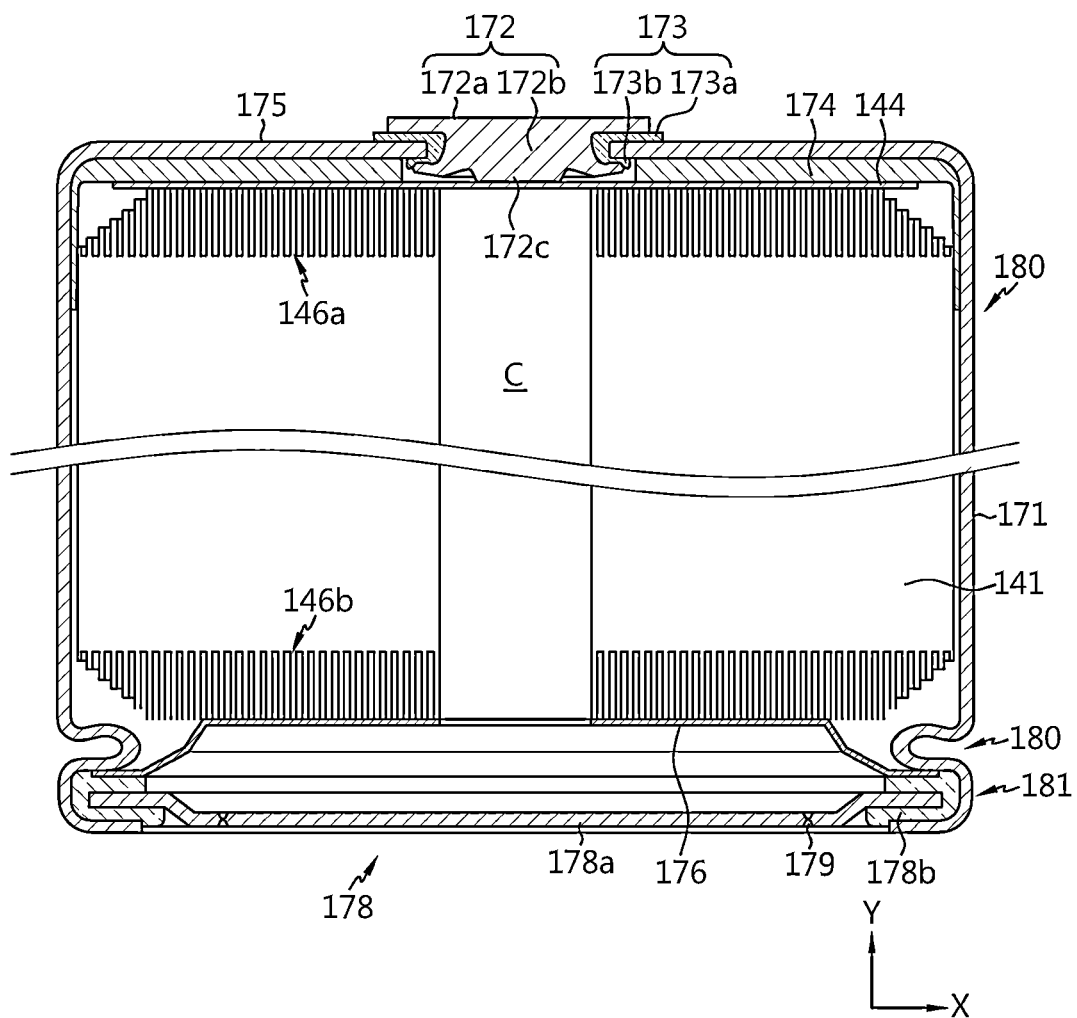
FIG. 28 is a cross-sectional view showing a cylindrical battery according to still another embodiment of the present disclosure, taken along the Y-axis direction.

FIG. 28 is a cross-sectional view showing a cylindrical battery 180 according to still another embodiment of the present disclosure, taken along the Y-axis direction.

Referring to FIG. 28, the electrode assembly 141 of the cylindrical battery 180 has substantially the same structure as that of the cylindrical battery 150 shown in FIG. 25, and the other configuration than the electrode assembly 141 is substantially the same as that of the cylindrical battery 170 shown in FIG. 27.

Accordingly, the configuration of the embodiments (modifications) of the cylindrical batteries 150, 170 may be equally applied to the cylindrical battery 180.

In addition, the structure of the electrode assembly 141 and the structure of the uncoated portion are not limited to those shown, and may be replaced with structures of the above embodiments (modifications).

Figure 29:
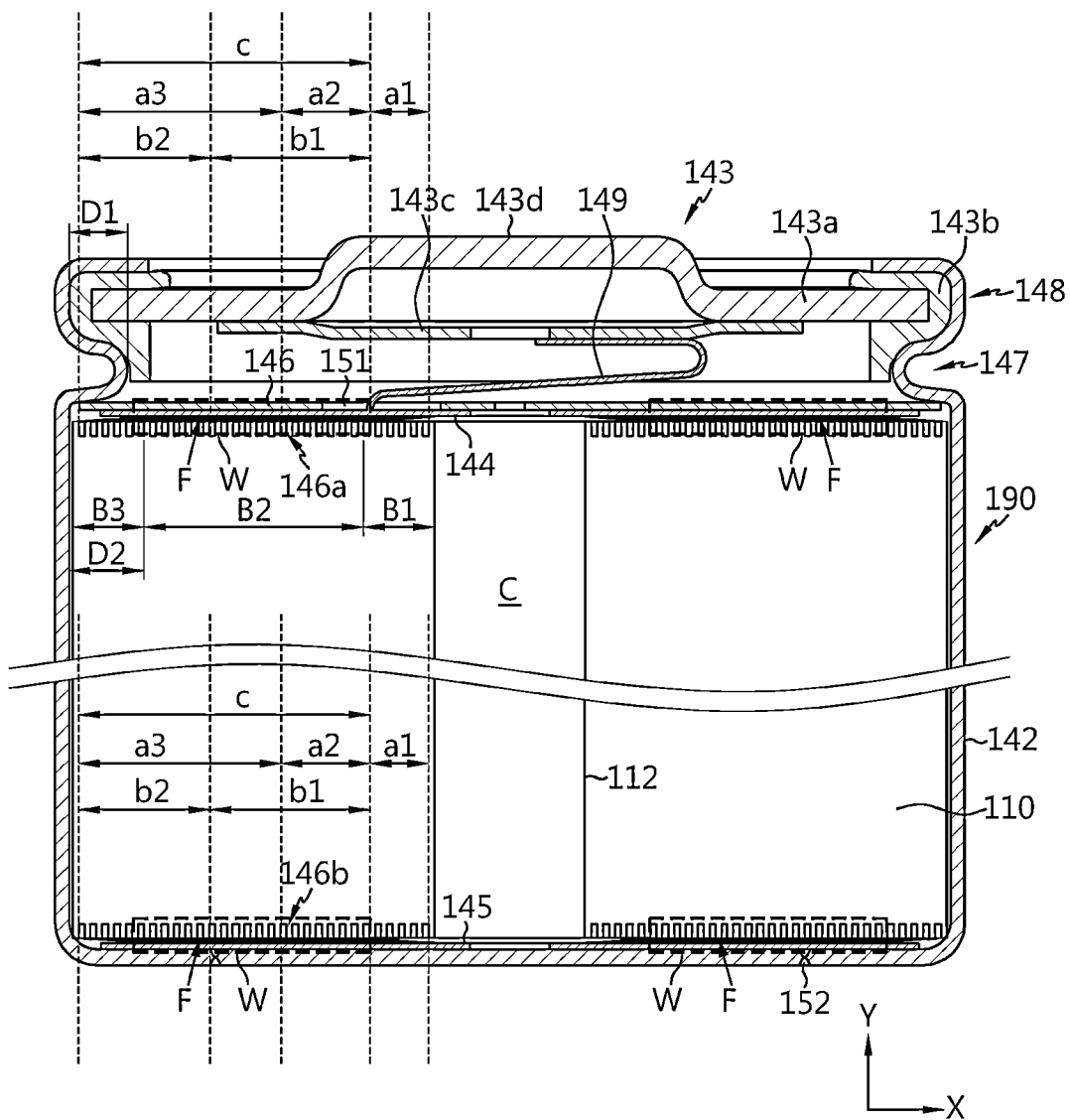
FIG. 29 is a cross-sectional view showing a cylindrical battery according to still another embodiment of the present disclosure, taken along the Y-axis direction.

FIG. 29 is a cross-sectional view showing a cylindrical battery 190 according to still another embodiment of the present disclosure, taken along the Y-axis direction.

Referring to FIG. 29, the cylindrical battery 190 includes the electrode assembly 110 shown in FIG. 21, and other configurations except for the electrode assembly 110 are substantially the same as those of the cylindrical battery 140 shown in FIG. 24. Accordingly, the configuration described with reference to FIGS. 21 and 24 may be substantially equally applied to this embodiment.

Referring to FIGS. 17a and 29, the first and second uncoated portions 146a, 146b of the electrode assembly 110 are bent in the radial direction of the electrode assembly 110, for example from the outer circumference toward the core, to form a bending surface region F.

The first portion B1 has a lower height than the other portion and corresponds to segment skip region a1 with no segment, so it is not bent toward the core.

Preferably, the bending surface region F may include the segment skip region a1, the segment height variable region a2, and the segment height uniform region a3 from the core toward the outer circumference.

As shown in FIGS. 17c, 17d, and 17e, the bending surface region F includes a stack number uniform region b1 having a stack number of 10 or more adjacent to the segment skip region a1.

The bending surface region F may also include a stack number decrease region b2 adjacent to the outer circumference of the electrode assembly 110, where the stack number of segments decreases toward the outer circumference. Preferably, the stack number uniform region b1 may be set as a welding target area.

In the bending surface region F, the preferred numerical ranges of the ratio (a2/c) of the height variable region a2 to the radial region c containing segments, the ratio (b1/c) of the stack number uniform region b1 to the radial region c containing segments, and the ratio of the area of the stack number uniform region b1 to the area of the bending surface region F are already described above, and thus will not be described again.

The first current collector 144 may be laser-welded to the bending surface region F of the first uncoated portion 146a, and the second current collector 145 may be laser-welded to the bending surface region F of the second uncoated portion 146b. The welding method may be replaced by ultrasonic welding, resistance welding, spot welding, and the like.

Preferably, an area of 50% or more of the welding regions W of the first current collector 144 and the second current collector 145 may overlap with the stack number uniform region b1 of the bending surface region F. Optionally, the remaining area of the welding region W may overlap with the stack number decrease region b2 of bending surface region F. In terms of high welding strength, low resistance of the welding interface, and prevention of damage to the separator or the active material layer, it is more preferable that the entire welding region W overlaps the stack number uniform region b1.

Preferably, in the stack number uniform region b1 and, optionally, the stack number decrease region b2 overlapping with the welding region W, the stack number of segments may be 10 to 35.

Optionally, when the segment stack number of the stack number decrease region b2 overlapping with the welding region W is less than 10, the laser output for welding of the stack number decrease region b2 may be lowered than the laser output for welding of the stack number uniform region b1. That is, when the welding region W overlaps with the stack number uniform region b1 and the stack number decrease region b2 at the same time, the laser output may be varied according to the stack number of segments. In this case, the welding strength of the stack number uniform region b1 may be greater than the welding strength of the stack number decrease region b2.

In the bending surface region F formed on the upper portion and the lower portion of the electrode assembly 110, the radial length of the segment skip region a1 and/or the segment height variable region a2 and/or the segment height uniform region a3 may be the same or different.

In the electrode assembly 110, the first portion B1 has a relatively smaller height than other portions. In addition, as shown in FIG. 21, the bending length H of the uncoated portion located at the innermost side is smaller than the sum of the radial length R of the first portion B1 and 10% of the radius of the core 112.

Therefore, even if the first uncoated portion 146a is bent toward the core, 90% or more of the diameter of the core 112 of the electrode assembly 110 may be open to the outside. If the core 112 is not blocked, there is no difficulty in the electrolyte injection process, and the electrolyte injection efficiency is improved. In addition, by inserting a welding jig through the core 112, the welding process may be easily performed between the second current collector 145 and the battery housing 142.

In the case where the uncoated portions 146a, 146b have a segment structure, if the width and/or height and/or separation pitch of the segments is adjusted to satisfy the numerical range of the above embodiment, when the segments are bent, the segments are overlapped in several layers enough to secure sufficient welding strength, and an empty hole (gap) is not formed in the bending surface region F.

Preferably, the first current collector 144 and the second current collector 145 may have outer diameters covering the end of the segment 61, 61' (FIG. 17f) bent at the last winding turn of the height uniform region a3 of the first electrode and the second electrode. In this case, welding is possible in a state while the segments forming the bending surface region F are uniformly pressed by the current collector, and the tightly stacked state of the segments may be well maintained even after welding. The tightly stacked state means a state where there is substantially no gap between the segments as shown in FIG. 17a. The tightly stacked state contributes to lowering the resistance of the cylindrical battery 190 to a level suitable for rapid charging (for example, 4 milliohms) or less.

If the first current collector 144 and/or the second current collector 145 is welded to the surface region F, it is possible to prevent the electrodes from rotating when the electrode assembly 110 swells. In other words, the welding of the first current collector 144 and/or the second current collector 145 may enhance the effect of the winding structure of the electrode assembly to prevent or alleviate the collapse of the core.

The structure of the uncoated portions 146a, 146b may be changed to the structure according to the above embodiments (modifications). In addition, a conventional uncoated portion structure may be applied to any one of the uncoated portions 146a, 146b without limitation.

Figure 30:
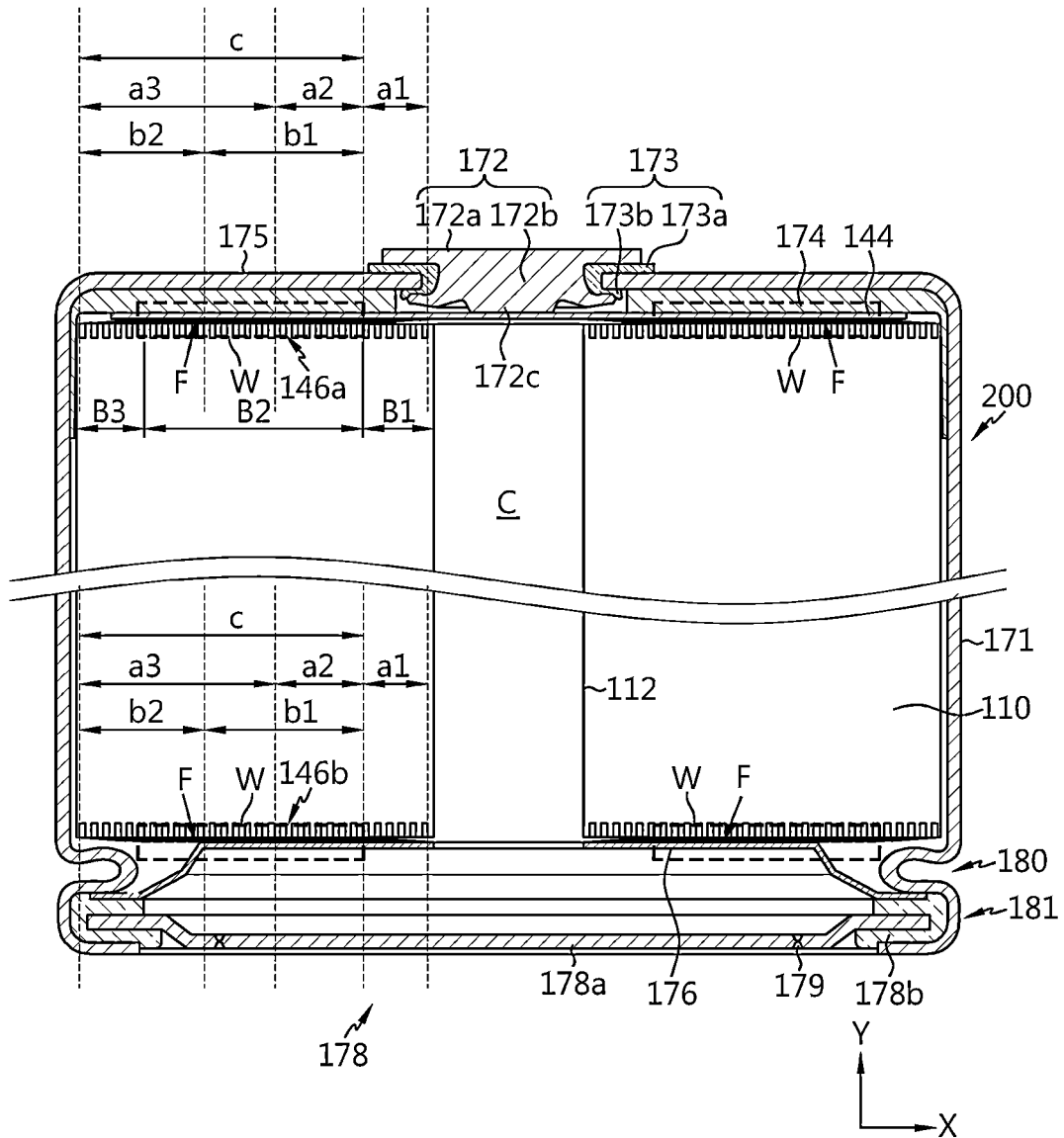
FIG. 30 is a cross-sectional view showing a cylindrical battery according to still another embodiment of the present disclosure, taken along the Y-axis direction.

FIG. 30 is a cross-sectional view showing a cylindrical battery 200 according to still another embodiment of the present disclosure, taken along the Y-axis direction.

Referring to FIG. 30, the cylindrical battery 200 includes the electrode assembly 110 shown in FIG. 21, and other configurations except for the electrode assembly 110 are substantially the same as those of the cylindrical battery 180 shown in FIG. 28. Accordingly, the configuration described with reference to FIGS. 21 and 28 may be substantially equally applied to this embodiment.

As shown in FIGS. 17a and 30, the first and second uncoated portions 146a, 146b of the electrode assembly 110 are bent in the radial direction of the electrode assembly 110, for example from the outer circumference toward the core, to form the bending surface region F.

The first portion B1 has a lower height than the other portion and corresponds to the segment skip region a1 with no segment, so it is not bent toward the core.

Preferably, the bending surface region F may include a segment skip region a1, a segment height variable region a2, and a segment height uniform region a3 from the core toward the outer circumference.

As shown in FIGS. 17c, 17d and 17e, the bending surface region F includes a stack number uniform region b1 having the stack number of 10 or more adjacent to the segment skip region a1.

The bending surface region F may also include a stack number decrease region b2 adjacent to the outer circumference of the electrode assembly 110, where the stack number of segments decreases toward the outer circumference. Preferably, the stack number uniform region b1 may be set as a welding target area.

In the bending surface region F, the preferred numerical ranges of the ratio (a2/c) of the segment height variable region a2 to the radial region c including the segments, the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be laser-welded to the bending surface region F of the first uncoated portion 146a, and the second current collector 176 may be laser-welded to the bending surface region F of the second uncoated portion 146b. The welding method may be replaced by ultrasonic welding, resistance welding, spot welding, and the like. The welding region W between the second current collector 176 and the second uncoated portion 146b may be spaced apart from the inner surface of the beading portion 180 by a predetermined interval.

Preferably, an area of 50% or more of the welding regions W of the first current collector 144 and the second current collector 176 may overlap with the stack number uniform region b1 of the bending surface region F. Optionally, the remaining area of the welding region W may overlap with the stack number decrease region b2 of the bending surface region F. In terms of high welding strength, low resistance of the welding interface, and prevention of damage to the separator or the active material layer, it is more preferable that the entire welding region W overlaps with the stack number uniform region b1.

Preferably, in the stack number uniform region b1 and, optionally, the stack number decrease region b2 overlapping with the welding region W, the stack number of segments may be 10 to 35.

Optionally, when the segment stack number of the stack number decrease region b2 overlapping with the welding region W is less than 10, the laser output for welding of the stack number decrease region b2 may be lowered than the laser output for welding of the stack number uniform region b1. That is, when the welding region W overlaps with the stack number uniform region b1 and the stack number decrease region b2 at the same time, the laser output may be varied according to the stack number of segments. In this case, the welding strength of the stack number uniform region b1 may be greater than the welding strength of the stack number decrease region b2.

In the bending surface region F formed on the upper portion and the lower portion of the electrode assembly 110, the radial length of the segment skip region a1 and/or the segment height variable region a2 and/or the segment height uniform region a3 may be the same or different.

In the electrode assembly 110, the first portion B1 has a relatively smaller height than other portions. In addition, as shown in FIG. 21, the bending length H of the segment located at the innermost side is smaller than the sum of the radial length R of the first portion B1 and 10% of the radius of the core 112.

Therefore, even if the uncoated portion 146a is bent toward the core, 90% or more of the diameter of the core 112 of the electrode assembly 110 may be open to the outside. If the core 112 is not blocked, there is no difficulty in the electrolyte injection process, and the electrolyte injection efficiency is improved. In addition, by inserting a welding jig through the core 112, the welding process may be easily performed between the first current collector 144 and the terminal 172.

In the case where the uncoated portions 146a, 146b have a segment structure, if the width and/or height and/or separation pitch of the segments is adjusted to satisfy the numerical range of the above embodiment, when the segments are bent, the segments are overlapped in several layers enough to secure sufficient welding strength, and an empty hole (gap) is not formed in the bending surface region F.

Preferably, the area of the first current collector 144 and the second current collector 176 in contact with the first and second uncoated portions 146a, 146 may have outer diameters covering the end of the segment 61, 61' (FIG. 17f) bent at the last winding turn of the height uniform region a3 of the first electrode and the second electrode. In this case, welding is possible in a state while the segments forming the bending surface region F are uniformly pressed by the current collector, and the tightly stacked state of the segments may be well maintained even after welding. The tightly stacked state means a state where there is substantially no gap between the segments as shown in FIG. 17a. The tightly stacked state contributes to lowering the resistance of the cylindrical battery 200 to a level suitable for rapid charging (for example, 4 milliohms) or less.

If the first current collector 144 and/or the second current collector 145 is welded to the surface region F, it is possible to prevent the electrodes from rotating when the electrode assembly 110 swells. In other words, the welding of the first current collector 144 and/or the second current collector 145 may enhance the effect of the winding structure of the electrode assembly to prevent or alleviate the collapse of the core.

The structure of the uncoated portions 146a, 146b may be changed to the structure according to the above embodiments (modifications). In addition, a conventional uncoated portion structure may be applied to any one of the uncoated portions 146a, 146b without limitation.

Figure 31:
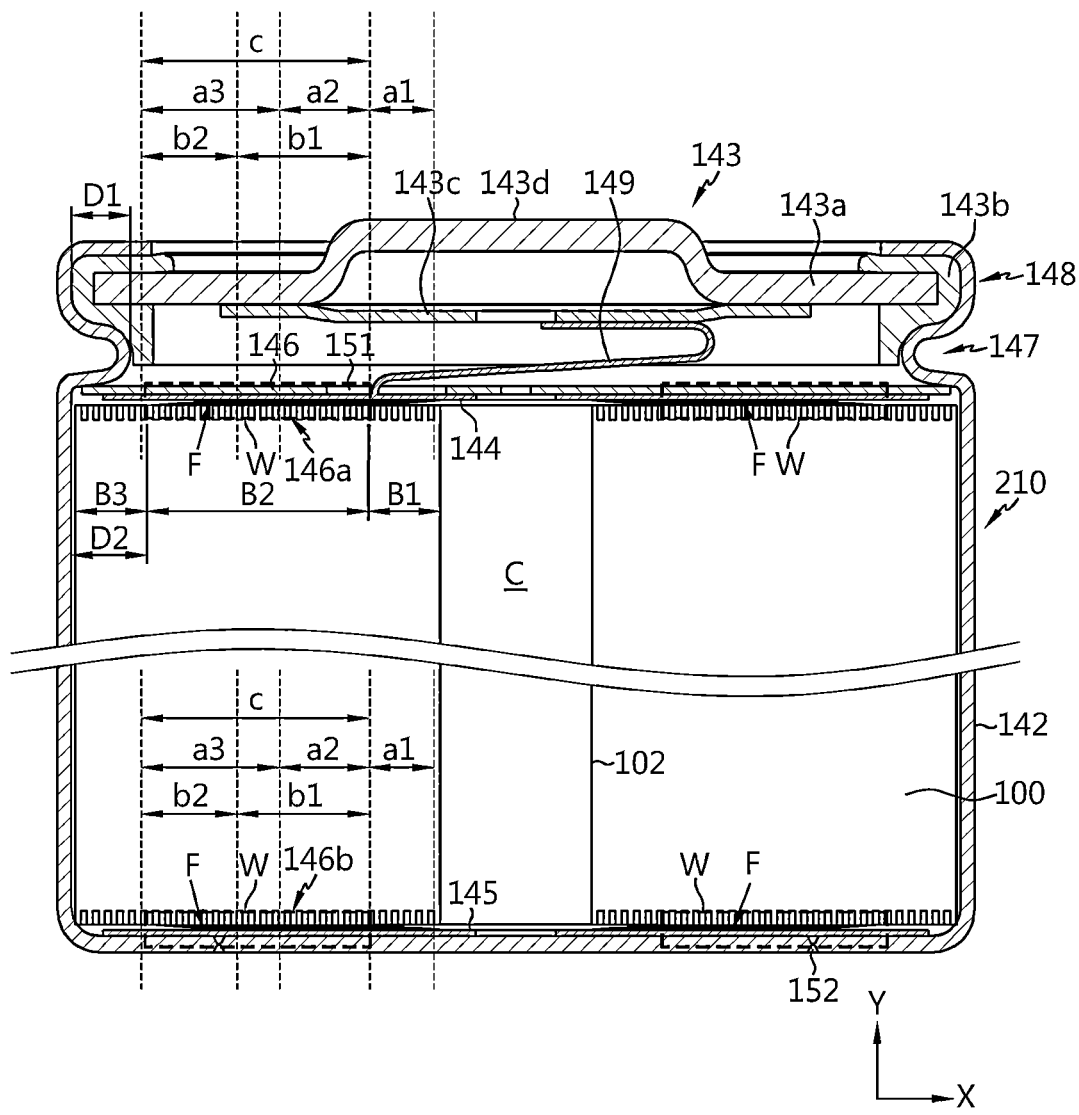
FIG. 31 is a cross-sectional view showing a cylindrical battery according to still another embodiment of the present disclosure, taken along the Y-axis direction.

FIG. 31 is a cross-sectional view showing a cylindrical battery 210 according to an embodiment of the present disclosure, taken along the Y-axis direction.

Referring to FIG. 31, the cylindrical battery 210 includes the electrode assembly 100 shown in FIG. 20, and other components except for the electrode assembly 100 are substantially the same as those of the cylindrical battery 140 shown in FIG. 24. Accordingly, the configuration described with reference to FIGS. 20 and 24 may be substantially equally applied to this embodiment.

Preferably, the first and second uncoated portions 146a, 146b of the electrode assembly 100 are divided into a plurality of segments, and the segments are bent in the radial direction of the electrode assembly 100, for example from the outer circumference toward the core. At this time, since the first portion B1 of the first uncoated portion 146a and the second portion B3 have a lower height than the other portions and do not include segments, they are not substantially bent. This is also identical in the case of the second uncoated portion 146b.

Also in this embodiment, the bending surface region F may include a segment skip region a1, a segment height variable region a2, and a segment height uniform region a3 from the core toward the outer circumference. However, since the second portion B3 is not bent, the radial length of the bending surface region F may be shorter than in the case of the above embodiment.

As shown in FIGS. 17c, 17d and 17e, the bending surface region F includes a stack number uniform region b1 having the stack number of 10 or more adjacent to the segment skip region a1.

The bending surface region F may also include a stack number decrease region b2 adjacent to the second portion B3 of the electrode assembly 100, in which the stack number of segments decreases toward the outer circumference. Preferably, the stack number uniform region b1 may be set as a welding target area.

In the bending surface region F, the preferred numerical range of the ratio (a2/c) of the segment height variable region a2 to the radial region c including the segments, the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be welded to the bending surface region F of the first uncoated portion 146a, and the second current collector 145 may be welded to the bending surface region F of the second uncoated portion 146b.

The overlapping relationship between the stack number uniform region b1 and the stack number decrease region b2 and the welding region W, the outer diameters of the first current collector 144 and the first current collector 145, and the configuration in which the first portion B1 does not block 10% or more of the diameter of the core are substantially the same as described above.

Meanwhile, the second portion B3 does not include segments, and the height of the second portion B3 is lower than that of the third portion B2. Therefore, when the first uncoated portion 146a is bent, the second portion B3 is not substantially bent. In addition, since the second portion B3 is sufficiently spaced from the beading portion 147, the problem of damage to the second portion B3 may be solved while the beading portion 147 is press-fitted.

If the first current collector 144 and/or the second current collector 145 is welded to the surface region F, it is possible to prevent the electrodes from rotating when the electrode assembly 100 swells. In other words, the welding of the first current collector 144 and/or the second current collector 145 may enhance the effect of the winding structure of the electrode assembly to prevent or alleviate the collapse of the core.

The structure of the uncoated portions 146a, 146b may be changed to the structure according to the above embodiments (modifications). In addition, a conventional uncoated portion structure may be applied to any one of the uncoated portions 146a, 146b without limitation.

Figure 32:
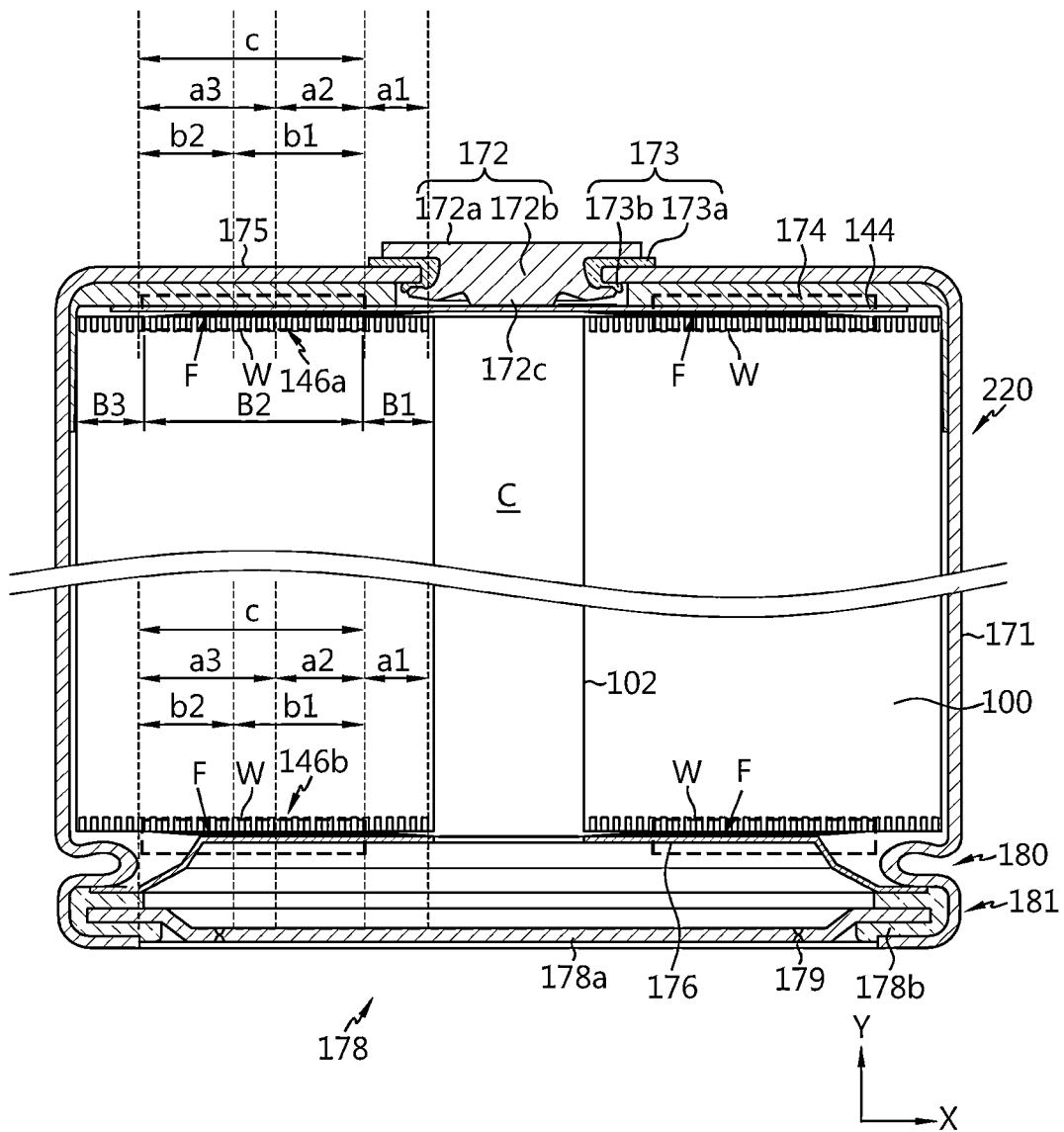
FIG. 32 is a cross-sectional view showing a cylindrical battery according to still another embodiment of the present disclosure, taken along the Y-axis direction.

FIG. 32 is a cross-sectional view showing a cylindrical battery 220 according to an embodiment of the present disclosure, taken along the Y-axis direction.

Referring to FIG. 32, the cylindrical battery 220 includes the electrode assembly 100 shown in FIG. 31, and other components except for the electrode assembly 100 are substantially the same as those of the cylindrical battery 180 shown in FIG. 28. Accordingly, the configuration described with reference to FIGS. 28 and 31 may be substantially equally applied to this embodiment.

Preferably, the first and second uncoated portions 146a, 146b of the electrode assembly 100 are divided into a plurality of segments, and are bent from the outer circumference toward the core. At this time, since the first portion B1 of the first uncoated portion 146a and the second portion B3 have a lower height than the other portions and do not include segments, they are not substantially bent. This is also identical in the case of the second uncoated portion 146b.

Therefore, in this embodiment, similar to the embodiment of FIG. 31, the bending surface region F may include a segment skip region a1, a segment height variable region a2, and a segment height uniform region a3 from the core toward the outer circumference. However, since the second portion B3 is not bent, the radial length of the bending surface region F may be shorter than in the case of the above embodiment.

As shown in FIGS. 17c, 17d and 17e, the bending surface region F includes a stack number uniform region b1 having the stack number of 10 or more adjacent to the segment skip region a1.

The bending surface region F may also include a stack number decrease region b2 adjacent to the second portion B3 of the electrode assembly 110, in which the stack number of segments decreases toward the outer circumference. Preferably, the stack number uniform region b1 may be set as a welding target area.

In the bending surface region F, the preferred numerical range of the ratio (a2/c) of the segment height variable region a2 to the radial region c including the segments, the ratio (b1/c) of the segment stack number uniform region b1 to the radial region c including the segments, and the ratio of the area of the stack number uniform region b1 to the area of the bending surface region F are already described above and thus will not be described again.

The first current collector 144 may be welded to the bending surface region F of the first uncoated portion 146a, and the second current collector 176 may be welded to the bending surface region F of the second uncoated portion 146b.

The overlapping relationship between the stack number uniform region b1 and the stack number decrease region b2 and the welding region W, the outer diameters of the first current collector 144 and the first current collector 176, and the configuration in which the first portion B1 does not block 10% or more of the diameter of the core are substantially the same as described above.

If the first current collector 144 and/or the second current collector 145 is welded to the surface region F, it is possible to prevent the electrodes from rotating when the electrode assembly 100 swells. In other words, the welding of the first current collector 144 and/or the second current collector 145 may enhance the effect of the winding structure of the electrode assembly to prevent or alleviate the collapse of the core.

The structure of the uncoated portions 146a, 146b may be changed to the structure according to the above embodiments (modifications). In addition, a conventional uncoated portion structure may be applied to any one of the uncoated portions 146a, 146b without limitation.

Figure 33:
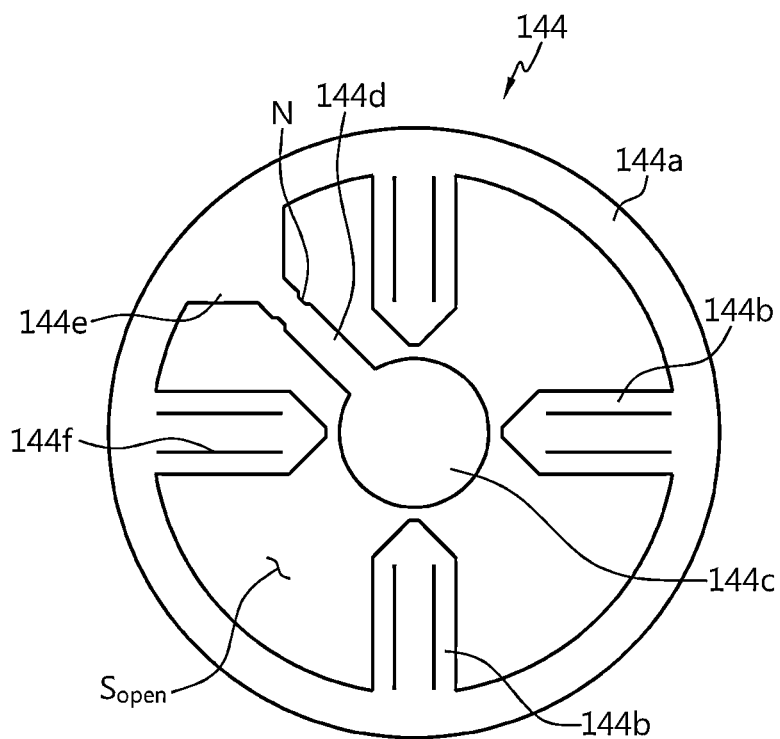
FIG. 33 is a top plan view showing a structure of a first current collector according to an embodiment of the present disclosure.
Figure 34:
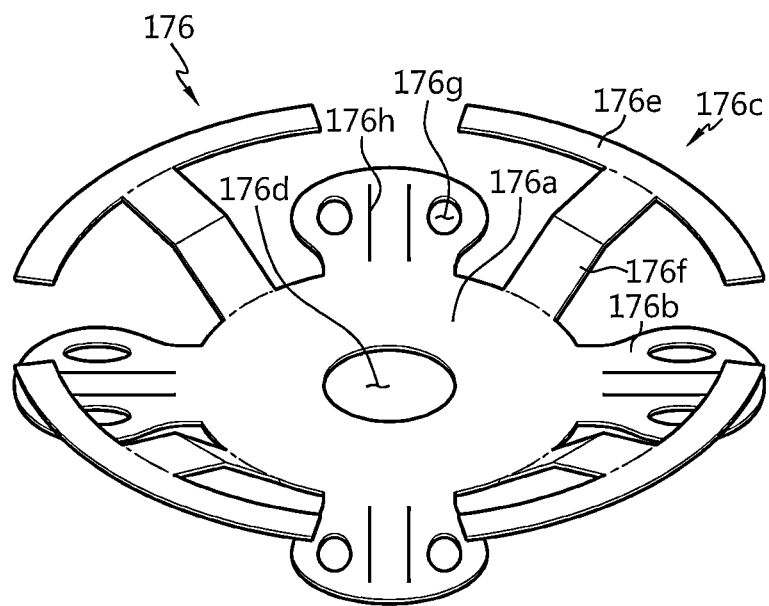
FIG. 34 is a perspective view showing a structure of a second current collector according to an embodiment of the present disclosure.

In the embodiments (modifications), the first current collector 144 and the second current collector 176 included in the cylindrical batteries 170, 180, 200, 220 including the terminal 172 may have an improved structure as shown in FIGS. 33 and 34.

The improved structure of the first current collector 144 and the second current collector 176 may contribute to lowering the resistance of the cylindrical battery, improving vibration resistance, and improving energy density. In particular, the first current collector 144 and the second current collector 176 are more effective when used in a large cylindrical battery whose ratio of diameter to height is greater than 0.4.

FIG. 33 is a top plan view showing the structure of the first current collector 144 according to an embodiment of the present disclosure.

Referring to FIGS. 30 and 33 together, the first current collector 144 may include an edge portion 144a, a first uncoated portion coupling portion 144b, and a terminal coupling portion 144c. The edge portion 144a is disposed on the electrode assembly 110. The edge portion 144a may have a substantially rim shape having an empty space ($S_{open}$) formed therein. In the drawings of the present disclosure, only a case in which the edge portion 144a has a substantially circular rim shape is illustrated, but the present disclosure is not limited thereto. The edge portion 144a may have a substantially rectangular rim shape, a hexagonal rim shape, an octagonal rim shape, or other rim shapes, unlike the illustrated one. The number of the edge portion 144a may be increased to two or more. In this case, another edge portion in the form of a rim may be included inside the edge portion 144a.

The terminal coupling portion 144c may have a diameter equal to or greater than the diameter of the flat portion 172c formed on the bottom surface of the terminal 172 in order to secure a welding region for coupling with the flat portion 172c formed on the bottom surface of the terminal 172.

The first uncoated portion coupling portion 144b extends inward from the edge portion 144a and is coupled to the uncoated portion 146a by welding. The terminal coupling portion 144c is spaced apart from the first uncoated portion coupling portion 144b and is positioned inside the edge portion 144a. The terminal coupling portion 144c may be coupled to the terminal 172 by welding. The terminal coupling portion 144c may be located, for example, approximately at the center of the inner space ($S_{open}$) surrounded by the edge portion 144a. The terminal coupling portion 144c may be provided at a position corresponding to the hole formed in the core C of the electrode assembly 110. The terminal coupling portion 144c may be configured to cover the hole formed in the core C of the electrode assembly 110 so that the hole formed in the core C of the electrode assembly 110 is not exposed out of the terminal coupling portion 144c. To this end, the terminal coupling portion 144c may have a larger diameter or width than the hole formed in the core C of the electrode assembly 110.

The first uncoated portion coupling portion 144b and the terminal coupling portion 144c may not be directly connected, but may be disposed to be spaced apart from each other and indirectly connected by the edge portion 144a. Since the first current collector 144 has a structure in which the first uncoated portion coupling portion 144b and the terminal coupling portion 144c are not directly connected to each other but are connected through the edge portion 144c as above, when shock and/or vibration occurs at the cylindrical battery 200, it is possible to disperse the shock applied to the coupling portion between the first uncoated portion coupling portion 144b and the first uncoated portion 146a and the coupling portion between the terminal coupling portion 144c and the terminal 172. In the drawings of the present disclosure, only a case in which four first uncoated portion coupling portions 144b are provided is illustrated, but the present disclosure is not limited thereto. The number of the first uncoated portion coupling portions 144b may be variously determined in consideration of manufacturing difficulty according to the complexity of the shape, electric resistance, the inner space ($S_{open}$) inside the edge portion 144a considering electrolyte impregnation, and the like.

The first current collector 144 may further include a bridge portion 144d extending inward from the edge portion 144a and connected to the terminal coupling portion 144c. At least a part of the bridge portion 144d may have a smaller sectional area compared to the first uncoated portion coupling portion 144b and the edge portion 144a. For example, at least a part of the bridge portion 144d may be formed to have a smaller width and/or thickness compared to the first uncoated portion coupling portion 144b. In this case, the electric resistance increases in the bridge portion 144d. Therefore, when a current flows through the bridge portion 144d, the relatively large resistance causes a part of the bridge portion 144d to be melted due to overcurrent heating. Accordingly, the overcurrent is irreversibly blocked. The sectional area of the bridge portion 144d may be adjusted to an appropriate level in consideration of the overcurrent blocking function.

The bridge portion 144d may include a taper portion 144e whose width is gradually decreased from the inner surface of the edge portion 144a toward the terminal coupling portion 144c. When the taper portion 144e is provided, the rigidity of the component may be improved at the connection portion between the bridge portion 144d and the edge portion 144a. When the taper portion 144e is provided, in the process of manufacturing the cylindrical battery 200, for example, a transfer device and/or a worker may easily and safely transport the first current collector 144 and/or a coupled body of the first current collector 144 and the electrode assembly 110 by gripping the taper portion 144e. That is, when the taper portion 144e is provided, it is possible to prevent product defects that may occur by gripping a portion where welding is performed with other components such as the first uncoated portion coupling portion 144b and the terminal coupling portion 144c.

The first uncoated portion coupling portion 144b may be provided in plural. The plurality of first uncoated portion coupling portions 144b may be disposed substantially at regular intervals from each other in the extending direction of the edge portion 144a. An extension length of each of the plurality of first uncoated portion coupling portions 144b may be substantially equal to each other. The first uncoated portion coupling portion 144b may be coupled to the bending surface region F of the uncoated portion 146a by laser welding. The welding may be replaced by ultrasonic welding, spot welding, or the like.

A welding pattern 144f formed by welding between the first uncoated portion coupling portion 144b and the bending surface region F may have a structure extending along the radial direction of the electrode assembly 110. The welding pattern 144f may be an array of line patterns or dot patterns.

The welding pattern 144f corresponds to the welding region. Therefore, it is desirable that the welding pattern 144f overlaps with the stack number uniform region b1 of the bending surface region F by 50% or more. The welding pattern 144f that does not overlap with the stack number uniform region b1 may overlap with the stack number decrease region b2. More preferably, the entire welding pattern 144f may overlap with the stack number uniform region b1 of the bending surface region F. In the bending surface region F below the point where the welding pattern 144f is formed, the stack number uniform region b1 and, optionally, the stack number decrease region b2 preferably have the stack number of 10 or more.

The terminal coupling portion 144c may be disposed to be surrounded by the plurality of first uncoated portion coupling portions 144b. The terminal coupling portion 144c may be coupled to the flat portion 172c of the terminal 172 by welding. The bridge portion 144d may be positioned between a pair of first uncoated portion coupling portions 144b adjacent to each other. In this case, the distance from the bridge portion 144d to any one of the pair of first uncoated portion coupling portions 144b along the extending direction of the edge portion 144a may be substantially equal to the distance from the bridge portion 144d to the other one of the pair of first uncoated portion coupling portions 144b along the extending direction of the edge portion 144a. The plurality of first uncoated portion coupling portions 144b may be formed to have substantially the same sectional area. The plurality of first uncoated portion coupling portions 144b may be formed to have substantially the same width and thickness.

Although not shown in the drawings, the bridge portion 144d may be provided in plural. Each of the plurality of bridge portions 144d may be disposed between a pair of first uncoated portion coupling portions 144b adjacent to each other. The plurality of bridge portions 144d may be disposed substantially at regular intervals to each other in the extending direction of the edge portion 144a. A distance from each of the plurality of bridge portions 144d to one of the pair of first uncoated portion coupling portions 144b adjacent to each other along the extending direction of the edge portion 144a may be substantially equal to a distance from each of the plurality of the bridge portion 144d to the other first uncoated portion coupling portion 144b.

In the case where the first uncoated portion coupling portion 144b and/or the bridge portion 144d is provided in plural as described above, if the distance between the first uncoated portion coupling portions 144b and/or the distance between the bridge portions 144d and/or the distance between the first uncoated portion coupling portion 144b and the bridge portion 144d is uniformly formed, a current flowing from the first uncoated portion coupling portion 144b toward the bridge portion 144d or a current flowing from the bridge portion 144d toward the first uncoated portion coupling portion 144b may be smoothly formed.

The bridge portion 144d may include a notching portion N formed to partially reduce a sectional area of the bridge portion 144d. The sectional area of the notching portion N may be adjusted, for example, by partially reducing the width and/or thickness of the bridge portion 144d. When the notching portion N is provided, electric resistance is increased in the region where the notching portion N is formed, thereby enabling rapid current interruption when overcurrent occurs.

The notching portion N is preferably provided in a region corresponding to the stack number uniform region of the electrode assembly 110 in order to prevent foreign substances generated during rupturing from flowing into the electrode assembly 110. This is because, in this region, the number of overlapping layers of the segments of the uncoated portion 146a is maintained to the maximum and thus the overlapped segments may function as a mask.

The notching portion N may be wrapped with an insulating tape. Then, since the heat generated in the notching portion N is not dissipated to the outside, the notching portion N may be ruptured more quickly when an overcurrent flows through the bridge portion 144d.

FIG. 34 is a top plan view showing the structure of the second current collector 176 according to an embodiment of the present disclosure.

Referring to FIGS. 30 and 34 together, the second current collector 176 is disposed below the electrode assembly 110. In addition, the second current collector 176 may be configured to electrically connect the uncoated portion 146b of the electrode assembly 110 and the battery housing 171. The second current collector 176 is made of a metal material with conductivity and is electrically connected to the bending surface region F of the uncoated portion 146b. In addition, the second current collector 176 is electrically connected to the battery housing 171. The edge portion of the second current collector 176 may be interposed and fixed between the inner surface of the battery housing 171 and the first gasket 178b. Specifically, the edge portion of the second current collector 176 may be interposed between the lower surface of the beading portion 180 of the battery housing 171 and the first gasket 178b. However, the present disclosure is not limited thereto, and the edge portion of the second current collector 176 may be welded to the inner wall surface of the battery housing 171 in a region where the beading portion 180 is not formed.

The second current collector 176 may include a support portion 176a disposed below the electrode assembly 110, a second uncoated portion coupling portion 176b extending from the support portion 176a approximately along the radial direction of the electrode assembly 110 and coupled to the bending surface region F of the uncoated portion 146b, and a housing coupling portion 176c extending from the support portion 176a toward the inner surface of the battery housing 171 approximately along an inclined direction based on the radial direction of the electrode assembly 110 and coupled to the inner surface of the battery housing 171. The second uncoated portion coupling portion 176b and the housing coupling portion 176c are indirectly connected through the support portion 176a, and are not directly connected to each other. Therefore, when an external shock is applied to the cylindrical battery 200 of the present disclosure, it is possible to minimize the possibility of damage to the coupling portion of the second current collector 176 and the electrode assembly 110 and the coupling portion of the second current collector 176 and the battery housing 171. However, the second current collector 176 of the present disclosure is not limited to the structure where the second uncoated portion coupling portion 176b and the housing coupling portion 176c are only indirectly connected. For example, the second current collector 176 may have a structure that does not include the support portion 176a for indirectly connecting the second uncoated portion coupling portion 176b and the housing coupling portion 176c and/or a structure in which the uncoated portion 146b and the housing coupling portion 176c are directly connected to each other.

The support portion 176a and the second uncoated portion coupling portion 176b are disposed below the electrode assembly 110. The second uncoated portion coupling portion 176b is coupled to the bending surface region F of the uncoated portion 146b. In addition to the second uncoated portion coupling portion 176b, the support portion 176a may also be coupled to the uncoated portion 146b. The second uncoated portion coupling portion 176b and the bending surface region F of the uncoated portion 146b may be coupled by welding. The welding may be replaced with ultrasonic welding or spot welding. The support portion 176a and the second uncoated portion coupling portion 176b are located higher than the beading portion 180 when the beading portion 180 is formed on the battery housing 171.

The support portion 176a has a current collector hole 176d formed at a location corresponding to the hole formed at the core C of the electrode assembly 110. The core C of the electrode assembly 110 and the current collector hole 176d communicating with each other may function as a passage for inserting a welding rod for welding between the terminal 172 and the terminal coupling portion 144c of the first current collector 144 or for irradiating a laser beam.

The current collector hole 176d may have a radius of 0.5 $r_c$ or more compared to the radius ($r_c$) of the hole formed in the core C of the electrode assembly 110. If the radius of the current collector hole 176d is 0.5 $r_c$ to 1.0 $r_c$, when a vent occurs in the cylindrical battery 200, the phenomenon that the winding structure of the separator or electrodes near the core C of the electrode assembly 110 is pushed out of the core C due to the vent pressure is prevented. When the radius of the current collector hole 176d is larger than 1.0 $r_c$, the opening of the core C is maximized, so the electrolyte may be easily injected in the electrolyte injection process.

When the second uncoated portion coupling portion 176b is provided in plural, the plurality of second uncoated portion coupling portions 176b may have a shape extending approximately radially from the support portion 176a of the second current collector 176 toward the sidewall of the battery housing 171. The plurality of second uncoated portion coupling portions 176b may be positioned to be spaced apart from each other along the periphery of the support portion 176a.

The housing coupling portion 176c may be provided in plural. In this case, the plurality of housing coupling portions 176c may have a shape extending approximately radially from the center of the second current collector 176 toward the sidewall of the battery housing 171. Accordingly, the electrical connection between the second current collector 176 and the battery housing 171 may be made at a plurality of points. Since the coupling for electrical connection is made at a plurality of points, the coupling area may be maximized, thereby minimizing electric resistance. The plurality of housing coupling portions 176c may be positioned to be spaced apart from each other along the periphery of the support portion 176a. At least one housing coupling portion 176c may be positioned between the second uncoated portion coupling portions 176b adjacent to each other. The plurality of housing coupling portions 176c may be coupled to, for example, the beading portion 180 in the inner surface of the battery housing 171. The housing coupling portions 176c may be coupled, particularly, to the lower surface of the beading portion 180 by laser welding. The welding may be replaced with, for example, ultrasonic welding, spot welding, or the like. By coupling the plurality of housing coupling portions 176c on the beading portion 180 by welding in this way, the current path may be distributed radially so that the resistance level of the cylindrical battery 200 is limited to about 4 milliohms or less. In addition, as the lower surface of the beading portion 180 has a shape extending in a direction approximately parallel to the upper surface of the battery housing 171, namely in a direction approximately perpendicular to the sidewall of the battery housing 171, and the housing coupling portion 176c also has a shape extending in the same direction, namely in the radial direction and the circumferential direction, the housing coupling portion 176c may be stably in contact with the beading portion 180. In addition, as the housing coupling portion 176c is stably in contact with the flat portion of the beading portion 180, the two components may be welded smoothly, thereby improving the coupling force between the two components and minimizing the increase in resistance at the coupling portion.

The housing coupling portion 176c may include a contact portion 176e coupled onto the inner surface of the battery housing 171 and a connection portion 176f for connecting the support portion 176a and the contact portion 176e.

The contact portion 176e is coupled onto the inner surface of the battery housing 171. In the case where the beading portion 180 is formed on the battery housing 171, the contact portion 176e may be coupled onto the beading portion 180 as described above. More specifically, the contact portion 176e may be electrically coupled to the flat portion formed at the lower surface of the beading portion 180 formed on the battery housing 171, and may be interposed between the lower surface of the beading portion 180 and the first gasket 178b. In this case, for stable contact and coupling, the contact portion 176e may have a shape extending on the beading portion 180 by a predetermined length along the circumferential direction of the battery housing 171.

The connection portion 176f may be bent at an obtuse angle. The bending point may be higher than the middle point of the connection portion 176f. When the connection portion 176f is bent, the contact portion 176e may be stably supported on the flat surface of the beading portion 180. The connection portion 176f is divided into a lower portion and an upper portion based on the bending point, and the lower portion may have a greater length than the upper portion. In addition, the lower portion of the bending point may have a greater inclination angle based on the surface of the support portion 176a than the upper portion. When the connection portion 176f is bent, a pressure (force) applied in the vertical direction of the battery housing 171 may be buffered. For example, in the process of sizing the battery housing 171, when a pressure is transmitted to the contact portion 176e so that the contact portion 176e moves vertically toward the support portion 176b, the bending point of the connection portion 176f moves upward, so that the shape of the connection portion 176 is deformed to buffer the stress.

Meanwhile, the maximum distance from the center of the second current collector 176 to the end of the second uncoated portion coupling portion 176b along the radial direction of the electrode assembly 110 is preferably equal to or smaller than the inner diameter of the battery housing 171 in a region where the beading portion 180 is formed, namely the minimum inner diameter of the battery housing 171. This is to prevent the end of the second uncoated portion coupling portion 176b from pressing the edge of electrode assembly 110 during the sizing process of compressing the battery housing 171 along the height direction.

The second uncoated portion coupling portion 176b includes a hole 176g. The hole 176g may be used as a passage through which the electrolyte may move. The welding pattern 176h formed by welding between the second uncoated portion coupling portion 176b and the bending surface region F may have a structure to extend along the radial direction of the electrode assembly 110. The welding pattern 176h may be a line pattern or a dot array pattern.

The welding pattern 176h corresponds to the welding region. Therefore, it is preferable that the welding pattern 176h overlaps by 50% or more with the stack number uniform region b1 of the bending surface region F located in the lower portion of the electrode assembly 110. The welding pattern 176h that does not overlap with the stack number uniform region b1 may overlap with the stack number decrease region b2. More preferably, the entire welding pattern 176h may overlap with the stack number uniform region b1 of the bending surface region F. In the bending surface region F at the upper portion of the point where the welding pattern 176h is formed, the stack number uniform region b1 and, optionally, the stack number decrease region b2 preferably have the stack number of 10 or more.

The outer diameters of the first current collector 144 and the second current collector 176 described above are different from each other. The outer diameter is an outer diameter of the outer edge of the contact area between the bending surface region F and the current collector. The outer diameter is defined as a maximum value of the distance between two points where a straight line passing through the center of the core C of the electrode assembly meets the edge of the contact area. Since the second current collector 176 is located inside the beading portion 180, its outer diameter is smaller than that of the first current collector 144. In addition, the length of the welding pattern 144f of the first current collector 144 is longer than the length of the welding pattern 176h of the second current collector 176. Preferably, the welding pattern 144f and the welding pattern 176h may extend toward the outer circumference from substantially the same point based on the center of the core C.

The welding region of the first current collector 144 and the second current collector 176 may have a radial structure based on the core center of the electrode assembly.

The welding structure of the upper bending surface region F and the first current collector 144 and/or the welding structure of the lower bending surface region F and the second current collector 176 work synergistically with the winding structure of the electrode assembly to prevent or alleviate the collapse of the core. As a result, it is possible to suppress the electrode from rotating while the cylindrical battery is repeatedly charged and discharged, for example, while the cylindrical battery is charged and discharged beyond the effective usage cycle.

The cylindrical battery 170, 180, 200, 220 according to an embodiment of the present disclosure have an advantage in that electrical connection can be performed at the upper portion thereof.

Figure 35:
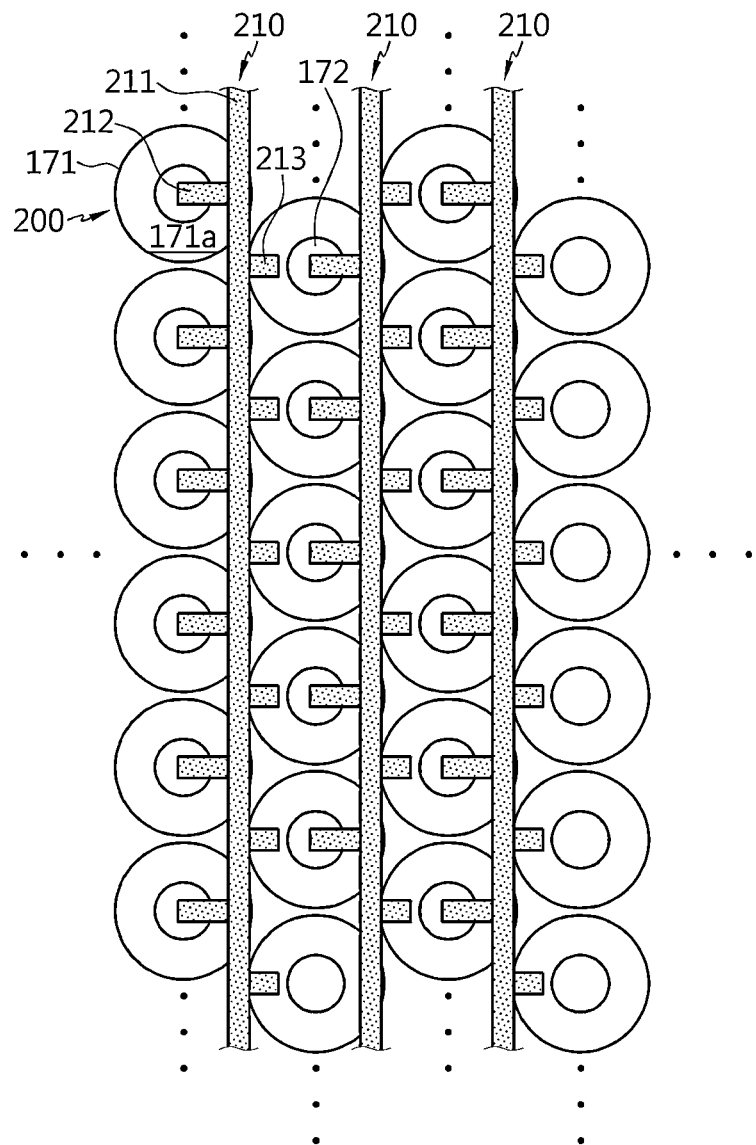
FIG. 35 is a top plan view showing a state in which a plurality of cylindrical batteries are electrically connected.
Figure 36:
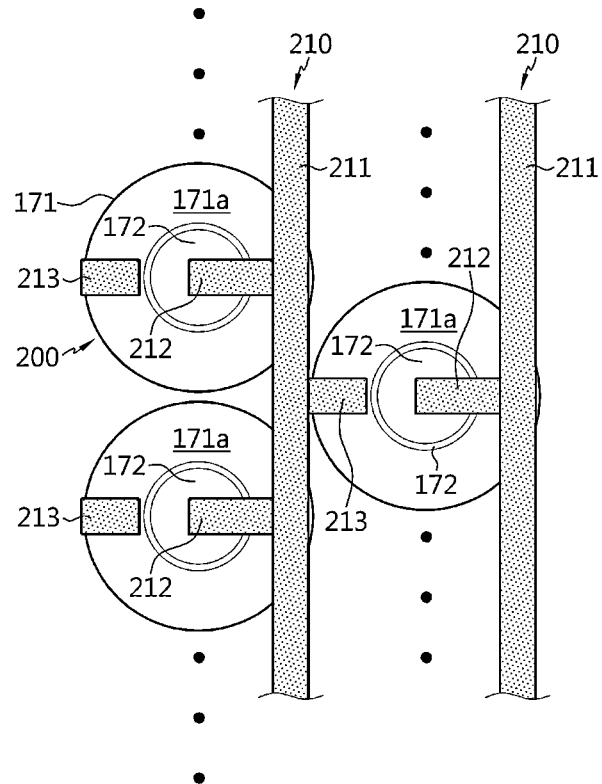
FIG. 36 is a partially enlarged view of FIG. 35.

FIG. 35 is a top plan view illustrating a state in which a plurality of cylindrical batteries 200 are electrically connected, and FIG. 36 is a partially enlarged view of FIG. 35. The cylindrical battery 200 may be replaced with a cylindrical battery 170, 180, 220 having a different structure.

Referring to FIGS. 35 and 36, a plurality of cylindrical batteries 200 may be connected in series and in parallel at an upper portion of the cylindrical batteries 200 using a bus bar 210. The number of cylindrical batteries 200 may be increased or decreased in consideration of the capacity of the battery pack.

In each cylindrical battery 200, the terminal 172 may have a positive polarity, and the flat surface 171a around the terminal 172 of the battery housing 171 may have a negative polarity, or vice versa.

Preferably, the plurality of cylindrical batteries 200 may be arranged in a plurality of columns and rows. Columns are provided in a vertical direction on the drawing, and rows are provided in a left and right direction on the drawing. In addition, in order to maximize space efficiency, the cylindrical batteries 200 may be arranged in a closest packing structure. The closest packing structure is formed when an equilateral triangle is formed by connecting the centers of the terminals 172 exposed out of the battery housing 171 to each other. Preferably, the bus bar 210 connects the cylindrical batteries 200 arranged in the same column in parallel to each other, and connects the cylindrical batteries 200 arranged in two neighboring columns in series with each other.

Preferably, the bus bar 210 may include a body portion 211, a plurality of first bus bar terminals 212 and a plurality of second bus bar terminals 213 for serial and parallel connection.

The body portion 211 may extend along the column of the cylindrical batteries 200 between neighboring terminals 172. Alternatively, the body portion 211 may extend along the column of the cylindrical batteries 200, and the body portion 211 may be regularly bent like a zigzag shape.

The plurality of first bus bar terminals 212 may extend in one side direction of the body portion 211 and may be electrically coupled to the terminal 172 of the cylindrical battery 200 located in one side direction. The electrical connection between the first bus bar terminal 212 and the terminal 172 may be achieved by laser welding, ultrasonic welding, or the like.

The plurality of second bus bar terminals 213 may extend in the other side direction of the body portion 211 and may be electrically coupled to the flat surface 171a around the terminal 172 located in the other side direction. The electrical coupling between the second bus bar terminal 213 and the flat surface 171a may be performed by laser welding, ultrasonic welding, or the like.

Preferably, the body portion 211, the plurality of first bus bar terminals 212 and the plurality of second bus bar terminals 213 may be made of one conductive metal plate. The metal plate may be, for example, an aluminum plate or a copper plate, but the present disclosure is not limited thereto. In a modified example, the body portion 211, the plurality of first bus bar terminals 212 and the second bus bar terminals 213 may be manufactured as separate pieces and then coupled to each other by welding or the like.

The cylindrical battery 200 of the present disclosure as described above has a structure in which resistance is minimized by enlarging the welding region by means of the bending surface region F, multiplexing current paths by means of the second current collector 176, minimizing a current path length, or the like. The AC resistance of the cylindrical battery 200 measured through a resistance meter between the positive electrode and the negative electrode, namely between the terminal 172 and the flat surface 171a around the terminal 172, may be approximately 0.5 milliohms to 4 milliohms, preferably 1 milliohms to 4 milliohms, suitable for fast charging.

In the cylindrical battery 200 according to the present disclosure, since the terminal 172 having a positive polarity and the flat surface 171a having a negative polarity are located in the same direction, it is easy to electrically connect the cylindrical batteries 200 using the bus bar 210.

In addition, since the terminal 172 of the cylindrical battery 200 and the flat surface 171a around the terminal 172 have a large area, the coupling area of the bus bar 210 may be sufficiently secured to sufficiently reduce the resistance of the battery pack including the cylindrical battery 200.

In addition, since electrical wiring may be performed on the upper portion of the cylindrical battery 200, there is an advantage in maximizing the energy density per unit volume of the battery module/pack.

The cylindrical battery according to the above embodiments (modifications) may be used to manufacture a battery pack.

Figure 37:
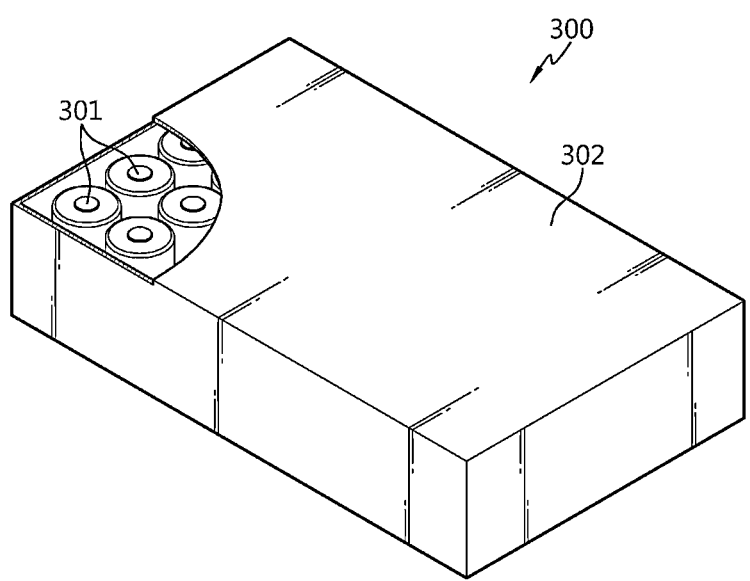
FIG. 37 is a diagram schematically showing a battery pack according to an embodiment of the present disclosure.

FIG. 37 is a diagram schematically showing a battery pack according to an embodiment of the present disclosure.

Referring to FIG. 37, a battery pack 300 according to an embodiment of the present disclosure includes an aggregate in which cylindrical batteries 301 are electrically connected, and a pack housing 302 for accommodating the aggregate. The cylindrical battery 301 may be any one of the batteries according to the above embodiments (modifications). In the drawing, components such as a bus bar, a cooling unit, and an external terminal for electrical connection of the cylindrical batteries 301 are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 38:
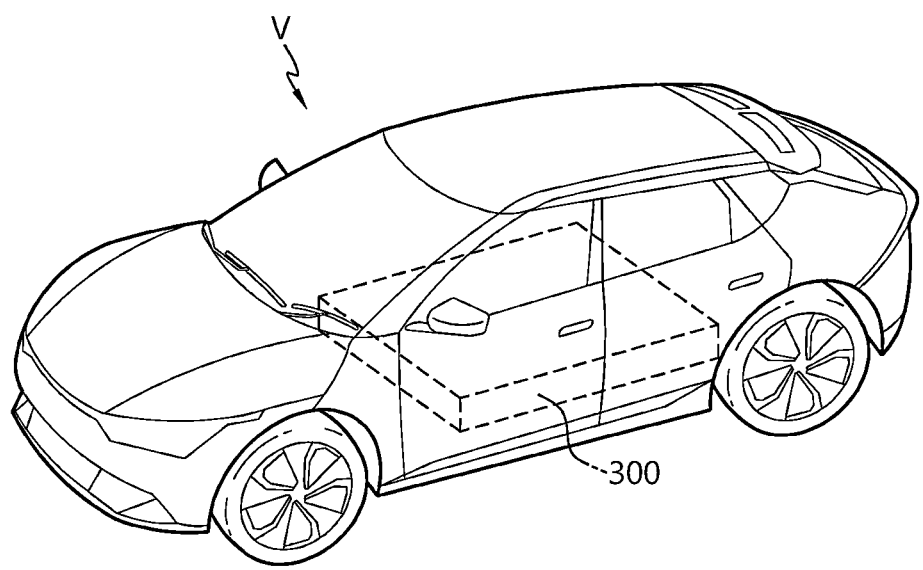
FIG. 38 is a diagram schematically showing a vehicle including the battery pack according to an embodiment of the present disclosure.

FIG. 38 is a diagram schematically showing a vehicle including the battery pack 300 of FIG. 37.

Referring to FIG. 38, a vehicle V according to an embodiment of the present disclosure includes the battery pack 300 according to an embodiment of the present disclosure. The vehicle V operates by receiving power from the battery pack 300 according to an embodiment of the present disclosure.

According to an aspect of the present disclosure, it is possible to prevent the core from collapsing by maintaining the symmetry and circularity of the electrode assembly even if swelling phenomenon occurs by adjusting relative positions of a positive electrode end and a negative electrode end at the core and the outer circumference of the electrode assembly of the cylindrical battery.

According to another aspect of the present disclosure, it is possible to provide a cylindrical battery including an electrode assembly with a structure capable of improving the collapse phenomenon of the core.

According to still another aspect of the present disclosure, the internal resistance of the battery may be reduced and the energy density may be increased by using the uncoated portion itself protruding on the upper and lower portions of the electrode assembly as an electrode tab.

According to another aspect of the present disclosure, by improving the structure of the uncoated portion of the electrode assembly so that the electrode assembly and the inner circumference of the battery housing do not interfere in the process of forming the beading portion of the battery housing, it is possible to prevent a short circuit from occurring inside the cylindrical battery due to partial deformation of the electrode assembly.

According to still another aspect of the present disclosure, by improving the structure of the uncoated portion of the electrode assembly, it is possible to prevent the uncoated portion from being torn when the uncoated portion is bent, and it is possible to improve the welding strength of the current collector by sufficiently increasing the number of overlapping layers of the uncoated portion.

According to still another aspect of the present disclosure, by applying a segment structure to the uncoated portion of the electrode and optimizing the dimensions (width, height, separation pitch) of the segments to sufficiently increase the segment stack number of the area used as the welding target area, it is possible to improve the properties of the area where the current collector is welded.

According to still another aspect of the present disclosure, an electrode assembly having improved energy density and reduced resistance may be provided by applying a structure in which a current collector is welded to a broad area of the bending surface region formed by bending the segments.

According to still another aspect of the present disclosure, a cylindrical battery having an improved design so that electrical wiring can be performed at the upper portion thereof may be provided.

According to still another aspect of the present disclosure, by improving the structure of the uncoated portion adjacent to the core of the electrode assembly, the cavity in the core of the electrode assembly is prevented from being blocked when the uncoated portion is bent, so that the electrolyte injection process and the process of welding the battery housing (or, terminal) and the current collector may be easily performed.

According to still another aspect of the present disclosure, it is possible to provide a cylindrical battery having a structure in which the internal resistance is low, an internal short circuit is prevented, and the welding strength between the current collector and the uncoated portion is improved, and a battery pack and a vehicle including the cylindrical battery.

In particular, the present disclosure may provide a cylindrical battery having a ratio of diameter to height of 0.4 or more and a resistance of 4 milliohm or less, and a battery pack and a vehicle including the cylindrical battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cylindrical battery, comprising:
   an electrode assembly in which a first electrode, a second electrode, and a separator interposed therebetween are wound around a winding axis of the electrode assembly, so as to define a hollow core and an outer circumference of the electrode assembly; and
   a cylindrical battery housing accommodating the electrode assembly,
   wherein a cross-section of the electrode assembly perpendicular to a winding axis direction includes a first fan-shaped region and a second fan-shaped region,
   wherein the first fan-shaped region is defined by a first straight line and a second straight line passing from a center of the core through a core side end of the first electrode and a core side end of the second electrode, respectively, and an outer circumference of the first fan-shaped region is defined as a stress vulnerable region, and
   wherein the second fan-shaped region is defined by a third straight line and a fourth straight line passing from the center of the core through an outer circumference side end of the first electrode and an outer circumference side end of the second electrode, respectively, and an outer circumference of the second fan-shaped region is defined as a stress amplification region, and wherein the electrode assembly has a winding structure in which at least the outer circumference side end of the first electrode of the stress amplification region is spaced apart from an inside of the stress vulnerable region along a circumferential direction of the cross-section of the electrode assembly, wherein in the winding structure, a circumferential angle of the stress vulnerable region has an angle of 30 degrees or more and 180 degrees or less, and a circumferential angle of the stress amplification region has an angle in a range of 1-degrees to 90 degrees.

2. The cylindrical battery according to claim 1, wherein the battery has a ratio of a diameter to a height greater than 0.4.

3. The cylindrical battery according to claim 2, wherein the cylindrical battery has a form factor of 46110, 4875, 48110, 4880, 4680, or 4695.

4. A battery pack, comprising a plurality of cylindrical batteries according to claim 1.

5. A vehicle, comprising the battery pack according to claim 4.

6. The cylindrical battery according to claim 1, wherein a diameter of the cross-section is greater than 40 mm.

7. The cylindrical battery according to claim 1, wherein a region of the outer circumference of the electrode assembly including the outer circumference side end of the first electrode contacts an inner surface of the battery housing.

8. The cylindrical battery according to claim 1, wherein in the winding structure, the stress amplification region is spaced apart from the stress vulnerable region along the circumferential direction of the cross-section of the electrode assembly.

9. The cylindrical battery according to claim 1, wherein the cross-section includes a first semicircular region and a second semicircular region based on a diametric line segment, wherein the diametric line segment passes through a center of the core and is perpendicular to a straight line dividing a circumferential angle of the stress vulnerable region into equal angles, wherein in the winding structure, the stress vulnerable region is located in the first semicircular region and the stress amplification region is located in the second semicircular region.

10. The cylindrical battery according to claim 1, wherein in the winding structure at least a part of the stress amplification region overlaps with a third fan-shaped region in a second semicircular region, wherein the third fan-shaped region is point symmetrical with the stress vulnerable region based on the center of the core.

11. The cylindrical battery according to claim 10, wherein in the winding structure at least a part of the stress amplification region overlaps with a fifth straight line that divides a circumferential angle of the third fan-shaped region into equal angles.

12. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the third straight line and the fourth straight line are located between the second straight line and the fifth straight line based on the circumferential direction of the cross-section.

13. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the third straight line and the fourth straight line are located between the first straight line and the fifth straight line based on the circumferential direction on the cross-section.

14. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the fourth straight line is located between the fifth straight line and the first straight line, and the third straight line is located between the fourth straight line and the second straight line based on the circumferential direction on the cross-section.

15. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the fourth straight line is located between the fifth straight line and the first straight line, and the third straight line is located between the fifth straight line and the second straight line based on the circumferential direction on the cross-section.

16. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the fourth straight line is located between the fifth straight line and the second straight line, and the third straight line is located between the fourth straight line and the first straight line based on the circumferential direction on the cross-section.

17. The cylindrical battery according to claim 1, wherein when a fifth straight line divides a third fan-shaped region into equal angles, wherein the third fan-shaped region is point symmetrical with the stress vulnerable region based on the center of the core, and wherein in the winding structure the fourth straight line is located between the fifth straight line and the second straight line, and the third straight line is located between the fifth straight line and the first straight line based on the circumferential direction on the cross-section.

18. The cylindrical battery according to claim 1, wherein the winding structure has a circumferential angle between the first straight line and the fourth straight line that is greater than a circumferential angle between the second straight line and the third straight line, based on the circumferential direction on the cross-section.

19. The cylindrical battery according to claim 1, wherein the winding structure has a circumferential angle between the second straight line and the fourth straight line that is greater than a circumferential angle between the first straight line and the third straight line, based on the circumferential direction on the cross-section.

20. The cylindrical battery according to claim 1,
wherein the winding structure has a circumferential angle of the stress amplification region that is smaller than a circumferential angle of the stress vulnerable region, based on the center of the core.

21. The cylindrical battery according to claim 1,
wherein the winding structure of the electrode assembly is maintained during charging and discharging in a range of 200 cycles to 900 cycles.

22. The cylindrical battery according to claim 1,
wherein the first electrode and the second electrode are a positive electrode and a negative electrode, respectively,
wherein the first electrode includes a plurality of positive electrode winding turns and the second electrode includes a plurality of negative electrode winding turns,
wherein at least a part of the plurality of negative electrode winding turns is provided adjacent to a core side of the electrode assembly, and
wherein at least a part of the plurality of negative electrode winding turns extends in a radial direction.

23. The cylindrical battery according to claim 22,
wherein the separator includes a plurality of winding turns provided at an inner side of the plurality of negative electrode winding turns.

24. The cylindrical battery according to claim 1,
wherein the first electrode and the second electrode are a positive electrode and a negative electrode, respectively,
wherein the core side end of the second electrode extends further in a direction opposite to the winding-axis direction than the core side end of the first electrode, so as to define at least a part of an innermost winding turn, and
wherein the outer circumference side end of the second electrode extends further in the winding direction than the outer circumference side end of the first electrode, so as to define at least a part of an outermost winding turn.

25. The cylindrical battery according to claim 1,
wherein in the winding structure, the circumferential angle of the stress vulnerable region is has an angle in a range of 87 degrees or more, and the circumferential angle of the stress amplification region has an angle in a range of 32 degrees or less.

26. The cylindrical battery according to claim 1,
wherein the battery housing includes an open end and a bottom portion opposing thereto and accommodates the electrode assembly in a space between the open end and the bottom portion, and
wherein the battery housing is electrically connected to one of the first electrode or the second electrode, so as to have a first polarity.

27. The cylindrical battery according to claim 26, further comprising:
a sealing body sealing the open end of the battery housing; and
a terminal electrically connected to the other of the first electrode or the second electrode, so as to have a second polarity,
wherein the terminal has a surface exposed to an exterior of the cylindrical battery.

28. The cylindrical battery according to claim 1,
wherein the first electrode includes a first uncoated portion at a long side end and extending along the winding axis direction of the electrode assembly,
wherein the first uncoated portion extends and protrudes outward from the separator through one end of the electrode assembly and is in a bent state extending in a radial direction of the electrode assembly to define a first bending surface region, and
wherein the cylindrical battery further comprises a first current collector coupled to the first bending surface region.

29. The cylindrical battery according to claim 28,
wherein the first uncoated portion includes a plurality of segments along the winding-axis direction of the electrode assembly, and
wherein the plurality of segments are in a bent state extending in the radial direction of the electrode assembly to define the first bending surface region.

30. The cylindrical battery according to claim 28,
wherein the second electrode includes a second uncoated portion at a long side end and extending along the winding axis direction,
wherein the second uncoated portion extends and protrudes outward from the separator through the other end of the electrode assembly and is in a bent state extending toward the core to define a second bending surface region, and
wherein the cylindrical battery further comprises a second current collector coupled to the second bending surface region.

31. The cylindrical battery according to claim 30,
wherein the second uncoated portion includes a plurality of segments along the winding axis direction of the electrode assembly, and
wherein the plurality of segments are in a bent state extending in the radial direction of the electrode assembly to define the second bending surface region.

32. The cylindrical battery according to claim 28,
wherein a coupling region of the first current collector has a radial structure.

33. The cylindrical battery according to claim 30,
wherein the welding a coupling region of the second current collector has a radial structure.

* * * * *